United States Patent
Gao et al.

(10) Patent No.: US 10,749,430 B2
(45) Date of Patent: Aug. 18, 2020

(54) POWER TRANSMISSION APPARATUS AND CONTROL METHOD THEREFOR, AND POWER SUPPLY SYSTEM

(71) Applicant: Positec Power Tools (Suzhou) Co., Ltd., Suzhou (CN)

(72) Inventors: Zhendong Gao, Suzhou (CN); Guoliang Mu, Suzhou (CN); Fangshi Liu, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 326 days.

(21) Appl. No.: 15/701,593

(22) Filed: Sep. 12, 2017

(65) Prior Publication Data

US 2018/0102706 A1 Apr. 12, 2018

Related U.S. Application Data

(63) Continuation-in-part of application No. PCT/CN2016/076300, filed on Mar. 14, 2016, which
(Continued)

(30) Foreign Application Priority Data

Mar. 13, 2015 (CN) .......................... 2015 1 0111767
Mar. 13, 2015 (CN) .......................... 2015 1 0111966
(Continued)

(51) Int. Cl.
*H02M 3/155* (2006.01)
*H02J 7/02* (2016.01)
(Continued)

(52) U.S. Cl.
CPC .......... *H02M 3/155* (2013.01); *H02J 7/0063* (2013.01); *H02J 7/02* (2013.01); *H02M 3/02* (2013.01); *H02M 7/42* (2013.01)

(58) Field of Classification Search
CPC ........ H02M 3/155; H02J 7/0063; H02J 9/062; H02J 9/061; H02J 9/06
(Continued)

(56) References Cited

U.S. PATENT DOCUMENTS 3,886,426 A 5/1975 Daggett
3,919,615 A 11/1975 Niecke
(Continued)

FOREIGN PATENT DOCUMENTS

AU 1613688 A 11/1988
CA 1315335 C 3/1993
(Continued)

OTHER PUBLICATIONS

Computer-generated English language abstract and computer-generated English language translation for EP2819207A1 extracted from espacenet.com database on Dec. 21, 2017, 13 pages.
(Continued)

*Primary Examiner* — Richard V Muralidar
(74) *Attorney, Agent, or Firm* — Howard & Howard Attorneys PLLC

(57) ABSTRACT

This invention discloses an electrical energy transmission apparatus. The electrical energy transmission apparatus includes an input component which is connected to a direct current (DC) energy storage component, an output component which comprises an alternating current (AC) device interface used to connect an AC device, and an adapter component which transfers electrical energy from the input component to the output component. The adapter component comprises a DC driving unit and an AC driving unit. The DC driving unit converts energy of the DC energy storage component into a DC power. The AC driving unit converts energy of the DC energy storage component into an
(Continued)

US 10,749,430 B2

Page 2

AC power. At least one of the DC driving unit and the AC driving unit is connected to the AC device interface.

26 Claims, 74 Drawing Sheets

Related U.S. Application Data is a continuation-in-part of application No. PCT/CN2016/085285, filed on Jun. 8, 2016.

(30) Foreign Application Priority Data

| Jun. 11, 2015 | (CN) | 2015 2 0401960 U |
| Jul. 9, 2015 | (CN) | 2015 1 0400765 |
| Jul. 29, 2015 | (CN) | 2015 2 0558879 U |
| Jul. 31, 2015 | (CN) | 2015 1 0465428 |
| Oct. 22, 2015 | (CN) | 2015 1 0697073 |
| Oct. 29, 2015 | (CN) | 2015 1 0717601 |
| Jan. 15, 2016 | (CN) | 2016 1 0028021 |

(51) Int. Cl.
H02M 7/42 (2006.01)
H02M 3/02 (2006.01)
H02J 7/00 (2006.01)

(58) Field of Classification Search
USPC ...... 320/138; 307/43, 46–48, 64–68, 80, 81, 307/85–86
See application file for complete search history.

(56) References Cited

U.S. PATENT DOCUMENTS

| 4,129,817 A | 12/1978 | Yew et al. |
| 4,360,766 A | 11/1982 | Bogardus, Jr. |
| 4,748,344 A | 5/1988 | Sing |
| 5,095,259 A | 3/1992 | Bailey et al. |
| 5,111,127 A | 5/1992 | Johnson |
| 5,211,321 A | 5/1993 | Rodriguez |
| 5,217,395 A | 6/1993 | Bailey et al. |
| 5,254,929 A | 10/1993 | Yang |
| 5,929,597 A | 7/1999 | Pfeifer et al. |
| 6,087,815 A | 7/2000 | Pfeifer et al. |
| 6,430,692 B1 | 8/2002 | Kimble et al. |
| 6,566,843 B2 | 5/2003 | Takano et al. |
| 9,276,250 B2 | 3/2016 | Hwang |
| 9,780,583 B2 | 10/2017 | Furui et al. |
| 2001/0015579 A1 | 8/2001 | Nakagawa et al. |
| 2002/0149345 A1 | 10/2002 | Takano et al. |
| 2003/0090162 A1 | 5/2003 | Cornog et al. |
| 2004/0207366 A1 | 10/2004 | Sung |
| 2004/0257038 A1 | 12/2004 | Johnson et al. |
| 2004/0263119 A1 | 12/2004 | Meyer et al. |
| 2005/0007068 A1 | 1/2005 | Johnson et al. |
| 2005/0153596 A1* | 7/2005 | VanWambeke ........... B25F 5/02 439/500 |
| 2005/0161305 A1 | 7/2005 | Jenni et al. |
| 2005/0258801 A9 | 11/2005 | Johnson et al. |
| 2005/0286281 A1 | 12/2005 | Victor et al. |
| 2006/0010850 A1 | 1/2006 | Jacobson et al. |
| 2006/0038535 A1 | 2/2006 | Lang |
| 2006/0071634 A1 | 4/2006 | Meyer et al. |
| 2006/0091858 A1 | 5/2006 | Johnson et al. |
| 2006/0103357 A1 | 5/2006 | Johnson et al. |
| 2006/0108975 A1 | 5/2006 | Meyer et al. |
| 2006/0108983 A1 | 5/2006 | Meyer et al. |
| 2006/0108984 A1 | 5/2006 | Johnson et al. |
| 2006/0117580 A1 | 6/2006 | Serdynski et al. |
| 2006/0164032 A1 | 7/2006 | Johnson et al. |
| 2007/0103109 A1 | 5/2007 | Meyer et al. |
| 2007/0103116 A1 | 5/2007 | Johnson et al. |
| 2007/0103121 A1 | 5/2007 | Johnson et al. |
| 2007/0108942 A1 | 5/2007 | Johnson et al. |
| 2007/0132428 A1 | 6/2007 | Wise |
| 2007/0273334 A1 | 11/2007 | Meyer et al. |
| 2008/0012526 A1 | 1/2008 | Sadow |
| 2008/0012530 A1 | 1/2008 | Johnson et al. |
| 2008/0055951 A1 | 3/2008 | Schreiber |
| 2008/0185993 A1 | 8/2008 | Johnson et al. |
| 2008/0265678 A1 | 10/2008 | Brotto et al. |
| 2008/0266913 A1 | 10/2008 | Brotto et al. |
| 2009/0071675 A1 | 3/2009 | Hanawa et al. |
| 2009/0087729 A1 | 4/2009 | Johnson et al. |
| 2009/0153101 A1 | 6/2009 | Meyer et al. |
| 2009/0160452 A1 | 6/2009 | Meyer |
| 2009/0195216 A1 | 8/2009 | Johnson et al. |
| 2009/0197152 A1 | 8/2009 | Johnson et al. |
| 2009/0307865 A1 | 12/2009 | Williamson et al. |
| 2010/0102772 A1 | 4/2010 | Smith |
| 2010/0133911 A1 | 6/2010 | Williams et al. |
| 2010/0135054 A1 | 6/2010 | Zacharias |
| 2010/0148729 A1 | 6/2010 | Johnson et al. |
| 2010/0167110 A1 | 7/2010 | Johnson et al. |
| 2010/0236807 A1 | 9/2010 | Johnson et al. |
| 2010/0264188 A1 | 10/2010 | Carlsson et al. |
| 2010/0320969 A1 | 12/2010 | Sakakibara et al. |
| 2010/0327815 A1 | 12/2010 | Johnson et al. |
| 2011/0043143 A1 | 2/2011 | Alter |
| 2011/0090726 A1 | 4/2011 | Brotto et al. |
| 2011/0114350 A1 | 5/2011 | Johnson et al. |
| 2011/0146023 A1 | 6/2011 | Wada et al. |
| 2011/0214896 A1 | 9/2011 | Johnson et al. |
| 2011/0215767 A1 | 9/2011 | Johnson et al. |
| 2011/0250484 A1 | 10/2011 | Meng |
| 2011/0289716 A1 | 12/2011 | Williamson et al. |
| 2011/0297411 A1 | 12/2011 | Johnson et al. |
| 2012/0001596 A1 | 1/2012 | Meyer et al. |
| 2012/0025750 A1 | 2/2012 | Margo |
| 2012/0048588 A1 | 3/2012 | Iyoda et al. |
| 2012/0052356 A1 | 3/2012 | Sugiura et al. |
| 2012/0066916 A1 | 3/2012 | Heinzelmann et al. |
| 2012/0118595 A1 | 5/2012 | Pellenc |
| 2012/0194136 A1 | 8/2012 | Johnson et al. |
| 2012/0281392 A1 | 11/2012 | Workman et al. |
| 2012/0286718 A1 | 11/2012 | Richards |
| 2012/0301764 A1 | 11/2012 | Johnson et al. |
| 2012/0321912 A1 | 12/2012 | Hachisuka et al. |
| 2013/0025893 A1* | 1/2013 | Ota ........................ H02J 1/10 173/2 |
| 2013/0043826 A1 | 2/2013 | Workman et al. |
| 2013/0062952 A1 | 3/2013 | Park et al. |
| 2013/0119101 A1 | 5/2013 | Hachisuka |
| 2013/0154549 A1 | 6/2013 | Hanawa et al. |
| 2013/0162055 A1 | 6/2013 | Reber et al. |
| 2013/0164600 A1 | 6/2013 | Rosskamp et al. |
| 2013/0183562 A1 | 7/2013 | Workman et al. |
| 2013/0224527 A1 | 8/2013 | Johnson et al. |
| 2013/0224528 A1 | 8/2013 | Johnson et al. |
| 2013/0239361 A1 | 9/2013 | Pellenc |
| 2013/0241499 A1 | 9/2013 | Johnson et al. |
| 2013/0244070 A1 | 9/2013 | Johnson et al. |
| 2013/0285452 A1 | 10/2013 | Gramm |
| 2013/0285476 A1 | 10/2013 | Nakano et al. |
| 2013/0335012 A1 | 12/2013 | Meyer et al. |
| 2014/0000922 A1 | 1/2014 | Pellenc |
| 2014/0009857 A1* | 1/2014 | Suzuki ..................... H02H 3/08 361/87 |
| 2014/0011061 A1 | 1/2014 | Yoshinari et al. |
| 2014/0041887 A1 | 2/2014 | Johnson et al. |
| 2014/0049113 A1 | 2/2014 | Choe |
| 2014/0091771 A1 | 4/2014 | Johnson et al. |
| 2014/0151079 A1 | 6/2014 | Furui et al. |
| 2014/0153171 A1 | 6/2014 | Ogura et al. |
| 2014/0158389 A1 | 6/2014 | Ito et al. |
| 2014/0159507 A1 | 6/2014 | Johnson et al. |
| 2014/0159640 A1 | 6/2014 | Yoshikawa et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0191705 A1 | 7/2014 | Takao et al. |

(56) References Cited

U.S. PATENT DOCUMENTS

| | | |
|---|---|---|
| 2014/0285020 A1 | 9/2014 | Yang et al. |
| 2014/0327401 A1 | 11/2014 | Pickens et al. |
| 2015/0041512 A1 | 2/2015 | Rief et al. |
| 2015/0042280 A1 | 2/2015 | Rief et al. |
| 2015/0044519 A1 | 2/2015 | Rief et al. |
| 2015/0050531 A1 | 2/2015 | Felser et al. |
| 2015/0050532 A1 | 2/2015 | Waigel et al. |
| 2015/0072210 A1 | 3/2015 | Waigel et al. |
| 2015/0111480 A1 | 4/2015 | Vanko et al. |
| 2015/0171654 A1 | 6/2015 | Horie et al. |
| 2015/0185289 A1 | 7/2015 | Yang et al. |
| 2015/0188101 A1 | 7/2015 | Zhang et al. |
| 2015/0188332 A1 | 7/2015 | Nakano et al. |
| 2015/0188333 A1 | 7/2015 | Zhang et al. |
| 2015/0194646 A1 | 7/2015 | Yoshinari et al. |
| 2015/0194647 A1 | 7/2015 | Yoshinari et al. |
| 2015/0207431 A1 | 7/2015 | Brotto et al. |
| 2015/0228940 A1 | 8/2015 | Fujisawa |
| 2015/0255773 A1 | 9/2015 | Yoshinari et al. |
| 2015/0256111 A1 | 9/2015 | Forster et al. |
| 2015/0263544 A1 | 9/2015 | Johnson et al. |
| 2015/0288038 A1 | 10/2015 | Johnson et al. |
| 2015/0288209 A1 | 10/2015 | Rippel et al. |
| 2015/0318581 A1 | 11/2015 | Johnson et al. |
| 2015/0318716 A1 | 11/2015 | Pickens et al. |
| 2015/0330294 A1 | 11/2015 | Golad |
| 2015/0340887 A1 | 11/2015 | Meyer et al. |
| 2015/0340894 A1 | 11/2015 | Horie et al. |
| 2015/0380982 A1 | 12/2015 | Choe |
| 2016/0020443 A1* | 1/2016 | White .................. H02P 25/14 318/245 |
| 2016/0056731 A1 | 2/2016 | Brotto et al. |
| 2016/0099575 A1 | 4/2016 | Velderman et al. |
| 2016/0099590 A1 | 4/2016 | Velderman et al. |
| 2016/0126533 A1 | 5/2016 | Velderman et al. |
| 2016/0204475 A1 | 7/2016 | White et al. |
| 2016/0226290 A1 | 8/2016 | Johnson et al. |
| 2016/0261114 A1 | 9/2016 | Brotto et al. |
| 2016/0285143 A1 | 9/2016 | Rief et al. |
| 2016/0301113 A1 | 10/2016 | Johnson et al. |
| 2016/0308380 A1 | 10/2016 | Johnson et al. |
| 2016/0336558 A1 | 11/2016 | White et al. |
| 2016/0336559 A1 | 11/2016 | White et al. |
| 2016/0336793 A1 | 11/2016 | Seman, Jr. et al. |
| 2017/0047760 A1 | 2/2017 | Rippel et al. |
| 2017/0126038 A1 | 5/2017 | Yoshikawa et al. |
| 2017/0256815 A1 | 9/2017 | Johnson et al. |
| 2017/0271899 A1 | 9/2017 | Johnson et al. |
| 2017/0279290 A1 | 9/2017 | Johnson et al. |

FOREIGN PATENT DOCUMENTS

| | | |
|---|---|---|
| CA | 2347139 A1 | 11/2002 |
| CN | 2185942 Y | 12/1994 |
| CN | 1636682 A | 7/2005 |
| CN | 1805261 A | 7/2006 |
| CN | 1937375 A | 3/2007 |
| CN | 1949618 A | 4/2007 |
| CN | 101299164 A | 11/2008 |
| CN | 101304180 A | 11/2008 |
| CN | 100461608 C | 2/2009 |
| CN | 201742121 U | 2/2011 |
| CN | 102095051 A | 6/2011 |
| CN | 201947160 U | 8/2011 |
| CN | 102223097 A | 10/2011 |
| CN | 202016044 U | 10/2011 |
| CN | 102263217 A | 11/2011 |
| CN | 202042530 U | 11/2011 |
| CN | 202127354 U | 1/2012 |
| CN | 202150709 U | 2/2012 |
| CN | 102386359 A | 3/2012 |
| CN | 202159716 U | 3/2012 |
| CN | 102412576 A | 4/2012 |
| CN | 202309128 U | 7/2012 |
| CN | 202488199 U | 10/2012 |
| CN | 202712292 U | 1/2013 |
| CN | 202749891 U | 2/2013 |
| CN | 202798123 U | 3/2013 |
| CN | 103066684 A | 4/2013 |
| CN | 103311967 A | 9/2013 |
| CN | 203261105 U | 10/2013 |
| CN | 203368044 U | 12/2013 |
| CN | 203407658 U | 1/2014 |
| CN | 103560677 A | 2/2014 |
| CN | 103732361 A | 4/2014 |
| CN | 203524002 U | 4/2014 |
| CN | 103956441 A | 7/2014 |
| CN | 104064720 A | 9/2014 |
| CN | 104065154 A | 9/2014 |
| CN | 203813692 U | 9/2014 |
| CN | 104242385 A | 12/2014 |
| CN | 204045695 U | 12/2014 |
| CN | 204119067 U | 1/2015 |
| CN | 204189915 U | 3/2015 |
| CN | 204189920 U | 3/2015 |
| CN | 104701580 A | 6/2015 |
| CN | 104795854 A | 7/2015 |
| CN | 204541108 U | 8/2015 |
| CN | 204541109 U | 8/2015 |
| DE | 29910045 U1 | 9/1999 |
| DE | 212012000160 U1 | 4/2014 |
| EP | 0291131 A1 | 11/1988 |
| EP | 0310717 A1 | 4/1989 |
| EP | 0508694 A2 | 10/1992 |
| EP | 2262093 A1 | 12/2010 |
| EP | 2819207 A1 | 12/2014 |
| FR | 2958083 A1 | 9/2011 |
| FR | 2990303 A3 | 11/2013 |
| GB | 2409832 B | 12/2005 |
| IT | 1394558 B1 | 7/2012 |
| JP | S6439240 A | 2/1989 |
| JP | H03062783 U1 | 6/1991 |
| JP | H04101357 U | 9/1992 |
| JP | H073983 U | 1/1995 |
| JP | 2000164182 A | 6/2000 |
| JP | 2002315217 A | 10/2002 |
| JP | 2002315223 A | 10/2002 |
| JP | 2005149868 A | 6/2005 |
| JP | 2008109782 A | 5/2008 |
| JP | 2009278832 A | 11/2009 |
| JP | 2011216304 A | 10/2011 |
| JP | 2013004224 A | 1/2013 |
| JP | 2013004225 A | 1/2013 |
| JP | 2013004226 A | 1/2013 |
| JP | 2013004227 A | 1/2013 |
| JP | 2013045691 A | 3/2013 |
| JP | 2013046512 A | 3/2013 |
| JP | 2013071219 A | 4/2013 |
| JP | 2014014890 A | 1/2014 |
| JP | 2014014891 A | 1/2014 |
| JP | 2014017098 A | 1/2014 |
| JP | 2014017099 A | 1/2014 |
| JP | 2014017951 A | 1/2014 |
| JP | 2014017953 A | 1/2014 |
| JP | 2014029660 A | 2/2014 |
| JP | 2014038816 A | 2/2014 |
| JP | 2014046388 A | 3/2014 |
| JP | 2014128856 A | 7/2014 |
| JP | 2014130759 A | 7/2014 |
| JP | 5595773 B2 | 9/2014 |
| JP | 2014235812 A | 12/2014 |
| JP | 2015003045 A | 1/2015 |
| JP | 5851156 B2 | 2/2016 |
| JP | 2016021277 A | 2/2016 |
| JP | 2016021278 A | 2/2016 |
| JP | 5873903 B2 | 3/2016 |
| JP | 2016225317 A | 12/2016 |
| KR | 20130027699 A | 3/2013 |
| KR | 101418900 B1 | 7/2014 |
| NL | 8701180 A | 12/1988 |
| WO | 2005058554 A1 | 6/2005 |
| WO | WO2005058554 * | 6/2005 |
| WO | 2008155209 A1 | 12/2008 |

(56) References Cited

FOREIGN PATENT DOCUMENTS

| WO | 2009128079 A1 | | 10/2009 |
|---|---|---|---|
| WO | 2009128080 A1 | | 10/2009 |
| WO | 2009128081 A1 | | 10/2009 |
| WO | 2009128082 A1 | | 10/2009 |
| WO | 2013027599 A1 | | 2/2013 |
| WO | 2014077386 A1 | | 5/2014 |
| WO | WO2014077386 | * | 5/2014 |
| WO | 2014103306 A2 | | 7/2014 |
| WO | 2014192372 A1 | | 12/2014 |
| WO | 2015065254 A1 | | 5/2015 |

OTHER PUBLICATIONS

English language abstract and computer-generated English language translation for FR2958083A1 extracted from espacenet.com database on Dec. 21, 2017, 11 pages.
English language abstract and computer-generated English language translation for FR2990303A3 extracted from espacenet.com database on Dec. 21, 2017, 12 pages.
English language abstract not found for IT1394558B1; however, see English language equivalent EP2262093A1. Original document of equivalent EP2262093A1 extracted from espacenet.com database on Dec. 21, 2017, 12 pages.
English language abstract for JPS6439240A extracted from espacenet.com database on Jan. 4, 2018, 1 page.
English language abstract and computer-generated English language translation for JPH03062783U1 extracted from PAJ database on Jan. 4, 2018, 4 pages.
Computer-generated English language translation for JPH04101357U extracted from espacenet.com database on Dec. 21, 2017, 5 pages.
Computer-generated English language translation for JPH073983U extracted from espacenet.com database on Jan. 11, 2018, 4 pages.
English language abstract and computer-generated English language translation for JP2000164182A extracted from espacenet.com database on Dec. 21, 2017, 7 pages.
English language abstract and computer-generated English language translation for JP2002315217A extracted from espacenet.com database on Dec. 21, 2017, 10 pages.
English language abstract and computer-generated English language translation for JP2002315223A extracted from espacenet.com database on Dec. 21, 2017, 11 pages.
English language abstract and computer-generated English language translation for JP2005149868A extracted from espacenet.com database on Dec. 21, 2017, 8 pages.
English language abstract and computer-generated English language translation for JP2008109782A extracted from espacenet.com database on Dec. 21, 2017, 14 pages.
English language abstract and computer-generated English language translation for JP2009278832A extracted from espacenet.com database on Dec. 21, 2017, 15 pages.
English language abstract and computer-generated English language translation for JP2011216304A extracted from espacenet.com database on Dec. 21, 2017, 10 pages.
English language abstract and computer-generated English language translation for JP2013004224A extracted from espacenet.com database on Dec. 21, 2017, 18 pages.
English language abstract and computer-generated English language translation for JP2013004225A extracted from espacenet.com database on Dec. 21, 2017, 19 pages.
English language abstract and computer-generated English language translation for JP2013004226A extracted from espacenet.com database on Dec. 21, 2017, 16 pages.
English language abstract and computer-generated English language translation for JP2013004227A extracted from espacenet.com database on Dec. 21, 2017, 14 pages.
English language abstract and computer-generated English language translation for JP2013045691A extracted from espacenet.com database on Dec. 21, 2017, 14 pages.
English language abstract and computer-generated English language translation for JP2013046512A extracted from espacenet.com database on Dec. 21, 2017, 11 pages.
English language abstract and computer-generated English language translation for JP2013071219A extracted from espacenet.com database on Dec. 21, 2017, 14 pages.
English language abstract and computer-generated English language translation for JP2014014890A extracted from espacenet.com database on Dec. 21, 2017, 21 pages.
English language abstract and computer-generated English language translation for JP2014014891A extracted from espacenet.com database on Jan. 4, 2018, 23 pages.
English language abstract and computer-generated English language translation for JP2014017098A extracted from espacenet.com database on Jan. 4, 2018, 21 pages.
English language abstract and computer-generated English language translation for JP2014017099A extracted from espacenet.com database on Jan. 4, 2018, 23 pages.
English language abstract and computer-generated English language translation for JP2014017951A extracted from espacenet.com database on Jan. 4, 2018, 21 pages.
English language abstract and computer-generated English language translation for JP2014017953A extracted from espacenet.com database on Jan. 4, 2018, 26 pages.
English language abstract for JP2014029660A extracted from espacenet.com database on Jan. 4, 2018, 2 pages.
English language abstract and computer-generated English language translation for JP2014038816A extracted from espacenet.com database on Jan. 4, 2018, 12 pages.
English language abstract for JP2014046388A extracted from espacenet.com database on Jan. 4, 2018, 1 page.
English language abstract and computer-generated English language translation for JP2014128856A extracted from PAJ database on Jan. 4, 2018, 15 pages.
English language abstract and computer-generated English language translation for JP2014130759A extracted from espacenet.com database on Jan. 4, 2018, 17 pages.
English language abstract and computer-generated English language translation for JP5595773B2 extracted from espacenet.com database on Dec. 21, 2017, 10 pages.
English language abstract and computer-generated English language translation for JP2014235812A extracted from espacenet.com database on Jan. 4, 2018, 16 pages.
English language abstract and computer-generated English language translation for JP2015003045A extracted from espacenet.com database on Jan. 4, 2018, 10 pages.
English language abstract and computer-generated English language translation for JP2016021277A extracted from espacenet.com database on Jan. 4, 2018, 12 pages.
English language abstract and computer-generated English language translation for JP5851156B2 extracted from espacenet.com database on Dec. 21, 2017, 13 pages.
English language abstract and computer-generated English language translation for JP2016021278A extracted from espacenet.com database on Jan. 4, 2018, 16 pages.
English language abstract and computer-generated English language translation for JP5873903B2 extracted from espacenet.com database on Dec. 21, 2017, 7 pages.
English language abstract and computer-generated English language translation for JP2016225317A extracted from espacenet.com database on Jan. 4, 2018, 23 pages.
English language abstract and computer-generated English language translation for KR20130027699A extracted from espacenet.com database on Jan. 4, 2018, 12 pages.
English language abstract and computer-generated English language translation for KR101418900B1 extracted from espacenet.com database on Jan. 4, 2018, 12 pages.
English language abstract for NL8701180A extracted from espacenet.com database on Jan. 4, 2018, 2 pages.
English language abstract and computer-generated English language translation for WO2008155209A1 extracted from espacenet.com database on Jan. 4, 2018, 16 pages.

(56) References Cited

OTHER PUBLICATIONS

English language abstract and computer-generated English language translation for WO2013027599A1 extracted from espacenet.com database on Jan. 4, 2018, 16 pages.
English language abstract and computer-generated English language translation for WO2014077386A1 extracted from espacenet.com database on Jan. 4, 2018, 13 pages.
English language abstract and computer-generated English language translation for WO2014192372A1 extracted from espacenet.com database on Jan. 4, 2018, 17 pages.
International Search Report for Application No. PCT/CN2016/076300 dated Jun. 13, 2016, 2 pages.
International Search Report for Application No. PCT/CN2016/085285 dated Sep. 14, 2016, 3 pages.
English language abstract and computer-generated English language translation for CN2185942A extracted from espacenet.com database on Dec. 21, 2017, 6 pages.
English language abstract for CN1636682A extracted from espacenet.com database on Dec. 20, 2017, 2 pages.
English language abstract and computer-generated English language translation for CN1805261A extracted from espacenet.com database on Dec. 20, 2017, 7 pages.
English language abstract and computer-generated English language translation for CN1937375A extracted from espacenet.com database on Dec. 20, 2017, 10 pages.
English language abstract and computer-generated English language translation for CN1949618A extracted from espacenet.com database on Dec. 20, 2017, 13 pages.
English language abstract and computer-generated English language translation for CN101299164A extracted from espacenet.com database on Dec. 20, 2017, 24 pages.
English language abstract and computer-generated English language translation for CN101304180A extracted from espacenet.com database on Dec. 20, 2017, 17 pages.
English language abstract and computer-generated English language translation for CN100461608C extracted from espacenet.com database on Dec. 20, 2017, 13 pages.
English language abstract and computer-generated English language translation for CN201742121U extracted from espacenet.com database on Dec. 20, 2017, 11 pages.
English language abstract and computer-generated English language translation for CN102095051A extracted from espacenet.com database on Dec. 20, 2017, 10 pages.
English language abstract and computer-generated English language translation for CN201947160U extracted from espacenet.com database on Dec. 20, 2017, 10 pages.
English language abstract and computer-generated English language translation for CN102223097A extracted from espacenet.com database on Dec. 20, 2017, 8 pages.
English language abstract and computer-generated English language translation for CN202016044U extracted from espacenet.com database on Dec. 20, 2017, 8 pages.
English language abstract and computer-generated English language translation for CN202042530U extracted from espacenet.com database on Dec. 20, 2017, 12 pages.
Computer-generated English language translation for CN102263217A extracted from espacenet.com database on Dec. 20, 2017, 8 pages.
English language abstract and computer-generated English language translation for CN202127354U extracted from espacenet.com database on Dec. 20, 2017, 5 pages.
English language abstract and computer-generated English language translation for CN202150709U extracted from espacenet.com database on Dec. 21, 2017, 6 pages.
English language abstract and computer-generated English language translation for CN202159716U extracted from espacenet.com database on Jan. 11, 2018, 9 pages.
English language abstract for CN102386359A extracted from espacenet.com database on Dec. 20, 2017, 2 pages.
English language abstract and computer-generated English language translation for CN102412576A extracted from espacenet.com database on Dec. 20, 2017, 14 pages.
English language abstract and computer-generated English language translation for CN202309128U extracted from espacenet.com database on Dec. 21, 2017, 7 pages.
English language abstract and computer-generated English language translation for CN202488199U extracted from espacenet.com database on Jan. 4, 2018, 7 pages.
English language abstract and computer-generated English language translation for CN202712292U extracted from espacenet.com database on Dec. 21, 2017, 7 pages.
English language abstract and computer-generated English language translation for CN202749891U extracted from espacenet.com database on Dec. 21, 2017, 12 pages.
English language abstract and computer-generated English language translation for CN202798123U extracted from espacenet.com database on Dec. 20, 2017, 9 pages.
English language abstract and computer-generated English language translation for CN103066684A extracted from espacenet.com database on Dec. 20, 2017, 17 pages.
English language abstract and computer-generated English language translation for CN103311967A extracted from espacenet.com database on Dec. 20, 2017, 9 pages.
English language abstract and computer-generated English language translation for CN203261105U extracted from espacenet.com database on Dec. 20, 2017, 13 pages.
English language abstract and computer-generated English language translation for CN203368044U extracted from espacenet.com database on Dec. 21, 2017, 8 pages.
English language abstract and computer-generated English language translation for CN203407658U extracted from espacenet.com database on Dec. 21, 2017, 11 pages.
English language abstract and computer-generated English language translation for CN103560677A extracted from espacenet.com database on Dec. 20, 2017, 10 pages.
English language abstract and computer-generated English language translation for CN203524002U extracted from espacenet.com database on Jan. 4, 2018, 5 pages.
English language abstract for CN103732361A extracted from espacenet.com database on Dec. 20, 2017, 2 pages.
English language abstract and computer-generated English language translation for CN103956441A extracted from espacenet.com database on Dec. 20, 2017, 8 pages.
English language abstract and computer-generated English language translation for CN203813692U extracted from espacenet.com database on Dec. 21, 2017, 70 pages.
English language abstract and computer-generated English language translation for CN104064720A extracted from espacenet.com database on Dec. 20, 2017, 11 pages.
English language abstract and computer-generated English language translation for CN104065154A extracted from espacenet.com database on Dec. 20, 2017, 13 pages.
English language abstract and computer-generated English language translation for CN104242385A extracted from espacenet.com database on Dec. 20, 2017, 28 pages.
English language abstract and computer-generated English language translation for CN204045695U extracted from espacenet.com database on Dec. 21, 2017, 15 pages.
English language abstract and computer-generated English language translation for CN204119067U extracted from espacenet.com database on Dec. 21, 2017, 13 pages.
English language abstract and computer-generated English language translation for CN204189915U extracted from espacenet.com database on Dec. 21, 2017, 7 pages.
English language abstract and computer-generated English language translation for CN204189920U extracted from espacenet.com database on Dec. 21, 2017, 6 pages.
English language abstract and computer-generated English language translation for CN104701580A extracted from espacenet.com database on Dec. 20, 2017, 19 pages.

(56) References Cited

OTHER PUBLICATIONS

English language abstract and computer-generated English language translation for CN104795854A extracted from espacenet.com database on Dec. 20, 2017, 12 pages.
English language abstract and computer-generated English language translation for CN204541108U extracted from espacenet.com database on Dec. 20, 2017, 17 pages.
English language abstract and computer-generated English language translation for CN204541109U extracted from espacenet.com database on Dec. 20, 2017, 17 pages.
Computer-generated English language translation for DE29910045U1 extracted from espacenet.com database on Dec. 21, 2017, 5 pages.
Computer-generated English language abstract and computer-generated English language translation for DE212012000160U1 extracted from espacenet.com database on Dec. 21, 2017, 16 pages.
European Search Report for Application EP16764225 dated Nov. 16, 2018, 2 pages.

* cited by examiner

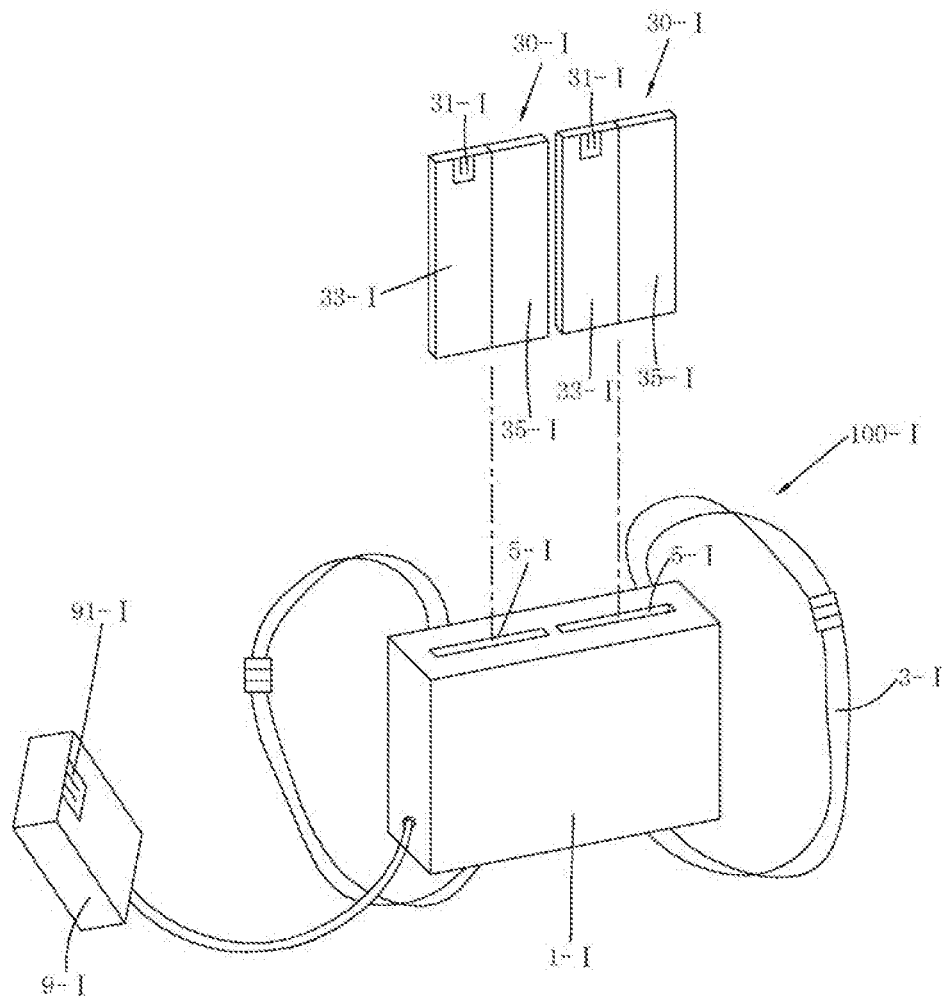
FIG. 1-I

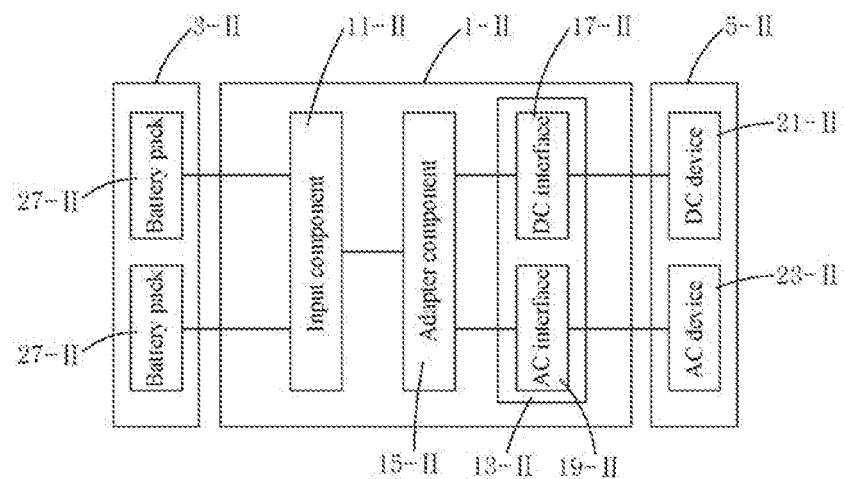
FIG. 1-II
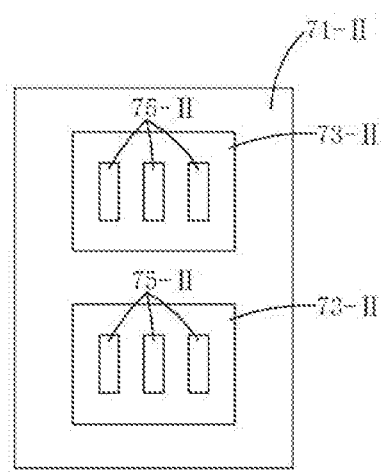
FIG. 2-II

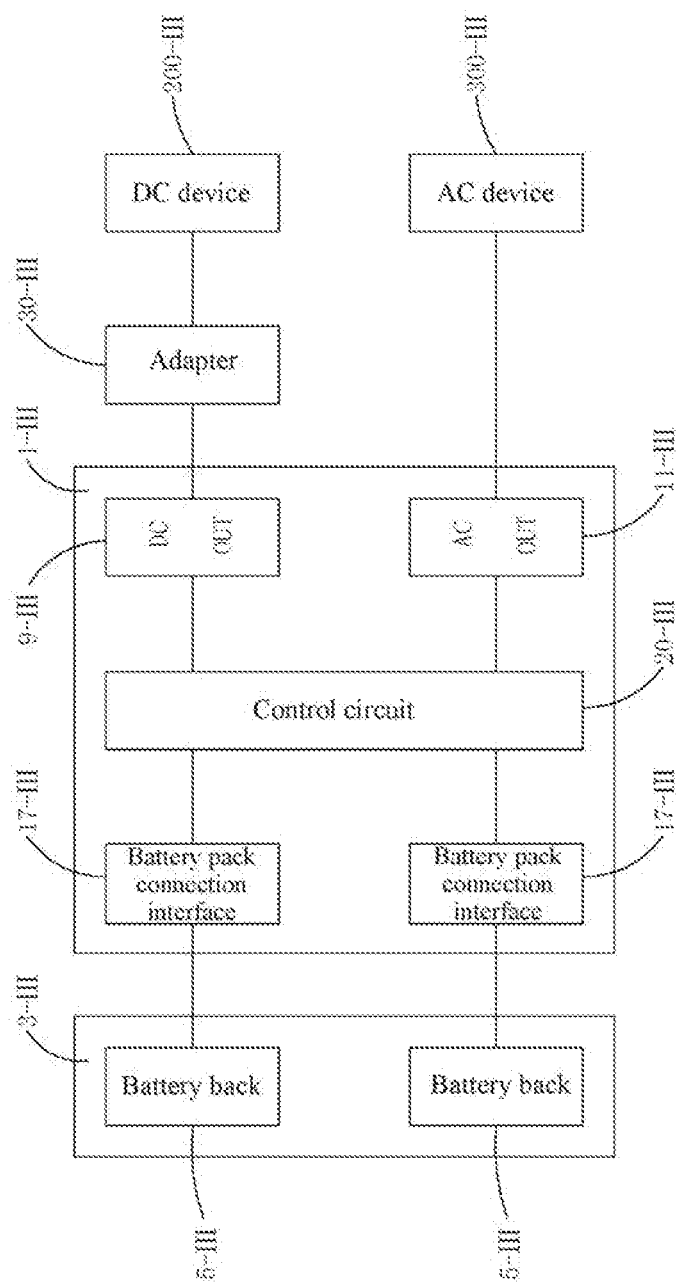
FIG. 1-III

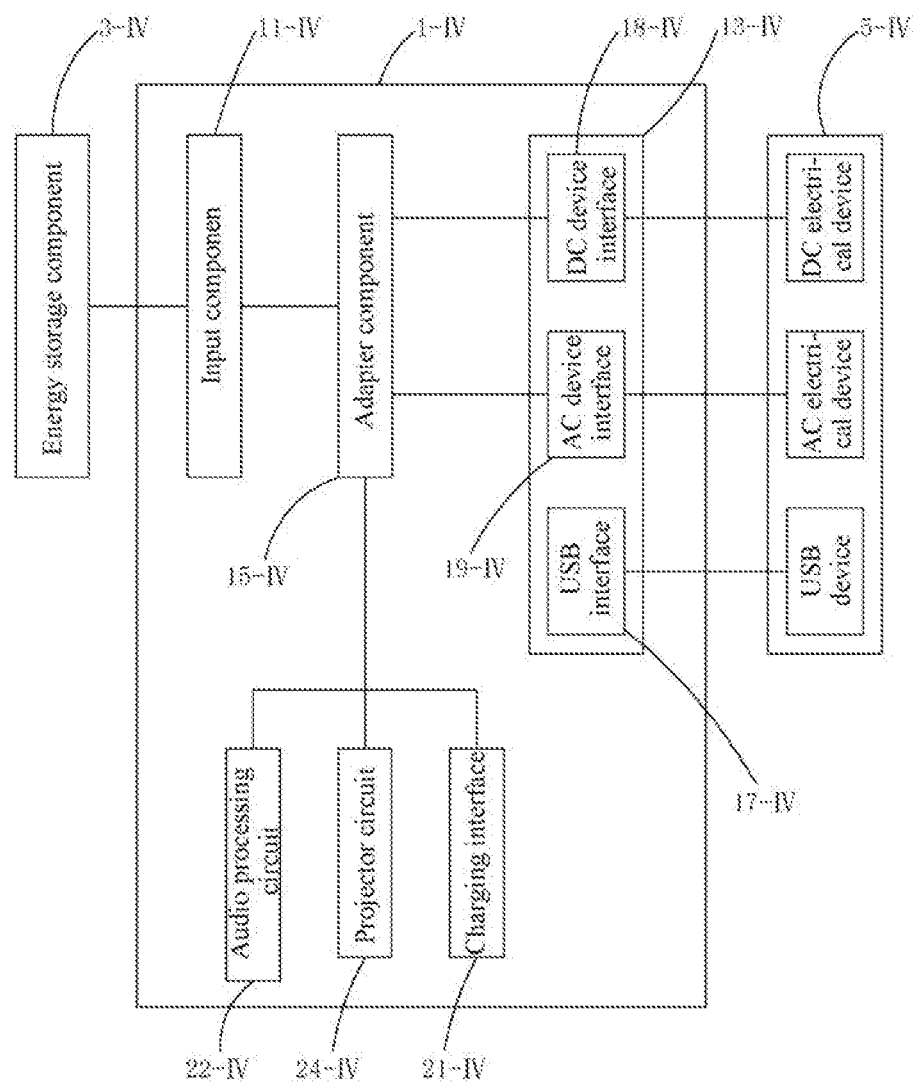
FIG. 1-IV

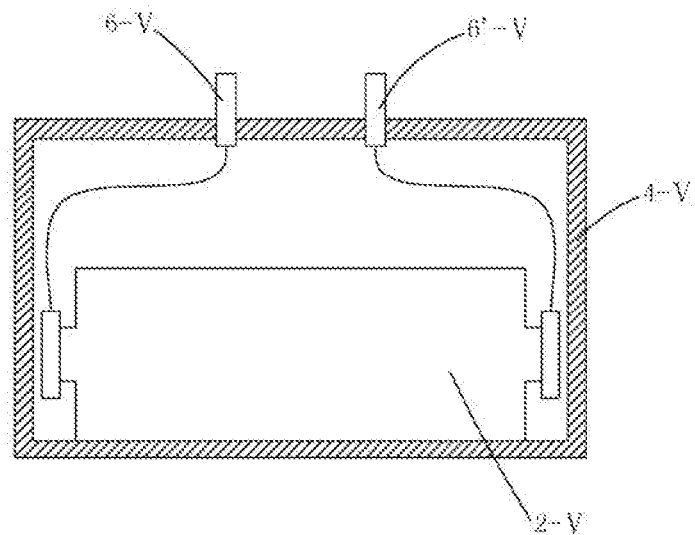
FIG. 1-V
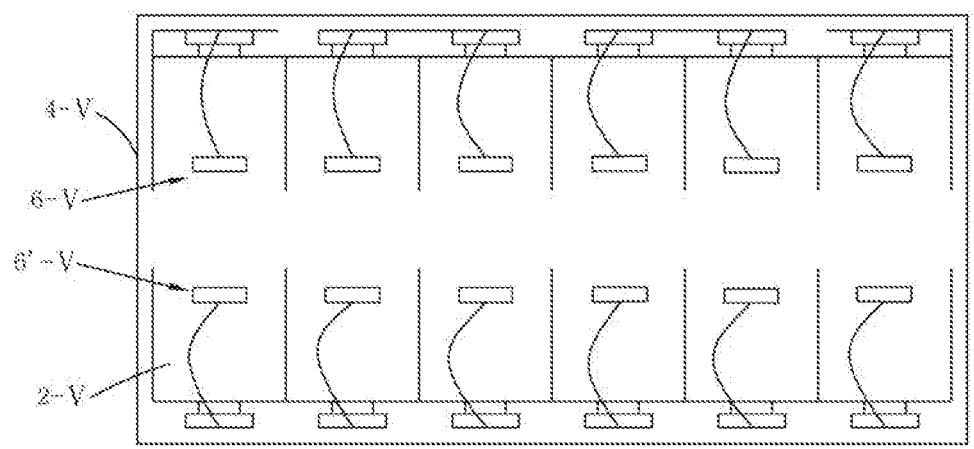
FIG. 2-V

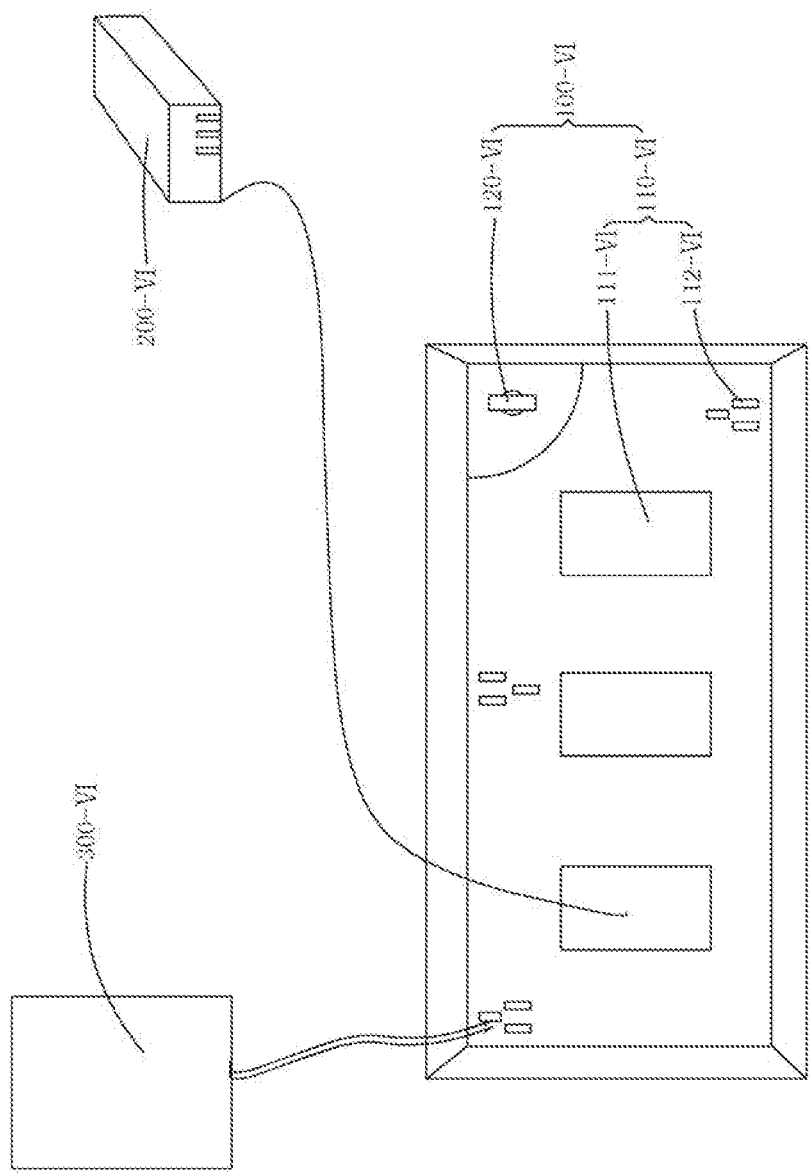
FIG. 1-VI

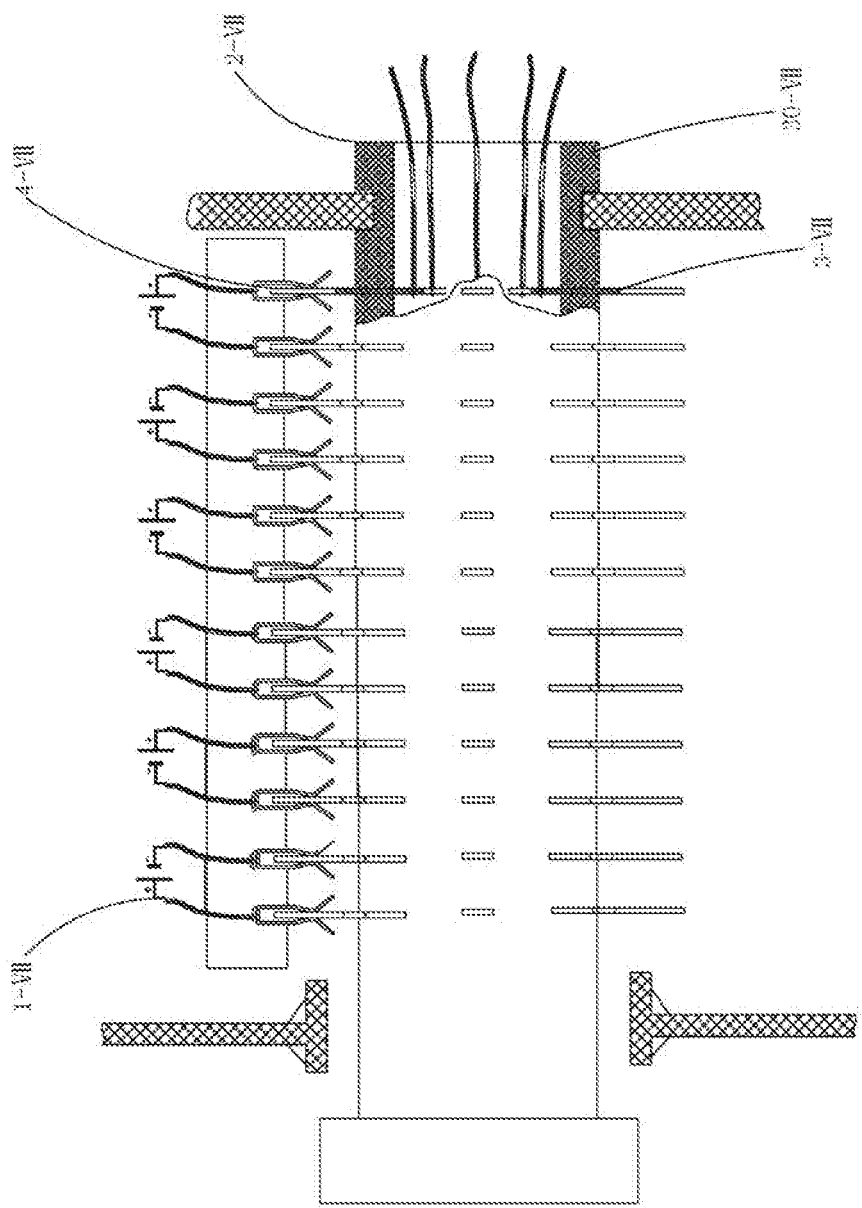
FIG. 1-VII

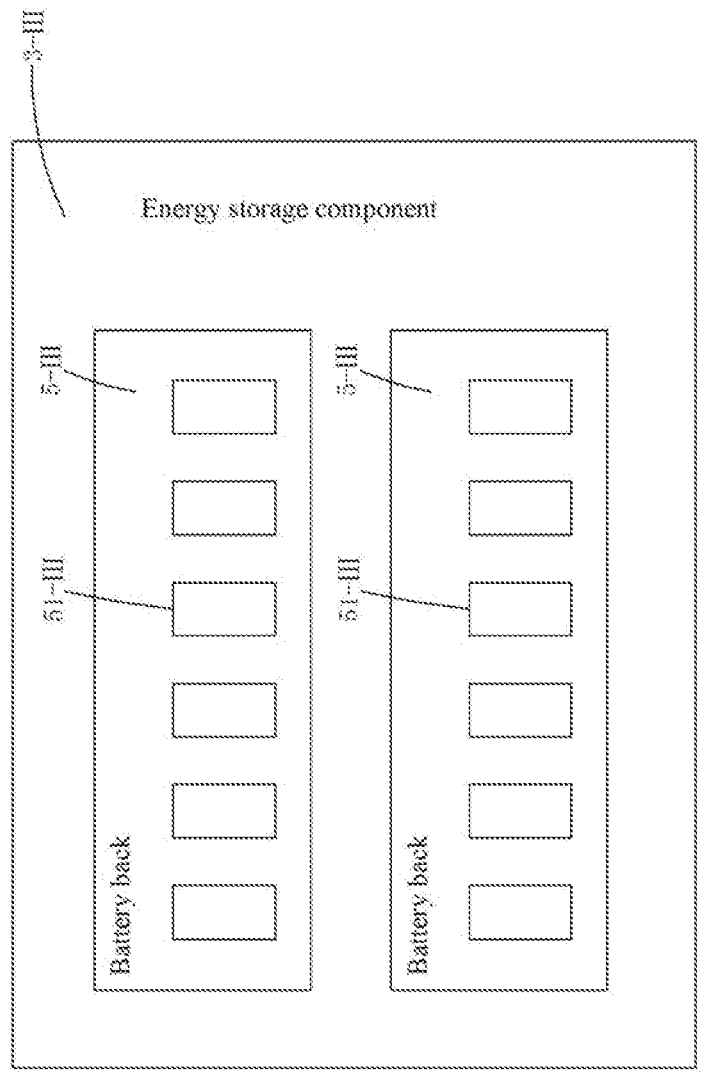
FIG. 2-III

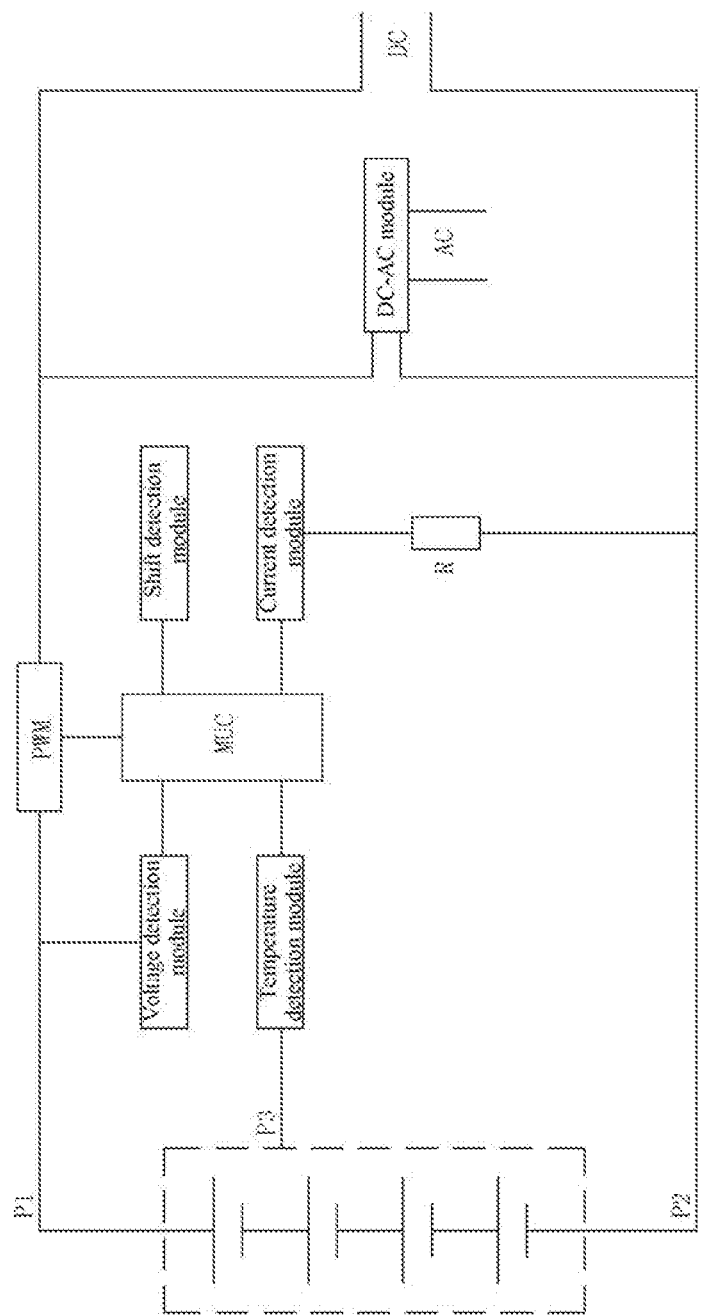
FIG. 2-VI

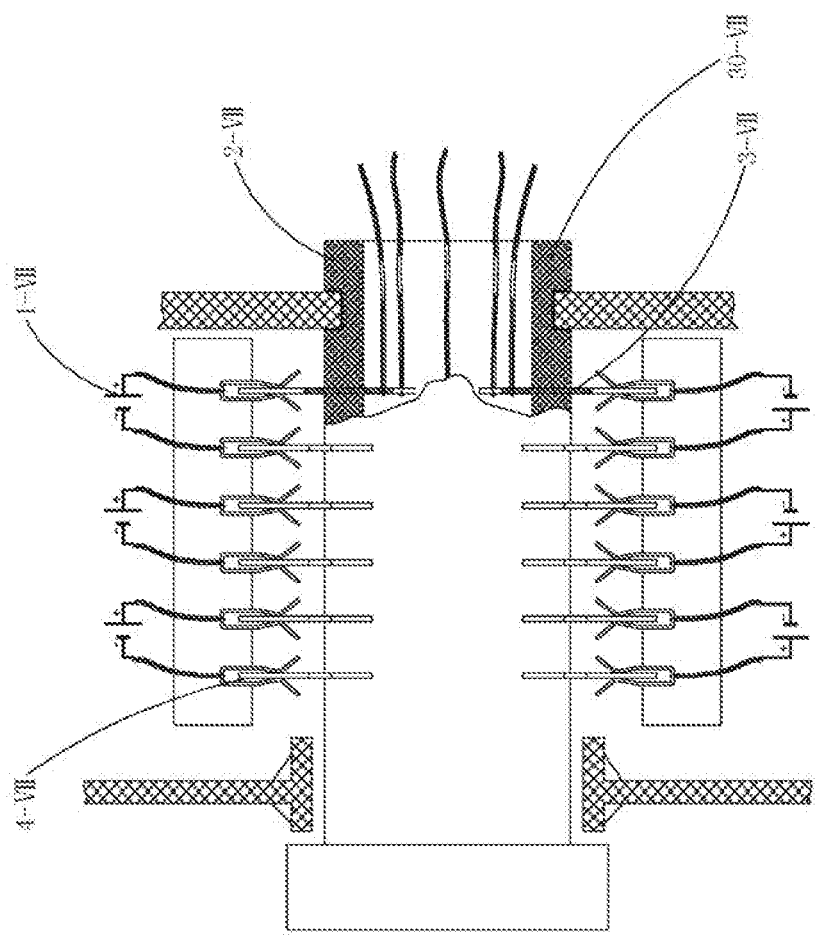
FIG. 2-VII

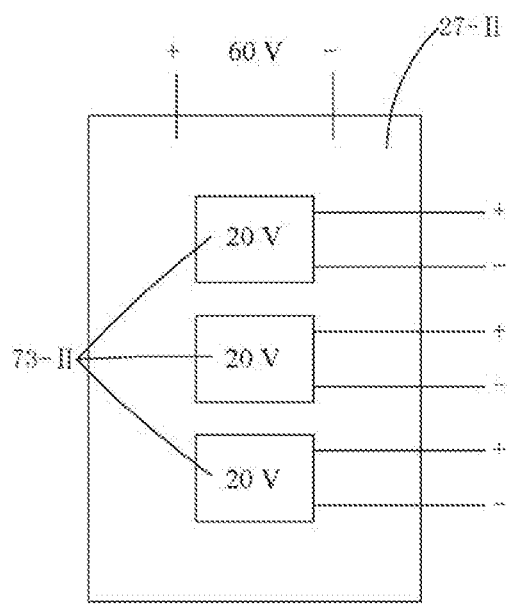
FIG. 3-II
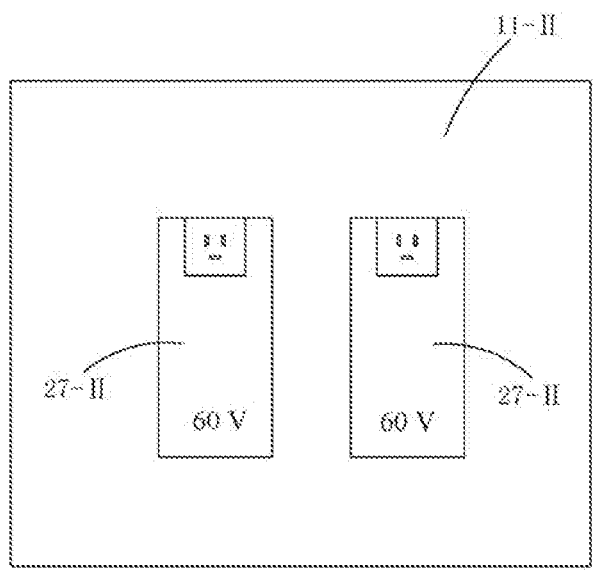
FIG. 4-II

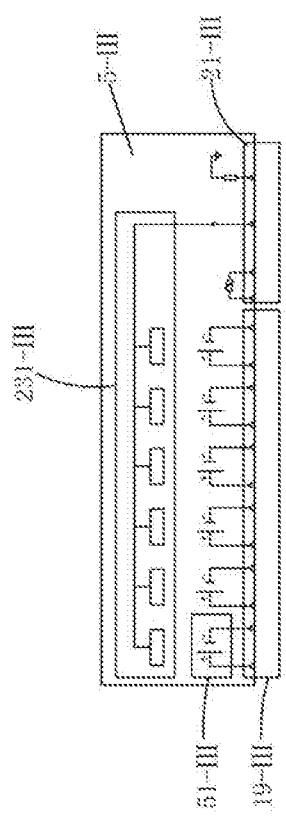
FIG. 3-III

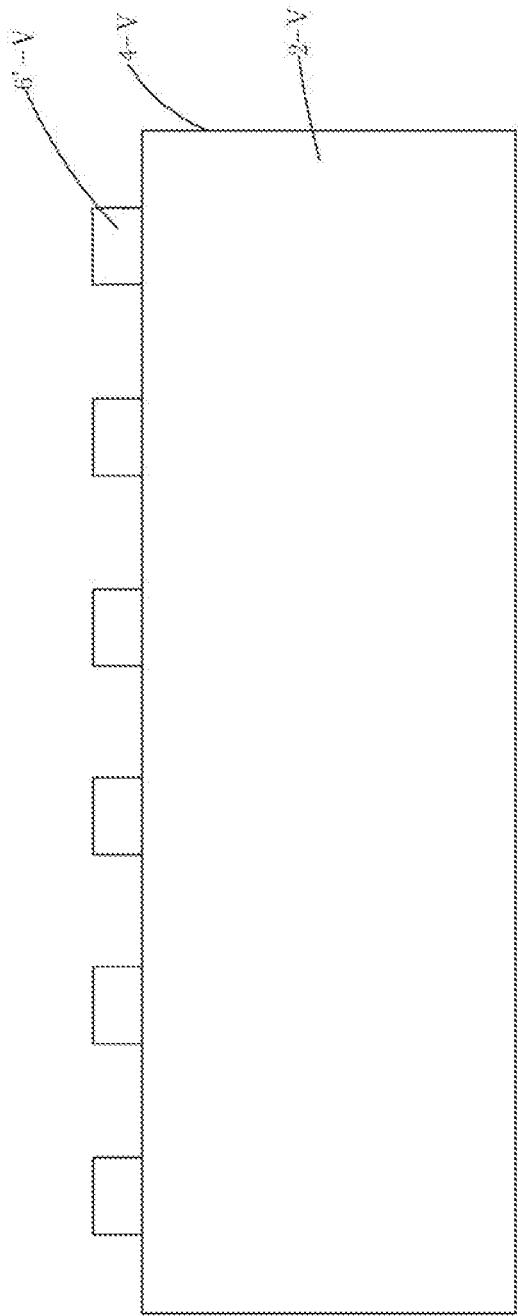
FIG. 3-V

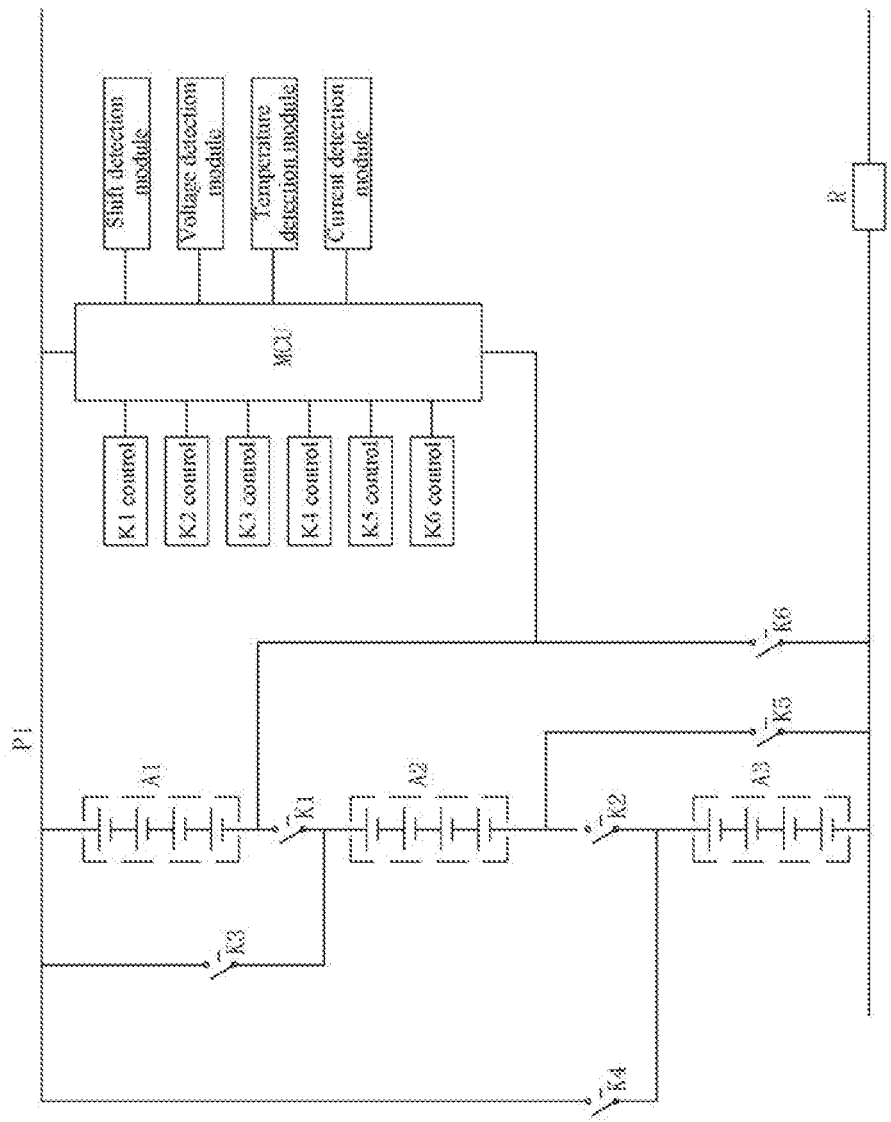
FIG. 3-VI

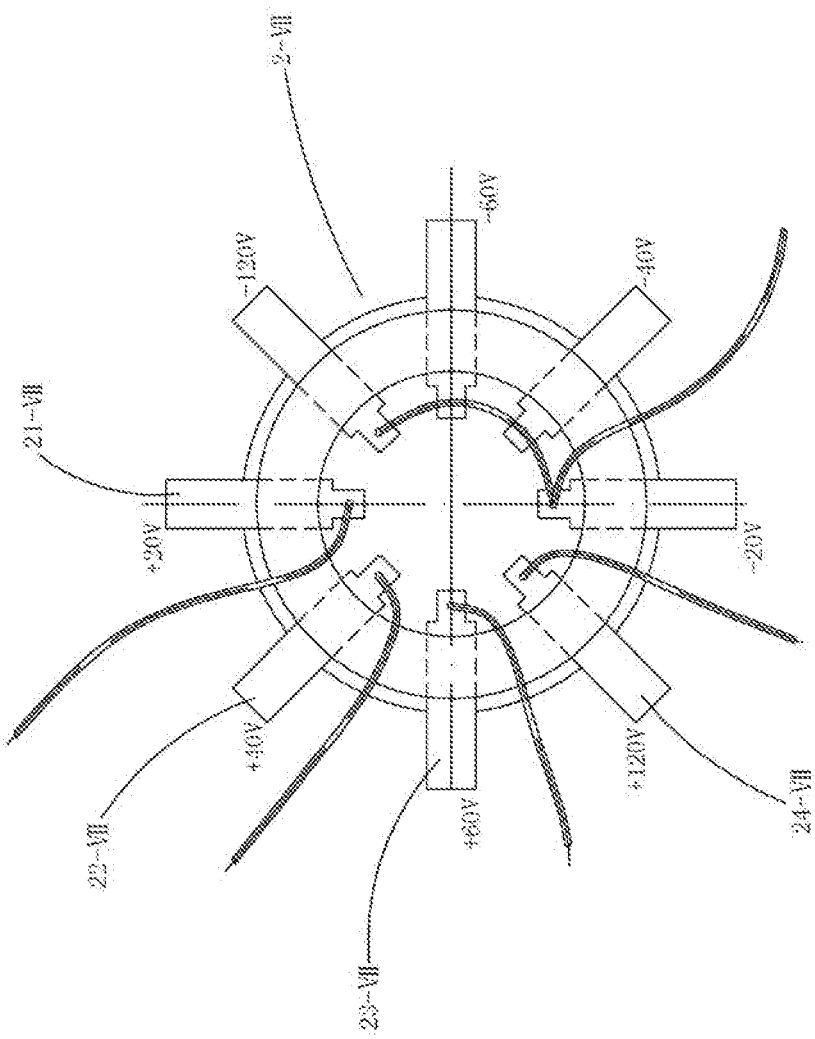

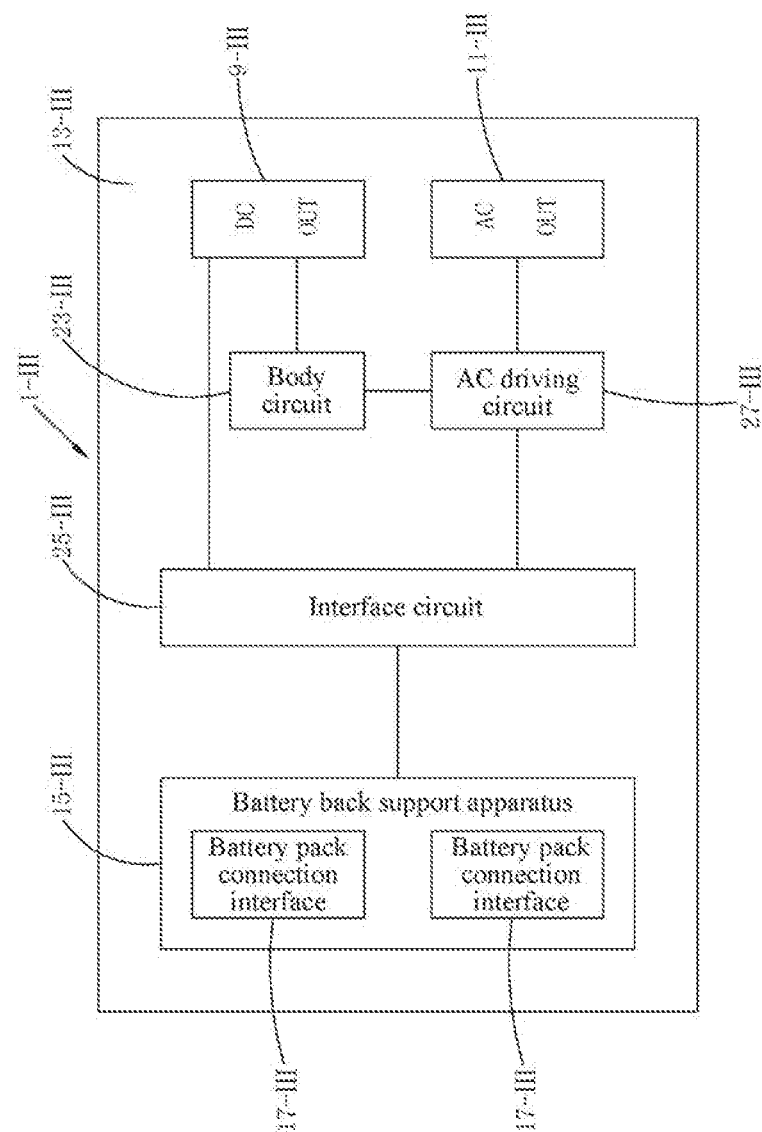
FIG. 4-III

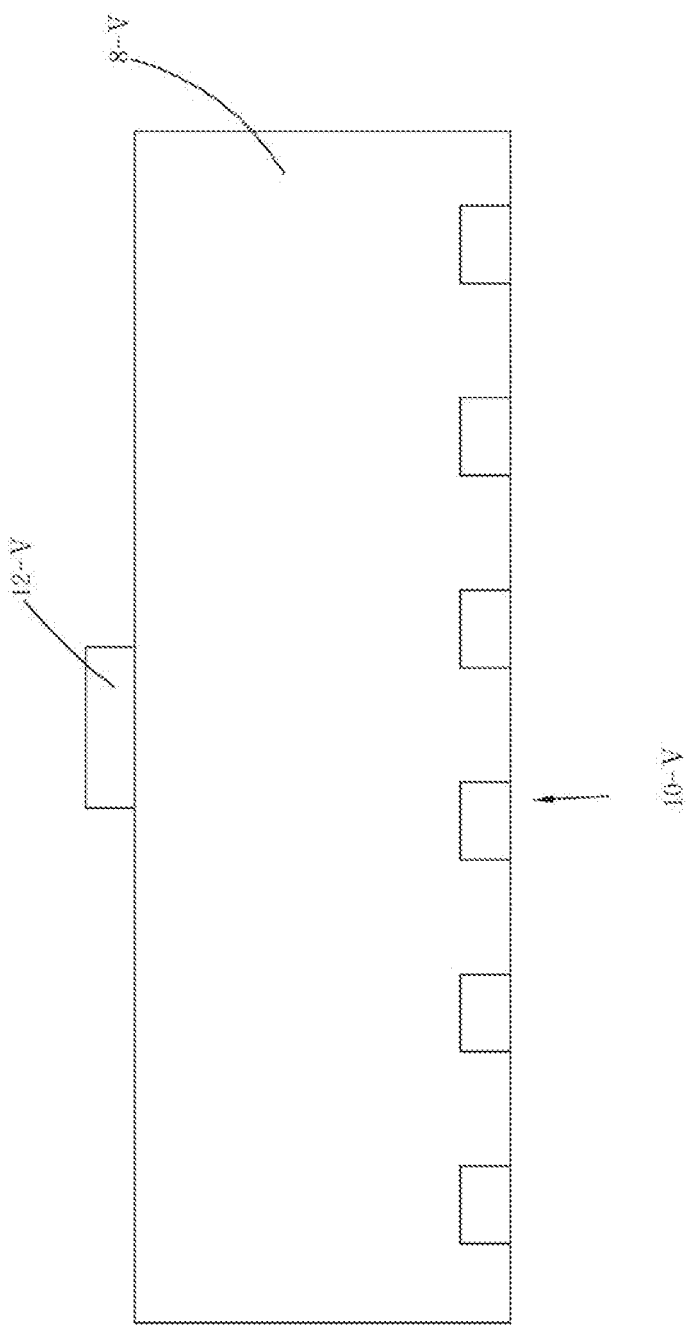

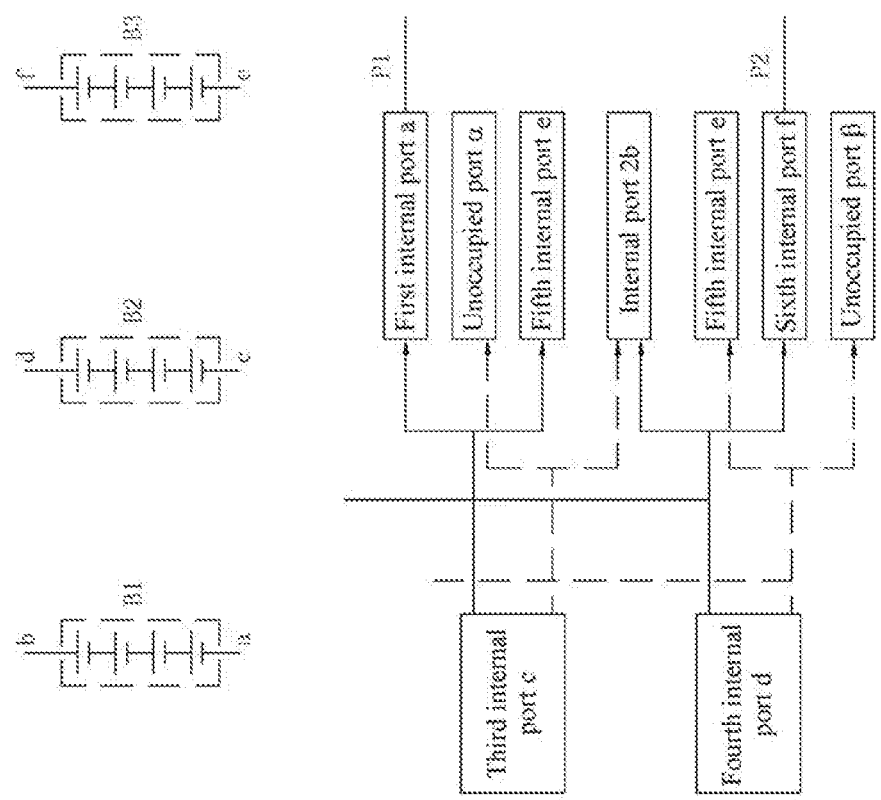
FIG. 4-VI

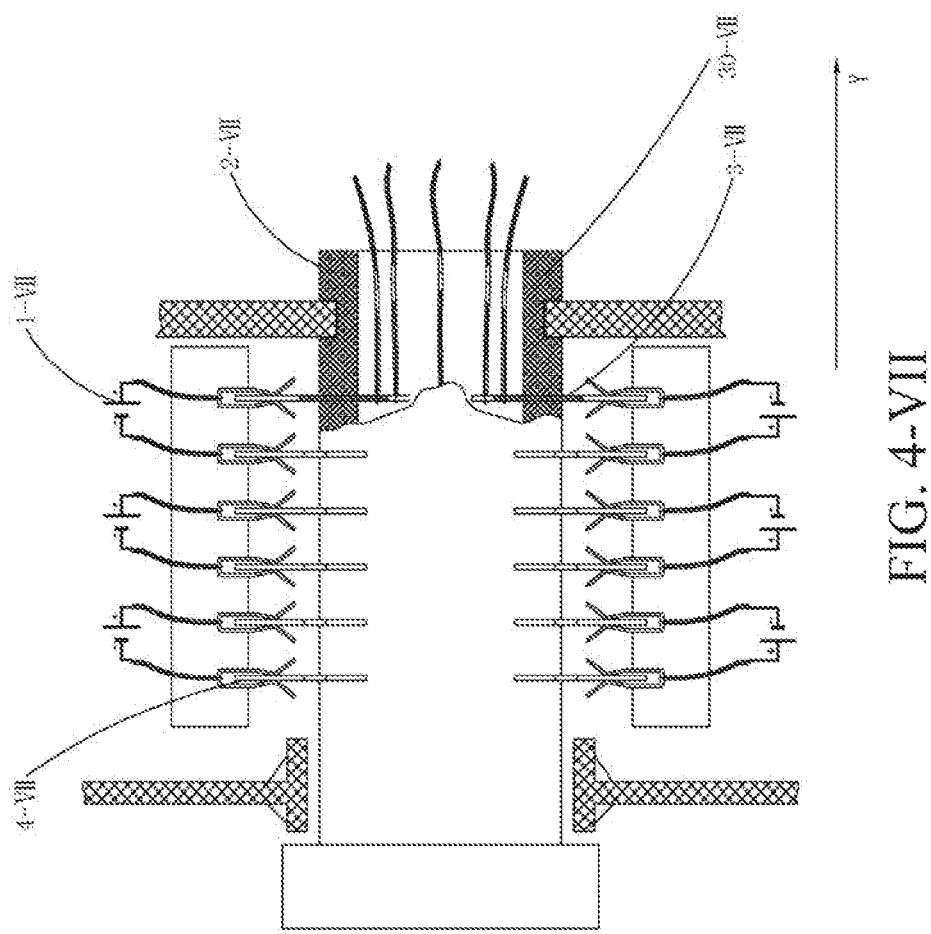
FIG. 4-VII

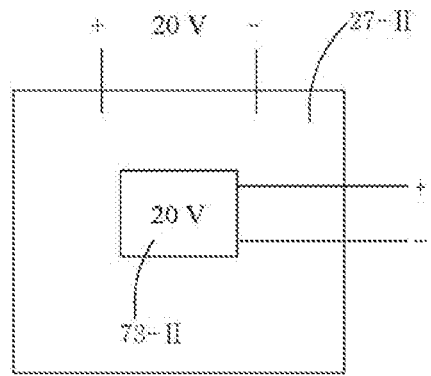
FIG. 5-II
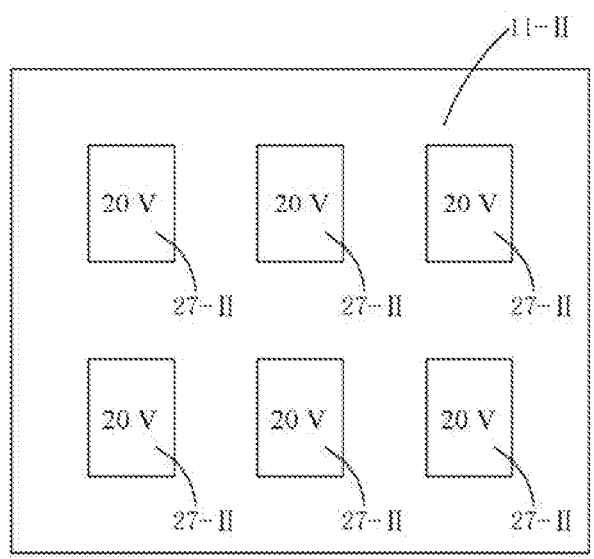
FIG. 6-II

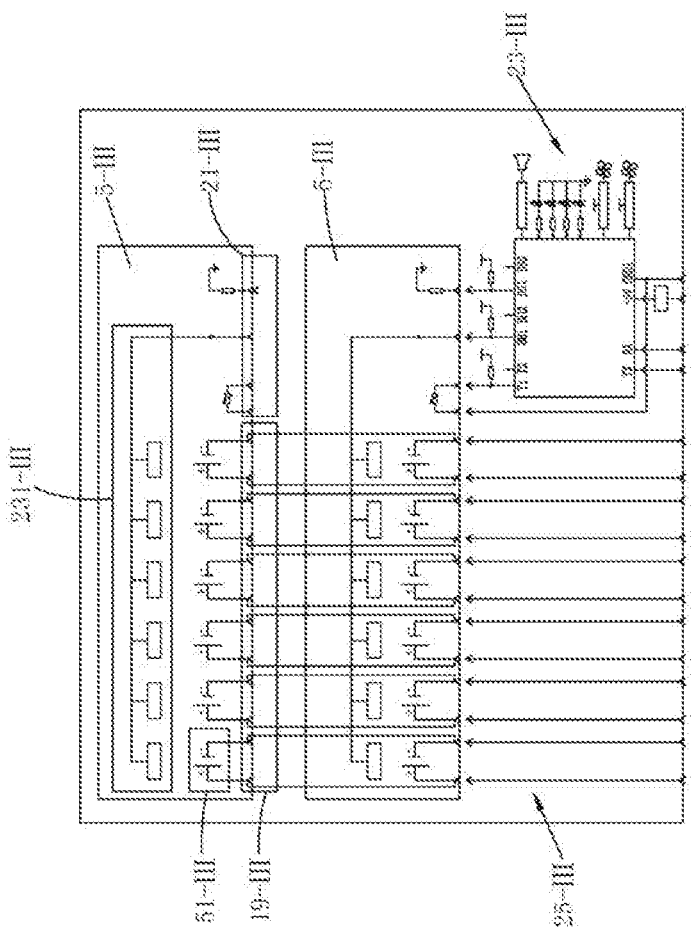
FIG. 5-III

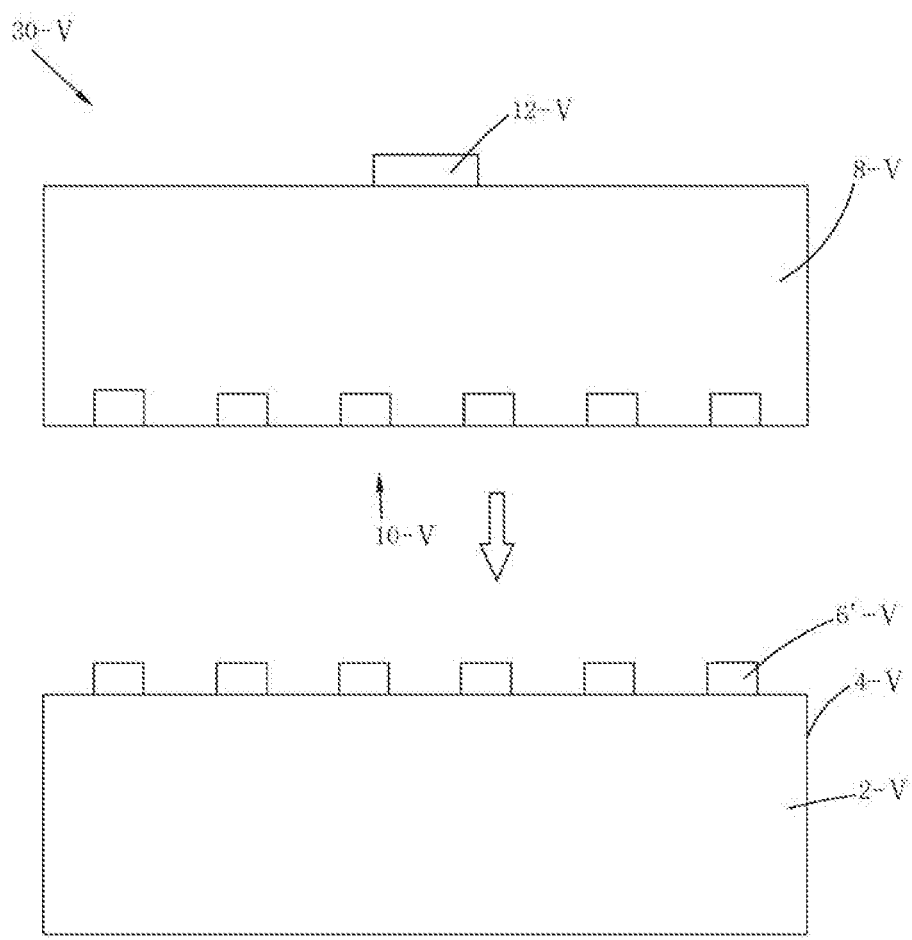
FIG. 5-V

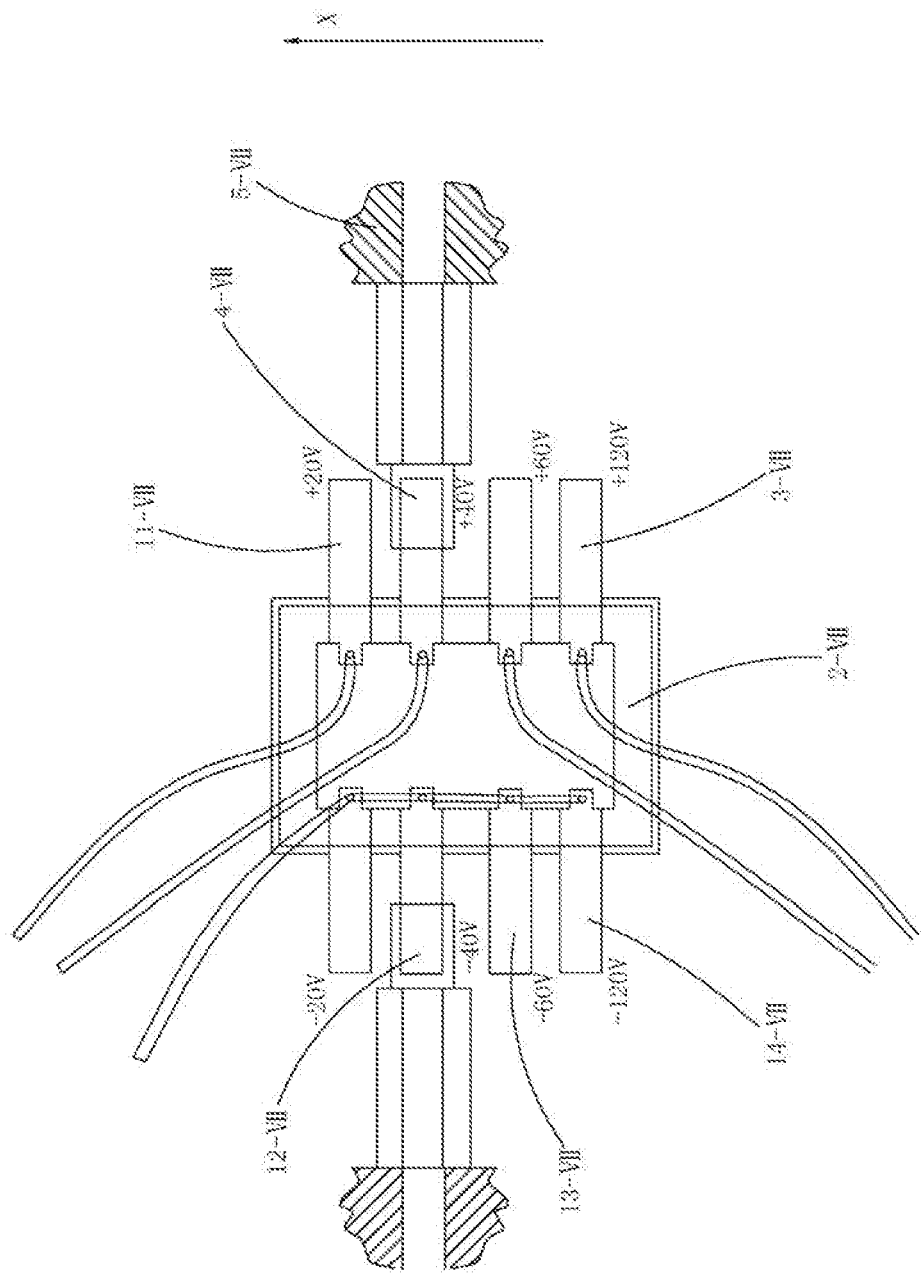
FIG. 5-VII

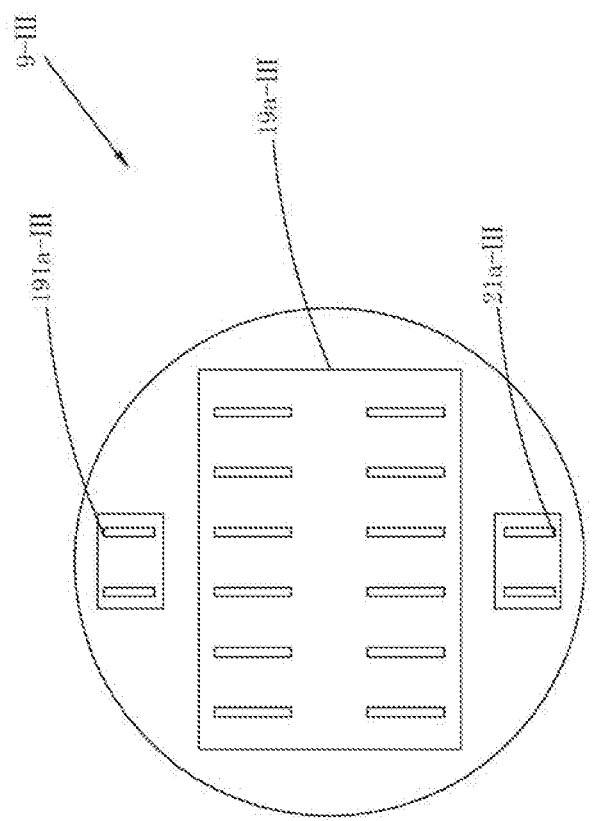
FIG. 6-III

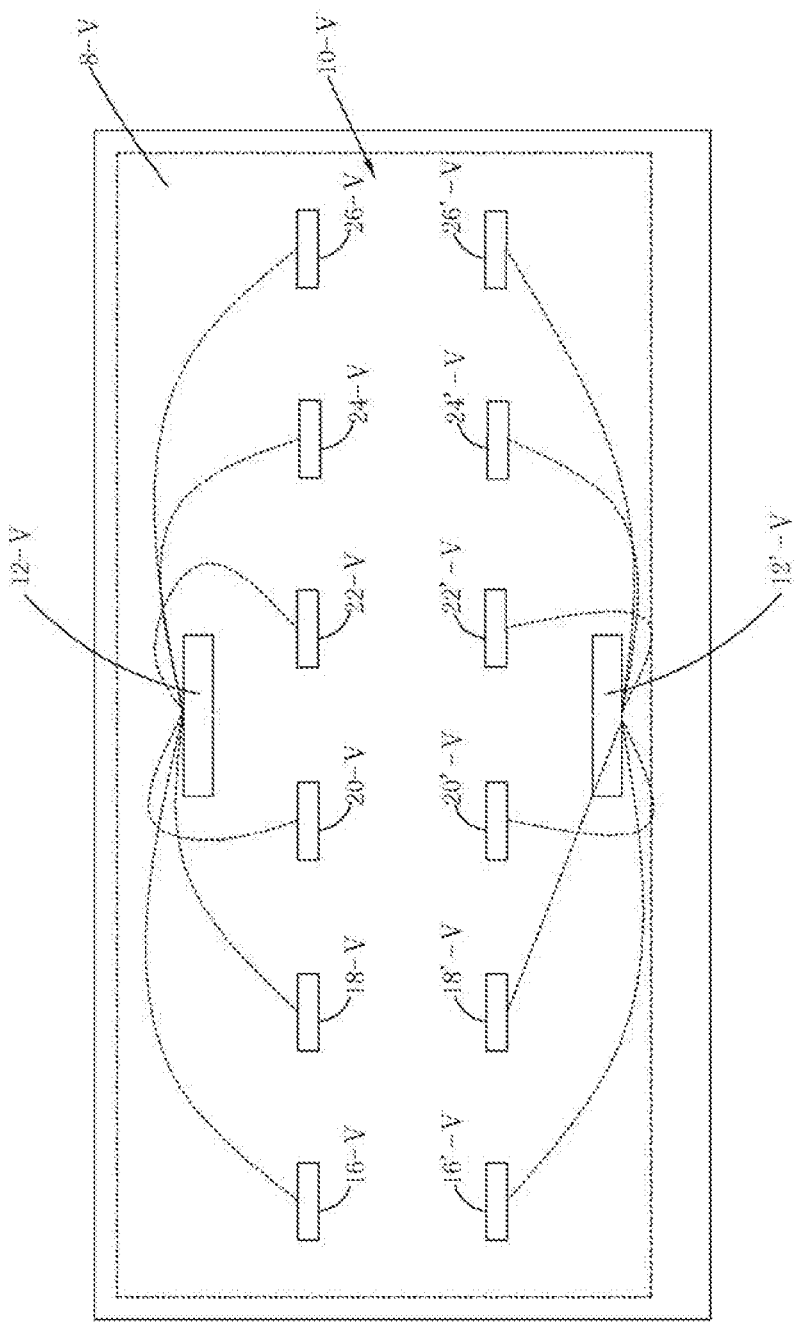
FIG. 6-V

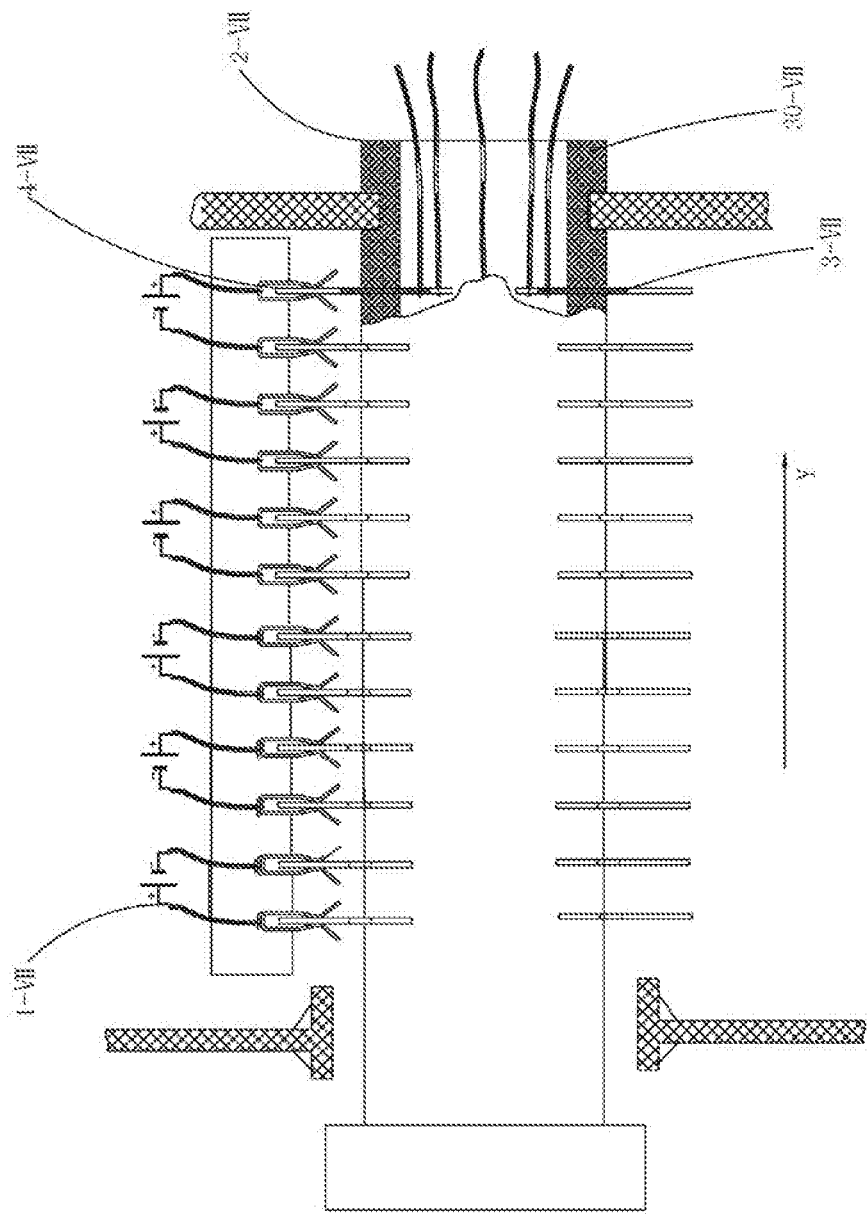

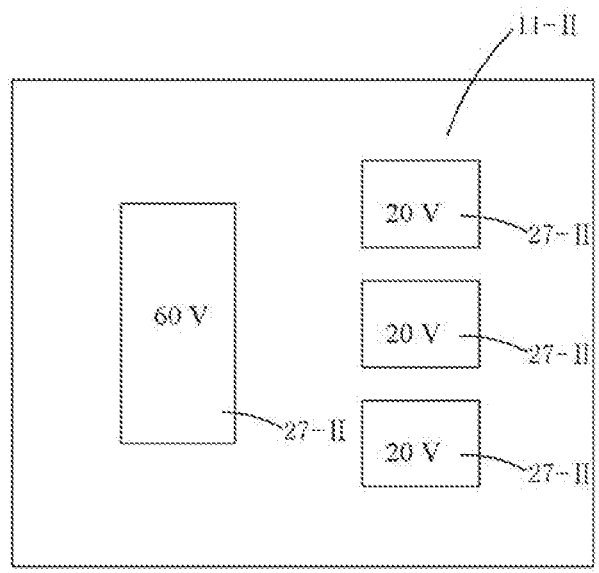
FIG. 7-II
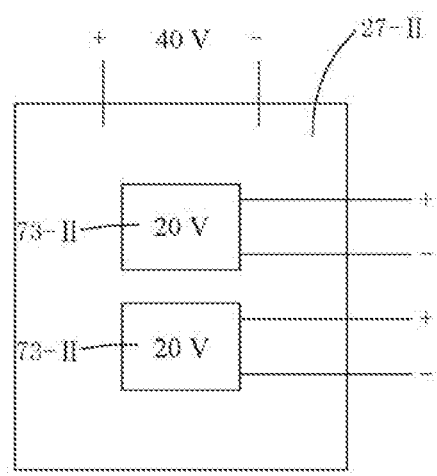
FIG. 8-II

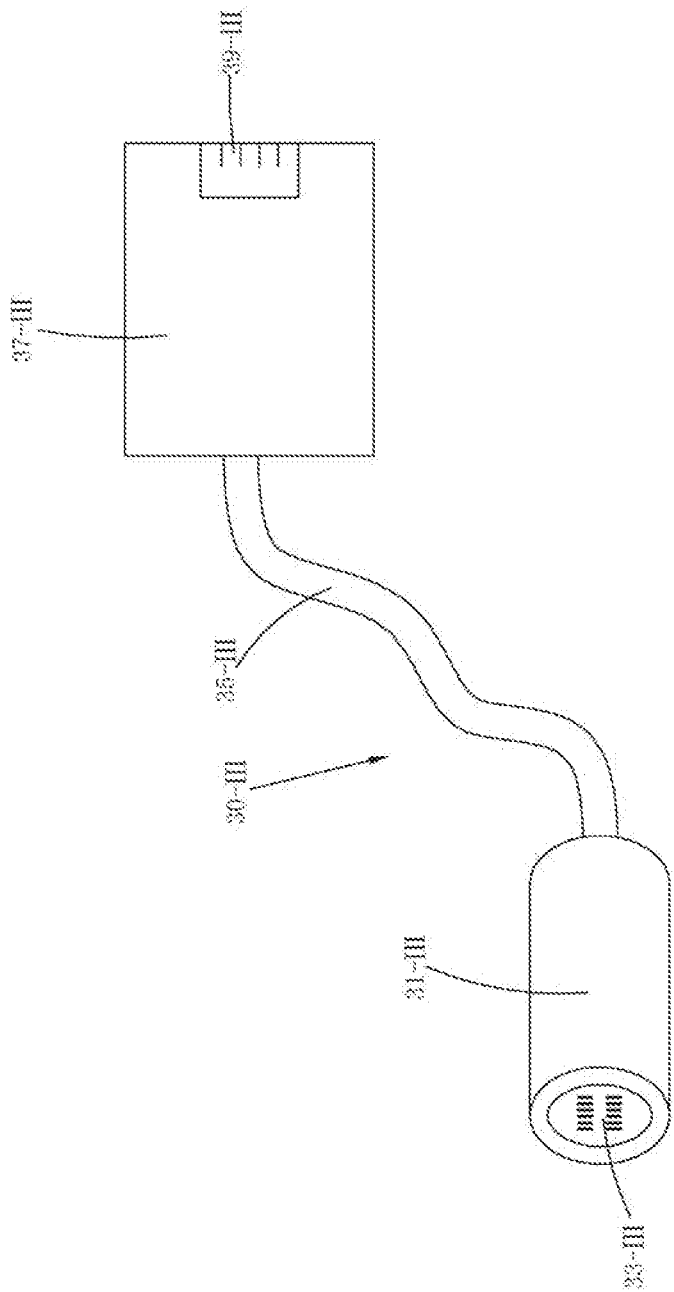
FIG. 7-III

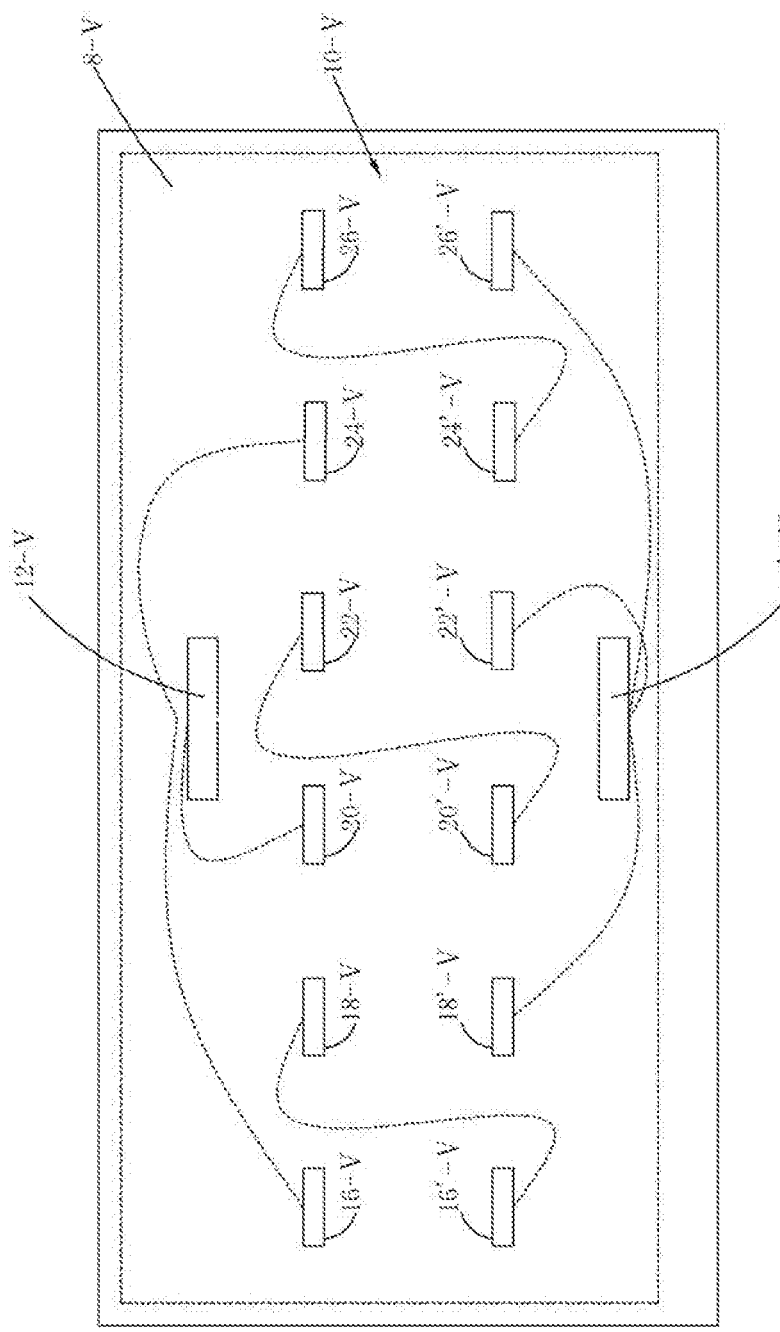

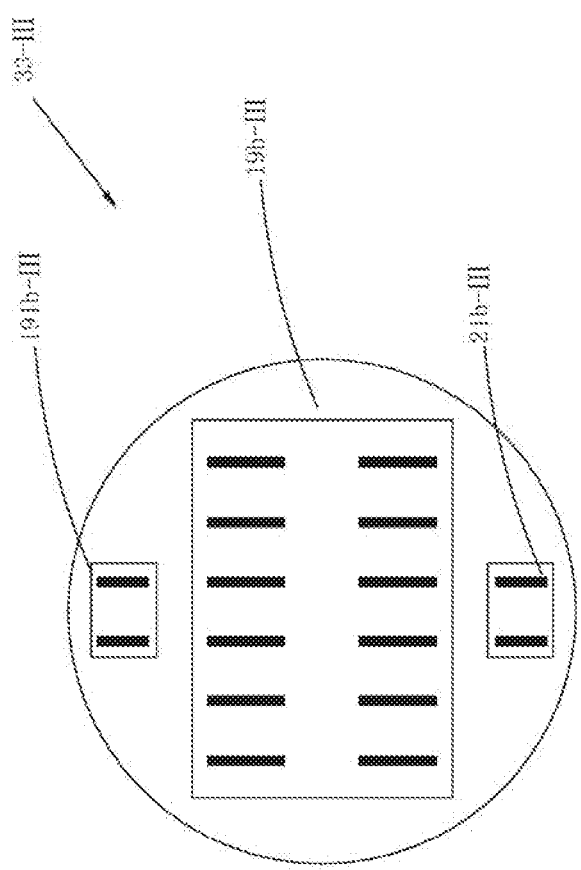
FIG. 8-III

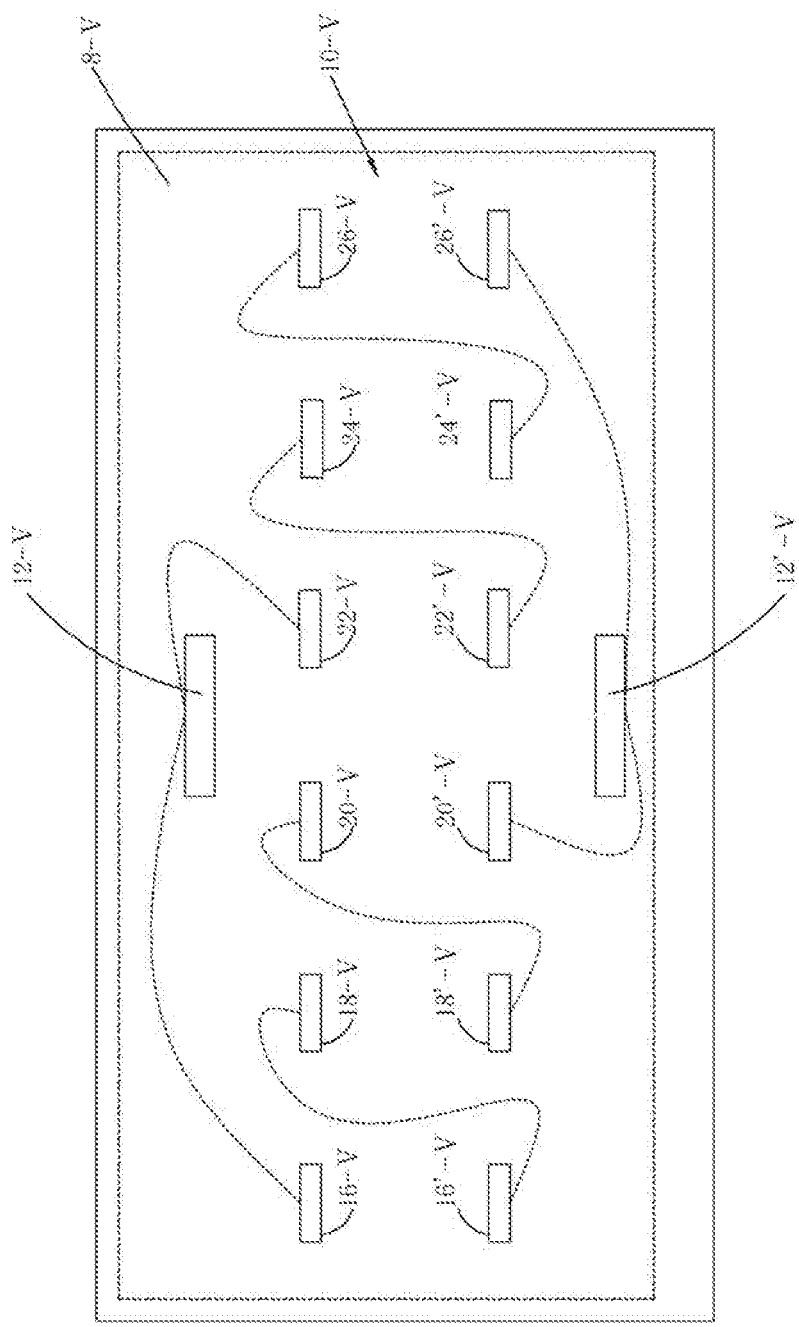

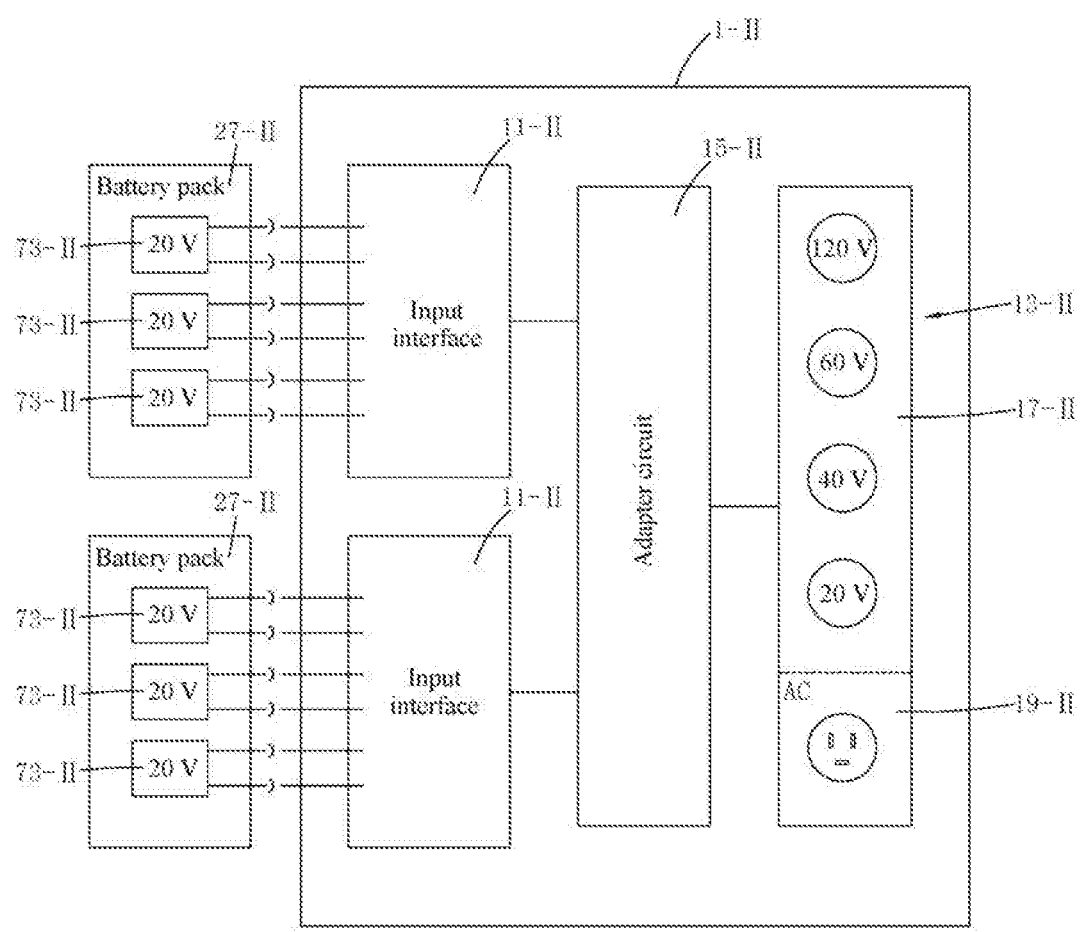
FIG. 9-II

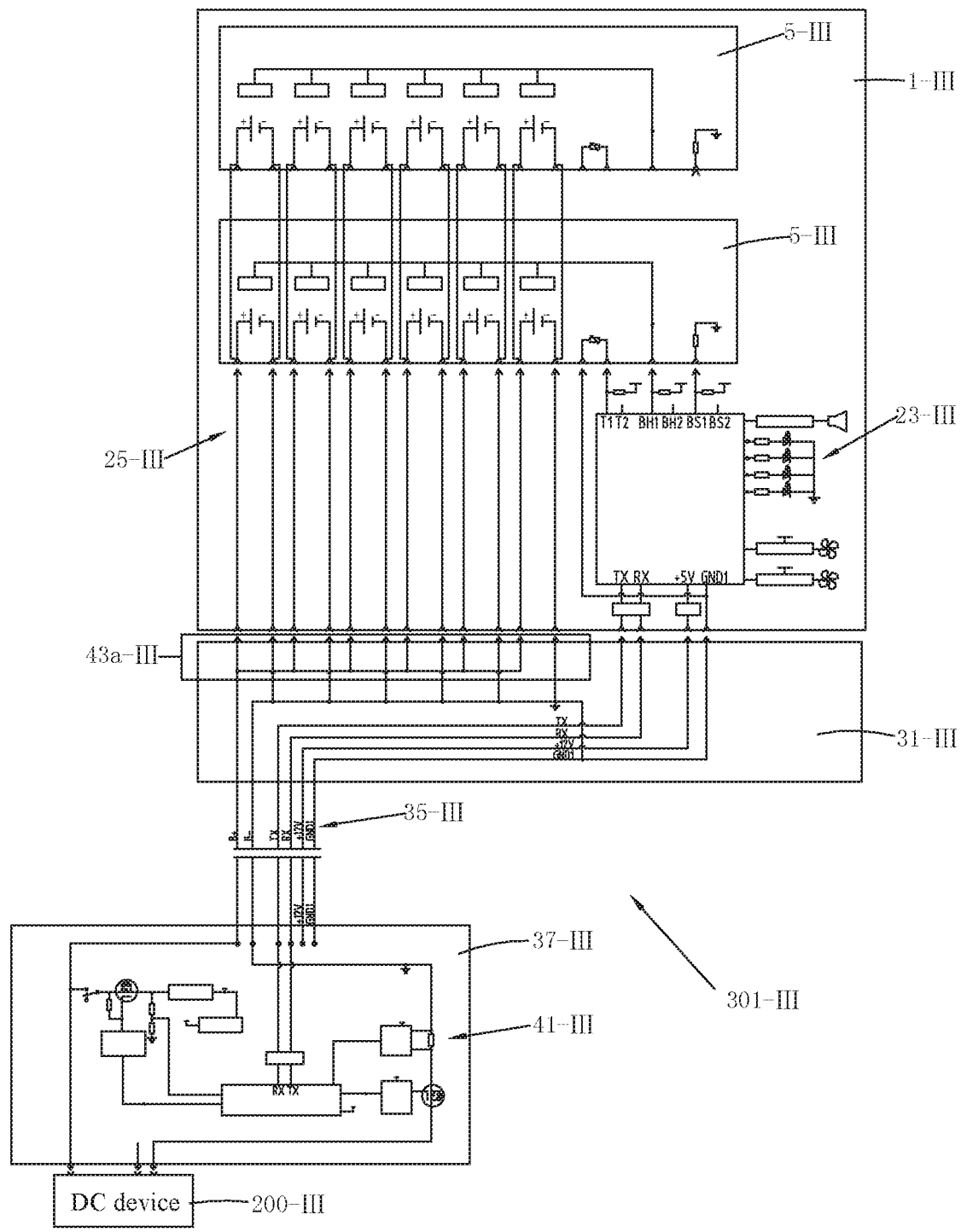
FIG. 9-III

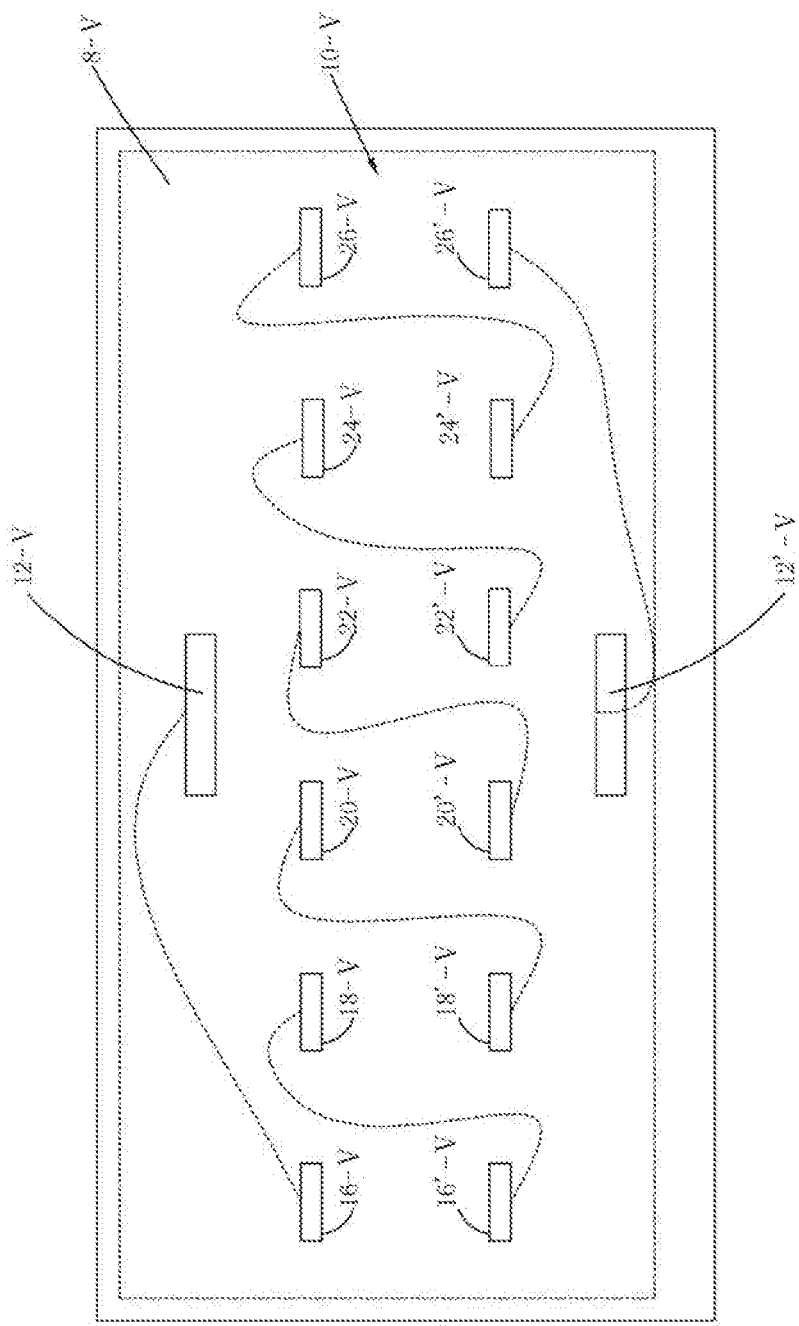
FIG. 9-V

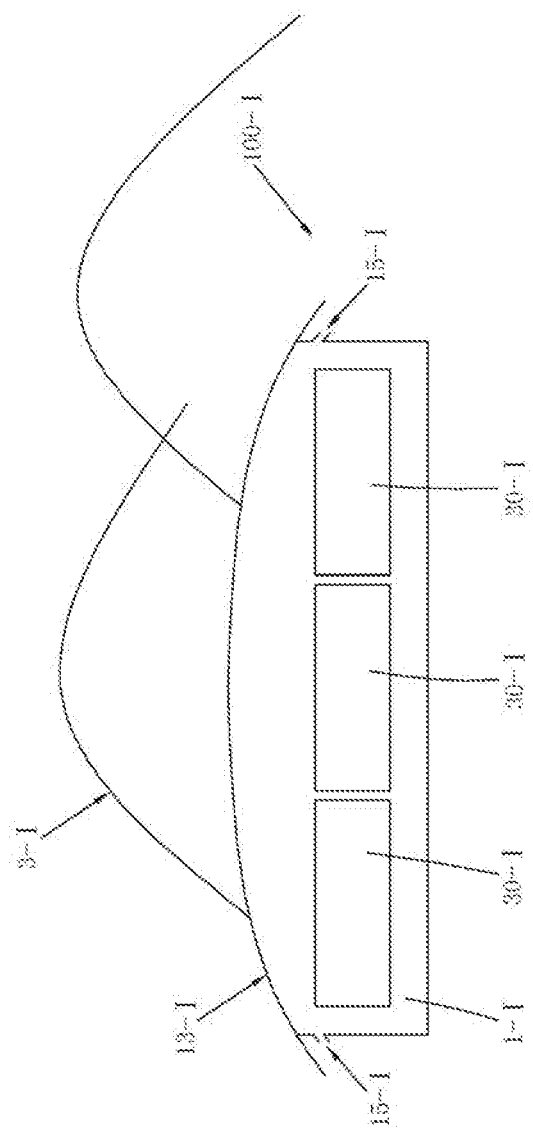

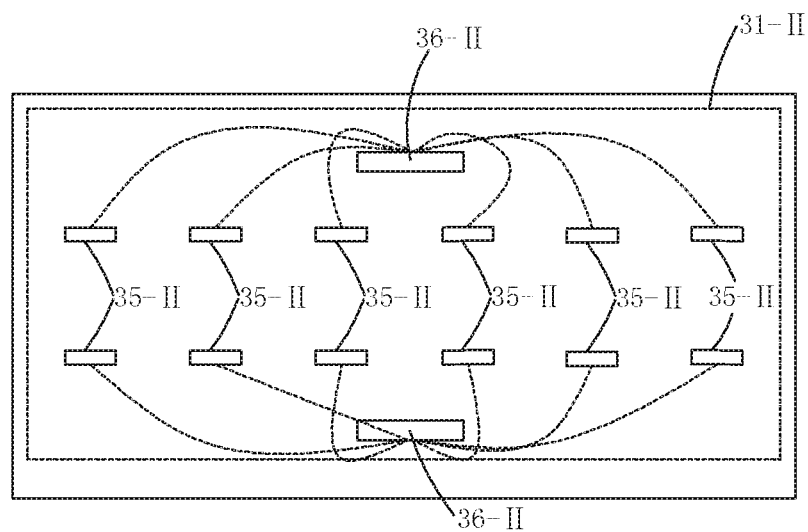
FIG. 10-1-II
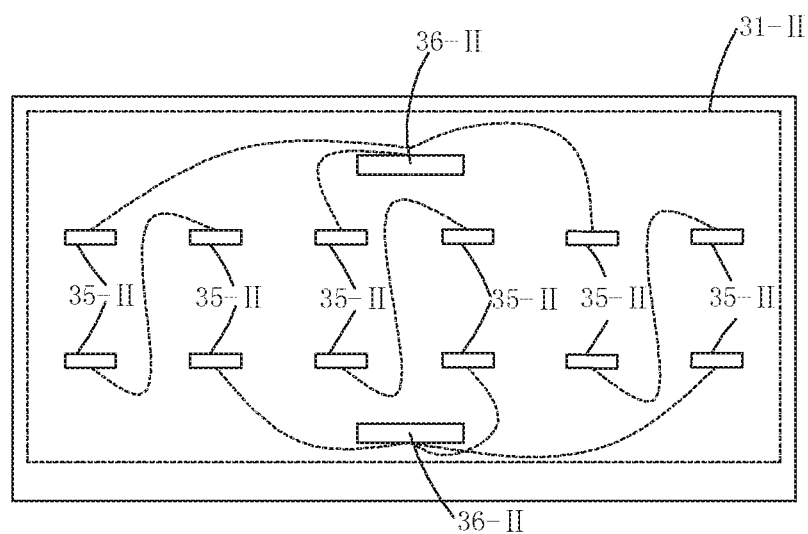
FIG. 10-2-II

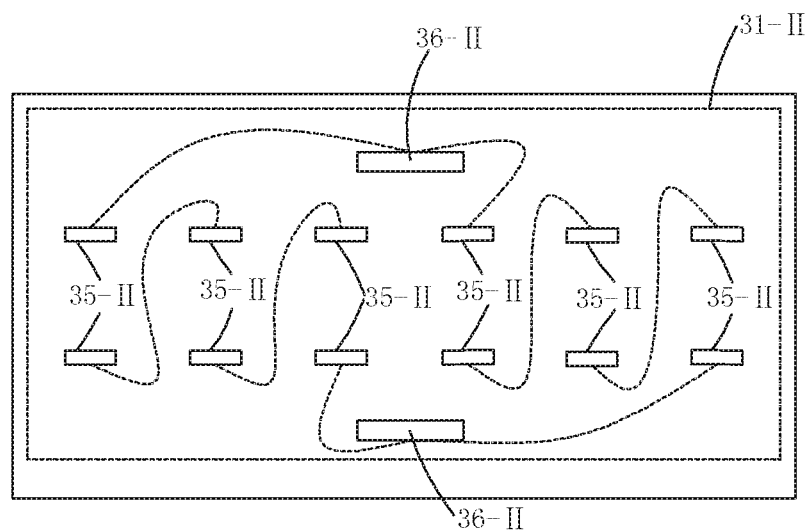
FIG. 10-3-II
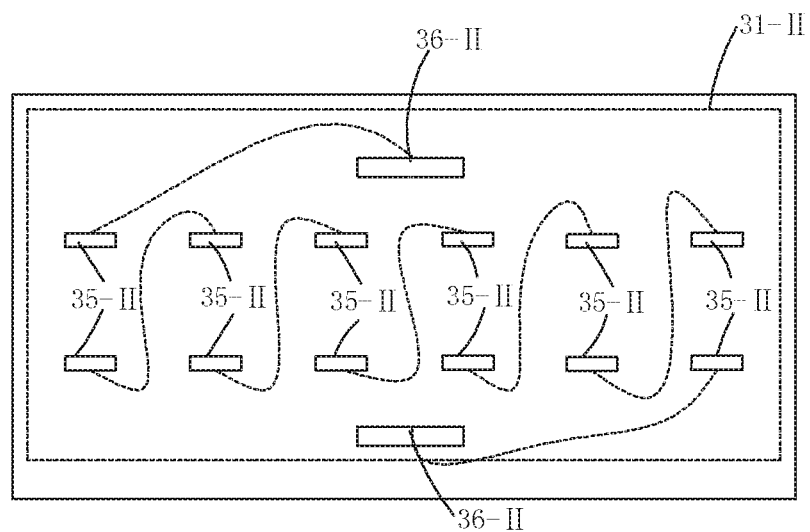
FIG. 10-4-II

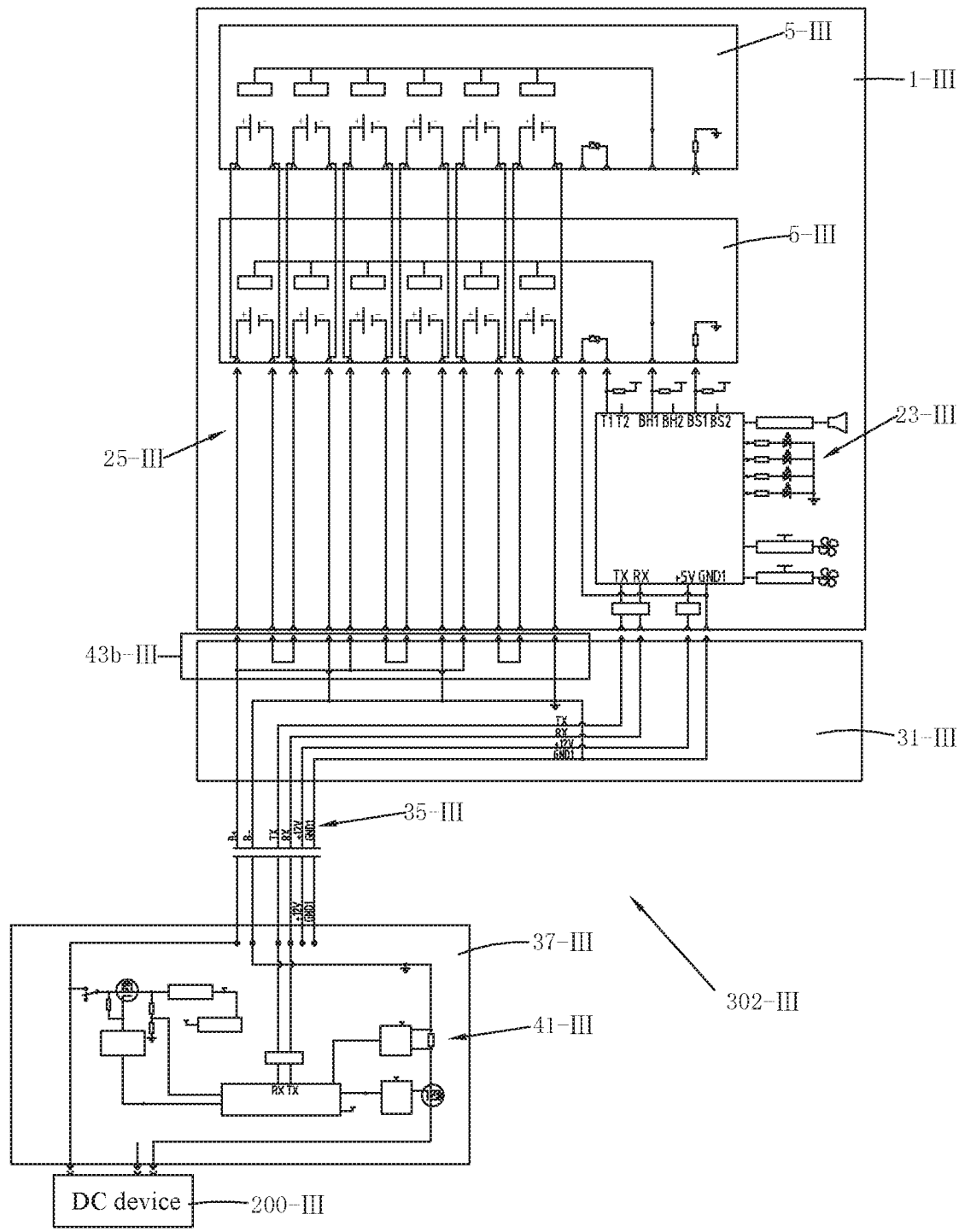
FIG. 10-III

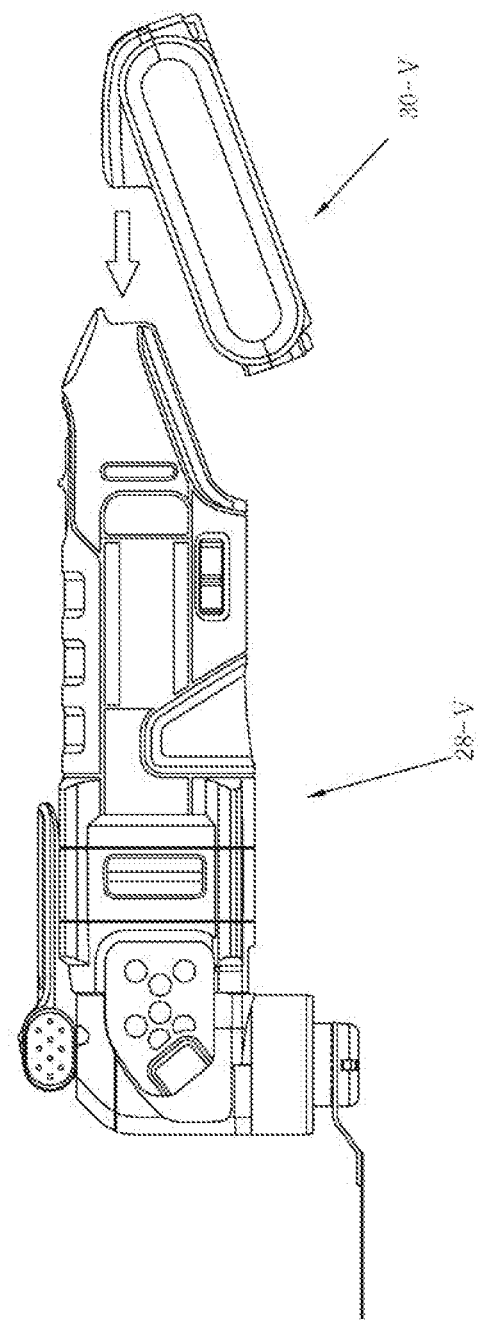
FIG. 10-V

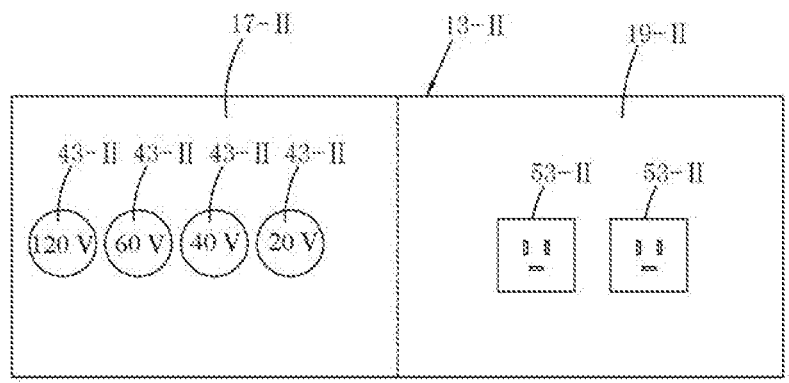
FIG. 11-II
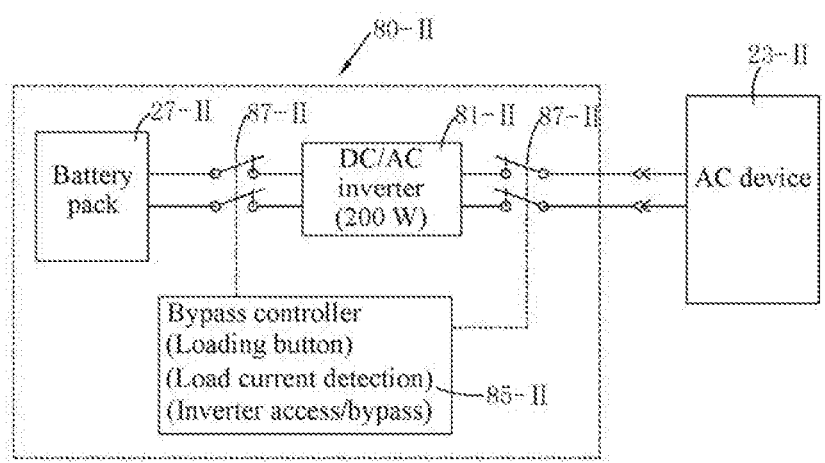
FIG. 12-II

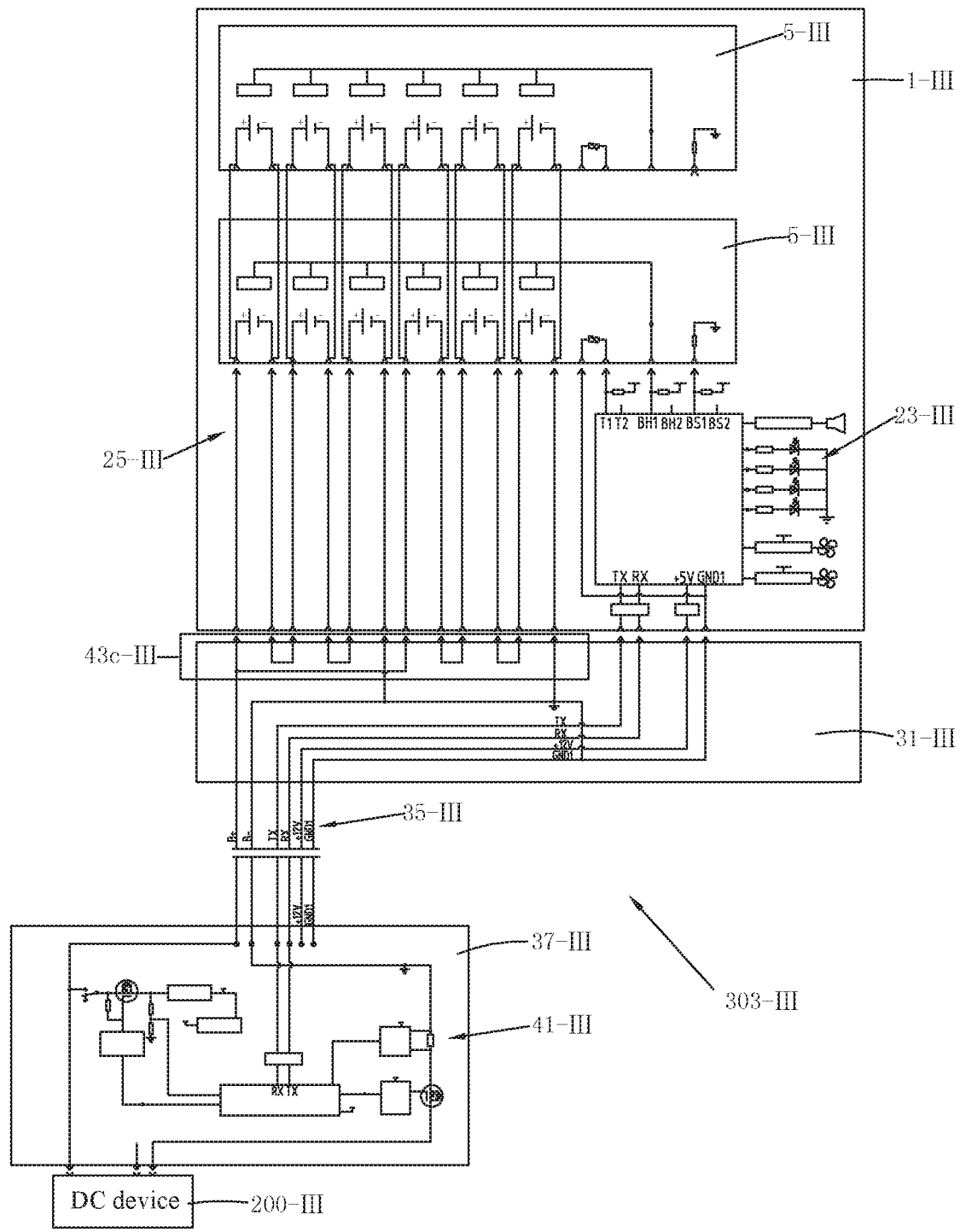
FIG. 11-III

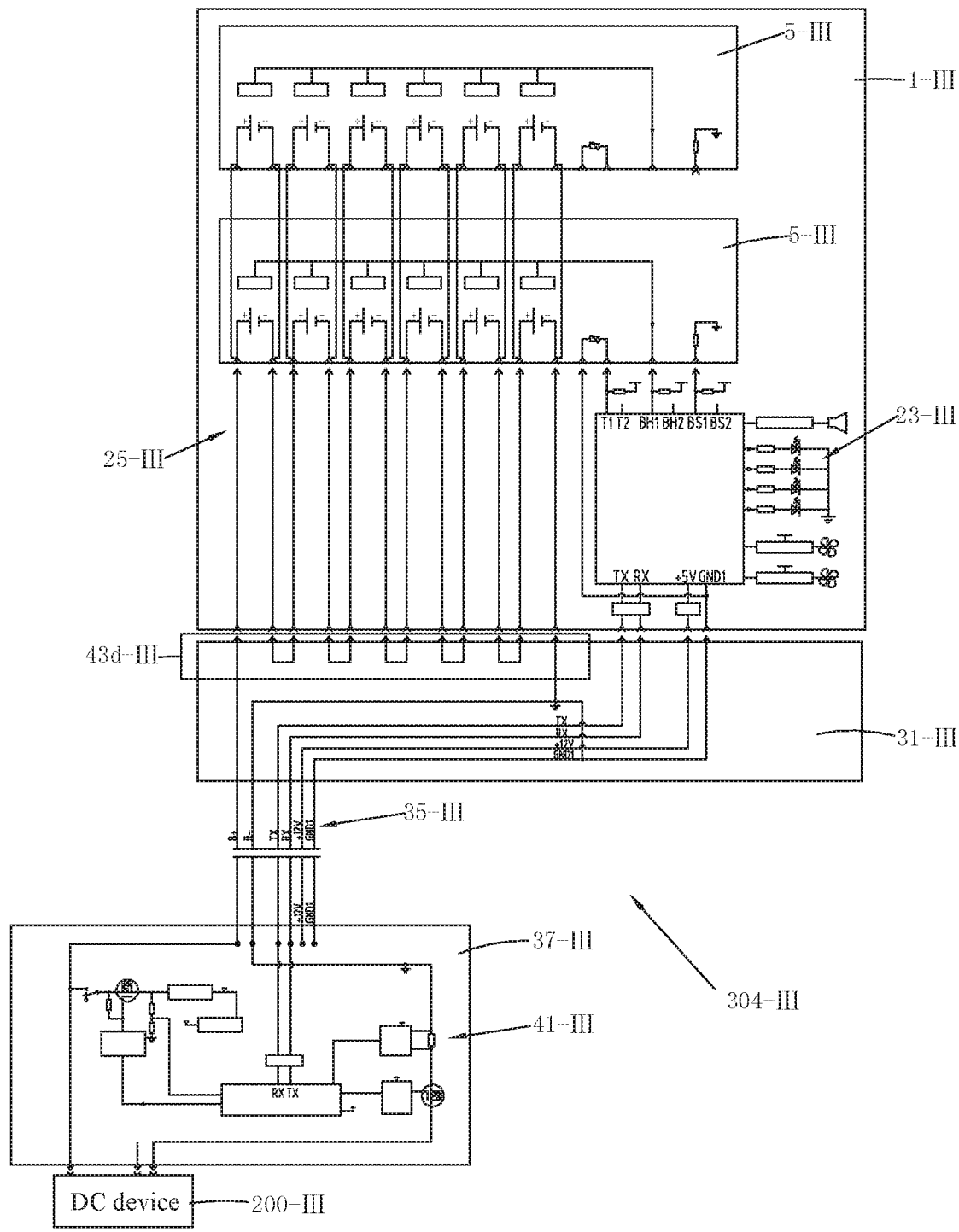
FIG. 12-III

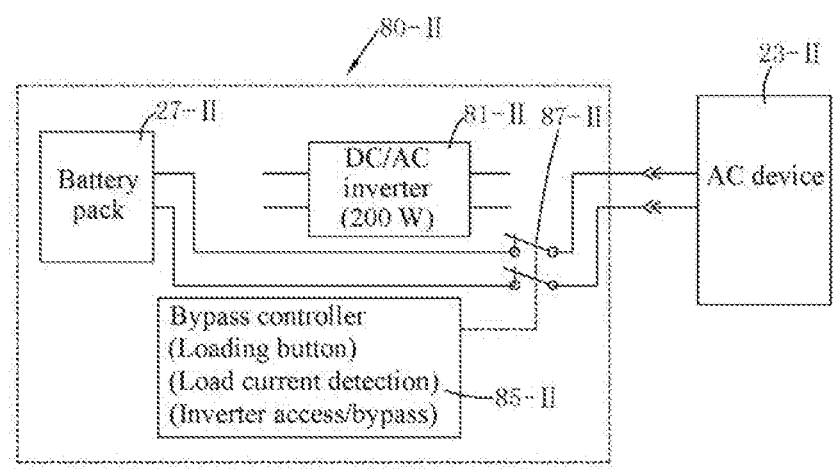
FIG. 13-II

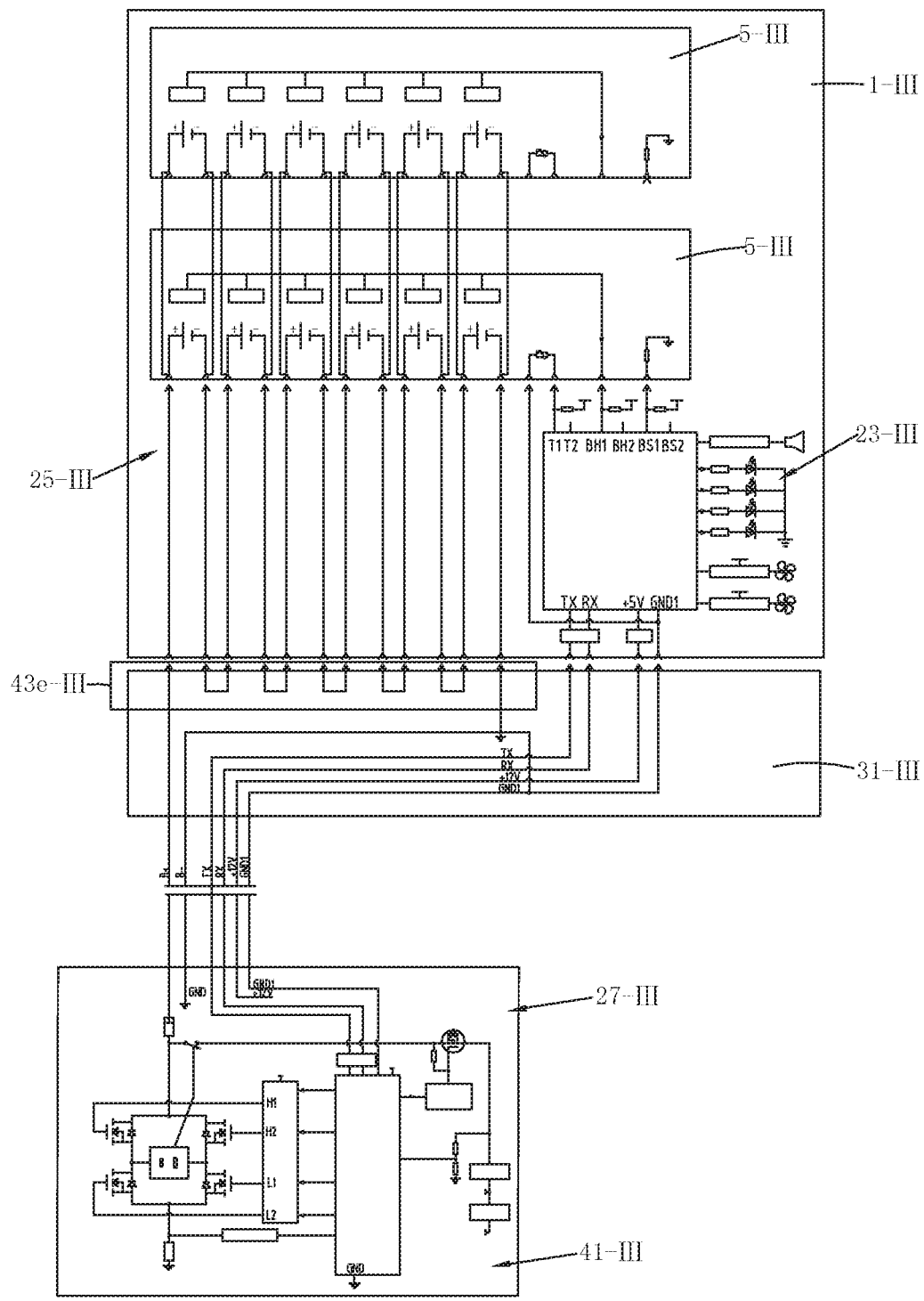
FIG. 13-III

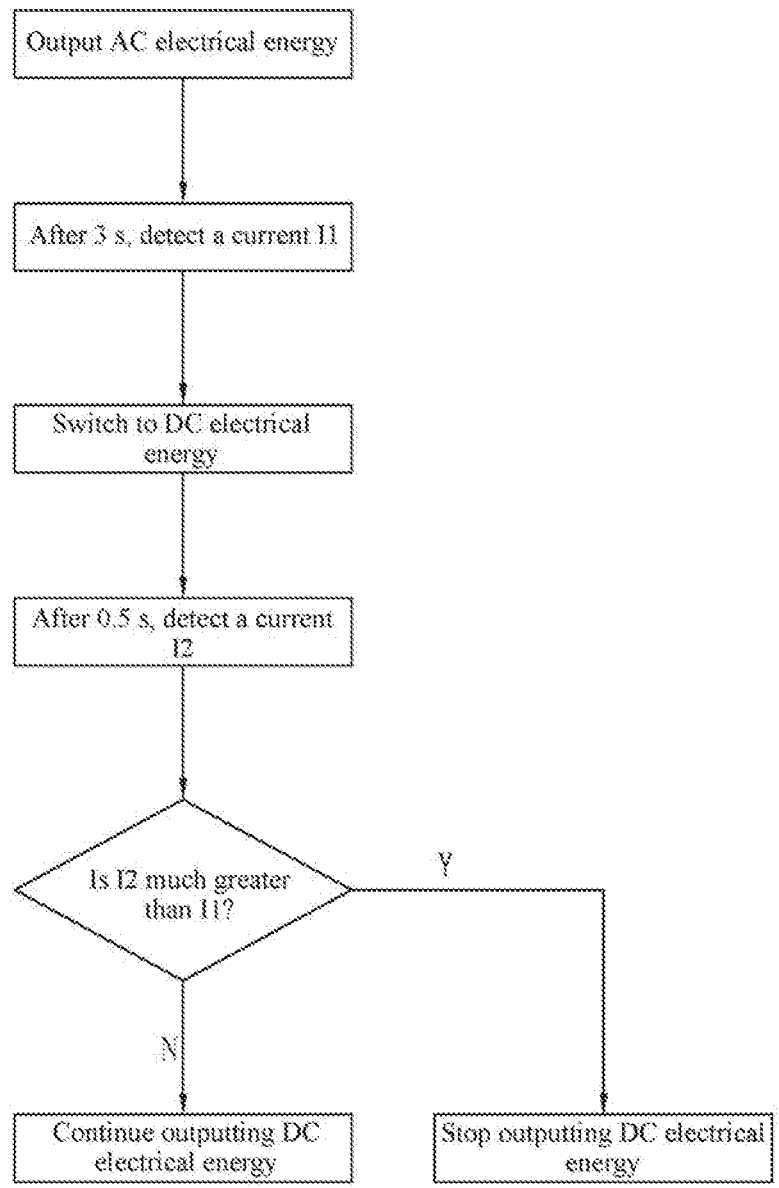
FIG. 14-II

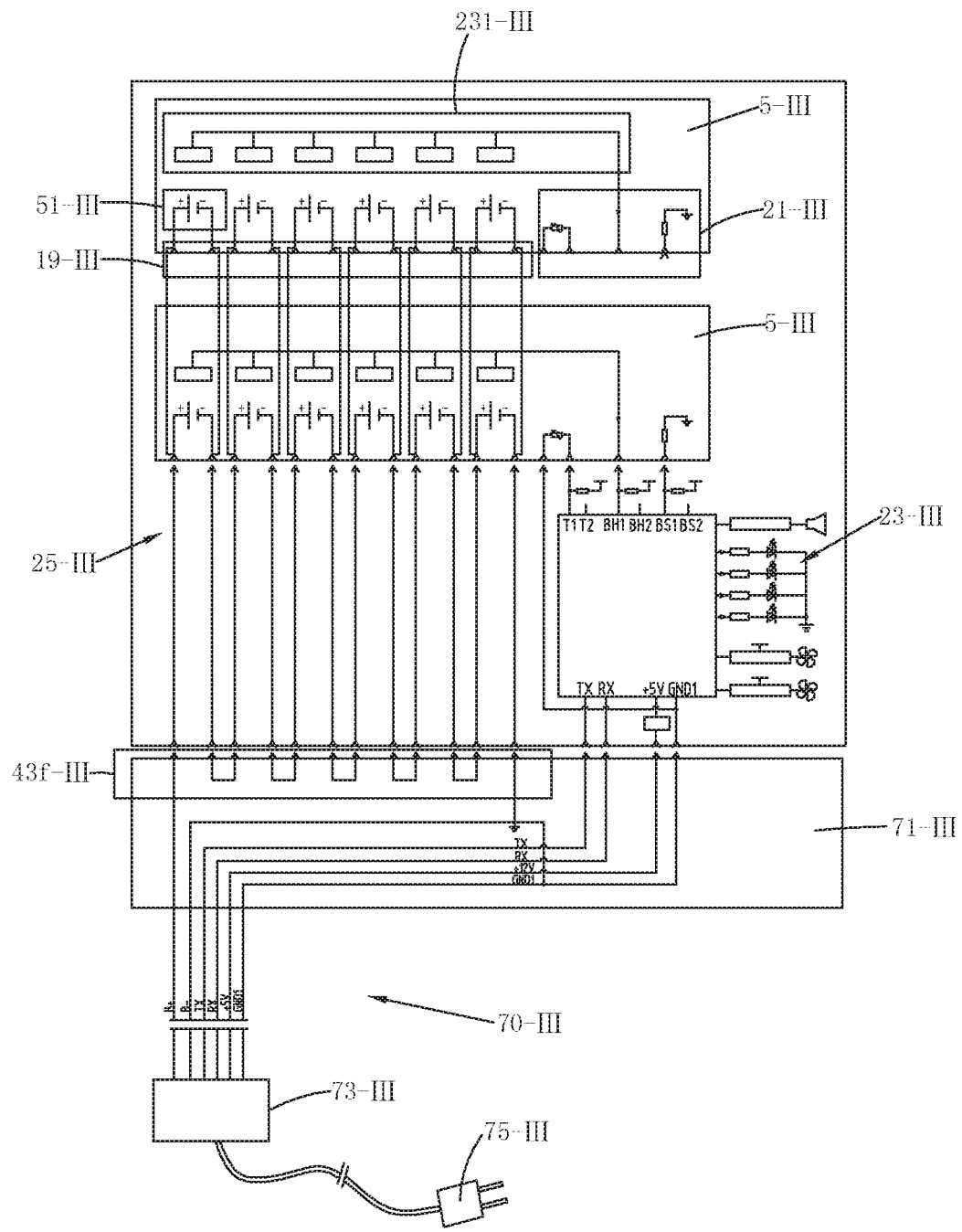
FIG. 14-III

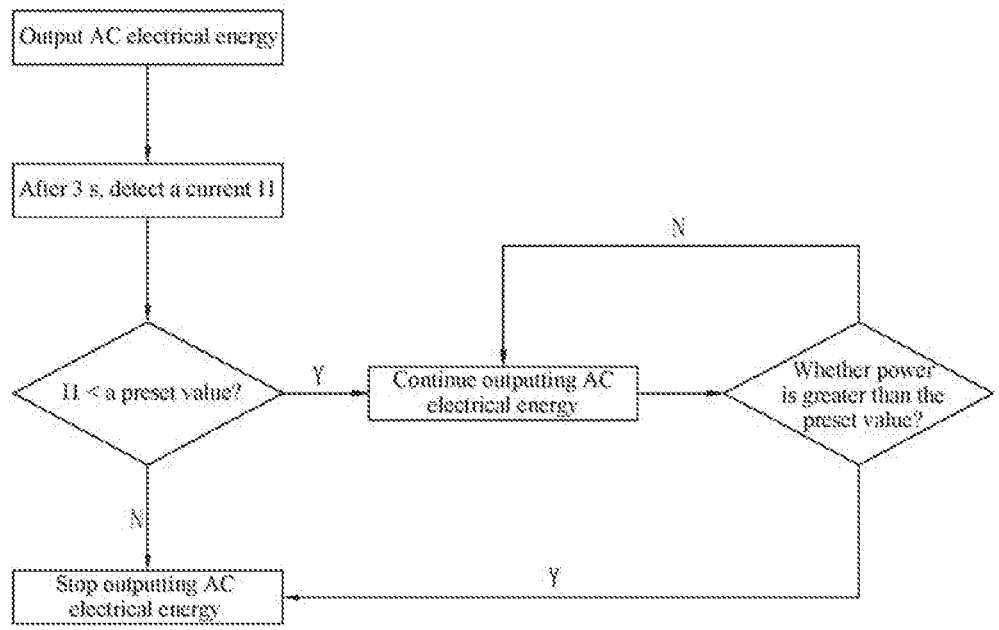
FIG. 15-II
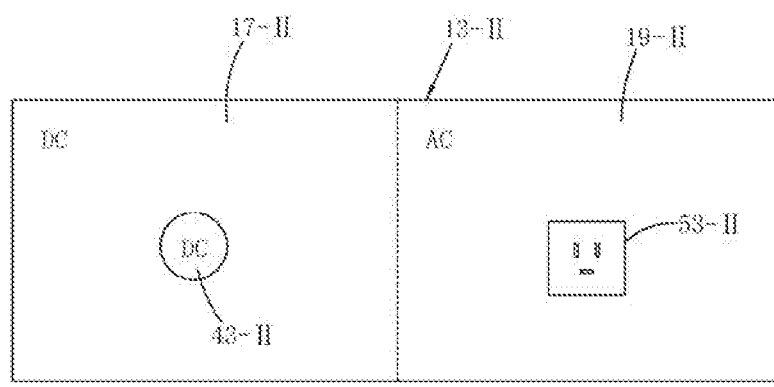
FIG. 16-II

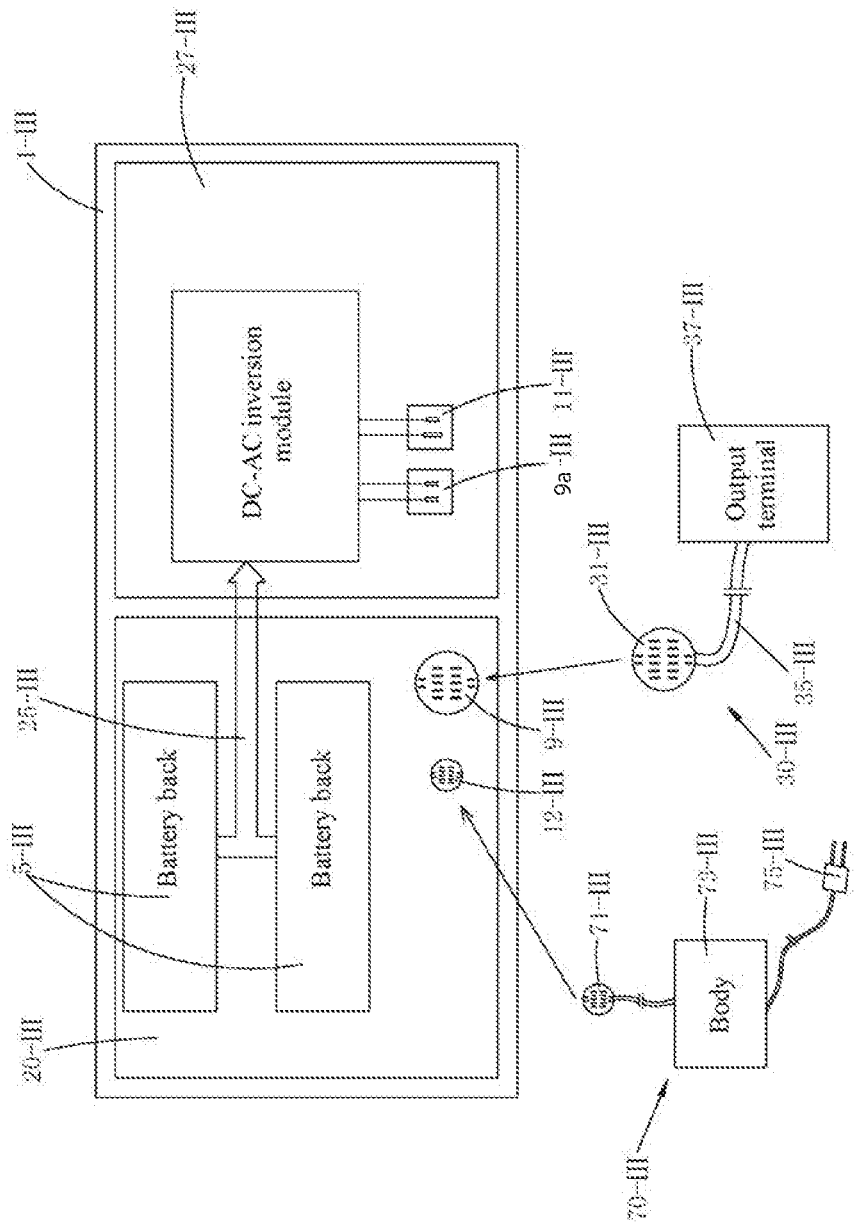
FIG. 15-III

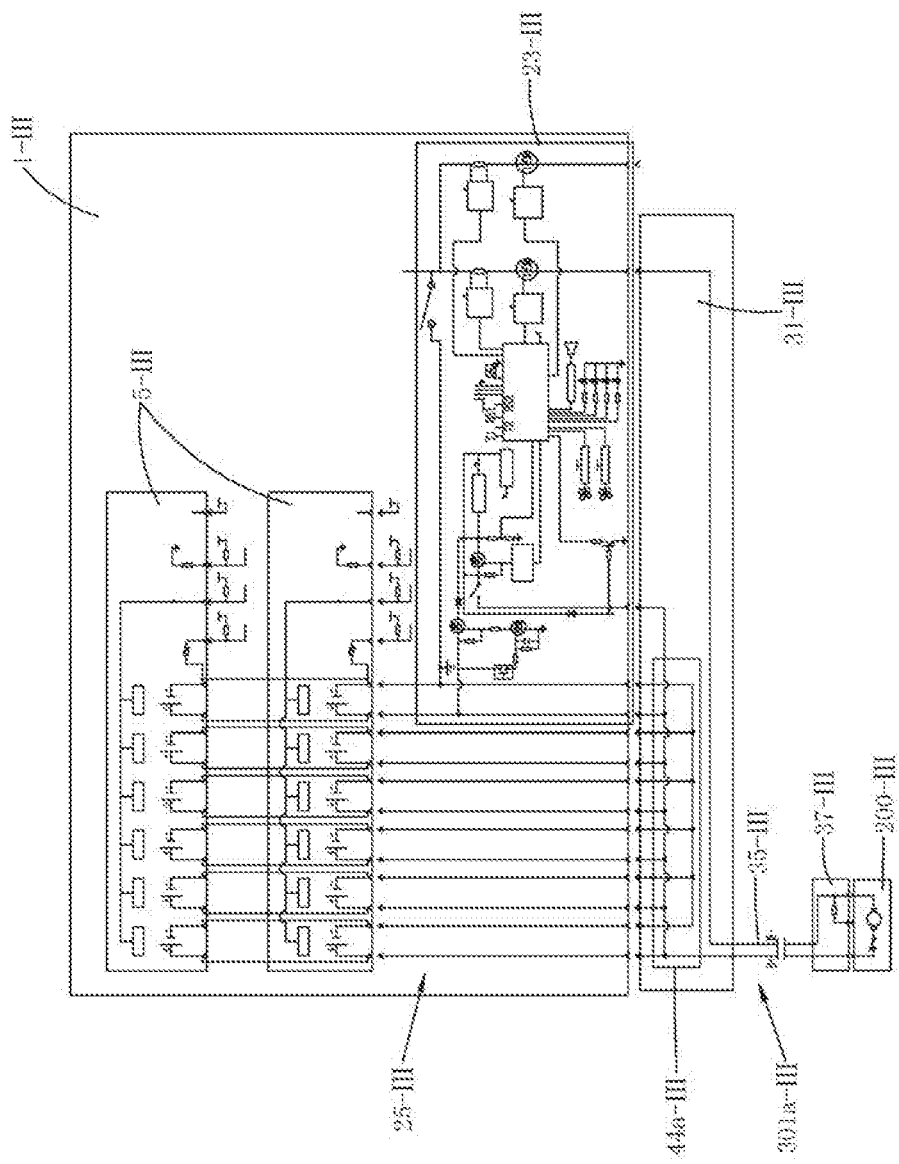
FIG. 16-III

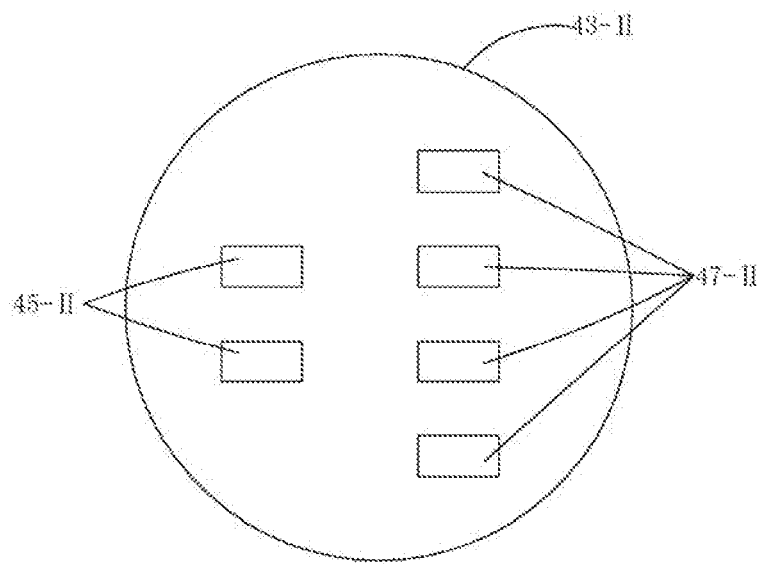
FIG. 17-II
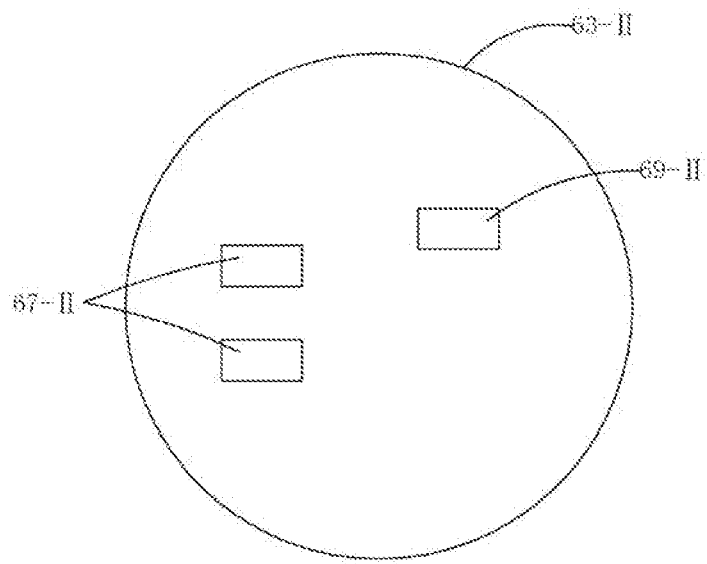
FIG. 18-II

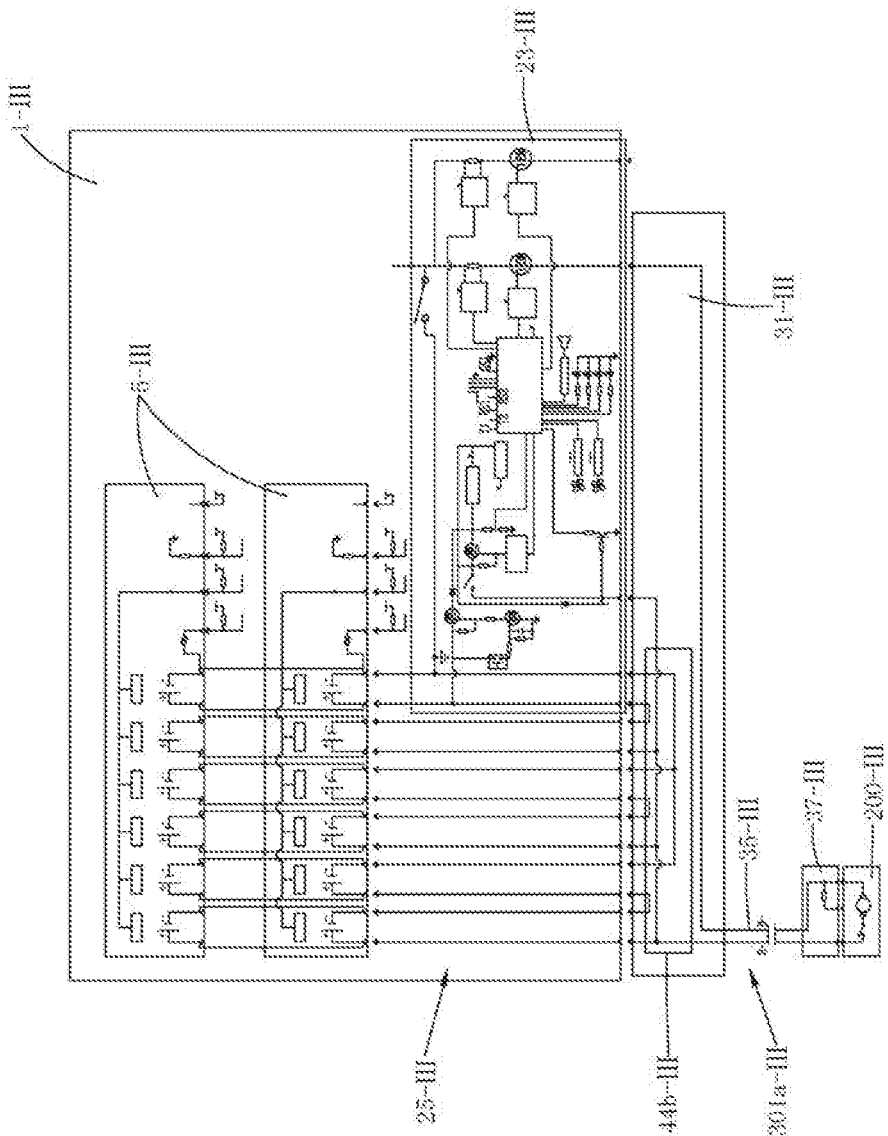
FIG. 17-III

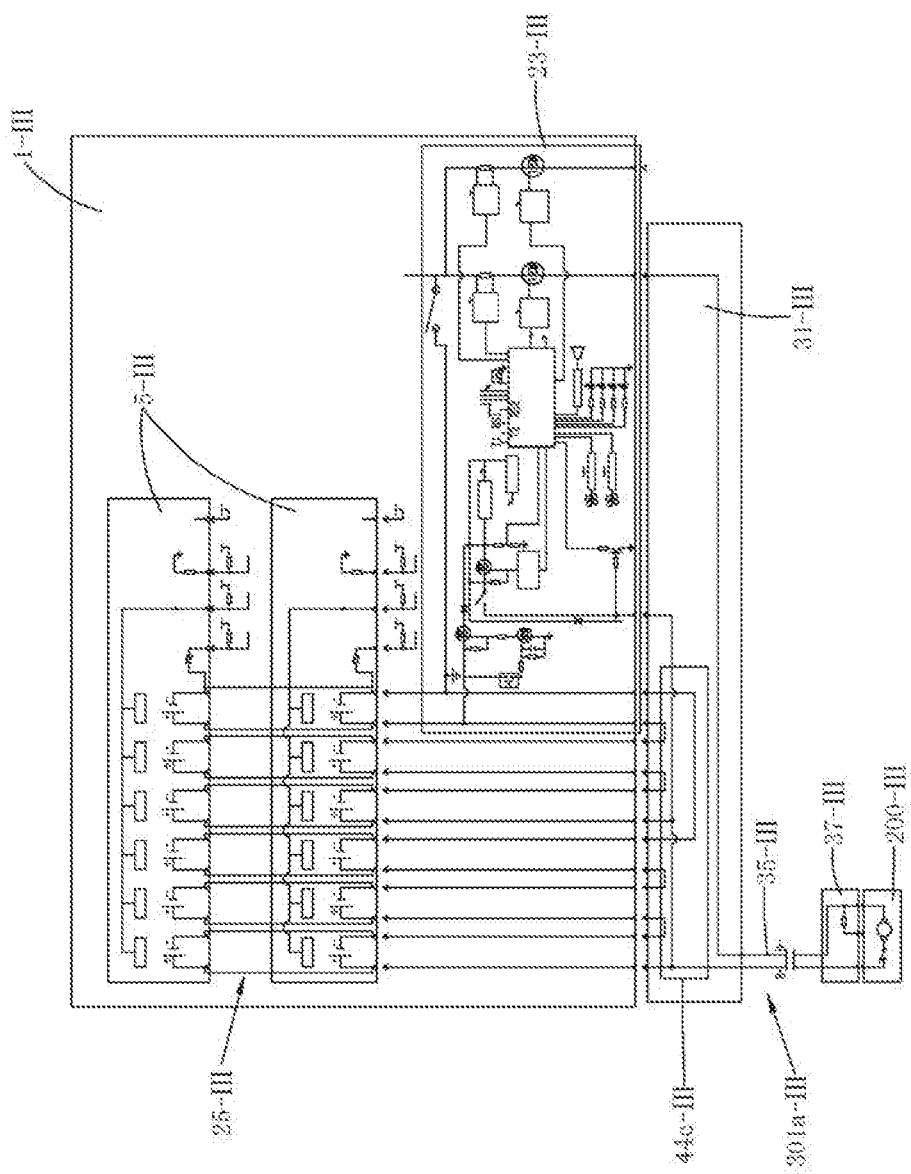
FIG. 18-III

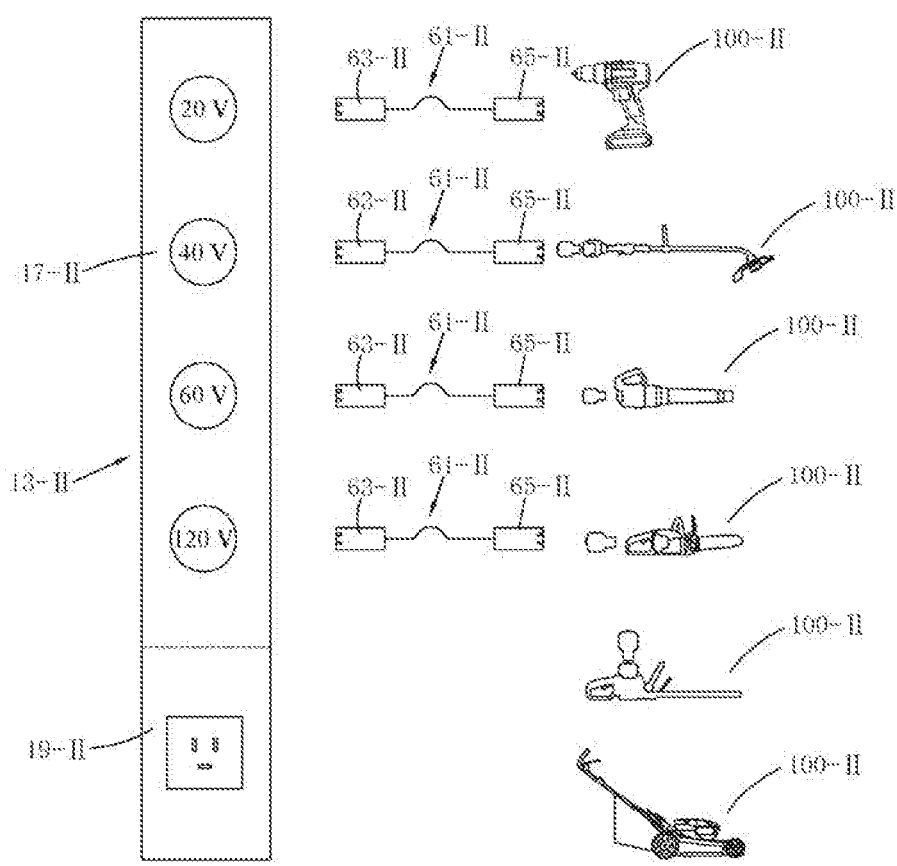
FIG. 19-II

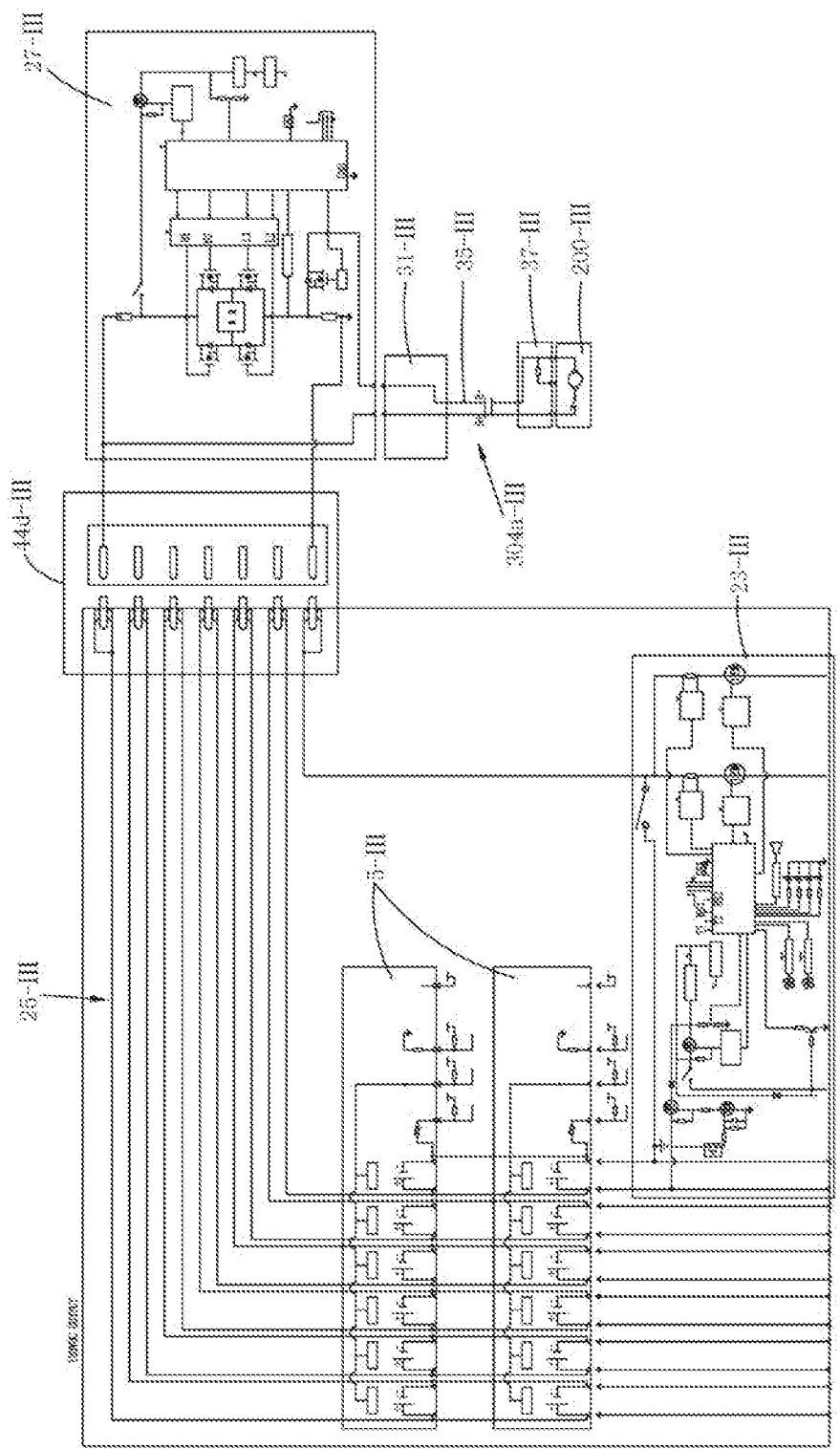

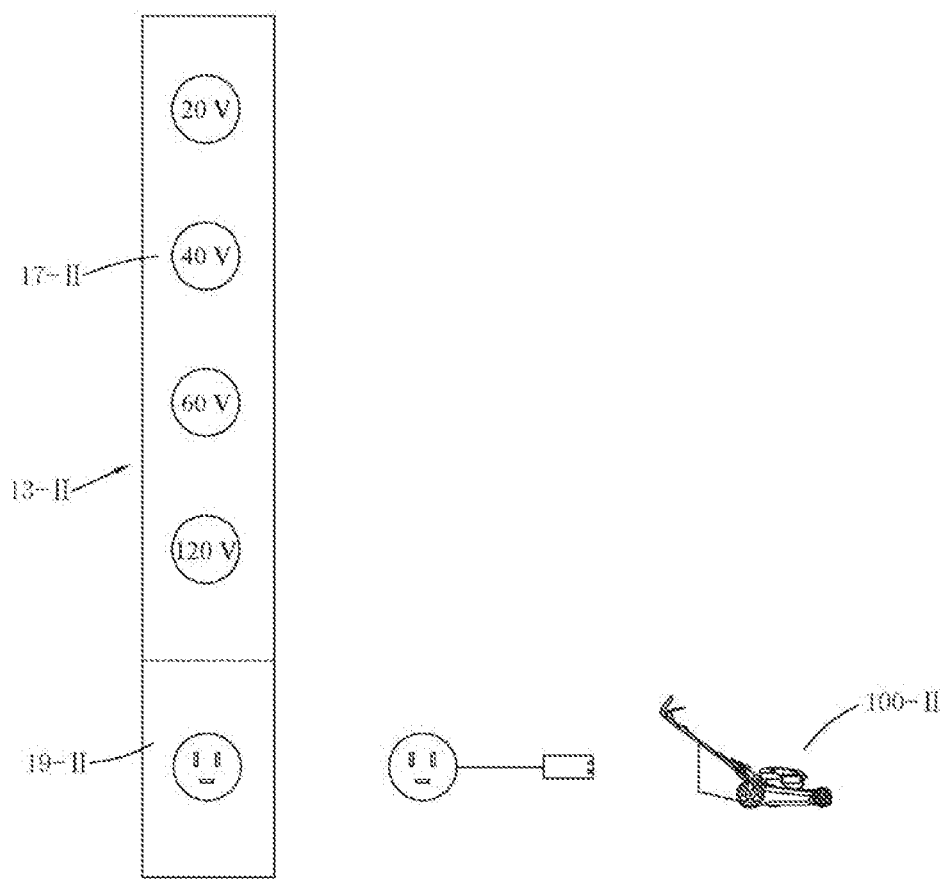
FIG. 20-II

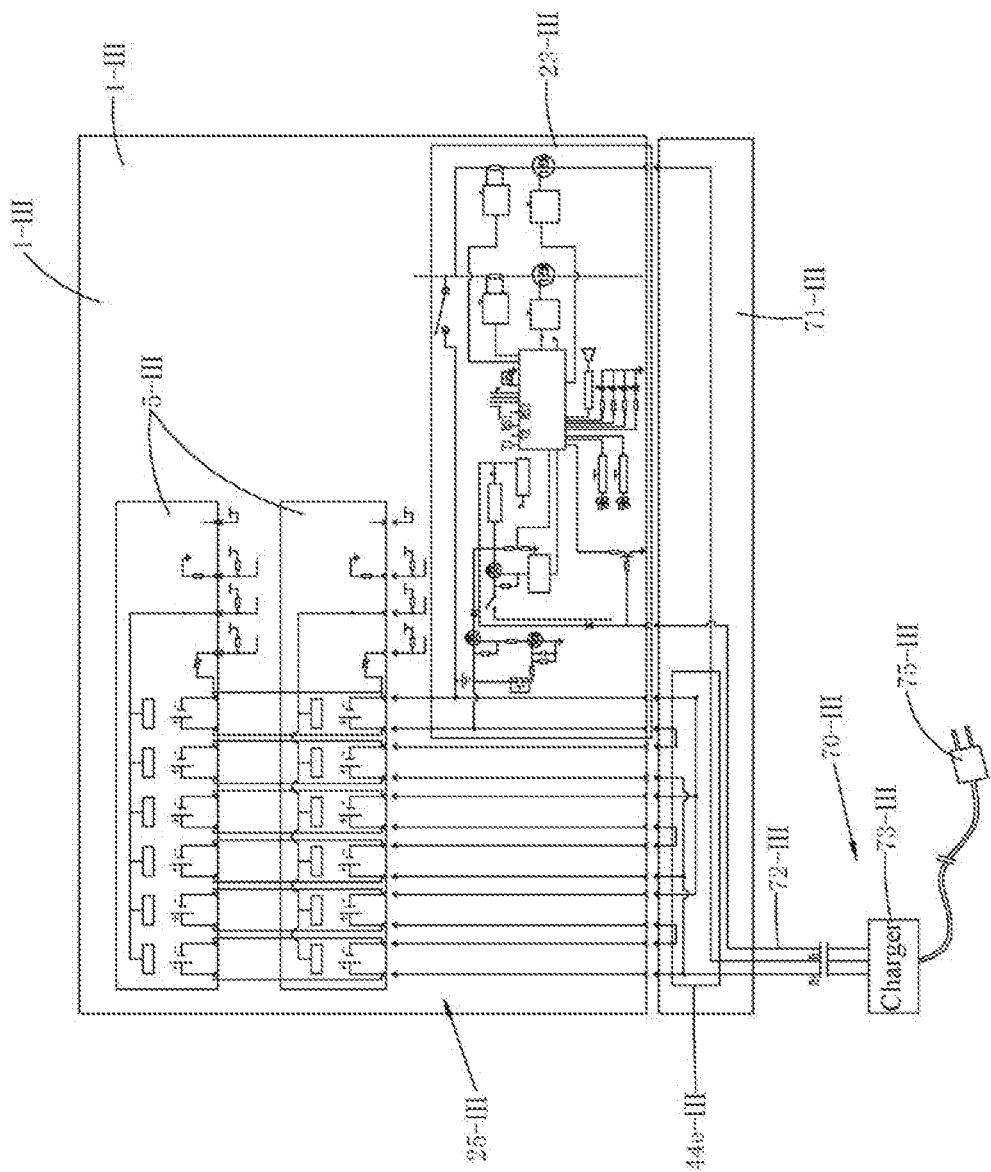
FIG. 20-III

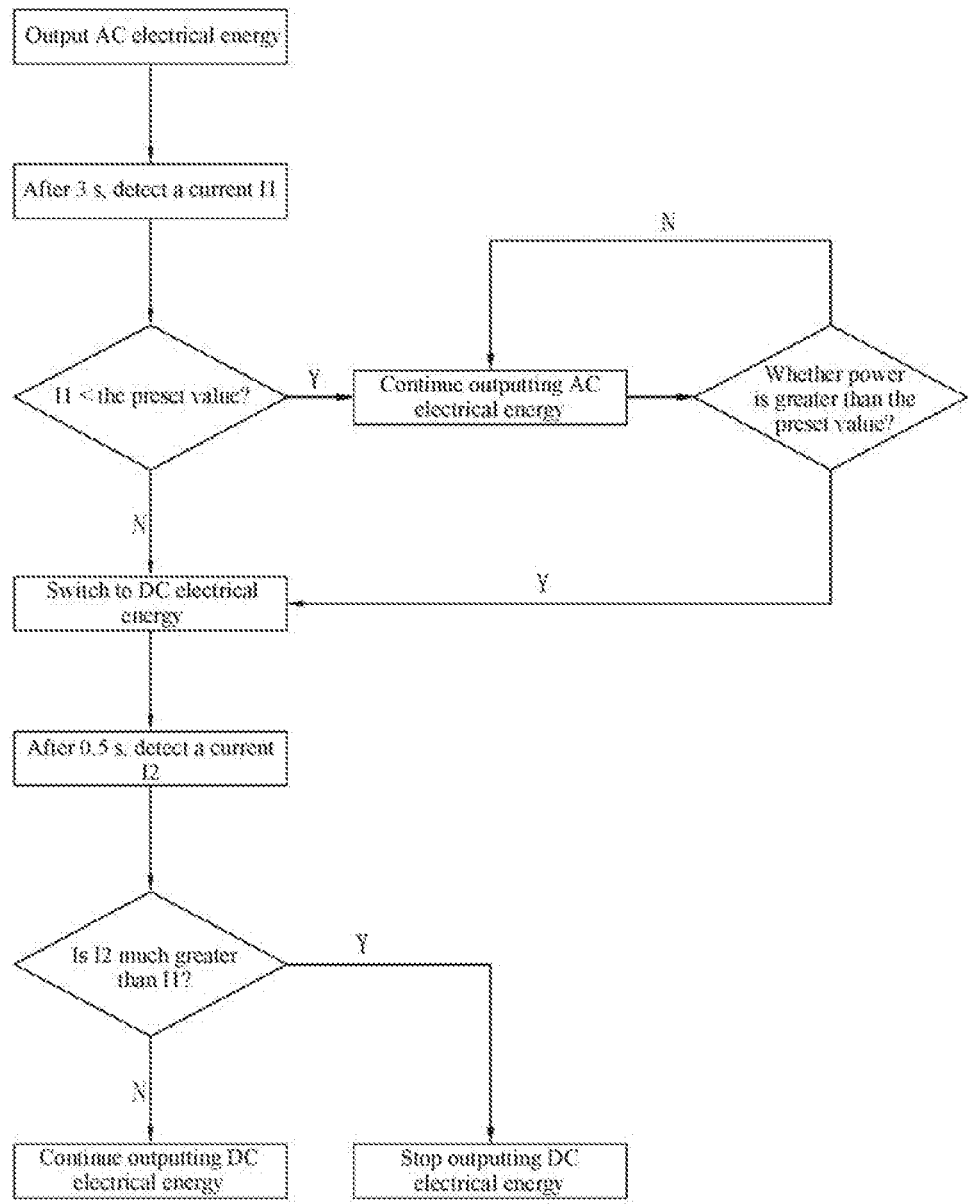
FIG. 21-II

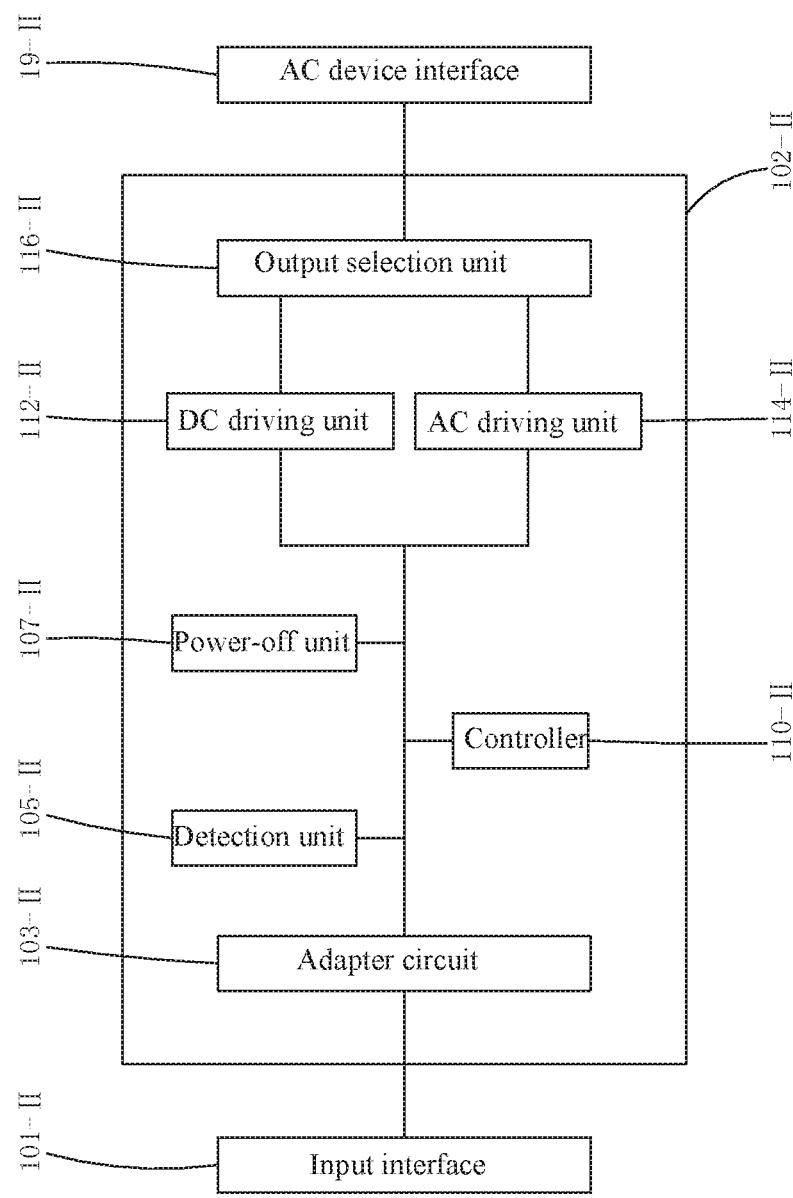
FIG. 22-II

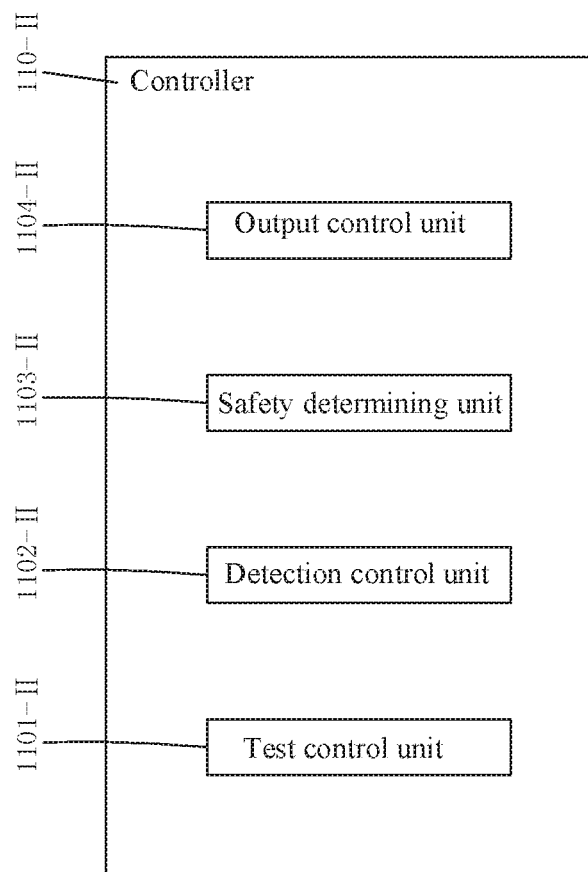
FIG. 23-II

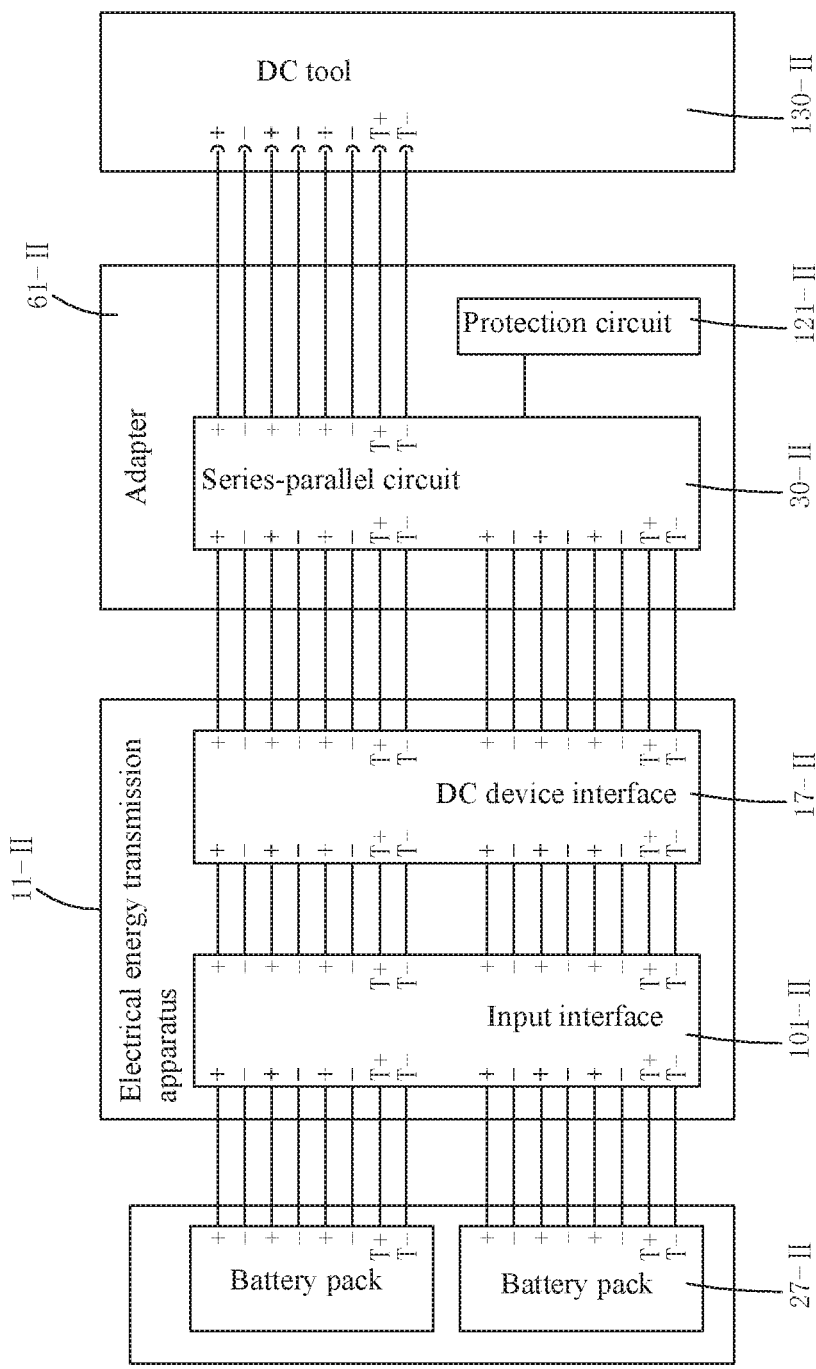
FIG. 24-II

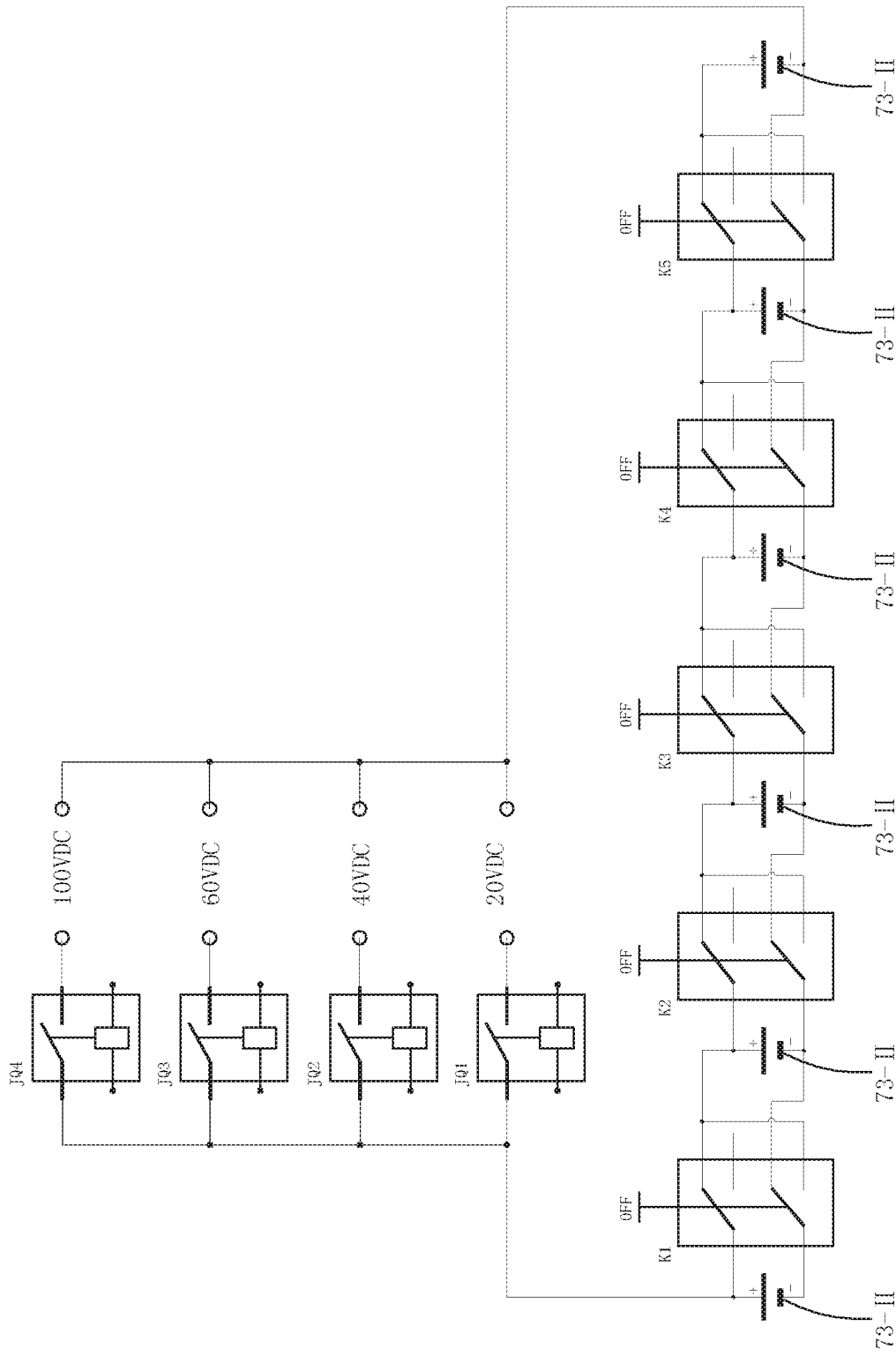
FIG. 26-II

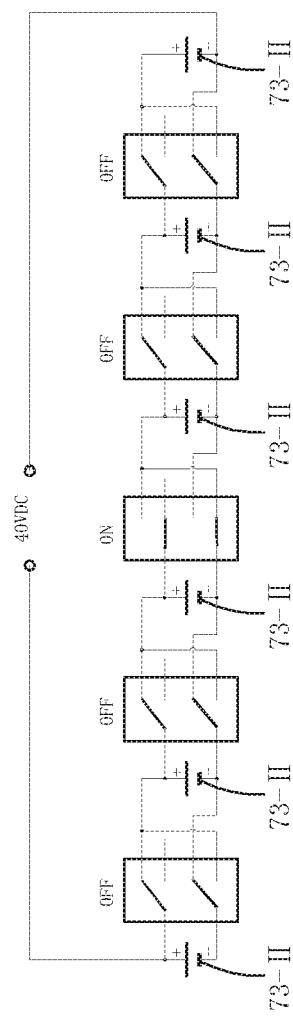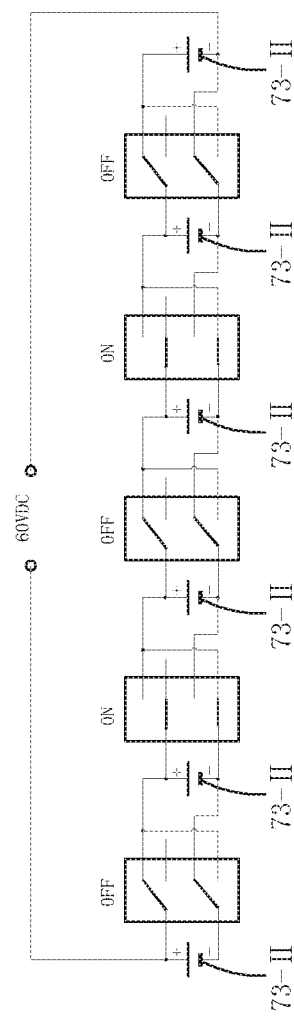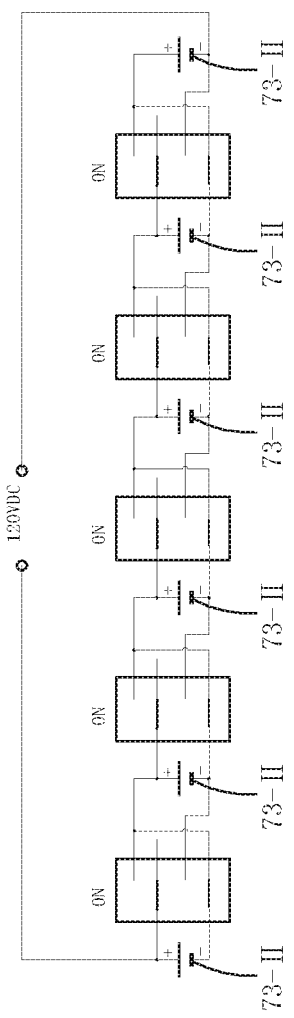

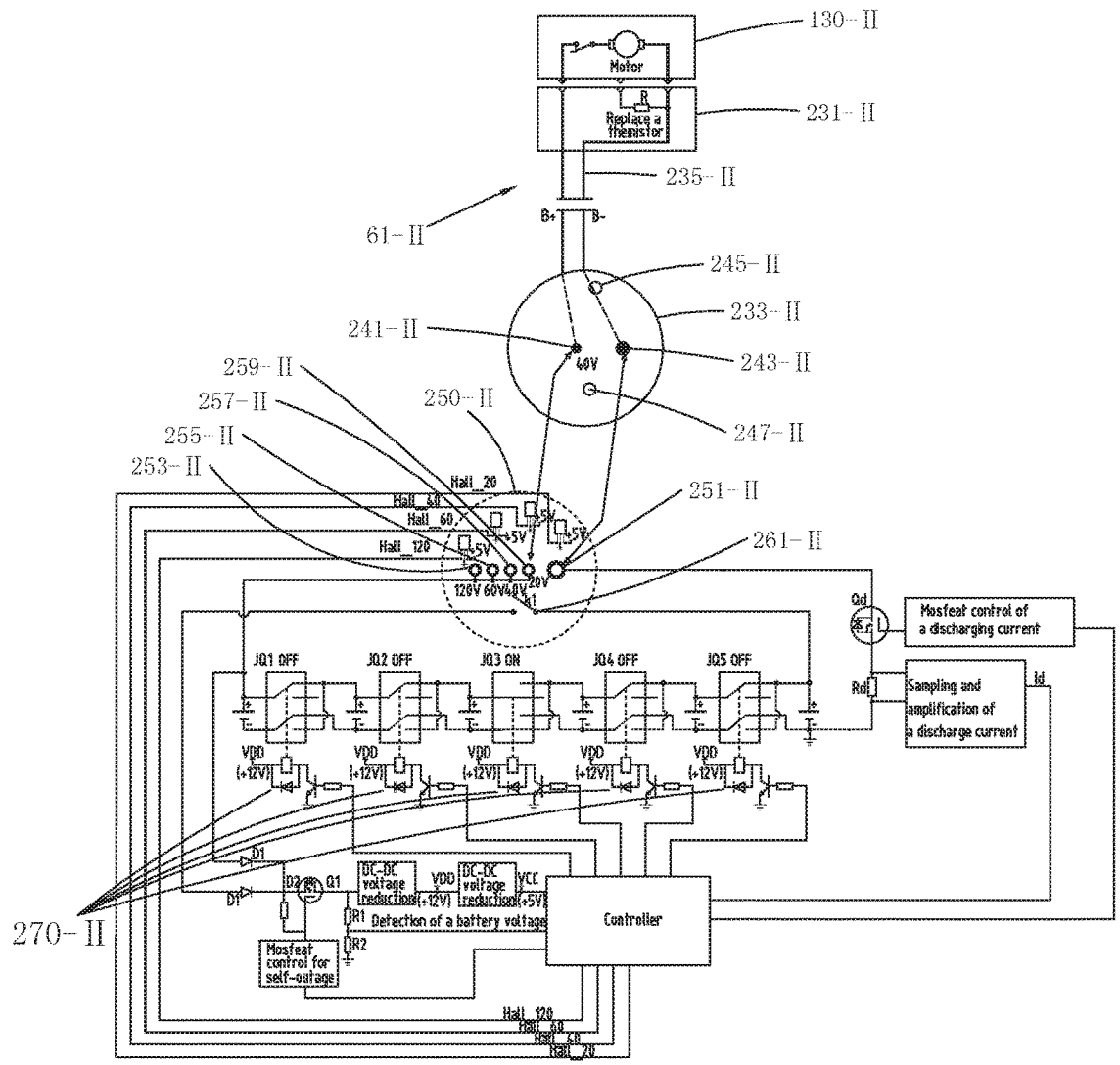
FIG. 30-II
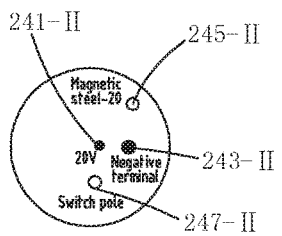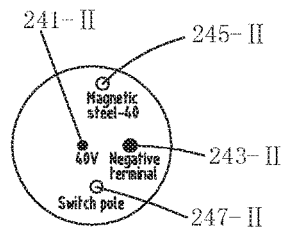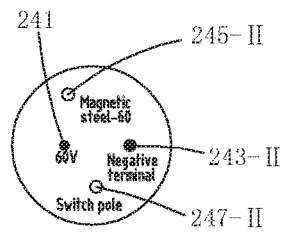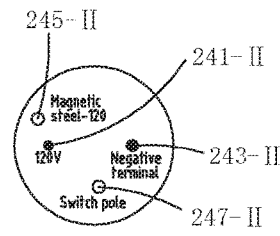
FIG. 31-II  FIG. 32-II  FIG. 33-II  FIG. 34-II

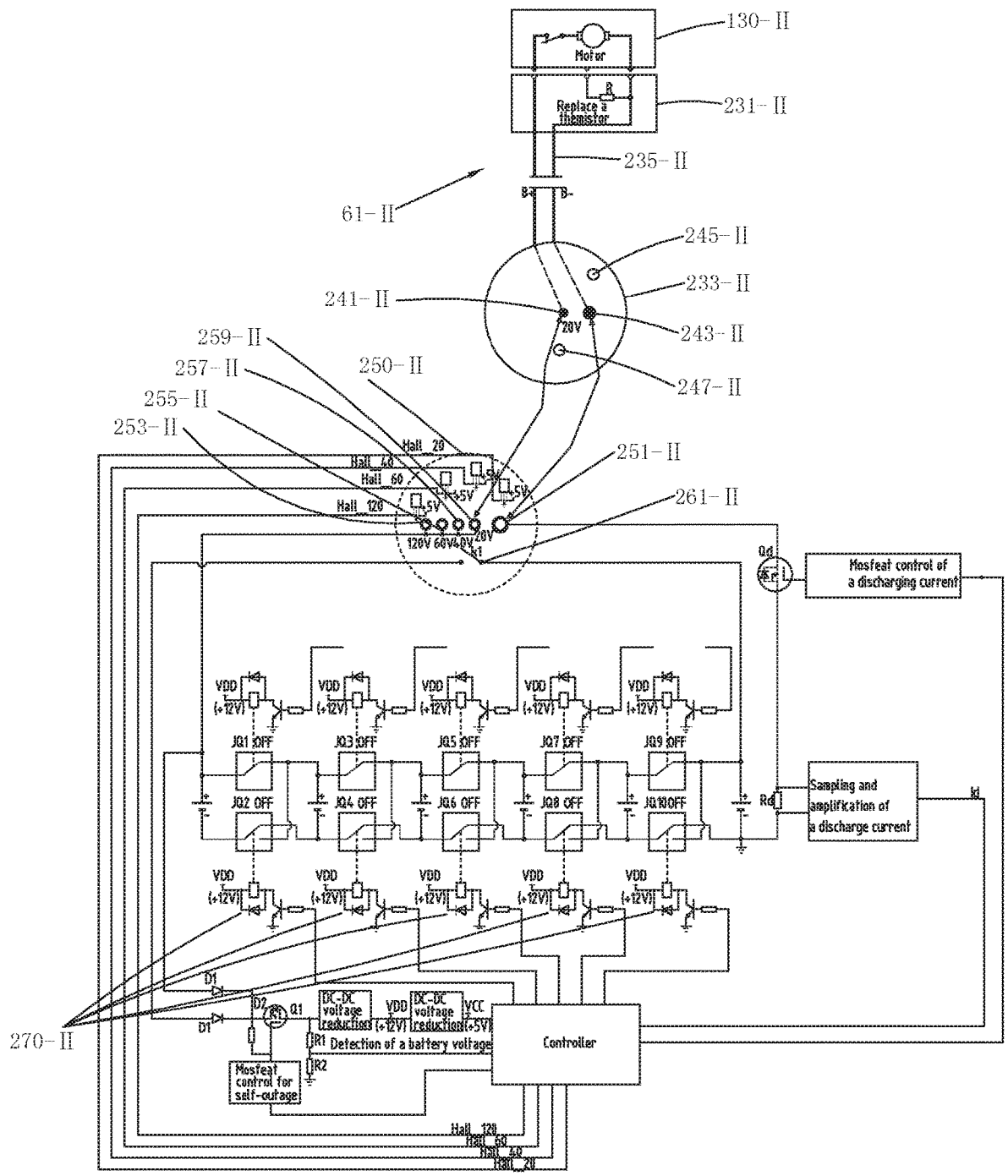
FIG. 35-II

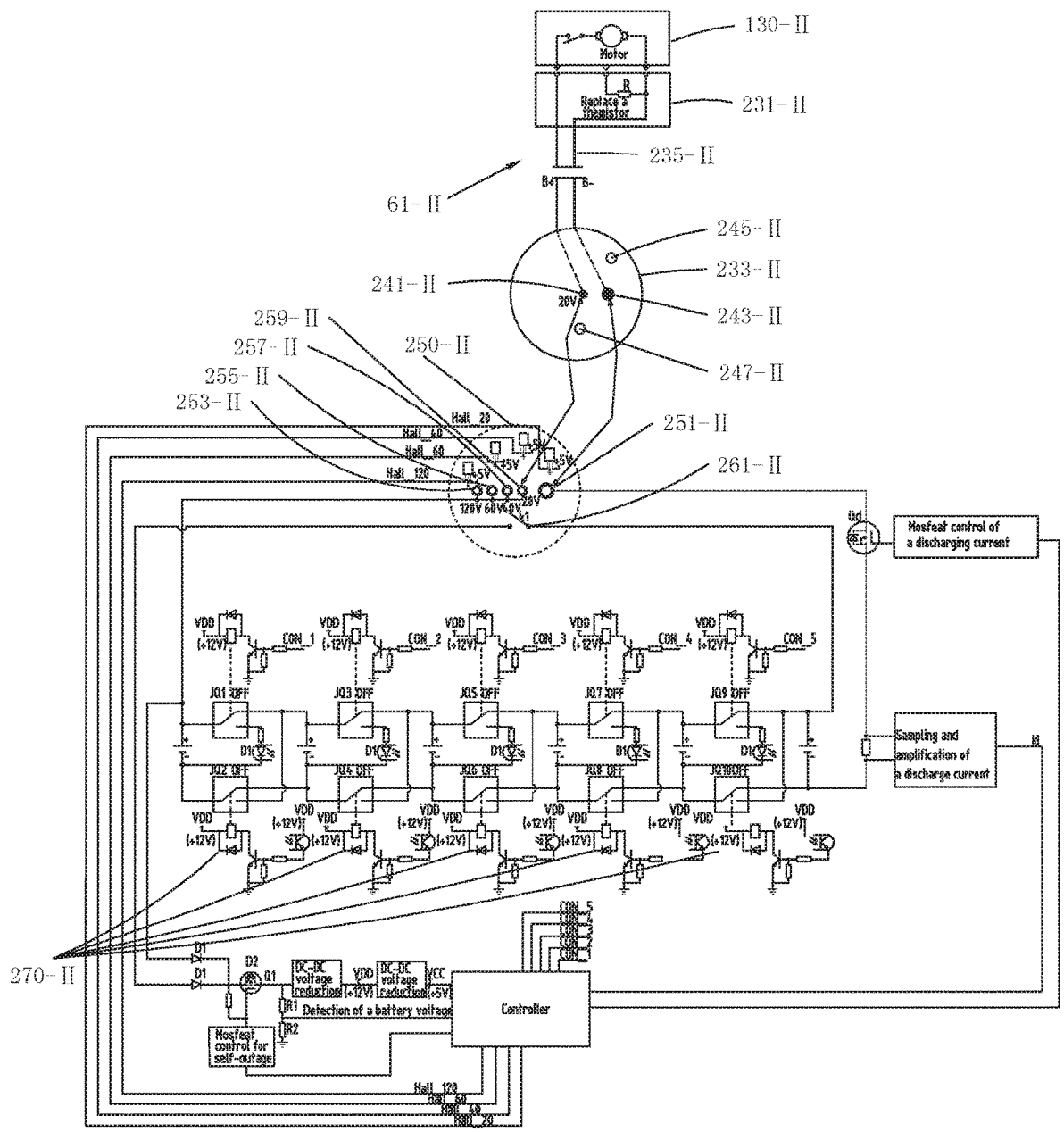
FIG. 36-II

POWER TRANSMISSION APPARATUS AND CONTROL METHOD THEREFOR, AND POWER SUPPLY SYSTEM

CROSS REFERENCE TO RELATED APPLICATIONS

The subject application is a continuation-in-part of International Patent Application No. PCT/CN2016/076300 filed on Mar. 14, 2016, which claims priority to and all the advantages of Chinese Patent Application No. 201510111767.6 filed on Mar. 13, 2015, Chinese Patent Application No. 201510111966.7 filed on Mar. 13, 2015, Chinese Patent Application No. 201510400765.9 filed on Jul. 9, 2015, Chinese Patent Application No. 201510465428.8 filed on Jul. 31, 2015, Chinese Patent Application No. 201510697073.5 filed on Oct. 22, 2015, Chinese Patent Application No. 201510717601.9 filed on Oct. 29, 2015, and Chinese Patent Application No. 201610028021.3 filed on Jan. 15, 2016, the contents of which are incorporated herein by reference in their entirety.

The subject application is also a continuation-in-part of International Patent Application No. PCT/CN2016/085285 filed on Jun. 8, 2016, which claims priority to and all the advantages of Chinese Patent Application No. 201520401960.9 filed on Jun. 11, 2015, Chinese Patent Application No. 201510400765.9 filed on Jul. 9, 2015, Chinese Patent Application No. 201520558879.1 filed on Jul. 29, 2015, Chinese Patent Application No. 201510465428.8 filed on Jul. 31, 2015, Chinese Patent Application No. 201510697073.5 filed on Oct. 22, 2015, Chinese Patent Application No. 201510717601.9 filed on Oct. 29, 2015, and Chinese Patent Application No. 201610028021.3 filed on Jan. 15, 2016, the contents of which are incorporated herein by reference in their entirety.

RELATED ART

Currently, energy sources in the world are turning from an alternating current (AC) form to a direct current (DC) form. DC power supplies are becoming increasingly powerful and inexpensive. New machines driven by DC energy sources such as electric cars are spreading all over the world.

SUMMARY

An electrical energy transmission apparatus, includes an input component, connected to a direct current (DC) energy storage component; an output component, comprising an alternating current (AC) device interface used to connect an AC device; and an adapter component, transferring electrical energy from the input component to the output component, wherein the adapter component comprises a DC driving unit and an AC driving unit, the DC driving unit converts energy of the DC energy storage component into a DC power, the AC driving unit converts energy of the DC energy storage component into an AC power, and at least one of the DC driving unit and the AC driving unit is connected to the AC device interface.

In one example, the DC driving unit and the AC driving unit are alternatively connected to a same AC device interface.

In one example, the DC driving unit and the AC driving unit are respectively connected to different AC device interfaces.

In one example, the DC driving unit outputs a continuous DC power to the AC device interface.

In one example, the DC driving unit outputs an intermittently interruptive DC power to the AC device interface.

In one example, the DC power is periodically interrupted.

In one example, duration of the DC power is greater than or equal to 20 ms.

In one example, when a preset condition is met, the DC power is interrupted, and the preset condition is that the electrical energy transmission apparatus detects that a main switch of the AC device connected to the electrical energy transmission apparatus receives a turn-off instruction.

In one example, when a preset condition is met, the DC power is interrupted, and the preset condition is that the electrical energy transmission apparatus detects that a working parameter of a main switch of the AC device connected to the electrical energy transmission apparatus meets an interruption condition.

In one example, duration of the interruption is greater than or equal to 3 ms.

In one example, the AC driving unit boosts and inverts electrical energy of the input component into an AC power.

In one example, a maximum output power of the AC driving unit is less than or equal to 300 W.

In one example, a peak value of the AC power is less than or equal to a voltage value at an input terminal of the AC driving unit.

In one example, the AC driving unit gradually increases, in a soft start manner, a power of an AC power applied to the AC device interface.

In one example, the adapter component further comprises a detection unit, a controller, and an output selection unit, the detection unit detects a working parameter related to a characteristic of the AC device, and the controller controls, according to a detection result of the detection unit, the output selection unit to alternatively output an AC power or a DC power.

In one example, the detection unit detects a power of the AC device; when determining that the power of the AC device is less than or equal to a preset value, the controller controls the output selection unit to output an AC power to the AC device interface; and when determining that the power of the AC device is greater than a preset power value, the controller controls the output selection unit to output a DC power to the AC device interface.

In one example, when the controller determines that the power of the AC device is greater than the preset power value, the controller further determines whether the AC device is suitable to be powered by a DC power, and when a determining result is yes, controls the output selection unit to output a DC power to the AC device interface, or when a determining result is no, controls the output selection unit stop outputting electrical energy to the AC device interface.

In one example, a specific manner in which the controller further determines whether the AC device is suitable to be powered by a DC power is that, the detection unit detects an AC working current value of the electrical energy transmission apparatus that exists when an AC power is output to the AC device interface and a DC working current value of the electrical energy transmission apparatus that exists when a DC power is output to the AC device interface, when the DC working current value and the AC working current value meet a preset relationship, a determining result of the controller is yes, and when the DC working current value and the AC working current value meet a turn-off condition, a determining result of the controller is no.

In one example, the preset relationship is: the DC working current value is less than five times of the AC working current value.

In one example, the turn-off condition is: the DC working current value is greater than five times of the AC working current value; or the DC working current value is greater than the AC working current value by more than 10 A.

In one example, when the controller determines whether the AC device is suitable to be powered by a DC power, a power of an AC power or a DC power output to the AC device interface is restricted.

In one example, in a process in which the output selection unit outputs an AC power to the AC device interface, if the detection unit detects that the power of the AC device is greater than the preset power value, the controller controls the output selection unit to output a DC power to the AC device interface.

In one example, in a process in which the output selection unit outputs a DC power to the AC device interface, if the detection unit detects that the power of the AC device is less than or equal to the preset power value, the controller controls the output selection unit to output an AC power to the AC device interface.

In one example, the electrical energy transmission apparatus further comprises at least one of a DC device interface, a USB device interface, a vehicle-mounted cigarette lighter receptacle interface, and a solar energy charging interface.

In one example, the electrical energy transmission apparatus further comprises at least one of an audio processing circuit and a projector circuit.

One example provides a control method for an electrical energy transmission apparatus, the control method comprises the following steps: connecting an alternating current (AC) device to an AC device interface of an electrical energy transmission apparatus; detecting a power of the AC device; when the power of the AC device is less than or equal to a preset power value, outputting an AC power to the AC device interface; and when the power of the AC device is greater than the preset power value, outputting a direct current (DC) power to the AC device interface.

In one example, before the outputting a DC power to the AC device interface, the control method further comprises the following steps: determining whether the AC device is suitable to be powered by a DC power, and if a determining result is yes, outputting a DC power to the AC device interface, or if a determining result is no, stopping outputting electrical energy to the AC device interface.

In one example, the step of determining whether the AC device is suitable to be powered by a DC power is: outputting an AC power to the AC device interface; detecting an AC working current of the electrical energy transmission apparatus; outputting a DC power to the AC device interface; detecting a DC working current of the electrical energy transmission apparatus; and if a DC working current value and an AC working current value meet a preset relationship, a determining result is yes, and if the DC working current value and the AC working current value meet a turn-off condition, a determining result is no.

In one example, a power supply system includes a direct current (DC) energy storage component and an electrical energy transmission apparatus, the electrical energy transmission apparatus is the electrical energy transmission apparatus according to any one of above-mentioned example.

In one example, the DC energy storage component comprises a primary energy storage module, a secondary energy storage module, and a tertiary energy storage module; the primary energy storage module is a battery pack detachably mounted on the electrical energy transmission apparatus; the secondary energy storage module is a standard battery unit located in the battery pack, and the standard battery unit has an output terminal that outputs a voltage; the DC energy storage component comprises multiple secondary energy storage modules; the secondary energy storage module comprises multiple tertiary energy storage modules; and the tertiary energy storage module is a cell located in the secondary energy storage module.

In one example, an adapter component comprises a conversion circuit, an input terminal of the conversion circuit is connected to the input component, an output terminal of the conversion circuit is connected to the DC driving unit and the alternating current (AC) driving unit, and the conversion circuit connects the secondary energy storage module in series and/or in parallel.

In one example, the conversion circuit comprises multiple different series-parallel circuits.

In one example, an electrical energy transmission apparatus includes: an input component, connected to a DC energy storage component; an output component, including an AC device interface used to connect an AC device; and an adapter component, transferring electrical energy from the input component to the output component. The adapter component includes a DC driving unit, the DC driving unit outputs an interruptive DC power to the AC device interface, and the interruptive DC power is a DC-output intermittently-interruptive DC power.

In one example, the interruptive DC power is periodically interrupted.

In one example, duration of the DC power is greater than or equal to 20 ms.

In one example, when a preset condition is met, the interruptive DC power is interrupted, and the preset condition is that the electrical energy transmission apparatus detects that a main switch of the AC device connected to the electrical energy transmission apparatus receives a turn-off instruction.

In one example, when a preset condition is met, the interruptive DC power is interrupted, and the preset condition is that the electrical energy transmission apparatus detects that a working parameter of a main switch of the AC device connected to the electrical energy transmission apparatus meets an interruption condition.

In one example, duration during which a DC output is interrupted is greater than or equal to 3 ms.

In one example, the adapter component further includes an AC driving unit, a detection unit, a controller, and an output selection unit. The AC driving unit outputs an AC power to the AC device interface. The detection unit detects a working parameter related to a characteristic of the AC device. The controller controls, according to a detection result of the detection unit, the output selection unit to alternatively output an AC power or a DC power.

In one example, the detection unit detects a power of the AC device. When determining that the power of the AC device is less than or equal to a preset value, the controller controls the output selection unit to output an AC power to the AC device interface. When determining that the power of the AC device is greater than a preset power value, the controller controls the output selection unit to output an interruptive DC power to the AC device interface.

In one example, when the controller determines that the power of the AC device is greater than the preset power value, the controller further determines whether the AC device is suitable to be powered by an interruptive DC power, and when a determining result is yes, controls the output selection unit to output an interruptive DC power to the AC device interface, or when a determining result is no, controls the output selection unit stop outputting electrical energy to the AC device interface.

In one example, a specific manner in which the controller further determines whether the AC device is suitable to be powered by an interruptive DC power is that, the detection unit detects an AC working current value of the electrical energy transmission apparatus that exists when an AC power is output to the AC device interface and a DC working current value of the electrical energy transmission apparatus that exists when a DC power is output to the AC device interface, when the DC working current value and the AC working current value meet a preset relationship, a determining result of the controller is yes, and when the DC working current value and the AC working current value meet a turn-off condition, a determining result of the controller is no.

In one example, the preset relationship is: the DC working current value is less than five times of the AC working current value.

In one example, the turn-off condition is: the DC working current value is greater than five times of the AC working current value; or the DC working current value is greater than the AC working current value by more than 10 A.

In one example, when the controller determines whether the AC device is suitable to be powered by an interruptive DC power supply, a power of an AC power or a DC power output to the AC device interface is restricted.

In one example, in a process in which the output selection unit outputs an AC power to the AC device interface, if the detection unit detects that the power of the AC device is greater than the preset power value, the controller controls the output selection unit to output an interruptive DC power to the AC device interface.

In one example, in a process in which the output selection unit outputs an interruptive DC power to the AC device interface, if the detection unit detects that the power of the AC device is less than or equal to the preset power value, the controller controls the output selection unit to output an AC power to the AC device interface.

In one example, a power supply system, where the power supply system includes a DC energy storage component and an electrical energy output apparatus, and the electrical energy transmission apparatus is any electrical energy transmission apparatus in the foregoing.

In one example, the DC energy storage component includes a primary energy storage module, a secondary energy storage module, and a tertiary energy storage module; the primary energy storage module is a battery pack detachably mounted on the electrical energy transmission apparatus; the secondary energy storage module is a standard battery unit located in the battery pack, and the standard battery unit has an output terminal that outputs a voltage; the DC energy storage component includes multiple secondary energy storage modules; the secondary energy storage module includes multiple tertiary energy storage modules; and the tertiary energy storage module is a cell located in the secondary energy storage module.

In one example, an adapter component includes a conversion circuit, an input terminal of the conversion circuit is connected to an input component, an output terminal of the conversion circuit is connected to a DC driving unit and an AC driving unit, and the conversion circuit is connected to the secondary energy storage module in series and/or in parallel.

In one example, the conversion circuit includes multiple different series-parallel circuits.

In one example, a power supply system includes a DC energy storage component and an electrical energy output apparatus. The electrical energy transmission apparatus includes: an input component, connected to the DC energy storage component; an output component, including an AC device interface used to connect an AC device; and an adapter component, transferring electrical energy from the input component to the output component, and including an AC driving unit, where an AC power is output to the AC device interface. The DC energy storage component includes a primary energy storage module, a secondary energy storage module, and a tertiary energy storage module. The primary energy storage module is a battery pack detachably mounted on the electrical energy transmission apparatus, and the battery pack is detachably mounted on a power tool. The secondary energy storage module is a standard battery unit located in the battery pack, and the standard battery unit has an output terminal that outputs a voltage. The DC energy storage component includes multiple secondary energy storage modules. The secondary energy storage module includes multiple tertiary energy storage modules. The tertiary energy storage module is a cell located in the secondary energy storage module.

In one example, the AC driving unit boosts and inverts electrical energy of the input component and converts the boosted and inverted electrical energy into an AC power.

In one example, a maximum output power of the AC driving unit is less than or equal to 300 W.

In one example, a peak value of the AC power is less than or equal to a voltage value at an input terminal of the AC driving unit.

In one example, the AC driving unit gradually increases, in a soft start manner, a power of an AC power applied to the AC device interface.

In one example, an electrical energy supply apparatus includes: a main body; multiple cells disposed in the main body, where a product of a voltage of the cells and a quantity of the cells is greater than or equal to 80 V; and an electrical energy output device, including a flexible connection apparatus, where an end of the flexible connection apparatus is electrically connected to the cells, an electrical energy output interface is disposed at the other end of the flexible connection apparatus, and the electrical energy output interface is connected to an external power tool, and supplies electrical energy to the external power tool, where an output voltage of the electrical energy output interface is above 80 V.

In one example, the electrical energy output interface matches a battery pack mounting interface of the external power tool.

In one example, the electrical energy output interface is detachably connected to the flexible connection apparatus.

In one example, the electrical energy supply apparatus further includes a wearable component connected to the main body, and the wearable component includes a shoulder belt and/or a waist belt.

In one example, the electrical energy supply apparatus further includes at least one battery pack housing, the multiple cells are received in the at least one battery pack housing, the battery pack housing has a battery pack interface, and the battery pack interface matches the battery pack mounting interface of the external power tool. At least one battery pack receiving recess is disposed at the main body, the battery pack receiving recess has a receiving interface matching the battery pack interface, and the battery pack housing is detachably mounted at the battery pack receiving recess.

In one example, the cells received in the battery pack housing form at least two standard battery units, the standard battery unit includes a positive terminal and a negative terminal, and multiple cells electrically connected to each other are disposed between the positive terminal and the negative terminal.

In one example, the product of the voltage of the cells and the quantity of the cells is approximately 120 V, and the output voltage of the electrical energy output interface is approximately 120 V.

In one example, an electrical energy supply apparatus including: a main body; and multiple cells disposed in the main body, where a product of a voltage of the cells and a quantity of the cells is greater than or equal to 60 V; an electrical energy output device, including a flexible connection apparatus, where an end of the flexible connection apparatus is electrically connected to the cells, an electrical energy output interface is disposed at the other end of the flexible connection apparatus, and the electrical energy output interface is connected to an external power tool, and supplies electrical energy to the external power tool; and a transformer circuit, converting a voltage of a cell into an output voltage of the electrical energy output interface, where when the transformer circuit is in a first state, the electrical energy output interface outputs a first voltage, when the transformer circuit is in a second state, the electrical energy output interface outputs a second voltage, and the first voltage is less than the second voltage.

In one example, the electrical energy output interface matches a battery pack mounting interface of the external power tool.

In one example, the electrical energy output interface is detachably connected to the flexible connection apparatus.

In one example, the electrical energy supply apparatus further includes a wearable component connected to the main body, and the wearable component includes a shoulder belt and/or a waist belt.

In one example, the electrical energy supply apparatus further includes at least one battery pack housing, the multiple cells are received in the at least one battery pack housing, the battery pack housing has a battery pack interface, and the battery pack interface matches the battery pack mounting interface of the external power tool. At least one battery pack receiving recess is disposed at the main body, the battery pack receiving recess has a receiving interface matching the battery pack interface, and the battery pack housing is detachably mounted at the battery pack receiving recess.

In one example, the first voltage is less than 60 V, and the second voltage is greater than 60 V.

In one example, the product of the voltage of the cells and the quantity of the cells is 120 V, and the second voltage is 80 V or 120 V.

In one example, the first voltage is 20 V or 40 V or 60 V.

In one example, the cells form at least two standard battery units, the standard battery unit includes a positive terminal and a negative terminal, and multiple cells electrically connected to each other are disposed between the positive terminal and the negative terminal.

In one example, the transformer circuit includes a first series-parallel circuit and a second series-parallel circuit. When the transformer circuit is in the first state, the standard battery units form a first series-parallel relationship by using the first series-parallel circuit. When the transformer circuit is in the second state, the standard battery units form a second series-parallel relationship by using the second series-parallel circuit.

In one example, the electrical energy output device includes a first electrical energy output device and a second electrical energy output device. The first series-parallel circuit is disposed in the first electrical energy output device. The second series-parallel circuit is disposed in the second electrical energy output device.

In one example, the electrical energy output device includes a first electrical energy output device and a second electrical energy output device. The first electrical energy output device outputs the first voltage, and the second electrical energy output device outputs the second voltage.

In one example, the main body further includes a monitoring apparatus. The monitoring apparatus monitors a signal at the electrical energy output interface. The transformer circuit adjusts the output voltage of the electrical energy output interface according to a signal detected by the monitoring apparatus.

In one example, the electrical energy supply apparatus further includes an output component. The electrical energy output device is detachably connected to the output component. The transformer circuit converts a voltage of a cell and transfers a voltage obtained through conversion to the electrical energy output interface by using the output component. The transformer circuit adjusts, according to a type of the electrical energy output device connected to the output component, a voltage output to the output component.

In one example, a switch is disposed between the transformer circuit and the electrical energy output interface. The electrical energy supply apparatus further includes an output voltage detection unit. The output voltage detection unit detects an output voltage of the transformer circuit. When the output voltage detection unit detects that the output voltage of the transformer circuit is the same as a target voltage needed by the electrical energy output interface, the switch is turned on.

In one example, an electrical energy transmission apparatus includes: a main body; an input component, disposed on the main body, and connected to multiple cells; an output component, disposed on the main body, and at least including a first DC device interface and a second DC device interface; an adapter component, disposed on the main body, and transferring electrical energy from the input component to the output component.

In one example, the first DC device interface and the second DC device interface have different structures.

In one example, an output voltage of the first DC device interface is less than an output voltage of the second DC device interface.

In one example, the main body further includes an interlock circuit disposed between the first DC device interface and the second DC device interface. When an electrical device is connected to the first DC device interface, the interlock circuit controls the second DC device interface not to output electrical energy.

In one example, the main body further includes an interlock structure disposed between the first DC device interface and the second DC device interface. When an electrical device is connected to the first DC device interface, the interlock structure prevents the second DC device interface from connecting an electrical device.

In one example, the output component further includes an AC device interface, and the AC device interface outputs an AC power.

In one example, an electrical energy transmission apparatus includes: a main body; an input component, disposed on the main body, and connected to multiple cells; an output component, disposed on the main body, and including a DC device interface, where the DC device interface includes a positive terminal, a negative terminal, and a recognition terminal, and the recognition terminal detects a type of an electrical device connected to the output component; and an adapter component, disposed on the main body, and transferring electrical energy from the input component to the output component, where the adapter component receives a signal of the recognition terminal and outputs corresponding electrical energy to the positive terminal and the negative terminal.

In one example, an electrical energy supply apparatus includes: multiple cells, and an electrical energy transmission apparatus.

In one example, a wearable battery pack receiving apparatus includes: a main body; a wearable component connected to the main body, where the wearable component includes a shoulder belt and/or a waist belt; at least one battery pack receiving recess disposed on the main body and used to receive a battery pack, where the battery pack receiving recess has a receiving interface matching a battery pack interface of the battery pack; and an electrical energy output device electrically connected to the receiving interface, where an electrical energy output interface is disposed on the electrical energy output device, and the electrical energy output interface matches a battery pack mounting interface of an external power tool. The battery pack receiving apparatus further includes: a transformer located between the electrical energy output interface and the receiving interface, where the transformer converts an input voltage at an end of the receiving interface into a rated output voltage at an end of the electrical energy output interface; and a voltage regulator connected to the transformer, where the voltage regulator controls the transformer to adjust a value of the rated output voltage.

In one example, an adjustment range of the value of the rated output voltage is 20 V to 120 V.

In one example, the voltage regulator is a monitoring apparatus. The monitoring apparatus monitors a signal or parameter at the electrical energy output interface, and adjusts the value of the rated output voltage according to the signal or parameter.

In one example, the electrical energy output interface has various types. The various types of electrical energy output interfaces are interchangeably mounted on the wearable battery pack receiving apparatus. The monitoring apparatus monitors a signal or parameter representing a type of the electrical energy output interface, and adjusts the value of the rated output voltage according to the type.

In one example, the monitoring apparatus monitors signal or parameter representing a type of the power tool, and adjusts the value of the rated output voltage according to the type.

In one example, the voltage regulator is an operation interface for a user to specify the value of the rated output voltage.

In one example, at least one receiving interface is the same as the battery pack mounting interface of the external power tool.

In one example, the battery pack receiving apparatus is a back pack, the main body has a bottom for being attached to the back of a user, multiple battery pack receiving recesses are disposed on the main body, and the battery pack receiving recesses are tiled at the bottom.

In one example, the battery pack receiving apparatus further includes a charger for charging a received battery pack. The charger has a charging interface that can be connected to an external power supply.

In one example, multiple battery pack receiving recesses are disposed on the main body. A shock absorber structure is disposed between the receiving recesses.

In one example, a vent hole is provided on the main body.

In one example, the main body includes a bag body and a cover. The receiving recess is disposed in the bag body. The cover operatively closes and opens the bag body. The cover includes a waterproof layer.

In one example, the main body and/or the wearable component include/includes an insulation protection layer.

In one example, a wearable battery pack system includes the foregoing wearable battery pack receiving apparatus, and at least one battery pack. The battery pack includes a battery pack interface. The battery pack interface matches at least one of the receiving interfaces.

In one example, the battery pack is elongated, and the thickness of a thinnest position of a part, receiving a battery, of the battery pack is less than 5 cm.

In one example, at most two layers of batteries are received in the thickness direction of the battery pack.

In one example, the battery pack at least includes a first body and a second body that are connected in a mutually displaceable manner. The first body and the second body separately receive several batteries. The battery pack interface is arranged on the first body.

In one example, a housing of the battery pack is made of a flexible material.

In one example, a rated voltage of the battery pack is greater than 80 V.

In one example, there are multiple battery packs, and a sum of rated voltages of the battery packs is greater than 80 V.

In one example, an electrical energy transmission apparatus includes:

an input component, connected to a DC energy storage component; an output component, including an AC device interface used to connect an AC device; and an adapter component, transferring electrical energy from the input component to the output component, where the AC device interface includes an AC device connection terminal, and the AC device connection terminal can output DC electrical energy.

In one example the AC device connection terminal can output AC electrical energy.

In one example, the AC device connection terminal includes a first port. The first port can selectively output AC electrical energy and DC electrical energy.

In one example, the AC device connection terminal includes a first port and a second port. The first port outputs DC electrical energy, and the second port outputs AC electrical energy.

In one example, the AC device connection terminal includes a standard AC socket.

In one example, a voltage of the DC electrical energy is a standard AC voltage ±20 V.

In one example, the electrical energy transmission apparatus further includes an AC-DC inverter. The AC electrical energy is provided by the inverter.

In one example, an output power of the AC working electrical energy is less than 300 W.

In one example, an output power of the AC working electrical energy is less than 200 W.

In one example, the electrical energy transmission apparatus further includes an output selection module for selecting a working energy output mode of the AC device connection terminal.

In one example, the electrical energy transmission apparatus further includes a detection unit for detecting a working parameter related to a characteristic of the AC device.

In one example, the detection unit controls the AC device connection terminal to output, before outputting working energy, test energy to detect the working parameter.

In one example, the test energy is less than the working energy.

In one example, the detection unit monitors the test energy, and when an output power of the test energy is less than a preset value, stops outputting the test energy.

In one example, the output power of the AC working electrical energy is less than 300 W. The detection unit monitors the test energy, and when output duration of the test energy reaches a preset time, stops outputting the test energy.

In one example, the working parameter includes a DC working parameter under DC test energy and an AC working parameter under AC test energy.

In one example, the AC working parameter is measured after a set time.

In one example, the set time is 2 seconds.

In one example, the DC working parameter is measured within a set time.

In one example, the set time is 1 second.

In one example, when the working parameter meets a DC output condition, the AC device connection terminal outputs DC working electrical energy.

In one example, the DC output condition is that a DC test current value and an AC test current value meet a preset relationship.

In one example, the preset relationship is: a DC working current value is less than five times of an AC working current value.

In one example, the preset relationship is that a DC working current is greater than the preset value, and is less than five times of the AC working current value.

In one example, when the working parameter meets an AC output condition, the AC device connection terminal outputs an AC working electrical energy.

In one example, the AC output condition is: a power of the AC device less than the preset value.

In one example, the preset value is less than 300 W.

In one example, the AC output condition is that a test current is less than the preset value.

In one example, when the working parameter meets a turn-off condition, the AC device connection terminal does not output electrical energy.

In one example, the turn-off condition is: the DC working current value and the AC working current value meet a preset relationship.

In one example, the preset relationship is: the DC working current value is greater than five times of the AC working current value, or the DC working current value is greater than the AC working current value by more than 10 A.

In one example, the preset relationship is that an AC working current is greater than the preset value.

In one example, the DC energy storage component is a battery pack. The input component includes a battery pack interface for connecting the battery pack.

In one example, the input component has multiple battery pack interfaces.

In one example, at least two battery pack interfaces are not the same as each other.

In one example, the electrical energy transmission apparatus further includes a DC device interface.

In one example, the DC device interface can output multiple different voltages.

In one example, the DC device interface includes multiple DC device connection terminals, where at least two DC device connection terminals output different voltages.

In one example, the DC device interface includes one DC device connection terminal. The DC device connection terminal selectively outputs one of multiple different voltages.

In one example, at least one of the multiple output voltages is between 20 V and 120 V.

In one example, the output voltages include at least two of 20 V, 40 V, 60 V, 80 V, 100 V, and 120 V.

In one example, at least one of the output voltages is greater than or equal to 60 V.

In one example, the electrical energy transmission apparatus further includes an adapter for connecting a DC device to the DC device interface.

In one example, an output interface of the adapter matches a battery pack interface of a specific power tool.

In one example, there are multiple adapters. Output interfaces of at least two adapters are different to connect different power tools.

In one example, a DC output interface recognizes types of the adapters to output different voltages.

In one example, the electrical energy transmission apparatus may be a wearable device.

In one example, an electrical energy supply apparatus includes any electrical energy transmission apparatus in the foregoing, and further including an energy storage component. The energy storage component includes a primary energy storage module, a secondary energy storage module, and a tertiary energy storage module. The primary energy storage module is a battery pack detachably mounted on the electrical energy transmission apparatus. The secondary energy storage module is a standard battery unit located in the battery pack and has an independent output terminal. The energy storage component includes multiple secondary energy storage modules. The secondary energy storage modules have a same voltage, and each secondary energy storage module includes multiple tertiary energy storage modules. The tertiary energy storage module is a cell located in the secondary energy storage module.

In one example, the output terminal of the secondary energy storage module is arranged on a housing of the battery pack.

In one example, the electrical energy transmission apparatus externally outputs different voltages by changing a series/parallel relationship between the secondary energy storage modules.

In one example, the energy storage apparatus includes multiple primary energy storage modules.

In one example, at least one primary energy storage module includes multiple secondary energy storage modules.

In one example, at least two primary energy storage modules have different quantities of secondary energy storage modules.

In one example, at least one primary energy storage module only includes one secondary energy storage module.

In one example, a voltage of the secondary energy storage module is a divisor of a standard AC voltage.

In one example, a voltage of the primary energy storage module is a divisor of a standard AC voltage.

In one example, a voltage of the secondary energy storage module is 20 V.

In one example, the energy storage apparatus includes 6 secondary energy storage modules.

In one example, at least one primary energy storage module includes 1 secondary energy storage module.

In one example, at least one primary energy storage module includes 3 secondary energy storage modules.

In one example, the secondary energy storage module includes an independent control circuit.

In one example, a working system includes any electrical energy supply apparatus in the foregoing, and further includes a power tool.

In one example, the power tool is an AC power tool.

In one example, the power tool is a DC power tool.

In one example, a battery pack interface of the DC power tool is the same as one of battery pack interfaces of an electrical energy transmission apparatus.

In one example, an electrical energy transmission method includes the following steps: S1. connecting a DC power supply for DC electrical energy; S2. detecting a parameter of a connected AC device; S3. determining whether the parameter meets a DC power output condition; and S4. if a determining result in step S3 is yes, transmitting the DC electrical energy to the AC device.

In one example, step S2 includes: S21. outputting detection energy to the AC device; and S22. detecting a working parameter of the AC device under the detection energy.

In one example, the detection energy includes DC detection energy and AC detection energy. The working parameter correspondingly includes a DC working parameter and an AC working parameter.

In one example, the DC working parameter is a working current value under the DC detection energy. The AC working parameter is a working current value under the AC detection energy. Step S3 includes: comparing a DC working current value with an AC working current value to determine a relationship therebetween, and if the relationship meets a preset relationship, determining that the working parameter meets a DC output condition.

In one example, the electrical energy transmission method further includes the following steps: S5. determining whether the connected AC device meets an AC power output condition; and S6. if a determining result in step S4 is yes, transmitting AC electrical energy to the AC device.

In one example, step S5 includes: determining, according to the AC working parameter, whether a power of the AC device is less than a preset value, and if yes, determining that the working parameter meets the AC power output condition.

In one example, the electrical energy transmission method further includes the following steps: S7. determining whether the connected AC device meets a turn-off condition; and S8. if a determining result in S6 is yes, turning off electrical energy transmission for the AC device.

In one example, the DC working parameter is a DC current value. The AC working parameter is an AC current value. Step S7 includes: comparing the DC current value with the AC current value to determine a relationship therebetween, and if the relationship meets a preset relationship, determining that the working parameter meets the turn-off condition.

In one example, the AC value is measured after a preset time after the AC detection energy is output.

In one example, the DC value is measured within a preset time after the DC detection energy is output.

In one example, a method for an electrical energy transmission apparatus includes the following steps: S1. connecting a DC power supply for DC electrical energy; S2. detecting a parameter of a connected AC device; S3. determining whether the parameter meets an AC power output condition; and S4. if a determining result in step S3 is yes, transmitting AC electrical energy to the AC device.

In one example, step S2 includes: sending AC detection energy to the AC device; and detecting a working parameter related to the AC device under the AC detection energy.

In one example, step S3 includes: determining, according to the working parameter, whether a power of the AC device is less than a preset value, and if yes, determining that the AC power output condition is met.

In one example, an electrical energy supply apparatus includes an electrical energy transmission apparatus and an energy storage component. The energy storage component includes a primary energy storage module. The primary energy storage module includes several secondary energy storage modules. The secondary energy storage modules include several tertiary energy storage modules. The primary energy storage module includes a battery pack. The battery pack is detachably mounted on the electrical energy transmission apparatus. The secondary energy storage module is a standard battery unit located in the battery pack and has an independent output terminal. The energy storage component includes multiple secondary energy storage modules. The secondary energy storage modules have a same voltage, and each secondary energy storage module includes multiple tertiary energy storage modules. The tertiary energy storage module includes a cell.

In one example, the electrical energy transmission apparatus externally provides multiple output voltages by changing a series/parallel relationship between the secondary energy storage modules.

In one example, an output voltage of the electrical energy supply apparatus is N times as large as a voltage value of a secondary module.

In one example, N is less than or equal to 15.

In one example, the output terminal of the secondary energy storage module is arranged on a housing of the battery pack.

In one example, a voltage of the primary energy storage module is a sum of voltages of the secondary energy storage modules.

In one example, the energy storage apparatus includes at least one primary energy storage module.

In one example, the energy storage apparatus includes multiple primary energy storage modules.

In one example, a total quantity of the primary energy storage modules is an odd number, and a single primary module includes even-numbered secondary modules.

In one example, a total quantity of the primary energy storage modules is an even number, and a single primary module includes odd-numbered secondary modules or even-numbered secondary modules.

In one example, at least one primary energy storage module includes multiple secondary energy storage modules.

In one example, at least two primary energy storage modules have different quantities of secondary energy storage modules.

In one example, at least one primary energy storage module only includes one secondary energy storage module.

In one example, a voltage of the secondary energy storage module is a divisor of a standard AC voltage.

In one example, a voltage of the primary energy storage module is a divisor of a standard AC voltage.

In one example, a voltage of the secondary energy storage module is one of 20 V, 18 V, 16V, 14.4V, 12V, 19.6 V, 24 V, 36 V or 28 V.

In one example, an energy storage component includes 6 secondary energy storage modules.

In one example, at least one primary energy storage module includes 1 secondary energy storage module.

In one example, at least one primary energy storage module includes 3 secondary energy storage modules.

In one example, the secondary energy storage module includes an independent control circuit.

In one example, the electrical energy transmission apparatus includes a controller. When the electrical energy supply apparatus is working, the controller monitors a mounting condition of the primary energy storage module, and correspondingly adjusts the series/parallel relationship between the secondary energy storage modules to keep the output voltage unchanged.

In one example, the electrical energy transmission apparatus includes a controller. When the electrical energy supply apparatus is working, the controller monitors failure conditions of the primary energy storage module and/or the secondary energy storage module. If a failure occurs, the controller blocks the primary energy storage module and/or the secondary energy storage module that has a failure, and correspondingly adjusts the series/parallel relationship between the secondary energy storage modules to keep the output voltage unchanged.

In one example, the cell is a lithium cell.

In one example, the electrical energy transmission apparatus includes an output component. The output component includes a DC output interface. The DC output interface outputs the multiple output voltages.

In one example, a DC device interface includes multiple DC device connection terminals. At least two DC device connection terminals output different output voltages.

In one example, a DC device interface includes one DC device connection terminal. The DC device connection terminal selectively outputs one of multiple different output voltages.

In one example, at least one of the multiple output voltages is between 20 V and 120 V.

In one example, the output voltages include at least two of 20 V, 40 V, 60 V, 80 V, 100 V, and 120 V.

In one example, at least one of the output voltages is greater than 60 V.

In one example, the electrical energy supply apparatus further includes an adapter for connecting a DC device to the DC device interface.

In one example, an output interface of the adapter matches a battery pack interface of a specific power tool.

In one example, there are multiple adapters. Output interfaces of at least two adapters are different to connect different power tools.

In one example, the DC output interface recognizes types of the adapters to output different voltages.

In one example, a battery pack includes multiple secondary energy storage modules. The secondary energy storage module is a standard battery unit located in the battery pack and has an independent output terminal. An energy storage component includes multiple secondary energy storage modules. The secondary energy storage modules have a same voltage, and each secondary energy storage module includes multiple tertiary energy storage modules. The tertiary energy storage module is a cell located in the secondary energy storage module.

In one example, the output terminal of the secondary energy storage module is arranged on a housing of the battery pack.

In one example, the secondary energy storage module includes an independent control circuit.

In one example, a voltage of the secondary energy storage module is a divisor of a standard AC voltage.

In one example, a voltage of a primary energy storage module is a divisor of a standard AC voltage.

In one example, a voltage of the secondary energy storage module is 20 V.

In one example, at least one primary energy storage module includes 1 secondary energy storage module.

In one example, at least one primary energy storage module includes 3 secondary energy storage modules.

In one example, an electrical energy transmission apparatus includes an input component, an output component, and an adapter component. The input component is connected to an energy storage component to receive electrical energy. The output component is connected to an electrical device to output the electrical energy. The adapter component transfers the electrical energy from the input component to the output component. The energy storage component includes a primary energy storage module, a secondary energy storage module, and a tertiary energy storage module. The primary energy storage module is a battery pack detachably mounted on the electrical energy transmission apparatus. The secondary energy storage module is a standard battery unit located in the battery pack and has an independent output terminal. The energy storage component includes multiple secondary energy storage modules. The secondary energy storage modules have a same voltage, and each secondary energy storage module includes multiple tertiary energy storage modules. The tertiary energy storage module is a cell located in the secondary energy storage module. An input port of the input component is connected to an output interface of each secondary energy storage module. The adapter component provides different output voltages to the output component by changing a series/parallel relationship between the secondary energy storage modules.

In one example, the adapter component correspondingly changes, according to a feature of a device connected to the output component, the series/parallel relationship between the secondary energy storage modules and outputs a specific output voltage.

In one example, the output component includes an output port. Multiple determining electrodes are built in the output port. The adapter component provides corresponding specific output voltages to the output component according to connection conditions of the determining electrodes.

In one example, the electrical energy transmission apparatus further includes an adapter, including an output terminal and an input terminal, the input terminal is connected to the output port of the output component. A feature electrode is disposed on the input terminal. The adapter component determines, according to the feature electrode connected to the determining electrode, an output voltage to be output.

In one example, the electrical energy transmission apparatus may be a wearable device.

In one example, an electrical energy transmission apparatus includes: an input interface, used to connect a DC energy storage component and receive electrical energy of the DC energy storage component; and an AC device interface, electrically connected to the input interface, where the AC device interface is used to connect an AC device and supply power to the AC device, and the AC device interface can output DC electrical energy.

In one example, the electrical energy transmission apparatus further includes a control circuit located between the input interface and the AC device interface. The control circuit controls transfer of electrical energy from the input interface to the AC device interface.

In one example, the control circuit includes an AC driving unit. The AC driving unit converts DC electrical energy received by the input interface into AC electrical energy and provides the AC electrical energy to the AC device interface.

In one example, the AC device interface includes an AC device connection terminal. The AC device connection terminal is a single port. The AC device connection terminal can selectively output DC electrical energy and AC electrical energy.

In one example, the AC device interface includes two AC device connection terminals. The AC device connection terminal is a single port. One of the AC device connection terminals can output DC electrical energy, and the other of the AC device connection terminals can output AC electrical energy.

In one example, the AC device connection terminal is a standard AC socket.

In one example, a voltage of the DC electrical energy is between 100 volts and 140 volts or is between 200 V and 260 V.

In one example, an output power of the AC electrical energy is less than 300 W.

In one example, an output power of the AC electrical energy is less than 200 W.

In one example, the control circuit includes a DC driving unit, an AC driving unit, a detection unit, an output selection unit, and a controller. The DC driving unit outputs, in a DC manner, electrical energy that is supplied from the input interface. The AC driving unit outputs, in an AC manner, electrical energy that is supplied from the input interface. The output selection unit alternatively connects the DC driving unit and the AC driving unit to the AC device interface. The detection unit detects a running parameter of the control circuit. The controller connects and controls the DC driving unit, the AC driving unit, the detection unit, and the output selection unit.

In one example, the controller includes a test control unit, a detection control unit, a safety determining unit, and an output control unit. The test control unit controls the output selection unit to enable the control circuit to output test energy to the AC device interface. The detection control unit receives a test running parameter measured by the detection unit under the test energy. The safety determining unit determines, according to the test running parameter, whether the AC device connected to the AC device interface is suitable for being driven by DC electrical energy or AC electrical energy to work. The output control unit receives a determining result of the safety determining unit, controls the output selection unit to correspondingly connect one of the DC driving unit and the AC driving unit to the AC device interface, or controls the control circuit to turn off electrical energy output to the AC device interface.

In one example, when the safety determining unit determines that the AC device connected to the AC device interface is suitable for being driven by DC electrical energy, the output control unit controls the output selection unit to connect the DC driving unit to the AC device interface.

In one example, when the safety determining unit determines that the AC device connected to the AC device interface is suitable for being driven by AC electrical energy, the output control unit controls the output selection unit to connect the AC driving unit to the AC device interface.

In one example, when the safety determining unit determines that the AC device connected to the AC device interface is neither suitable for being driven by AC electrical energy nor suitable for being driven by DC electrical energy, the output control unit controls the control circuit to turn off electrical energy output to the AC device interface.

In one example, the test energy includes DC test energy and AC test energy. Output duration and/or output powers of the DC test energy and the AC test energy are restricted by preset parameters.

In one example, the running parameter includes a DC running parameter under DC test energy and an AC running parameter under AC test energy.

In one example, the safety determining unit determines, according to a relative relationship between the DC running parameter and the AC running parameter, whether the AC device is suitable for being driven by DC electrical energy or AC electrical energy to work.

In one example, the controller includes a test control unit, a detection control unit, a safety determining unit, and an output control unit. The test control unit controls the output selection unit to enable the control circuit to output test energy to the AC device interface. The detection control unit receives a test running parameter measured by the detection unit under the test energy. The safety determining unit determines, according to the test running parameter, whether the AC device connected to the AC device interface is suitable for being driven by DC electrical energy to work. The output control unit receives a determining result of the safety determining unit, controls the output selection unit to correspondingly connect the DC driving unit to the AC device interface, or controls the control circuit to turn off electrical energy output to the AC device interface.

In one example, the controller includes a test control unit, a detection control unit, a safety determining unit, and an output control unit. The test control unit controls the output selection unit to enable the control circuit to output test energy to the AC device interface. The detection control unit receives a test running parameter measured by the detection unit under the test energy. The safety determining unit determines, according to the test running parameter, whether the AC device connected to the AC device interface is suitable for being driven by AC electrical energy to work. The output control unit receives a determining result of the safety determining unit, and controls the output selection unit to correspondingly connect the AC driving unit to the AC device interface, or controls the control circuit to turn off electrical energy output to the AC device interface.

In one example, an electrical energy supply apparatus includes any electrical energy transmission apparatus in the foregoing, and further includes a DC energy storage component.

In one example a working system includes any electrical energy supply apparatus in the foregoing, and further includes an AC device that is selectively connected to an AC device interface.

In one example, an electrical energy transmission system includes an electrical energy transmission apparatus and an adapter. The electrical energy transmission apparatus includes a DC device interface. Multiple groups of output terminals are arranged on the DC device interface. Each group of terminals includes positive and negative electrodes. The adapter is detachably connected to the DC device interface. An input interface of the adapter matches an output interface of a DC device. An output interface of the adapter includes a group of output terminals. The output terminals include positive and negative electrodes. A series-parallel circuit is disposed between multiple groups of input terminals and one group of output terminals of the adapter. The series-parallel circuit configures a series/parallel relationship between the multiple groups of terminals and then transfers electrical energy to the output terminals.

In one example, the electrical energy transmission system further includes the input interface. The multiple groups of input terminals are arranged on the input interface. Each group of terminals includes positive and negative electrodes.

In one example, the electrical energy transmission system includes multiple adapters interchangeably connected to the DC device interface. At least two output voltages are not the same as each other.

In one example, the multiple groups of input terminals of the input interface and multiple groups of output terminals of the DC device interface have the same quantity, and one input terminal is connected to one output terminal.

In one example, the multiple groups of input terminals of the input interface and multiple groups of output terminals of the DC device interface have the same quantity, and two input terminals are connected to one output terminal.

In one example, the input interface includes at least one battery pack interface. The battery pack interface includes the multiple groups of input terminals.

In one example, the input interface includes multiple battery pack interfaces. Each battery pack interface includes at least one group of input terminals.

In one example, there are 6 groups or 12 groups of input terminals of the input interface. There are 6 groups of output terminals of the DC device interface.

In one example, the series-parallel circuit of the adapter connects every two input terminals of the 6 groups of input terminals in parallel, and then connects the input terminals to the output terminals of the adapter in series.

In one example, the series-parallel circuit of the adapter connects every three input terminals of the 6 groups of input terminals in parallel, and then connects the input terminals to the output terminals of the adapter in series.

In one example, the series-parallel circuit of the adapter connects the 6 groups of input terminals to each other in parallel, and then connects the input terminals to the output terminals of the adapter.

In one example, the series-parallel circuit of the adapter connects the 6 groups of input terminals to each other in series, and then connects the input terminals to the output terminals of the adapter.

In one example, an electrical energy providing system, includes any electrical energy transmission system in the foregoing, and further includes a DC energy storage component.

In one example, each battery pack and each interface further include at least one group of signal terminals.

In one example, the signal terminals include a temperature signal terminal.

In one example, an adapter connects a DC device to an electrical energy transmission apparatus. Multiple groups of terminals are disposed on an input interface of the adapter. Each group of terminals includes positive and negative electrodes. A series-parallel circuit is built in the adapter.

In one example, there are 6 groups or 12 groups of input terminals of the input interface. There are 6 groups of output terminals of a DC device interface.

In one example, the series-parallel circuit of the adapter connects every two input terminals of the 6 groups of input terminals in parallel, and then connects the input terminals to the output terminals of the adapter in series.

In one example, the series-parallel circuit of the adapter connects every three input terminals of the 6 groups of input terminals in parallel, and then connects the input terminals to the output terminals of the adapter in series.

In one example, the series-parallel circuit of the adapter connects the 6 groups of input terminals to each other in parallel, and then connects the input terminals to the output terminals of the adapter.

In one example, the series-parallel circuit of the adapter connects the 6 groups of input terminals to each other in series, and then connects the input terminals to the output terminals of the adapter.

In one example, an adapter connects a DC device to an electrical energy transmission apparatus, and a protection circuit is disposed in the adapter.

In one example, the protection circuit includes at least one of an overcurrent protection circuit, an undervoltage protection circuit, and an overtemperature protection circuit.

In one example, an electrical energy transmission apparatus includes an output port, used to connect a power supply connector of an electrical device. A start switch is disposed in the output port. The start switch controls the electrical energy transmission apparatus to be turned on or off. When the power supply connector is connected to the output port, the start switch is triggered to be turned on.

In one example, the start switch is a micro switch.

In one example, when the power supply connector is detached from the output port, the start switch is triggered to be turned off.

In one example, the output port is an AC device connection terminal.

In one example an electrical energy transmission apparatus includes a detection unit, a controller, and a power-off unit. The detection unit detects a load condition of a connected electrical device. The power-off unit selectively makes a turn-off to stop electrical energy output of the electrical energy transmission apparatus to the electrical device. The controller connects the detection unit to the power-off unit. The controller instructs, when the load condition meets a preset condition, the power-off unit to make a turn-off. The preset condition is that the load is less than a preset value and reaches preset duration.

In one example, the detection unit detects a current in a control point circuit to detect the load condition of the electrical device.

In one example, an electrical energy transmission apparatus includes an input interface, a control circuit, and an output interface. The output interface includes multiple connection terminals for connecting an external device. An interlock mechanism is disposed between multiple connection terminals. The interlock mechanism enables only one of the multiple connection terminals to convey electrical energy to an external electrical device at a same moment.

In one example, the output interface includes a DC device interface and an AC device interface. The DC device interface and the AC device interface separately include at least one connection terminal.

In one example, the interlock mechanism is a mechanical interlock mechanism.

In one example, the mechanical interlock mechanism includes locking pieces disposed on the connection terminals and linkage pieces between the locking pieces. The locking piece moves between a locking position and an unlocking position. At the locking position, the locking piece forbids the connection terminals from being electrically connected to a power supply terminal of the electrical device. At the unlocking position, the locking piece allows the connection terminals to be electrically connected to the power supply terminal of the electrical device. When any connection terminal is electrically connected to the power supply terminal, the locking piece of the connection terminal is fixed at the unlocking position, and the locking piece drives the linkage piece to enable all other locking pieces to be fixed at the locking position.

In one example, the connection terminal is a jack. There are two jacks. The mechanical interlock mechanism is one locking rod. The locking rod is located between the two jacks. Two ends of the locking rod movably extend into the two jacks separately to form two locking pieces. A part between the two ends forms the linkage piece.

In one example, the interlock mechanism is an electronic interlock mechanism.

In one example, a working system includes a battery pack, an electrical energy transmission apparatus, and a DC tool. A working voltage of the DC tool is greater than 60 V. The battery pack is supported in the working system by using a battery pack support apparatus. The electrical energy transmission apparatus is disposed separately from the DC tool. The electrical energy transmission apparatus outputs electrical energy to the DC tool by using a cable electrical energy output part. The battery pack support apparatus is only arranged on the electrical energy transmission apparatus. An electrical energy input interface on the DC tool only includes a port for connecting the cable electrical energy output part.

In one example, the DC tool is a handheld tool.

One example provides a DC tool, powered by an electrical energy transmission apparatus disposed separately from the DC tool. The electrical energy transmission apparatus includes a battery pack support structure for supporting the weight of a battery pack thereon. An electrical energy input interface of the electrical energy transmission apparatus only includes a port for connecting a cable electrical energy output part of the electrical energy transmission apparatus.

In one example, the DC tool is a handheld tool.

In one example, a DC tool includes an electrical energy input interface, a battery pack cannot be connected on the electrical energy input interface.

In one example, a working system includes a battery pack, an electrical energy transmission apparatus, and a push power tool. The push power tool includes a push handle and a main body. A battery pack interface and a cable electrical energy output part interface are disposed on the push power tool, and are respectively used to connect a battery pack and a cable electrical energy output part.

In one example, the cable electrical energy output part interface is located on the push handle.

In one example, the cable electrical energy output part interface is located at an upper portion of the push handle.

In one example, there are multiple battery pack interfaces.

In one example, a working voltage of the push power tool is greater than 50 V.

In one example, a working voltage of the push power tool is 120 V. There are two battery pack interfaces. A voltage of the battery pack is 60 V.

In one example, the push power tool can only be powered by one of the battery pack and the cable electrical energy output part.

In one example, the push power tool can be powered by both the battery pack and the cable electrical energy output part.

In one example, the battery pack interface and the cable electrical energy output part interface of the push power tool are connected in parallel.

In one example, the push power tool is a lawn mower.

One example provides a push tool, where the push tool is any push tool in the foregoing.

One example provides an electrical energy transmission apparatus. The electrical energy transmission apparatus includes an input interface, an AC device interface, and a control circuit. The control circuit includes an AC driving unit. The AC driving unit converts a DC power input from the input interface into an AC power and provides the AC power to the AC device interface. The input interface is used to connect a battery pack. The AC power is a square-wave AC power.

In one example, the AC driving unit includes a bridge circuit.

In one example, the control circuit includes a DC driving unit. The DC driving unit provides, in a DC power form, the DC power input from the input interface to the AC device interface.

In one example, a power of the AC driving unit is less than or equal to 2000 watts.

In one example, a power of the AC driving unit is less than or equal to 1000 watts.

In one example, a power of the AC driving unit is greater than or equal to 1000 W, 1500 W or 2000 W.

One example provides a charger. Specifically, a charger includes a protection circuit, and specifically has an overcharging protection circuit and an overtemperature protection circuit. The overcharging protection circuit provides separate protection for each secondary energy storage module. The overtemperature protection circuit provides separate protection for each battery pack.

In one example, the charger is integrated in an electrical energy transmission apparatus.

In one example, two battery packs can only be charged simultaneously, but cannot be charged separately.

One example provides a power supply system, including: a battery pack. The battery pack includes: multiple standard battery units, having a same voltage; a series-parallel circuit, connected to the multiple standard battery units, where the series-parallel circuit selectively configures a series/parallel relationship of the multiple standard battery units, to enable the battery pack to output different output voltages in various series/parallel relationships; and an output interface, outputting electrical energy of the battery pack. The series-parallel circuit includes a switch device. A quantity of the switch devices is less than a quantity of standard battery units by one, and in the circuit, the switch devices and the standard battery units are arranged in a staggered manner. Each switch device includes two subswitches. In a turned-off state, a first subswitch is connected to positive electrodes of two standard battery units, and in a turned-on state, the first subswitch is disconnected from the positive electrodes of the two standard battery units. In a turned-off state, a second subswitch is connected to negative electrodes of two standard battery units, and in a turned-on state, the second subswitch is connected to the negative electrode of the former standard battery unit and a positive electrode of the latter standard battery unit. Two switches in each switch device are linked, to have a first state and a second state. In the first state, the two subswitches are both turned on. In the second state, the two subswitches are both turned off. Each switch device is in different state combinations in a controlled manner, to enable the series-parallel circuit to be in different series/parallel relationships.

In one example, the battery pack includes 6 standard battery units and 5 switch devices.

In one example, the output interface includes multiple positive electrode output terminals corresponding to multiple output voltages. Each output terminal is connected to a terminal switch. Whether the terminal switches are turned on or turned off is linked to a series/parallel relationship of the series-parallel circuit, so that in a specific series/parallel relationship, only a terminal switch of a positive electrode output terminal corresponding to an output voltage in the relationship is turned on, and other terminal switches are turned off.

In one example, the terminal switch is a relay. The relay is controlled by a controller in the power supply system.

In one example, the switch device is a micro switch. The power supply system further includes an output voltage selection piece. When the output voltage selection piece is in different positions, the micro switches are triggered to be turned on or turned off in different combinations, to configure different series/parallel relationships.

In one example, the micro switch is a dual normally-open/dual normally-closed micro switch.

In one example, the series/parallel relationship includes at least two of the following: 1. all switch devices are in the second state; 2. a sequentially-arranged third switch device is in the first state, and other switch devices are in the second state; 3. a sequentially-arranged second switch device and a sequentially-arranged fourth switch device are in the first state, and other switch devices are in the second state; or 4. all switch devices are in the first state.

In one example, the switch device is a relay.

In one example, the relay is a dual normally-open/dual normally-closed relay.

In one example, each switch device includes two relays, separately forming the first subswitch and the second subswitch.

In one example, the first subswitch and the second subswitch are linked by using an optical coupler. When the first subswitch is turned on, the optical coupler is triggered to enable the second subswitch to be turned on.

In one example, the power supply system detects a type of a connected electrical device to automatically control the relays to be turned on or off, so as to implement that the battery pack outputs a voltage value corresponding to the type of the electrical device.

In one example, a switch is disposed between the battery pack and the output interface. The power supply system further includes an output voltage detection unit of the battery pack. The switch is turned on only when the output voltage detection unit detects that an output voltage of the battery pack is the same as a target voltage that the power supply system needs to output.

One example provides a power supply system, including a battery pack and an AC driving circuit, to externally output AC electrical energy. The AC driving circuit can output a square-wave or trapezoidal-wave AC power. The AC driving circuit includes a boost circuit to implement that an output voltage of the AC driving circuit is greater than an output voltage of the battery pack.

In one example, the power supply system further includes a DC driving circuit, to externally output DC electrical energy.

In one example, a boost amplitude of the boost circuit does not exceed 20%.

In one example, the AC driving circuit includes an H-bridge circuit, to output a square-wave or trapezoidal-wave AC power.

One example provides another power supply system, including a battery pack and a DC driving circuit, to externally output DC electrical energy, where the DC driving circuit outputs an interruptive DC power.

In one example, an interruption time of the interruptive DC power is less than 0.5 s.

One example provides a power supply system, including: a body; a DC output interface and an AC output interface located on the body; a battery pack support apparatus located on the body; a battery pack detachably mounted on the battery pack support apparatus; several standard battery units located in the battery pack, where the standard battery units have a same voltage and all have independent positive and negative electrodes; an interface circuit, located in the body, and connecting the positive and negative electrodes of the standard battery units, to form multiple pairs of positive and negative electrode leads that are independent from each other; a series-parallel circuit located in the body, where the series-parallel circuit configures a series/parallel relationship between the multiple pairs of positive and negative electrode leads to form a preset DC voltage; and a DC-AC inverter apparatus, connecting the series-parallel circuit and converting the DC voltage into an AC voltage and providing the AC voltage to the AC output interface, where the series-parallel circuit further connects the DC output interface.

In one example, the series-parallel circuit forms a 120V DC voltage.

In one example, the DC-AC inverter apparatus converts the DC voltage into a square-wave or trapezoidal-wave AC power by using an H-bridge circuit.

In one example, the DC output interface and the AC output interface share a discharging protection circuit.

In one example, the DC output interface and the AC output interface are a same interface.

In one example, the power supply system further includes: an interface circuit, located in the body, and connecting the positive and negative electrodes of the standard battery units, to form the multiple pairs of positive and negative electrode leads that are independent from each other; a second DC output interface, located in the body, where the second DC output interface has multiple pairs of output positive and negative electrodes, and correspondingly connected to the multiple pairs of positive and negative electrode leads respectively.

In one example, the power supply system further includes: multiple adapters, alternatively connected to the second DC output interface, where the adapter includes an input terminal, a transmission cable, and an output terminal, multiple pairs of input positive and negative electrodes are arranged on the input terminal, the multiple pairs of input positive and negative electrodes and the multiple pairs of output positive and negative electrodes match one by one, the input positive and negative electrodes are connected to the series-parallel circuit to configure a series/parallel relationship between the standard battery units, a specific output voltage is formed at the output terminal of the adapter, and series-parallel circuits of the multiple adapters are different from each other to form different output voltages; and a control circuit, located in the body, and including a discharging protection circuit, where the discharging protection circuit detects an adapter connected to the second DC output interface and selects a discharging protection program for the discharging protection circuit according to the adapter.

In one example, the power supply system further includes: an interlock structure disposed among the DC output interface, the AC output interface, and the second DC output interface, where when an electrical device is connected to the DC output interface or the AC output interface, the interlock structure enables the second DC output interface not to output electrical energy.

In one example, the control circuit selects a discharging protection program according to a voltage value formed by the series-parallel circuit.

In one example, the adapter outputs, to a power supply circuit, an output voltage formed by the series-parallel circuit. The power supply circuit includes a voltage detection apparatus to receive a voltage value of an output voltage.

In one example, a rated voltage of the standard battery unit is 20 V. There are 6 pairs of power supply leads connecting one or more pairs of standard battery units connected to each other in parallel. Series-parallel circuits of different adapters separately form a 20V, 40V or 60V output voltage.

One example provides another power supply system. The power supply system includes: a body; a battery pack support apparatus located on the body; a battery pack detachably mounted on the battery pack support apparatus; several standard battery units located in the battery pack, where the standard battery units have a same voltage and all have independent positive and negative electrodes; an interface circuit, located in the body, and connecting the positive and negative electrodes of the standard battery units, to form multiple pairs of positive and negative electrode leads that are independent from each other; a DC output interface, located on the body, having multiple pairs of output positive and negative electrodes, and correspondingly connected to the multiple pairs of positive and negative electrode leads respectively; multiple adapters, alternatively connected to the DC output interface, where the adapter includes an input terminal, a transmission cable, and an output terminal, multiple pairs of input positive and negative electrodes are arranged on the input terminal, the multiple pairs of input positive and negative electrodes and the multiple pairs of output positive and negative electrodes match one by one, the input positive and negative electrodes are connected to a series-parallel circuit to configure a series/parallel relationship between the standard battery units, a specific output voltage is formed at the output terminal of the adapter, and series-parallel circuits of the multiple adapters are different from each other to form different output voltages; and a control circuit, located in the body, and including a discharging protection circuit, where the discharging protection circuit detects an adapter connected to the DC output interface and selects a discharging protection program for the discharging protection circuit according to the adapter.

In one example, the control circuit selects a discharging protection program according to a voltage value formed by the series-parallel circuit.

In one example, the adapter outputs, to a power supply circuit, an output voltage formed by the series-parallel circuit. The power supply circuit includes a voltage detection apparatus to receive a voltage value of an output voltage.

In one example, a rated voltage of the standard battery unit is 20 V. There are 6 pairs of power supply leads connecting one or more pairs of standard battery units connected to each other in parallel. Series-parallel circuits of different adapters separately form a 20V, 40V or 60V output voltage.

In one example, the power supply circuit includes a voltage conversion apparatus. The voltage conversion apparatus converts an output voltage received from an adapter into a specific voltage value to supply power to the control circuit.

In one example, the discharging protection program includes: performing a battery protection action when a discharging current exceeds a preset threshold; or, performing a battery protection action when a discharging voltage is less than a preset threshold.

In one example, the battery protection action includes: turning off a discharging circuit.

In one example, the power supply system further includes: a series-parallel circuit located in the body, where the series-parallel circuit configures a series/parallel relationship between the multiple pairs of positive and negative electrode leads to form a preset DC voltage; and a DC-AC inverter apparatus, connected to the series-parallel circuit and converting the DC voltage into an AC voltage and providing the AC voltage to an AC output interface, where the series-parallel circuit is further connected to another DC output interface.

In one example, the DC-AC inverter apparatus converts the DC voltage into a square-wave or trapezoidal-wave AC power by using an H-bridge circuit.

In one example, the another DC output interface and the AC output interface share the discharging protection circuit.

One example provides another power supply system, including: a battery pack support apparatus; a battery pack detachably mounted on the battery pack support apparatus; an AC output interface, outputting AC electrical energy; a DC output component, outputting DC electrical energy; and a control circuit, connecting the battery pack to the DC output component and the AC output interface, transferring electrical energy of the battery pack to the DC output component, and converting the electrical energy of the battery pack into AC electrical energy and providing the AC electrical energy to the AC output interface, where a rated output voltage of the AC output interface is N times as large as a rated output voltage of the DC output component, and N is a positive integer less than 10.

In one example, the rated output voltage of the AC output interface is 120 V.

In one example, the rated output voltage of the DC output component is selectively 20 V, 40 V or 60 V.

In one example, the rated output voltage of the DC output component is 20 V, 40 V or 60 V.

In one example, a rated voltage of the standard battery unit is 20 V. The rated output voltage of the AC output interface is 6 times as large as a rated voltage of a standard battery unit. A rated output voltage of a DC output interface is 1 time, 2 times, 3 times or 6 times as large as a rated voltage of a standard battery unit.

In one example, the power supply system includes several battery packs. The several battery packs include multiple standard battery units in total. The standard battery units are the same and all have independent positive and negative electrodes. The rated output voltage of the AC output interface is integer times as large as a rated voltage of a standard battery unit. The rated output voltage of the DC output component is integer times as large as a rated voltage of a standard battery unit.

In one example, the DC output component includes a DC output interface and an adapter selectively connected to the DC output interface. A series-parallel circuit is built in the adapter. The series-parallel circuit performs series and parallel configuration on the standard battery units to obtain a preset rated voltage.

One example provides another power supply system, including: a battery pack support apparatus; a battery pack detachably mounted on the battery pack support apparatus; an AC output interface, outputting AC electrical energy; a DC output interface, outputting DC electrical energy; a control circuit, connecting the battery pack to the DC output interface and the AC output interface, transferring electrical energy of the battery pack to the DC output interface, converting the electrical energy of the battery pack into AC electrical energy and providing the AC electrical energy to the AC output interface; an adapter, including an input terminal and an output terminal, where the input terminal is detachably connected to the DC output interface, and the output terminal is detachably connected to an electrical energy input interface of a power tool.

In one example, the power supply system includes multiple adapters that may be selectively connected to the DC output interface.

In one example, the control circuit alternatively transfers electrical energy of the battery pack to the DC output interface or the AC output interface.

In one example, the battery pack support apparatus includes a wearable structure for a user to wear the battery pack support apparatus.

In one example, the battery pack support apparatus is a back pack. The wearable structure includes a back belt.

In one example, a battery pack connection interface is disposed on the battery pack support apparatus.

One example provides another power supply system, including: a battery pack support apparatus, where the battery pack support apparatus includes a wearable structure for a user to wear the battery pack support apparatus; a battery pack detachably mounted on the battery pack support apparatus; an AC output interface, outputting AC electrical energy; a DC output interface, outputting DC electrical energy; and a control circuit, connecting the battery pack to the DC output interface and the AC output interface, transferring electrical energy of the battery pack to the DC output interface, and converting the electrical energy of the battery pack into AC electrical energy and providing the AC electrical energy to the AC output interface.

In one example, the battery pack support apparatus is a back pack. The wearable structure includes a back belt.

In one example, the power supply system further includes an adapter including an input terminal and an output terminal. The input terminal is detachably connected to the DC output interface. The output terminal is detachably connected to an electrical energy input interface of a power tool.

In one example, the power supply system further includes multiple adapters that may be selectively connected to the DC output interface. A series-parallel circuit is built in the adapters. The series-parallel circuit performs series and parallel configuration on the standard battery units to obtain a preset rated voltage.

In one example, the control circuit alternatively transfers electrical energy of the battery pack to the DC output interface or the AC output interface.

In one example, a battery pack connection interface is disposed on the battery pack support apparatus.

One example provides a power supply platform, including: a battery pack support apparatus; a battery pack mounted on the battery pack support apparatus; an AC output interface, outputting AC electrical energy; a DC output component, selectively outputting DC electrical energy of one of various voltages; a control circuit, connecting the battery pack to a DC output interface and the AC output interface, transferring electrical energy of the battery pack to the DC output component, and converting the electrical energy of the battery pack into AC electrical energy and providing the AC electrical energy to the AC output interface.

In one example, the battery pack is detachably mounted on the battery pack support apparatus.

In one example, the DC output component includes the DC output interface and an adapter. A series-parallel circuit is built in the adapter. The series-parallel circuit performs series and parallel configuration on the standard battery units to obtain a preset rated voltage.

In one example, the adapter is a power tool adapter.

In one example, several standard battery units are built in the battery pack. The standard battery units are isolated from each other and have a same configuration.

In one example, a rated voltage of the standard battery unit is 20 V.

In one example, there are multiple adapters. Preset voltages are at least two of 20 V, 40 V, 60 V, and 120 V.

One example provides a power supply system, including: a battery pack support apparatus; a battery pack mounted on the battery pack support apparatus; an AC output interface, outputting AC electrical energy whose rated output voltage is between 110 V and 130 V; and a control circuit, converting the electrical energy of the battery pack into AC electrical energy and providing the AC electrical energy to the AC output interface.

In one example, the rated output voltage is 120 V.

In one example, the control circuit includes a transformer part and a DC-AC inverter part. The transformer part is a series-parallel circuit. The series-parallel circuit configures a series/parallel relationship of the battery pack, and converts a voltage of the battery pack into a rated output voltage of the AC output interface.

In one example, the control circuit includes a transformer part and a DC-AC inverter part. The DC-AC inverter part converts a DC power into a square-wave AC power or trapezoidal-wave AC power by using an H-bridge circuit.

In one example, the battery pack support apparatus may be a wearable apparatus.

In one example, the power supply system further includes a DC output interface for outputting DC electrical energy. The control circuit transfers electrical energy of the battery pack to the DC output interface.

One example provides another power supply system, including: a battery pack support apparatus; a battery pack mounted on the battery pack support apparatus; an AC output interface, outputting square-wave or trapezoidal-wave AC electrical energy; and a control circuit, converting the electrical energy of the battery pack into AC electrical energy and providing the AC electrical energy to the AC output interface.

In one example, a rated output voltage of the AC output interface is AC electrical energy between 110 V and 130 V.

In one example, the control circuit includes a transformer part and a DC-AC inverter part. The transformer part is a series-parallel circuit. The series-parallel circuit configures a series/parallel relationship of the battery pack, and converts a voltage of the battery pack into a rated output voltage of the AC output interface.

In one example, the control circuit includes a transformer part and a DC-AC inverter part. The DC-AC inverter part converts a DC power into a square-wave AC power or trapezoidal-wave AC power by using an H-bridge circuit.

In one example, the battery pack support apparatus may be a wearable apparatus.

In one example, the power supply system further includes a DC output interface for outputting DC electrical energy. The control circuit transfers electrical energy of the battery pack to the DC output interface.

In one example, the rated output voltage is 120 V.

One example provides another power supply system, including: a battery pack support apparatus; several battery packs mounted on the battery pack support apparatus, where the several battery packs include multiple standard battery units, and the multiple standard battery units have a same rated voltage; a DC output interface, outputting DC electrical energy; a control circuit, transferring electrical energy of the battery pack to the DC output interface; and an adapter, detachably connected between the DC output interface and an electrical device, where a series-parallel circuit is disposed inside the adapter, and the series-parallel circuit configures a series/parallel relationship of the multiple standard battery units to form DC electrical energy having a preset voltage.

In one example, the power supply system includes multiple adapters, where at least two series-parallel circuits are not the same as each other.

In one example, the multiple adapters are alternatively connected to the DC output interface.

In one example, the control circuit includes a lead wire. The lead wire leads out positive and negative electrodes of the standard battery units to the DC output interface. Multiple pairs of output positive and negative electrodes are formed on the DC output interface.

In one example, there are multiple groups of lead wires. Each group of lead wires includes several pairs of input positive and negative electrodes and a pair of output positive and negative electrodes. The input positive and negative electrodes are joined to the positive and negative electrodes of the standard battery units. The several pairs of input positive and negative electrodes are connected in series or parallel and are then connected to the output positive and negative electrodes.

In one example, the several pairs of input positive and negative electrodes are connected to each other in parallel and are then connected to the output positive and negative electrodes.

In one example, circuit configurations of the groups of lead wires are the same as each other.

One example provides another power supply system, including: several battery packs, where the several battery packs include multiple standard battery units, and the standard battery units are consistent with each other and all include multiple single batteries; a series-parallel circuit, where the series-parallel circuit by configuring a series/parallel relationship between multiple standard battery units to form DC electrical energy having a preset voltage, and the preset voltage is minimally a rated voltage of the standard battery unit.

In one example, the power supply system further includes a battery pack support apparatus, where the several battery packs are mounted on the battery pack support apparatus; a DC output interface, outputting DC electrical energy; a control circuit, transferring electrical energy of the battery pack to the DC output interface; an adapter, detachably connected between the DC output interface and an electrical device; and a series-parallel circuit, disposed in the adapter, where the series-parallel circuit configures the series/parallel relationship between the multiple standard battery units to form DC electrical energy having a preset voltage.

In one example, the power supply system includes multiple adapters. At least two series-parallel circuits are not the same as each other.

In one example, the multiple adapters are alternatively connected to the DC output interface.

In one example, the control circuit includes a lead wire. The lead wire leads out positive and negative electrodes of the standard battery units to the DC output interface. Multiple pairs of output positive and negative electrodes are formed on the DC output interface.

In one example, there are multiple groups of lead wires. Each group of lead wires includes several pairs of input positive and negative electrodes and a pair of output positive and negative electrodes. The input positive and negative electrodes are joined to the positive and negative electrodes of the standard battery units. The several pairs of input positive and negative electrodes are connected in series or parallel and are then connected to the output positive and negative electrodes.

In one example, the several pairs of input positive and negative electrodes are connected to each other in parallel and are then connected to the output positive and negative electrodes.

In one example, circuit configurations of the groups of lead wires are the same as each other.

One example provides another power supply system, including: a battery pack support apparatus; a battery pack mounted on the battery pack support apparatus; an AC output interface, outputting AC electrical energy; a DC output interface, outputting DC electrical energy; and a control circuit, connecting the battery pack to the DC output interface and the AC output interface, transferring electrical energy of the battery pack to the DC output interface, and converting the electrical energy of the battery pack into AC electrical energy and providing the AC electrical energy to the AC output interface, where the DC output interface and the AC output interface alternatively output electrical energy externally.

In one example, an interlock structure is disposed between the DC output interface and the AC output interface. When an external device is connected to one of the DC output interface and the AC output interface, the interlock structure forbids the other to output electrical energy externally.

In one example, the control circuit includes a DC power supply circuit, an AC power supply circuit, and an electrical energy switch mechanism. When one of the DC power supply circuit and the AC power supply circuit supplies power externally, the electrical energy switch mechanism forbids the other to supply power externally.

In one example, a distance between the DC output interface and the AC output interface is less than 15 cm.

One example provides a power supply system, including: a battery pack support apparatus; a battery pack mounted on the battery pack support apparatus; an electrical energy output interface, outputting electrical energy externally in a discharging mode; a control circuit, transferring electrical energy of the battery pack to the electrical energy output interface; and a charging interface, receiving external electrical energy in a charging mode and transferring the external electrical energy to the battery pack, where the power supply system is alternatively in the charging mode or the discharging mode.

In one example, the battery pack includes a standard battery unit having a preset rated voltage. The power supply system includes multiple standard battery units.

In one example, in the charging mode and in the discharging mode, the multiple standard battery units have different series/parallel relationships.

In one example, the electrical energy output interface includes a DC output interface and an AC output interface. The charging interface and the DC output interface are a same interface.

One example provides a power supply platform, including: a battery pack support apparatus, where a battery pack is detachably mounted on the battery pack support apparatus; an AC output interface, outputting AC electrical energy; a DC output interface, outputting DC electrical energy; a control circuit, connecting the battery pack to the DC output interface and the AC output interface, transferring electrical energy of the battery pack to the DC output interface, and converting the electrical energy of the battery pack into AC electrical energy and providing the AC electrical energy to the AC output interface, where the power supply platform can work in a first working mode or a second working mode, and a quantity of battery packs mounted on the battery pack support apparatus in the first working mode is N times as large as a quantity of battery packs mounted in the second working mode.

In one example, the battery pack support apparatus includes multiple battery pack interfaces. The battery pack interfaces are grouped into multiple groups. Each group includes N battery pack interfaces.

In one example, in the first working mode, Each group of battery pack interfaces connects 1 battery pack. In the second working mode, each group of battery pack interfaces connects N battery pack.

In one example, N is equal to 2.

In one example, battery pack interfaces in each group of battery pack interfaces are connected to each other in parallel.

One example provides a power supply system, including any power supply platform in the foregoing and battery packs safely disposed on the power supply platform, where the battery packs are consistent with each other, and rated voltages of the battery packs are greater than 50 V.

In one example, the rated voltages of the battery packs are greater than 60 V.

One example provides a power supply system, including: a battery pack support apparatus; a battery pack detachably mounted on the battery pack support apparatus; a DC output interface, outputting DC electrical energy; a control circuit, transferring electrical energy of the battery pack to the DC output interface; and an adapter, detachably connected between the DC output interface and an electrical device, where the control circuit includes a battery pack detection circuit, a battery pack protection circuit is disposed in the adapter, the battery pack detection circuit detects battery pack information and sends the battery pack information to the battery pack protection circuit, and the battery pack protection circuit sends a corresponding control instruction according to the battery pack information.

In one example, the battery pack detection circuit includes at least one of a temperature detection component, a current detection component, and a voltage detection component. A preset condition is built in the battery pack protection circuit. When received temperature information and/or current information and/or voltage information does not meet the preset condition, a control instruction used to make the battery pack stop working is sent, or a control instruction used to make the power supply system to externally send an alarm signal is sent.

In one example, several battery pack interfaces are disposed on the battery pack support apparatus. The battery pack detection circuit includes a detection component. The detection component detects whether a battery pack is mounted on the battery pack interfaces.

In one example, the battery pack includes a standard battery unit. The power supply system includes multiple standard battery units. The adapter includes a voltage selection circuit that configures a series/parallel relationship between the standard battery units to form a preset voltage.

The power supply system includes at least two adapters that may be alternatively connected to the DC output interface. Series-parallel circuits of the at least two adapters are different, and the preset conditions are different.

One example provides a power supply platform, including: a body, including a base, where the base supports the body on a working surface; a battery pack support apparatus, located on the body, used to receive a battery pack; a wearable component, where the wearable component is suitable for being worn by a user; and a DC output interface, externally outputting a DC power, where the power supply platform has a base mode and a wearable mode, the base supports the body on the working surface in the base mode, and the body is supported on the user by using the wearable component in the wearable mode.

In one example, the wearable component is detached from the body in the base mode, and the wearable component is connected to the body in the wearable mode.

In one example, the power supply platform further includes an AC output interface that outputs an AC power externally.

In one example, the body includes a holding portion to be held by the user.

In one example, the wearable component includes a back belt. When the wearable component is connected to the body, the power supply platform forms a back pack.

In one example, the body includes a motherboard protection component at least mostly surrounding a motherboard. The motherboard protection component is rigid.

In one example, when the power supply platform is worn on the user by using the wearable component, a lengthwise axis of the battery pack basically extends vertically relative to the ground. When the power supply platform is placed on a support surface by using the base of the body, the lengthwise axis of the battery pack is basically parallel or perpendicular to the support surface.

In one example, the base and the wearable component are located on different sides of the body.

One example provides a battery pack, including multiple secondary energy storage modules, where the secondary energy storage modules is a standard battery unit located in the battery pack and has an independent output terminal. An energy storage component includes multiple secondary energy storage modules. The secondary energy storage modules have a same voltage, and include multiple tertiary energy storage modules. The tertiary energy storage module is a cell located in the secondary energy storage module.

In one example, the output terminal of the secondary energy storage module is arranged on a housing of the battery pack.

In one example, the secondary energy storage module includes an independent control circuit.

In one example, a voltage of the secondary energy storage module is a divisor of a standard AC voltage.

In one example, a voltage of a primary energy storage module is a divisor of a standard AC voltage.

In one example, a voltage of the secondary energy storage module is 20 V.

In one example, at least one primary energy storage module includes 1 secondary energy storage module.

In one example, at least one primary energy storage module includes 3 secondary energy storage modules.

One example provides an electrical energy supply apparatus, including any electrical energy transmission apparatus in the foregoing, and further including an energy storage component. The energy storage component includes a primary energy storage module, a secondary energy storage module, and a tertiary energy storage module. The primary energy storage module is a battery pack detachably mounted on the electrical energy transmission apparatus. The secondary energy storage module is a standard battery unit located in the battery pack and has an independent output terminal. The energy storage component includes multiple secondary energy storage modules. The secondary energy storage modules have a same voltage, and include multiple tertiary energy storage modules. The tertiary energy storage module is a cell located in the secondary energy storage module.

In one example, the output terminal of the secondary energy storage module is arranged on a housing of the battery pack.

In one example, the electrical energy transmission apparatus externally outputs different voltages by changing a series/parallel relationship between the secondary energy storage modules.

In one example, the energy storage apparatus includes multiple primary energy storage modules.

In one example, at least one primary energy storage module includes multiple secondary energy storage modules.

In one example, at least two primary energy storage modules have different quantities of secondary energy storage modules.

In one example, at least one primary energy storage module only includes one secondary energy storage module.

In one example, a voltage of the secondary energy storage module is a divisor of a standard AC voltage.

In one example, a voltage of the primary energy storage module is a divisor of a standard AC voltage.

In one example, a voltage of the secondary energy storage module is 20 V.

In one example, an energy storage system includes 6 secondary energy storage modules.

In one example, at least one primary energy storage module includes 1 secondary energy storage module.

In one example, at least one primary energy storage module includes 3 secondary energy storage modules.

In one example, the secondary energy storage module includes an independent control circuit.

One example provides a working system, including any electrical energy supply apparatus in the foregoing, where the working system further includes a power tool.

In one example, the power tool is an AC power tool.

In one example, the power tool is a DC power tool.

In one example, a battery pack interface of the DC power tool is the same as one of battery pack interfaces of the electrical energy transmission apparatus.

One example provides a battery pack, including multiple standard battery units electrically isolated from each other, and a sum of rated voltages of the multiple standard battery units is greater than 50 V.

In one example, a sum of voltages of the multiple standard battery units is 60 V or 120 V.

In one example, a rated voltage of the standard battery unit is 20 V.

One example provides a battery pack, including a battery pack interface. Multiple groups of positive and negative electrodes are arranged on the battery pack interface. The groups of positive and negative electrodes are separately connected to standard battery units that are consistent with each other and are independent from each other. The standard battery unit includes several cells.

In one example, the battery pack interface has 3 pairs or 6 pairs of positive and negative electrodes.

In one example, a rated voltage of the standard battery unit is 20 V.

In one example, the battery pack interface further includes a signal electrode.

In one example, the signal electrode is a temperature electrode, a voltage electrode or a type recognition electrode.

One example provides a power supply system, including: a battery pack support apparatus; a battery pack detachably mounted on the battery pack support apparatus; an AC output interface, outputting AC electrical energy; a DC output interface, outputting DC electrical energy; a control circuit, connecting the battery pack to the DC output interface and the AC output interface, transferring electrical energy of the battery pack to the DC output interface, and converting the electrical energy of the battery pack into AC electrical energy and providing the AC electrical energy to the AC output interface; and a heat dissipation apparatus, for performing heat dissipation for the battery pack.

In one example, the heat dissipation apparatus is a fan. The fan generates an air flow that flows through the battery pack.

One example provides a power supply platform, including: a body; a battery pack support apparatus located on the body, where a battery pack interface is arranged on the battery pack support apparatus; an electrical energy output interface, outputting electrical energy of the battery pack; and a motherboard, where a control circuit is arranged on the motherboard, and the control circuit transfers electrical energy of the battery pack to the electrical energy output interface, where multiple groups of positive and negative electrodes are arranged on the battery pack interface, the groups of positive and negative electrodes are separately connected to standard battery units that are consistent with each other and are independent from each others, and the standard battery unit includes several cells.

In one example, the battery pack interface has 3 pairs or 6 pairs of positive and negative electrodes.

In one example, the battery pack interface further includes a signal electrode.

In one example, the signal electrode is a temperature signal electrode.

One example provides a power supply platform, including: a body; a battery pack support apparatus located on the body, where a battery pack interface is arranged on the battery pack support apparatus; an electrical energy output interface, outputting electrical energy of the battery pack; and a motherboard, where a control circuit is arranged on the motherboard, and the control circuit transfers electrical energy of the battery pack to the electrical energy output interface, where the battery pack support apparatus includes multiple battery pack interfaces, the battery pack interfaces are grouped into multiple groups, each group includes multiple battery pack interfaces, positive and negative electrodes in each group of battery pack interfaces are electrically isolated from each other, and corresponding positive and negative electrodes in different groups are connected to each other in parallel.

In one example, there are 2 groups of battery pack interfaces.

In one example, each group includes 2 battery pack interfaces.

In one example, the electrical energy output interface includes an AC output interface. The control circuit includes a series-parallel circuit and a DC-AC inverter. The series-parallel circuit connects the groups of battery pack interfaces to each other in series, and then connects the battery pack interfaces to the DC-AC inverter. The DC-AC inverter converts received DC electrical energy into AC electrical energy, and provides the AC electrical energy to the AC output interface.

In one example, the power supply platform includes a battery pack mounting instruction apparatus. The battery pack mounting instruction apparatus instructs a user to mount battery packs in the battery pack support apparatus in a manner in which each group of battery pack interfaces is filled with battery packs or is empty.

In one example, each battery pack interface includes multiple pairs of positive and negative electrodes.

In one example, the electrical energy output interface includes a DC output interface. The control circuit leads out positive and negative electrodes of each group of battery pack interfaces to the DC output interface. Multiple pairs of positive and negative electrodes that correspond to the groups of battery pack interfaces one by one are formed on the DC output interface.

One example provides a power supply system, including any power supply platform in the foregoing. The power supply system further includes a battery pack detachably mounted on a battery pack support apparatus.

In one example, the battery pack includes several standard battery units.

One example provides a power supply platform, including: a body; a battery pack support apparatus located on the body, where multiple battery pack interfaces are arranged on the battery pack support apparatus; an electrical energy output interface, outputting electrical energy of the battery pack; and a motherboard, where a control circuit is arranged on the motherboard, and the control circuit transfers electrical energy of the battery pack to the electrical energy output interface, where the power supply platform further includes a protection apparatus that covers the battery pack interfaces when the battery pack is mounted.

One example provides a power supply platform, including: a body; a battery pack support apparatus located on the body, where several battery pack interfaces are arranged on the battery pack support apparatus; a DC output interface, outputting electrical energy of the battery pack; a motherboard, where a control circuit is arranged on the motherboard, and the control circuit transfers electrical energy of the battery pack to an electrical energy output interface, where multiple pairs of positive and negative electrodes are arranged on each battery pack interface, the control circuit includes a power supply lead, the power supply lead directly leads out positive and negative electrodes on the battery pack interface, or leads out, after series and parallel configuration is performed according to groups, the positive and negative electrodes to the DC output interface, and multiple pairs of positive and negative electrodes are formed on the DC output interface.

The power supply lead of the power supply system connects the pairs of positive and negative electrodes in each group in parallel and then leads out the pairs of positive and negative electrodes to the DC output interface.

One example provides a power supply platform, including a DC output interface. Multiple groups of positive and negative electrodes are arranged on the DC output interface. The groups of positive and negative electrodes are separately connected to standard battery units that are consistent with each other and are independent from each others. The standard battery unit includes several cells.

In one example, the DC output interface has 3 pairs or 6 pairs of positive and negative electrodes.

In one example, a rated voltage of the standard battery unit is 20 V.

In one example, the DC output interface further includes a signal electrode.

In one example, the signal electrode is a temperature signal electrode.

One example provides a power supply system, including: a battery pack support apparatus; a battery pack mounted on the battery pack support apparatus; a DC output interface, outputting DC electrical energy; and a control circuit, transferring electrical energy of the battery pack to the DC output interface, where a locking structure is disposed on the DC output interface to lock a device connected to the DC output interface.

In one example, the power supply system further includes an adapter. The adapter has an input terminal to connect the DC output interface, and has an output terminal to connect an electrical device. The input terminal has a fastening structure. The fastening structure of the input terminal matches a fastening structure of the DC output interface.

One example provides an adapter, including an input terminal and an output terminal. The input terminal has an input interface. The input interface has multiple pairs of positive and negative electrodes. The adapter further includes a series-parallel circuit. The series-parallel circuit configures a series/parallel relationship of the multiple pairs of positive and negative electrodes and then connects the multiple pairs of positive and negative electrodes to a pair of output positive and negative electrodes of the output terminal.

In one example, the input interface has 6 pairs of positive and negative electrodes.

In one example, the series-parallel circuit connects the 6 pairs of positive and negative electrodes to each other in parallel and then connects the 6 pairs of positive and negative electrodes to the output positive and negative electrodes.

In one example, the series-parallel circuit connects every 2 pairs of positive and negative electrodes in series as one group, then connects the groups to each other in parallel, and then connects the groups to the output positive and negative electrodes.

In one example, the series-parallel circuit connects every 3 pairs of positive and negative electrodes in series as one group, then connects the groups to each other in parallel, and then connects the groups to the output positive and negative electrodes.

In one example, the series-parallel circuit connects the 6 pairs of positive and negative electrodes to each other in series, and then connects the 6 pairs of positive and negative electrodes to the output positive and negative electrodes.

One example provides an adapter, including an input terminal and an output terminal, where the input terminal has an input interface, and the input interface has multiple pairs of positive and negative electrodes.

In one example, the input interface has 3 pairs or 6 pairs of positive and negative electrodes.

In one example, the input interface further includes a signal electrode.

In one example, the signal electrode is a temperature signal electrode.

One example provides an adapter, including an input terminal, an output terminal, and a transmission cable located between the input terminal and the output terminal. The input terminal is connected to a power supply system, and the output terminal is connected to an electrical device. The transmission cable includes a pair of device transmission cables and several signal lines. The device transmission cables transfer electrical energy from the input terminal to the output terminal. The signal lines transfer signals between the input terminal and the output terminal.

In one example, the transmission cable further includes a pair of PCB transmission cables. The PCB transmission cables transfer electrical energy from the output terminal to the input terminal.

In one example, the adapter includes a battery pack control circuit. The signal lines include a signal line for transmitting a signal from the input terminal to the output terminal and a signal line for transmitting a signal from the output terminal to the input terminal.

In one example, the signal line transmits at least one of a temperature signal, a voltage signal, and a current signal.

One example provides another adapter, including an input terminal, an output terminal, and a transmission cable located between the input terminal and the output terminal. The input terminal is connected to a power supply system, and the output terminal is connected to an electrical device.

In one example, a battery pack protection circuit is further disposed inside the adapter. The battery pack protection circuit includes a signal input terminal and a signal output terminal. The signal input terminal receives a signal representing a battery pack parameter. According to the signal received by the signal input terminal, the signal output terminal sends a control signal for a battery pack.

In one example, the signal input terminal receives at least one of a temperature signal, a current signal, and a voltage signal. A preset condition is built in the battery pack protection circuit. When the received temperature signal and/or current signal and/or voltage signal does not meet the preset condition, a control signal used to make the battery pack stop working is sent, or a control instruction used to make the power supply system to externally send an alarm signal is sent.

One example provides another adapter, including an input terminal for connecting a power supply system, an output terminal for connecting an electrical device, and a transmission cable located between the input terminal and the output terminal. The adapter includes a general part and an adaptive part detachably connected to the general part. The input terminal is located at the general part, and the output terminal is located at the adaptive part.

In one example, at least a large part of the transmission cable is located at the adapter part.

In one example, the adapter includes multiple adaptive parts. The multiple adaptive parts are alternatively connected to the general part.

In one example, the output terminal has a battery pack shape.

In one example, the general part has a first interface, the adaptive part has a second interface, and the first interface and the second interface match to be connected to or detached from each other.

In one example, the first interface is a cable connector.

One example provides an adapter, including a cylindrical body, an input terminal, an output terminal, and a transmission cable located between the input terminal and the output terminal. A circuit board is built in the body. The shape of the circuit board matches the shape of the cross section of a main body.

In one example, the circuit board is arranged perpendicular to the central axis of the main body.

In one example, the main body is located between the input terminal and the transmission cable.

In one example, a series-parallel circuit is arranged on the circuit board. The input terminal includes multiple pairs of positive and negative electrodes. The series-parallel circuit configures a series/parallel relationship of the multiple pairs of positive and negative electrodes and then connects the multiple pairs of positive and negative electrodes to the output terminal.

In one example, a battery pack protection circuit is arranged on the circuit board. A signal electrode is arranged on the input terminal. The battery pack protection circuit correspondingly outputs a control signal according to a received signal, to control a connected battery pack.

One example provides an adapter, including a body, an input terminal, an output terminal, and a transmission cable located between the input terminal and the output terminal. The body includes a control circuit. The output terminal includes a device check element. When detecting that an electrical device is connected to a device, the device check element triggers the control circuit to start.

In one example, the device check element is a micro switch.

One example provides an adapter, including a body, an input terminal for connecting a power supply system, an output terminal for connecting a power tool, and a transmission cable located between the input terminal and the output terminal. The output terminal is a cable connector. The cable connector has a diameter less than 3 cm and a weight less than 200 grams.

In one example, the body includes a series-parallel circuit. The input terminal includes multiple pairs of positive and negative electrodes. The series-parallel circuit performs series and parallel configuration on the multiple pairs of positive and negative electrodes and then connects the multiple pairs of positive and negative electrodes to positive and negative electrodes of the output terminal. The series-parallel circuit connects at least two pairs of positive and negative electrodes in series.

One example provides a power supply platform, including: a battery pack support apparatus, where a battery pack is detachably mounted on the battery pack support apparatus; an AC output interface, outputting AC electrical energy; and a control circuit, converting DC electrical energy into AC electrical energy, and transferring the AC electrical energy to the AC output interface, where the control circuit further includes a load detection mechanism, the load detection mechanism detects a load condition of an electrical device connected to the AC output interface, and when the load is less than a preset value, the control circuit turns off electrical energy output to the AC output interface.

In one example, the load detection mechanism is a current detection unit.

In one example, the control circuit includes a DC-AC inverter. The control circuit turns off the inverter when the load is less than the preset value.

One example provides a power supply platform, including: a battery pack support apparatus, where a battery pack is detachably mounted on the battery pack support apparatus; an AC output interface, outputting AC electrical energy; and a control circuit, converting DC electrical energy into AC electrical energy, and transferring the AC electrical energy to the AC output interface, where the AC output interface includes a device check element, and when detecting that an electrical device is connected to the AC output interface, the device check element triggers the control circuit to start.

In one example, the device check element is a micro switch.

One example provides an electrical energy transmission apparatus, including an output port, used to connect a power supply connector of an electrical device, where a start switch is disposed in the output port, the start switch controls the electrical energy transmission apparatus to be turned on or off, and when the power supply connector is connected to the output port, the start switch is triggered to be turned on.

In one example, the start switch is a micro switch.

In one example, when the power supply connector is detached from the output port, the start switch is triggered to be turned off.

In one example, the output port is a connection terminal for an AC electrical device.

One example provides a push DC tool, including a push handle, a body, and a movable component for supporting the body on the ground, and further including: a battery pack interface, used to connect a battery pack, and including an electrical connection part and a battery pack support part; and a transmission cable interface, used to connect a cable connector, and including an electrical connection part and a mechanical joint part.

In one example, the battery pack interface is connected to the transmission cable interface in parallel.

In one example, the transmission cable interface is located on the push handle.

In one example, the transmission cable interface is disposed on or near a part to be held by a user of the push handle.

One example provides a working system, including a battery pack, an electrical energy transmission apparatus, and a push power tool. The push power tool includes a push handle and a main body. A battery pack interface and a cable electrical energy output part interface are disposed on the push power tool, and are respectively used to connect a battery pack and a cable electrical energy output part.

In one example, the cable electrical energy output part interface is located on the push handle.

In one example, the cable electrical energy output part interface is located at an upper portion of the push handle.

In one example, the battery pack interface is located on the body.

In one example, there are multiple battery pack interfaces.

In one example, a working voltage of the push power tool is greater than 50 V.

In one example, a working voltage of the push power tool is 120 V, there are two battery pack interfaces, and a voltage of the battery pack is 60 V.

In one example, the push power tool can only be powered by one of the battery pack and the cable electrical energy output part.

In one example, the push power tool can be powered by both the battery pack and the cable electrical energy output part.

In one example, the battery pack interface and the cable electrical energy output part interface of the push power tool are connected in parallel.

In one example, the push power tool is a lawn mower.

One example provides a push tool, where the push tool is any push tool in the foregoing.

One example provides a push DC tool, including a push handle, a body, and a movable component for supporting the body on the ground, further including: a transmission cable interface, used to connect a cable connector, and including an electrical connection part and a mechanical joint part, the transmission cable interface is disposed on the push handle.

In one example, the transmission cable interface is disposed on or near a part to be held by a user of the push handle.

One example provides a handheld DC tool, including an electrical energy input interface, where the electrical energy input interface is a transmission cable interface, used to connect a transmission cable connector.

In one example, a rated input voltage of the electrical energy input interface is greater than 50 V.

In one example, a rated input voltage of the electrical energy input interface is between 100 V and 140 V, or is between 50 V and 70 V.

In one example, the electrical energy input interface includes a locking structure, used to lock the transmission cable connector in the electrical energy input interface.

One example provides a working system, including a battery pack, an electrical energy transmission apparatus, and a DC tool. A working voltage of the DC tool is greater than 60 V. The battery pack is supported in the working system by using a battery pack support apparatus. The electrical energy transmission apparatus is disposed separately from the DC tool. The electrical energy transmission apparatus outputs electrical energy to the DC tool by using a cable electrical energy output part. The battery pack support apparatus is only arranged on the electrical energy transmission apparatus. An electrical energy input interface on the DC tool only includes a port for connecting the cable electrical energy output part.

In one example, the DC tool is a handheld tool.

One example provides a DC tool, powered by an electrical energy transmission apparatus disposed separately from the DC tool. The electrical energy transmission apparatus includes a battery pack support structure for supporting the weight of a battery pack thereon. An electrical energy input interface of the electrical energy transmission apparatus only includes a port for connecting a cable electrical energy output part of the electrical energy transmission apparatus.

In one example, the DC tool is a handheld tool.

One example provides a DC tool, where a battery pack cannot be connected on an electrical energy input interface.

One example provides a charger, including an output terminal, a main body, and an AC plug that are sequentially connected. An electrical energy output interface is disposed on the output terminal. Multiple pairs of positive and negative electrodes are disposed on the electrical energy output interface. The charging station includes a series-parallel circuit. The series-parallel circuit is connected to the multiple pairs of positive and negative electrodes.

One example provides a battery pack used to output multiple voltages for power tools. The battery pack includes at least two battery units. Each battery unit leads out a positive terminal and a negative terminal. The battery pack further includes a voltage conversion apparatus. The voltage conversion apparatus includes an input terminal electrically connected to the at least two battery units and an output terminal used to output a voltage. The input terminal includes at least two groups of electrode contacts corresponding to a quantity of the battery units. Each group of electrode contacts includes a positive electrode contact electrically connected to the positive terminal and a negative electrode contact electrically connected to the negative terminal. The voltage conversion apparatus makes combinations of series connection and/or parallel connection of the at least two battery units to enable the output terminal to output different voltage values.

In one example, the voltage conversion apparatus change connecting lines between the groups of electrode contacts and between the electrode contacts and the output terminal, so as to adjust a combination manner of series connection and/or parallel connection of the at least two battery units.

In one example, the input terminal includes a groups of electrode contacts, where b groups of electrode contacts are connected in parallel, a/b groups of electrode contacts are connected in series, and b is a positive divisor of a.

In one example, a=6, b=6, and the input terminal includes 6 groups of electrode contacts. Positive electrodes of each group of electrode contacts are connected to positive electrodes of the output terminal. Negative electrodes of each group of electrode contacts are connected to negative electrodes of the output terminal.

In one example, a=6, b=3, and the input terminal includes 6 groups of electrode contacts. Positive electrodes of a first group of electrode contacts are connected to negative electrodes of a second group of electrode contacts. Negative electrodes of the first group of electrode contacts are connected to negative electrodes of the output terminal. Positive electrodes of the second group of electrode contacts are connected to positive electrodes of the output terminal. Positive electrodes of a third group of electrode contacts are connected to negative electrodes of a fourth group of electrode contacts. Negative electrodes of the third group of electrode contacts are connected to the negative electrodes of the output terminal. Positive electrodes of the fourth group of electrode contacts are connected to the positive electrodes of the output terminal. Positive electrodes of a fifth group of electrode contacts are connected to negative electrodes of a sixth group of electrode contacts. Negative electrodes of the fifth group of electrode contacts are connected to the negative electrodes of the output terminal. Positive electrodes of the sixth group of electrode contacts are connected to the positive electrodes of the output terminal.

In one example, a=6, b=2, and the input terminal includes 6 groups of electrode contacts. Positive electrodes of a first group of electrode contacts are connected to negative electrodes of a second group of electrode contacts. Positive electrodes of the second group of electrode contacts are connected to negative electrodes of a third group of electrode contacts. Negative electrodes of the first group of electrode contacts are connected to negative electrodes of the output terminal. Positive electrodes of the third group of electrode contacts are connected to positive electrodes of the output terminal. Positive electrodes of a fourth group of electrode contacts are connected to negative electrodes of a fifth group of electrode contacts. Positive electrodes of the fifth group of electrode contacts are connected to negative electrodes of a sixth group of electrode contacts. Negative electrodes of the fourth group of electrode contacts are connected to the negative electrodes of the output terminal. Positive electrodes of the sixth group of electrode contacts are connected to the positive electrodes of the output terminal.

In one example, a=6, b=1, and the input terminal includes 6 groups of electrode contacts. Negative electrodes of a first group of electrode contacts are connected to negative electrodes of the output terminal. Positive electrodes of the first group of electrode contacts are connected to negative electrodes of a second group of electrode contacts. Positive electrodes of the second group of electrode contacts are connected to negative electrodes of a third group of electrode contacts. Positive electrodes of the third group of electrode contacts are connected to negative electrodes of a fourth group of electrode contacts. Positive electrodes of the fourth group of electrode contacts are connected to negative electrodes of a fifth group of electrode contacts. Positive electrodes of the fifth group of electrode contacts are connected to negative electrodes of a sixth group of electrode contacts. Positive electrodes of the sixth group of electrode contacts are connected to positive electrodes of the output terminal.

In one example, the battery units may form c different voltage values, where c is a quantity of positive divisors of a.

In one example, the battery unit is a lithium ion battery unit.

In one example, the battery unit includes at least one battery.

In one example, a voltage value of each battery unit is 12V.

In one example, a voltage value of each battery unit is 20 V.

In one example, a power tool system includes a power tool, and further includes a battery pack that outputs multiple voltages. The battery pack includes at least two battery units. Each battery unit leads out an electrode terminal. The battery pack further includes a voltage conversion apparatus. The voltage conversion apparatus includes an input terminal of a corresponding electrode terminal and an output terminal that outputs a voltage. The voltage conversion apparatus uses a same quantity of battery units to make combinations of series connection and/or parallel connection to output different voltage values.

In one example, a battery pack bracket structure includes a bracket body and a control apparatus mounted in the bracket body. A battery pack holder is disposed on the bracket body. The battery pack holder includes at least two battery pack clamping portions. A positive electrode lead wire and a negative electrode lead wire are disposed on the battery pack holder. The positive electrode lead wire and the negative electrode lead wire are separately electrically connected to the control apparatus. A conversion control piece is further disposed on the bracket body. The conversion control piece is electrically connected to the control apparatus. An output part used to output a voltage is further disposed on the bracket body. The output part is electrically connected to the positive electrode lead wire and the negative electrode lead wire. The conversion control piece is applicable to adjustment of an output voltage of the output part.

In one example, the conversion control piece has at least two voltage shifts.

In one example, the control apparatus includes a microcontroller unit (MCU). The MCU is electrically connected to the positive electrode lead wire and the negative electrode lead wire. The MCU is applicable to control an output voltage of a battery pack in the battery pack holder.

In one example, the control apparatus further includes a shift detection module. The shift detection module is electrically connected to the MCU and the conversion control piece separately. The shift detection module is applicable to detection of a voltage shift adjusted by the conversion control piece. The shift detection module feeds back the detected voltage shift to the MCU. The MCU controls an output voltage of a battery pack in the battery pack holder.

In one example, the control apparatus further includes a voltage detection module. The voltage detection module is electrically connected to the positive electrode lead wire and the MCU separately. The voltage detection module is applicable to detection of a sum of voltages of all battery packs in the battery pack holder. When the sum of voltages of all battery packs in the battery pack holder reaches a preset voltage value, the MCU controls a battery pack in the battery pack holder to stop outputting a voltage.

In one example, the control apparatus further includes a current detection module and a sampling resistor. The current detection module is electrically connected to the negative electrode lead wire and the MCU separately. The sampling resistor is electrically connected to the negative electrode lead wire and the current detection module separately. The current detection module is applicable to detection of an output current of a battery pack in the battery pack holder. When the output current is greater than a preset current value, the MCU controls a battery pack in the battery pack holder to stop outputting a voltage.

In one example, the control apparatus further includes a temperature detection module. The temperature detection module is electrically connected to the battery pack holder and the MCU separately. The temperature detection module is applicable to detection of the temperature of a battery pack in the battery pack holder. When the temperature of a battery pack is greater than a preset temperature, the MCU controls a battery pack in the battery pack holder to stop outputting a voltage.

In one example, the control apparatus further includes a pulse width modulation module. The pulse width modulation module is electrically connected to the positive electrode lead wire, the output part, and the MCU separately. The pulse width modulation module is applicable to control of a pulse width duty ratio to adjust an output voltage of the output part. The conversion control piece adjusts the voltage shift. The shift detection module feeds back the detected voltage shift to the MCU. The MCU controls the pulse width modulation module to adjust the output voltage of the output part, and then the output part outputs the output voltage.

In one example, the control apparatus further includes at least two relays. Two ends of a coil of each of the at least two relays are electrically connected to the MCU and a circuit power supply respectively. Contact points of the at least two relays are electrically connected to the at least two battery pack clamping portions respectively. The conversion control piece adjusts the voltage shift, and feeds back a signal of the voltage shift to the MCU. The MCU controls the relay to be opened or closed to enable the at least two battery pack clamping portions to be connected in parallel or connected in series.

In one example, the control apparatus includes a lever. The lever is controlled through a movement of the conversion control piece, and the lever is separately connected to the at least two battery pack clamping portions. The conversion control piece adjusts the voltage shift. The conversion control piece moves the lever to enable the at least two battery pack clamping portions to implement parallel connection or series connection.

In one example, the conversion control piece is a switching knob or a shift switch.

In one example, the output part includes a DC output terminal and an AC output terminal. The DC output terminal is electrically connected to the positive electrode lead wire and the negative electrode lead wire of the battery pack holder. The control apparatus further includes a DC/AC conversion module. The positive electrode lead wire and the negative electrode lead wire of the battery pack holder are electrically connected to the DC/AC conversion module. The AC output terminal is electrically connected to the DC/AC conversion module.

In one example, an elastic piece is disposed on the battery pack clamping portion. The elastic piece is compressed or stretched to adjust the size of a receiving space for the battery pack clamping portion.

In one example, the at least two battery pack clamping portions are connected in series.

In one example, there are three battery pack clamping portions, that is, a first battery pack clamping portion, a second battery pack clamping portion, and a third battery pack clamping portion. A positive electrode of the first battery pack clamping portion is electrically connected to the positive electrode lead wire. A negative electrode of the third battery pack clamping portion is electrically connected to the negative electrode lead wire. There are six relays, that is, a first relay, a second relay, a third relay, a fourth relay, a fifth relay, and a sixth relay. Two contact points of the first relay are electrically connected to a negative electrode of the first battery pack clamping portion and a positive electrode of the second battery pack clamping portion separately. Two contact points of the second relay are electrically connected to a negative electrode of the second battery pack clamping portion and a positive electrode of the third battery pack clamping portion separately. Two contact points of the third relay are electrically connected to the positive electrode of the first battery pack clamping portion and the positive electrode of the second battery pack clamping portion separately. Two contact points of the fourth relay are electrically connected to the positive electrode of the first battery pack clamping portion and the positive electrode of the third battery pack clamping portion separately. Two contact points of the fifth relay are electrically connected to the negative electrode of the second battery pack clamping portion and the negative electrode of the third battery pack clamping portion separately. Two contact points of the sixth relay are electrically connected to the negative electrode of the first battery pack clamping portion and the negative electrode of the third battery pack clamping portion separately. The MCU controls the first relay and the second relay to close and the third relay, the fourth relay, and the fifth relay to open. The first battery pack clamping portion, the second battery pack clamping portion, and the third battery pack clamping portion are connected in series. The MCU controls the first relay and the second relay to open and the third relay, the fourth relay, and the fifth relay to close. The first battery pack clamping portion, the second battery pack clamping portion, and the third battery pack clamping portion are connected in parallel.

In one example, there are three battery pack clamping portions, that is, a first battery pack clamping portion, a second battery pack clamping portion, and a third battery pack clamping portion. The negative electrode of the first battery pack clamping portion is electrically connected to a first internal port. A positive electrode of the first battery pack clamping portion is electrically connected to a second internal port. The negative electrode of the second battery pack clamping portion is electrically connected to a third internal port. The positive electrode of the second battery pack clamping portion is electrically connected to a fourth internal port. The negative electrode of the third battery pack clamping portion is electrically connected to a fifth internal port. The positive electrode of the third battery pack clamping portion is electrically connected to a sixth internal port. The first internal port is electrically connected to the negative electrode lead wire. The sixth internal port is electrically connected to the positive electrode lead wire. The conversion control piece moves the lever to a first position. The first internal port and the third internal port are connected to the fifth internal port. The second internal port and the fourth internal port are connected to the sixth internal port. The first battery pack clamping portion, the second battery pack clamping portion, and the third battery pack clamping portion are connected in parallel. The conversion control piece moves the lever to a second position. The second internal port is connected to the third internal port. The fourth internal port is connected to the fifth internal port. The first battery pack clamping portion, the second battery pack clamping portion, and the third battery pack clamping portion are connected in series.

BRIEF DESCRIPTION OF THE DRAWINGS

The foregoing objectives, technical solutions, and beneficial effects of the present invention may be described below in detail by using the following specific examples by means of which the present invention can be implemented.

The same reference numerals and symbols in the accompanying drawings and the specification are used to represent the same or equivalent elements.

FIG. 10-I is a schematic diagram of a battery pack receiving apparatus according to an implementation of the present invention.

FIG. 1-II is a diagram of modules of an electrical energy working system according to an example of the present invention.

FIG. 2-II is a diagram of modules of energy storage components in FIG. 1-II.

FIG. 3-II is a structural diagram of a secondary energy storage module in FIG. 2-II.

FIG. 4-II is a schematic diagram of an energy storage component formed of the secondary energy storage module in FIG. 3-II.

FIG. 5-II is a structural diagram of the secondary energy storage module in FIG. 2-II.

FIG. 6-II is a schematic diagram of an energy storage component formed of the secondary energy storage module in FIG. 5-II.

FIG. 7-II is a schematic diagram of an energy storage component formed of the secondary energy storage module in FIG. 3-II and the secondary energy storage module in FIG. 5-II.

FIG. 8-II is a structural diagram of the secondary energy storage module in FIG. 2-II.

FIG. 9-II is a schematic diagram of the connection between the energy storage component and an electrical energy transmission apparatus in FIG. 4-II.

FIG. 10-1-II is a schematic diagram according to this example.

FIG. 10-2-II is a schematic diagram of a second series-parallel circuit according to this example.

FIG. 10-3-II is a schematic diagram of a third series-parallel circuit according to this example.

FIG. 10-4-II is a schematic diagram of a fourth series-parallel circuit according to this example.

FIG. 11-II is a schematic diagram of an output component according to this example.

FIG. 12-II is a schematic diagram of a first state of an output selection module according to this example.

FIG. 13-II is a schematic diagram of a second state of the output selection module in FIG. 12-II.

FIG. 14-II is a working flowchart when a first port in FIG. 11-II is connected to an AC device.

FIG. 15-II is a working flowchart when a second port in FIG. 11-II is connected to an AC device.

FIG. 16-II is a schematic diagram of an input component according to another example of the present invention.

FIG. 17-II is a schematic diagram of a DC device connection terminal in FIG. 16-II.

FIG. 18-II is a schematic diagram of an input terminal of an adapter matching the DC device connection terminal in FIG. 17-II.

FIG. 19-II is a schematic diagram of the connection between a DC output interface and a DC device according to an example of the present invention.

FIG. 20-II is a schematic diagram of the connection between an AC output interface and an AC device according to an example of the present invention.

FIG. 21-II is a working flowchart when an AC device connection terminal in FIG. 16-II is connected to an AC device.

FIG. 22-II is a schematic diagram of an electrical energy transmission apparatus according to an example of the present invention.

FIG. 23-II is a diagram of modules of a controller in FIG. 22-II.

FIG. 24-II is a schematic diagram of a working system according to an example of the present invention.

FIG. 26-II is a schematic diagram of a series-parallel conversion circuit according to the example in FIG. 25-II.

FIG. 27-II is a schematic diagram of another state of the series-parallel conversion circuit in FIG. 26-II.

FIG. 28-II is a schematic diagram of another state of the series-parallel conversion circuit in FIG. 26-II.

FIG. 29-II is a schematic diagram of another state of the series-parallel conversion circuit in FIG. 26-II.

FIG. 30-II is a diagram of circuit connections of an energy storage system and an electrical device according to another example of the present invention.

FIG. 31-II is a schematic diagram of an electrical energy input terminal of a 20V adapter in the example shown in FIG. 30-II.

FIG. 32-II is a schematic diagram of an electrical energy input terminal of a 40V adapter in the example shown in FIG. 30-II.

FIG. 33-II is a schematic diagram of an electrical energy input terminal of a 60V adapter in the example shown in FIG. 30-II.

FIG. 34-II is a schematic diagram of an electrical energy input terminal of a 120V adapter in the example shown in FIG. 30-II.

FIG. 35-II is a diagram of circuit connections of an energy storage system and an electrical device according to another example of the present invention.

FIG. 36-II is a diagram of circuit connections of an energy storage system and an electrical device according to another example of the present invention.

FIG. 1-III is a general diagram of modules of a power supply system according to an example of the present invention.

FIG. 2-III is a block diagram of an energy storage component in FIG. 1-III.

FIG. 3-III is a structural diagram of a battery pack in FIG. 1-III.

FIG. 4-III is a diagram of modules of the power supply platform in FIG. 1-III.

FIG. 5-III is a circuit diagram of the power supply platform in FIG. 4-III.

FIG. 6-III is a schematic diagram of a DC output interface of the power supply platform in FIG. 4-III.

FIG. 7-III is a schematic diagram of an adapter in FIG. 1-III.

FIG. 8-III is a schematic diagram of an input interface of an adapter in FIG. 7-III.

FIG. 9-III is a schematic diagram of the power supply platform in FIG. 1-III connected to a first adapter.

FIG. 10-III is a schematic diagram of the power supply platform in FIG. 1-III connected to a second adapter.

FIG. 11-III is a schematic diagram of the power supply platform in FIG. 1-III connected to a third adapter.

FIG. 12-III is a schematic diagram of the power supply platform in FIG. 1-III connected to a fourth adapter.

FIG. 13-III is a schematic diagram of the power supply platform in FIG. 1-III and an AC driving circuit of the power supply platform.

FIG. 14-III is a schematic diagram of the power supply platform in FIG. 1-III connected to a charger.

FIG. 15-III is a schematic diagram of modules according to another example of the present invention.

FIG. 16-III is a circuit diagram of a power supply platform in FIG. 15-III connected to a first adapter.

FIG. 17-III is a circuit diagram of a power supply platform in FIG. 15-III connected to a second adapter.

FIG. 18-III is a circuit diagram of a power supply platform in FIG. 15-III connected to a third adapter.

FIG. 19-III is a circuit diagram of a power supply platform in FIG. 15-III connected to a charger.

FIG. 20-III is a circuit diagram when a power supply platform in FIG. 15-III includes an AC driving circuit.

FIG. 1-IV is a general diagram of modules of a power supply system according to an example of the present invention.

FIG. 1-V is a left view of a battery pack housing including 6 groups of battery units according to a preferred example of the present invention.

FIG. 2-V is a diagram of internal connecting wires of the battery pack housing shown in FIG. 1-V, where each battery unit leads out one group of electrode terminals.

FIG. 3-V is a front view of the battery pack housing shown in FIG. 1-V.

FIG. 4-V is a schematic diagram of a voltage conversion apparatus according to a preferred example of the present invention.

FIG. 5-V is a schematic diagram of the assembly of the battery pack housing shown in FIG. 2-V and the voltage conversion apparatus shown in FIG. 4-V.

FIG. 6-V is a schematic diagram of a first implementation of internal connecting wires of the voltage conversion apparatus shown in FIG. 4-V.

FIG. 7-V is a schematic diagram of a second implementation of internal connecting wires of the voltage conversion apparatus shown in FIG. 4-V.

FIG. 8-V is a schematic diagram of a third implementation of internal connecting wires of the voltage conversion apparatus shown in FIG. 4-V.

FIG. 9-V is a schematic diagram of a fourth implementation of internal connecting wires of the voltage conversion apparatus shown in FIG. 4-V.

FIG. 10-V is a schematic diagram of the assembly of a battery pack and a power tool according to a preferred example of the present invention.

FIG. 1-VI is a schematic structural diagram of a battery pack bracket structure according to the present invention.

FIG. 2-VI is a schematic diagram of circuit connections of an example of the battery pack bracket structure shown in FIG. 1-VI.

FIG. 3-VI is a schematic diagram of circuit connections of another example of the battery pack bracket structure shown in FIG. 1-VI.

FIG. 4-VI is a schematic diagram of connections of still another example of the battery pack bracket structure shown in FIG. 1-VI.

FIG. 1-VII is a schematic structural diagram of Example 1 of a power supply system according to the present invention.

FIG. 2-VII is a schematic structural diagram of Example 2 of a power supply system according to the present invention.

FIG. 3-VII is a side view of a moving component according to Example 2 of the present invention.

FIG. 4-VII is a schematic structural diagram of Example 3 of a power supply system according to the present invention.

FIG. 5-VII is a schematic diagram of a moving component of Example 3 of a power supply system according to the present invention.

FIG. 6-VII is a side view of Example 4 of a power supply system according to the present invention.

Figures 1, 2:
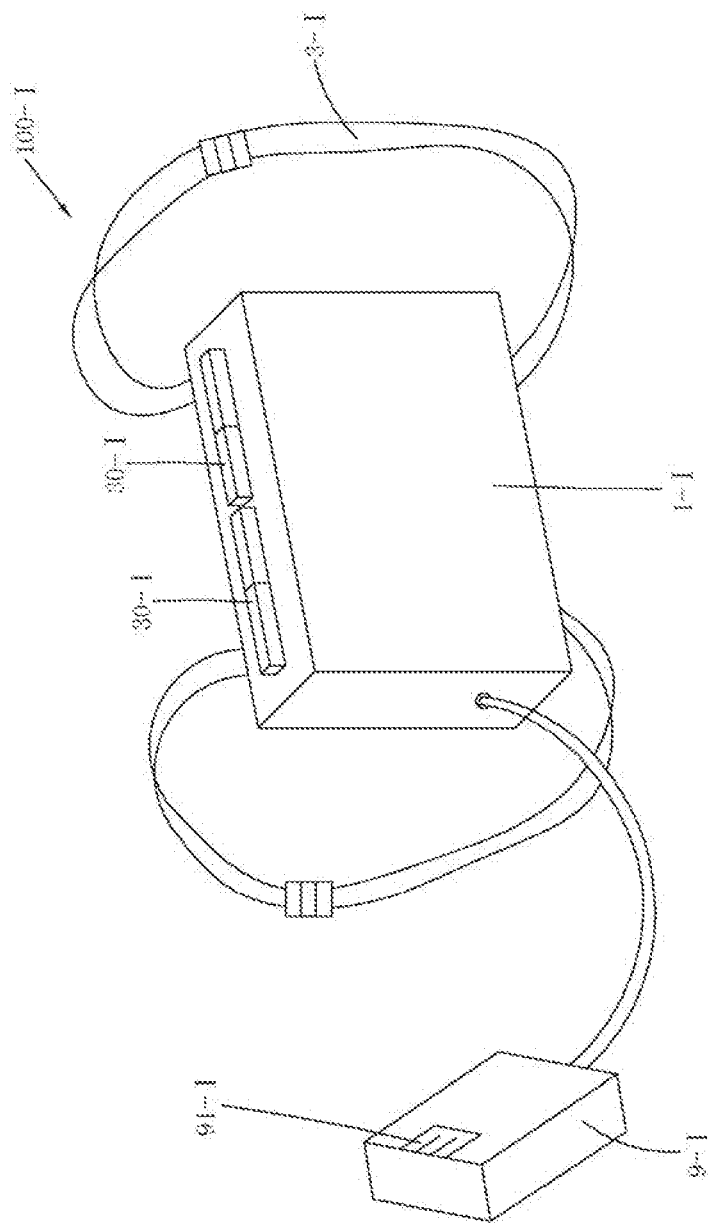
FIG. 1-I is a schematic diagram of a battery pack receiving apparatus and a battery pack received in the battery pack receiving apparatus according to an implementation of the present invention.
FIG. 2-I is a schematic diagram of the battery pack receiving apparatus shown in FIG. 1-I being assembled with a battery pack.

| 100-I. Battery pack receiving apparatus | 1-I. Main body | 3-I. Wearable component |
|---|---|---|
| 5-I. Battery pack receiving recess | 9-I. Electrical energy output device | 11-I. Cover |
|  | 15-I. Vent hole | 17-I. Airbag |
|  |  | 33-I. First body |

-continued

13-I. Bag body
30-I. Battery pack
35-I. Second body
91-I. Electrical energy output interface
1-II. Electrical energy transmission apparatus
11-II. Input component
17-II. DC device interface
23-II. AC device
32-II. Second series-parallel circuit
35-II. Input terminal
45-II. Power supply terminal
55-II. Second port
65-II. Output terminal
71-II. Primary energy storage module
80-II. Output selection module
87-II. Switch
30-II. Series-parallel circuit
101-II. Input interface
107-II. Power-off unit
114-II. AC driving unit
130-II. DC tool
1101-II. Test control unit
1104-II. Output control unit
200-II. Operation panel
205-II. Mode indicator lamp
211-II. Low voltage DC output interface
217-II. Mode selection operation piece
231-II. Tool end
241-II. Positive terminal
247-II. Switch pole
253-II. 20 V positive terminal
259-II. 120 V positive terminal
271-II. Light coupling element
100-III. Power supply system
5-III. Battery pack
13-III. Body
19-III. Positive and negative electrodes
21-III. Signal electrode
191b-III. Output positive and negative electrodes
25-III. Interface circuit
30-III. Adapter
301-III. First adapter
304-III. Fourth adapter
39-III. Output interface
43b-III. Series-parallel circuit
43e-III. Series-parallel circuit
70-III. Charger
75-III. AC plug
301a-III. First adapter
304a-III. Fourth adapter
44a-III. Series-parallel circuit
44d-III. Series-parallel circuit
1-IV. Electrical energy transmission apparatus
11-IV. Input component
17-IV. USB interface
22-IV. Audio processing circuit 31-I. Battery pack interface
50-I. Power tool
3-II. Energy storage component
13-II. Output component
19-II. AC device interface
27-II. Battery pack
33-II. Third series-parallel circuit
36-II. Output terminal
47-II. Recognition terminal
61-II. Adapter
67-II. Power supply terminal
73-II. Secondary energy storage module
81-II. Inverter
100-II. Power tool
102-II. Control circuit
103-II. Conversion circuit
110-II. Controller
116-II. Output selection unit
1102-II. Detection control unit
201-II. Switch
207-II. USB output interface
213-II. High voltage output interface
233-II. Electrical energy input terminal
243-II. Negative terminal
250-II. DC output interface
255-II. 40 V positive terminal
261-II. Start switch
1-III. Power supply platform
9-III. DC output interface
15-III. Battery pack support apparatus
19a-III. Output positive and negative electrodes
21a-III. Signal electrode
20-III. Control circuit
27-III. AC driving circuit
31-III. Input terminal
302-III. Second adapter
35-III. Transmission cable
41-III. Discharging protection circuit
43c-III. Series-parallel circuit
43f-III. Series-parallel circuit
71-III. Output terminal
200-III. DC electrical device
302a-III. Second adapter
9a-III. DC output interface
44b-III. Series-parallel circuit
44e-III. Series-parallel circuit
3-IV. Energy storage component
13-IV. Output component
19-IV. AC device interface
24-IV. Projector circuit
4-V. Housing
10-V. Input terminal
16'-V. Positive electrodes of the first group of electrode contacts
18-V. Negative electrodes of the second group of electrode contacts
22'-V. Positive electrodes of the fourth group of electrode contacts
24-V. Negative electrodes of the fifth group of electrode contacts
28-V. Oscillator
110-VI. Bracket body
120-VI. Conversion control piece 51-I. Battery pack mounting interface
5-II. Electrical device
15-II. Adapter component
21-II. DC device
31-II. First series-parallel circuit
34-II. Fourth series-parallel circuit
43-II. DC device connection terminal
53-II. First port
63-II. Input terminal
69-II. Feature terminal
75-II. Tertiary energy storage module
85-II. Bypass controller
28-II. Battery pack interface
105-II. Detection unit
112-II. DC driving unit
121-II. Protection circuit
1103-II. Safety determining unit
203-II. Mode indicator lamp
209-II. 12 V output interface
215-II. Charging interface
235-II. Transmission cable
245-II. Trigger piece
251-II. Negative terminal
257-II. 60 V positive terminal
270-II. Driving circuit
3-III. Energy storage component
11-III. AC output interface
17-III. Battery pack connection interface
19b-III. Input positive and negative electrodes
191a-III. Input positive and negative electrodes
23-III. Body circuit
231-III. Voltage detection unit
33-III. Input interface
303-III. Third adapter
37-III. Output terminal
43a-III. Series-parallel circuit
43d-III. Series-parallel circuit
51-III. Standard battery unit
73-III. Body
300-III. AC electrical device
303a-III. Third adapter
72-III. Transmission cable
44c-III. Series-parallel circuit
12-III. Charging interface
5-IV. Electrical device
15-IV. Adapter component
21-IV. Charging interface
6'-V. Positive terminal
6-V. Negative terminal
12'-V. Positive electrodes of the output terminal
16-V. Negative electrodes of the first group of electrode contacts
20'-V. Positive electrodes of third group of electrode contacts
22-V. Negative electrodes of the fourth group of electrode contacts
26'-V. Positive electrodes of the sixth group of electrode contacts
30-V. Battery pack -continued 2-V. Battery unit
8-V. Voltage conversion apparatus
12-V. Negative electrodes of the output terminal
18'-V. Positive electrodes of the second group of electrode contacts
20-V. Negative electrodes of the third group of electrode contacts
24'-V. Positive electrodes of the fifth group of electrode contacts
26-V. Negative electrodes of the sixth group of electrode contacts
100-VI. Battery pack bracket structure
112-VI. Output part
300-VI. Electric appliance
111-VI. Battery pack clamping portion
200-VI. Battery pack

DETAILED DESCRIPTION

The disclosure includes seven groups of examples. The first first group examples are described with reference to FIG. 1-I to FIG. 11-I. The second group examples are described with reference to FIG. 1-II to FIG. 37-II. The third group examples are described with reference to FIG. 1-III to FIG. 20-III. The fourth group examples are described with reference to FIG. 1-IV. The fifth group examples are described with reference to FIG. 1-V to FIG. 10-V. The sixth group examples are described with reference to FIG. 1-VI to FIG. 4-VI. The seventh group examples are described with reference to FIG. 1-VII to FIG. 6-VII. The seven group examples support each other and together form the inventive essence of the disclosure.

First, the first group examples are described with reference to FIG. 1-I to FIG. 11-I.

As shown in FIG. 1-I, this example provides a wearable battery pack receiving apparatus 100-I and a wearable battery pack receiving system.

The wearable battery pack receiving apparatus 100-I is used to output electrical energy to a power tool 50-I. The battery pack receiving apparatus 100-I includes a main body 1-I and a wearable component 3-I connected to the main body 1-I, and further includes an electrical energy output device 9-I that outputs electrical energy to the external power tool 50-I. In one example, the electrical energy output device 9-I is a flexible apparatus, typically, an electric cable.

A wearable battery pack system further includes, in addition to the battery pack receiving apparatus 100-I, a battery pack 30-I received in the battery pack receiving apparatus 100-I.

At least one battery pack receiving recess 5-I used to receive the battery pack 30-I is disposed on the main body 1-I. A receiving interface (not shown) matching a battery pack interface 31-I of the battery pack 30-I is disposed on the battery pack receiving recess 5-I. With reference to FIG. 1-I and FIG. 2-I, the battery pack interface 31-I and the receiving interface that match each other are disposed, and the battery pack 30-I and the battery pack receiving recess 5-I are electrically connected to each other in a detachable manner and have matching shapes. Alternatively, the battery pack 30-I received in the battery pack receiving recess 5-I is suitable for being directly mounted on the power tool 50-I.

The wearable component 3-I includes a shoulder belt and/or a waist belt. In this example, the battery pack receiving apparatus 100-I is a back pack, and the wearable component 3-I is a shoulder belt suitable for a user to carry. In another example, the wearable component may further include a waist belt that facilitates carrying. If the battery pack receiving apparatus 100-I is a fanny pack, the wearable component 3-I correspondingly includes a waist belt. If the battery pack receiving apparatus 100-I is a shoulder bag, the wearable component 3-I correspondingly includes a shoulder belt suitable for a user to wear over the shoulder.

Figures 1, 3:
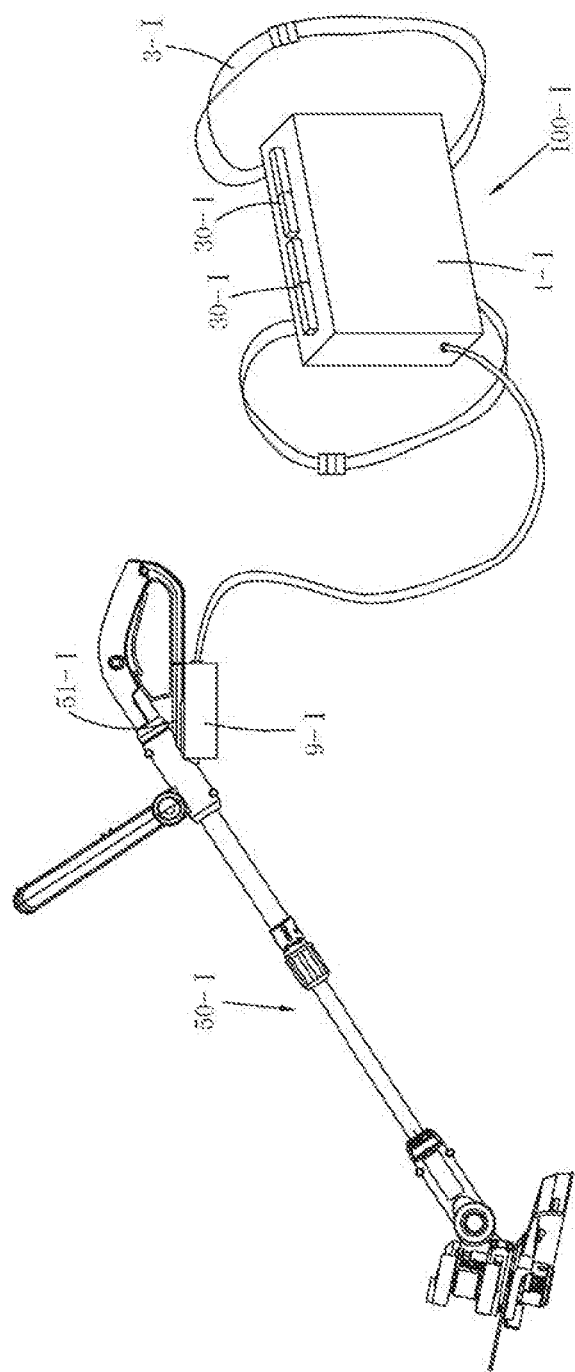
FIG. 3-I is a schematic diagram of the electrical energy output interface of the battery pack receiving apparatus shown in FIG. 2-I being connected to a power tool.

The electrical energy output device 9-I is connected to the main body 1-I, and is electrically connected to the receiving interface, so as to output electrical energy of the battery pack 30-I received in the battery pack receiving apparatus 100-I to the power tool 50-I. As shown in FIG. 3-I, an electrical energy output interface 91-I is provided on the electrical energy output device 9-I. In one example, the electrical energy output interface 91-I matches a battery pack mounting interface 51-I of an external the power tool 50-I, so that the electrical energy output device 9-I can be mounted on the power tool 50-I like a common battery pack 30-I and output electrical energy to the power tool 50-I. That is, another set of electrical energy input interfaces does not need to be additionally disposed on the power tool 50-I, and electrical energy provided by the battery pack receiving apparatus 100-I can be directly received by using the battery pack mounting interface 51-I. In this example, a rated output voltage of the electrical energy output interface 91-I is greater than 80 V. For example, the rated output voltage is 80 V, 100 V, 108 V, 112 V or 120 V.

As discussed above, the battery pack receiving apparatus 100-I receives one or more battery packs 30-I by using the battery pack receiving recess 5-I, and is then connected to the battery pack mounting interface 51-I of the power tool 50-I by using the electrical energy output device 9-I, to transfer electrical energy from the battery pack 30-I to the power tool 50-I. The battery pack receiving apparatus 100-I is similar to a docking station. The battery capacity is increased and/or the weight bearing position of a user is changed without changing the interfaces of the original battery pack 30-I and power tool 50-I.

In some different implementations, the quantity and circuit connection relationships of the battery pack receiving recesses 5-I have various optional configuration forms.

However, in each implementation, the battery pack receiving apparatus 100-I is configured correspondingly. For example, circuit connection relationships of the each battery pack receiving recess 5-I are properly set, or a transformer is disposed, or a transformer and a power supply regulator are disposed, to control a rated output voltage of the electrical energy output device 9-I.

For example, continuing to refer to FIG. 1-I to FIG. 3-I, in this example, the battery pack receiving apparatus 100-I has multiple battery pack receiving recesses 5-I. In this example, by configuring a series/parallel relationship between the battery pack receiving recesses 5-I, it is implemented that the rated output voltage of the electrical energy output interface is greater than 80 V. In some examples, a rated voltage of the battery pack 30-I is greater than 80 V. In other examples, there are multiple battery packs, and a sum of rated voltages of the battery packs is greater than 80 V.

It should be noted that, the rated output voltage here is a voltage externally output by the battery pack receiving apparatus after battery packs meeting a particular condition are mounted in the battery pack receiving apparatus. The particular condition here may be that the battery pack receiving recesses 5-I all receive the battery packs 30-I, or some specific battery pack receiving recess 5-I all receive the battery packs 30-I.

For example, the battery pack receiving recesses 5-I may have a same specification, and are suitable for receiving same battery packs 30-I. If the rated output voltage of the electrical energy output interface 91-I is 108 V, the battery pack receiving recesses 5-I may be two or more 108V battery pack receiving recesses 5-I that are connected to each other in parallel, or may be two 54V battery pack receiving recesses 5-I that are connected to each other in series, or may be several groups of battery pack receiving recesses 5-I that are connected to each other in parallel. Each group of battery pack receiving recesses 5-I include 2 54V battery pack receiving recesses 5-I that are connected to each other in series. There may further be many other similar combination manners, which are no longer enumerated.

As discussed above, specifically, in this example, receiving interfaces of at least two battery pack receiving recesses 5-I match a battery pack interface 31-I of a battery pack 30-I whose rated voltage is less than 60 V. For example, the battery pack receiving apparatus 100-I has two battery pack receiving recesses 5-I. Receiving interfaces of the two battery pack receiving recesses 5-I both match a battery pack interface 31-I of a battery pack 30-I whose rated voltage is 54 V. For another example, the battery pack receiving apparatus 100-I has 4 battery pack receiving recesses 5-I. Receiving interfaces of the 4 battery pack receiving recesses 5-I all match a battery pack interface 31-I of a battery pack 30-I whose rated voltage is 27 V.

In this example, the receiving interfaces are the same as each other, and the receiving interfaces is also the same as the matching battery pack mounting interface 51-I of the external power tool 50-I. That is, a same battery pack 30-I can be mounted on both the power tool 50-I and the battery pack receiving apparatus 100-I. However, because a rated output voltage of a single battery pack is different from a rated output voltage of a battery pack receiving apparatus, the external power tool 50-I needs to have voltage adaptability. A same battery pack mounting interface can receive both a low voltage input and a high voltage input. Certainly, in another optional example, the receiving interface may alternatively be different from the matching battery pack mounting interface 51-I of the external power tool 50-I.

In another example, the battery pack receiving recesses 5-I has various specifications, that is, may receive battery packs 30-I of various specifications, and a fixed rated output voltage of the electrical energy output interface 91-I is implemented by configuring a suitable series-parallel circuit relationship between the battery pack receiving recesses 5-I. For example, the rated voltage of the electrical energy output interface 91-I is 108 V, and the battery pack receiving recesses 5-I may include 1 54V battery pack receiving recess 5-I and 2 27V battery pack receiving recesses 5-I. The battery pack receiving recesses 5-I are connected to each other in series. The battery pack receiving recesses 5-I may alternatively include several groups of battery pack receiving recesses 5-I that are connected to each other in parallel, and an output voltage of each group of battery pack receiving recesses 5-I is 108 V. However, the battery pack receiving recesses 5-I in each group are connected in series. For example, one group of battery pack receiving recesses 5-I includes 3 36V battery pack receiving recesses that are connected in series; another group of battery pack receiving recesses 5-I includes 2 54V battery pack receiving recesses 5-I that are connected in series, and still another group of battery pack receiving recesses 5-I includes one 54V battery pack receiving recess 5-I and two 27V battery pack receiving recesses 5-I; and the like. There may further be many other similar combination manners, which are no longer enumerated.

In this example, receiving interfaces of the battery pack receiving recesses 5-I have various specifications, that is, the battery pack receiving apparatus 100-I may receive battery packs 30-I of various specifications. Moreover, at least one receiving interface is the same as the external the battery pack mounting interface 51-I of the power tool 50-I, and the electrical energy output interface 91-I matches the battery pack mounting interface 51-I of the power tool 50-I. However, another receiving interface of the battery pack receiving apparatus 100-I may be the same as or may be different from the battery pack mounting interface of the power tool 50-I, and may match or may not match the electrical energy output interface 91-I. Certainly, in another optional implementation of this example, none of the receiving interfaces may be the same as the external the battery pack mounting interface 51-I of the power tool 50-I, and it is only ensured that the electrical energy output interface 91-I matches the battery pack mounting interface 51-I of the power tool 50-I.

In another example of the present invention, the battery pack receiving apparatus further includes a transformer located between the electrical energy output interface 91-I and the receiving interface. The transformer converts an input voltage at an end of the receiving interface into a rated output voltage at an end of the electrical energy output interface. In this way, the battery pack receiving apparatus may have more flexible configuration manners for battery pack receiving recesses, and a series/parallel relationship between the receiving interfaces does not need to be used to provide a particular rated output voltage. In this example, when battery packs received in the battery pack receiving apparatus meet a minimal quantity and/or a voltage requirement, the transformer controls the battery pack receiving apparatus to output a predetermined rated output voltage, for example, 80 V, 100 V, 108 V or 120 V.

As discussed above, in several examples of the present invention, the rated output voltage of the electrical energy output interface 91-I is above 80 V. For a relatively high rated output voltage, the advantage of the wearable battery pack receiving apparatus 100-I can particularly be fully utilized. A high voltage usually means a relatively large output power and battery capacity, that is, a relatively large weight. Therefore, user experience is significantly improved when the wearable battery pack receiving apparatus 100-I is carried. Correspondingly, the battery pack receiving apparatus 100-I of the present invention is particularly suitable for use in a power tool that needs a high output power and/or high battery capacity. The power tool is, for example, a chainsaw, a lawn mower or pruning shears.

In another example of the present invention, the rated output voltage of the electrical energy output interface 91-I is adjustable. In this way, the battery pack receiving apparatus may provide energy to various power tools having different input voltages, thereby improving the application scope of the product.

In one example, the battery pack receiving apparatus 100-I further includes a transformer and a voltage regulator connected to the transformer. The transformer is located between the electrical energy output interface and the receiving interface, and converts an input voltage at an end of the receiving interface into a rated output voltage at an end of the electrical energy output interface. The voltage regulator adjust a value of the rated output voltage.

To adapt to power tools of various types, in this example, an adjustment range the value of the rated output voltage is between 20 V and 120 V.

The voltage regulator may be an operation interface for a user to directly specify a rated output voltage, or may adaptively adjust a monitoring apparatus for a rated output voltage according to a working condition.

For example, the operation interface may be one voltage adjustment knob. The voltage adjustment knob is located on the main body 1-I or on the electrical energy output device, and has multiple shifts, for example, 20 V, 28 V, 40 V, 56 V, 80 V, 100 V, 108 V, 112 V, and 120 V. Certainly, the voltage adjustment knob may alternatively be steplessly adjustable. In another implementation, the operation interface may alternatively be another suitable form such as a push button and a touch panel, and details are no longer described herein.

The monitoring apparatus monitors a signal or parameter at the electrical energy output interface 91-I, and adjusts the value of the rated output voltage according to the signal or parameter.

In an implementation, there are various types of electrical energy output interface 91-I that are separately suitable for being mounted on various different power tools. For example, an electrical energy output interface is suitable for being mounted on a small electric drill, and an electrical energy output interface is suitable for being mounted on a large lawn mower. These different power tools have different input voltages. Various types of electrical energy output interfaces 91-I are interchangeably mounted on the wearable battery pack receiving apparatus 100-I. In an implementation, the electrical energy output interface 91-I itself is separately replaced as one component. In another implementation, the electrical energy output interface 91-I and the electrical energy output device are replaced as a whole. The monitoring apparatus monitors a signal or parameter representing a type of the electrical energy output interface 91-I, and adjusts the value of the rated output voltage according to the type. For example, when the type of the electrical energy output interface 91-I adapts to an electrical energy output interface of a 20V electric drill, the monitoring apparatus enables, according to the type, the transformer to adjust the rated output voltage of the battery pack receiving apparatus 100-I to 20 V. When the type of the electrical energy output interface 91-I adapts to an electrical energy output interface of a 56V lawn mower, the monitoring apparatus enables, according to the type, the transformer to adjust the rated output voltage of the battery pack receiving apparatus 100-I to 56 V. In an implementation, the electrical energy output interface 91-I may send a recognition signal to the battery pack receiving apparatus 100-I, where the recognition signal indicates the type of the electrical energy output interface 91-I. In another implementation, an electronic component such as a recognition resistor is built in the electrical energy output interface 91-I. The monitoring apparatus correspondingly selects a suitable rated output voltage according to an interface type output by a parameter driving circuit of the recognition resistor.

In an implementation, the electrical energy output interface 91-I has a standard specification, but can be mounted on various power tools 50-I on a same interface platform. The power tools on the platform have different input voltages. The monitoring apparatus monitors a signal or parameter representing a type of a power tool, and adjusts the value of the rated output voltage according to the type. For example, when recognizing that the power tool is a 20V electric drill, the monitoring apparatus enables, according to the type, the transformer to adjust the rated output voltage of the battery pack receiving apparatus 100-I to 20 V. When recognizing that the power tool is a 56V lawn mower, the monitoring apparatus enables, according to the type, the transformer to adjust the rated output voltage of the battery pack receiving apparatus 100-I to 56 V. In an implementation, the power tool 50-I may send a recognition signal to the battery pack receiving apparatus 100-I, where the recognition signal indicates the type of the power tool 50-I. In another implementation, an electronic component such as a recognition resistor is built in the power tool 50-I. The monitoring apparatus correspondingly selects a suitable rated output voltage according to an interface type output by a parameter driving circuit of the recognition resistor.

In another example of the present invention, the battery pack receiving apparatus further includes a charger for charging a received battery pack. The charger has a charging interface that can be connected to an external power supply. In this way, the battery pack receiving apparatus 100-I may be connected to an external power supply such as mains electricity, and charges a battery pack in the battery pack receiving apparatus 100-I.

In another example of the present invention, parts that may contact human body, for example, the main body, the wearable component, and/or the like of the battery pack receiving apparatus, includes an insulation protection layer, so as to prevent human body from injury when a battery pack has electricity leakage, a short circuit, or the like. In some examples of the present invention, the overall rated output voltage of the battery pack receiving apparatus is already greater than 80 V. The voltage of a single pack may be up to 50 V or even higher. An insulation layer may be provided to prevent severe accidental injury.

In some examples of the present invention, a rated output voltage of a single battery pack 30-I is already relatively large, for example, is above 50 V or even above 100 V. In this way, the battery pack 30-I is usually relatively thick and heavy, and the thickness of the battery pack 30-I is usually greater than 10 CM. The weight of the battery pack 30-I is also considerable. After multiple battery packs are combined, the total weight may be up to 10 kilograms or higher. It may be seen that after the multiple battery packs 30-I are filled in the battery pack receiving apparatus 100-I, the entire battery pack receiving apparatus 100-I is heavy. In addition, because the battery packs have large thickness, the overall center of gravity is in the back. When a user carries the battery pack receiving apparatus 100-I on the back, the body of the user easily tilt backward, resulting in poor experience and a particular risk of falling. To resolve this problem, as shown in FIG. 1-I, in some examples of the present invention, a single battery pack 30-I is designed to be relatively thin and is generally elongated, for example, has a strip shape or an L shape. The thickness of a thinnest position of a part, receiving a battery, of the battery pack 30-I is less than 5 cm. At most two layers of batteries are received in the thickness direction of the battery pack 30-I. In this way, after the battery pack receiving apparatus 100-I is filled in the battery pack 30-I, the overall center of gravity is close to the user, so that it is relatively not easy for the user to tilt backward, so as to achieve comfort and safety.

Figures 1, 4:
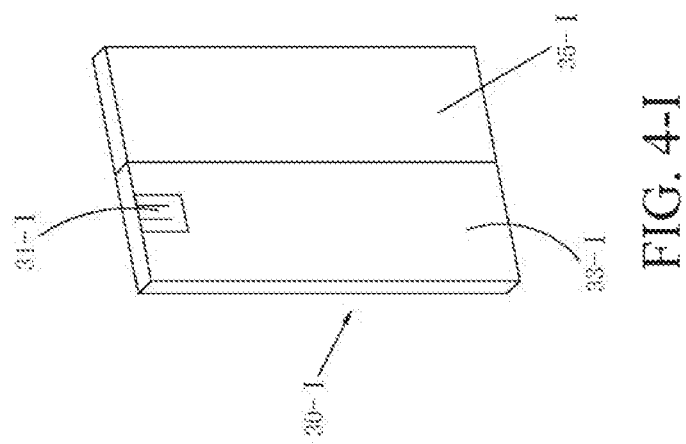
FIG. 4-I is a schematic diagram of an unfolded state of a foldable battery pack according to an implementation of the present invention.

However, because the volume of a battery pack with particular capacity has a lower limit, after the battery pack 30-I is made relatively thin, the length and width of the battery pack 30-I correspondingly increase. In this case, it is relatively not easy to mount the battery pack 30-I on the power tool 50-I. For this reason, as shown in FIG. 4-I to FIG. 6-I, in an implementation of the present invention, the battery pack 30-I is foldable, and at least includes a first body 33-I and a second body 35-I. The first body 33-I and the second body 35-I separately receive several batteries. A battery in the first body 33-I and a battery in the second body 35-I are electrically connected to each other. Moreover, the first body 33-I and the second body 35-I are connected in a mutually displaceable manner. The battery pack interface 31-I is arranged on the first body 33-I. In this example, the first body 33-I and the second body 35-I are connected in a foldable manner, and have an unfolded state shown in FIG. 4-I and a folded state shown in FIG. 5-I. In an unfolded state, the overall length of the battery pack 30-I is large and the overall thickness of the battery pack 30-I is small, and the battery pack 30-I is suitable for being mounted in the battery pack receiving apparatus 100-I. In the folded state, the overall length of the battery pack 30-I is small and the overall thickness of the battery pack 30-I is large, and the battery pack 30-I is suitable for being mounted on the power tool 50-I. In another optional example, the first body 33-I and the second body 35-I may alternatively be disposed to be connected to each other in a slideable manner.

To enable the center of gravity of the battery pack receiving apparatus 100-I in the form of a back pack to be as near as possible to the back of a user, in this example, the main body 1-I has a bottom for being attached to the back of a user, and multiple battery pack receiving recesses 5-I are disposed on the main body 1-I. The battery pack receiving recesses 5-I are tiled at the bottom, and are not overlapped with each other to become thick.

Figures 1, 8:
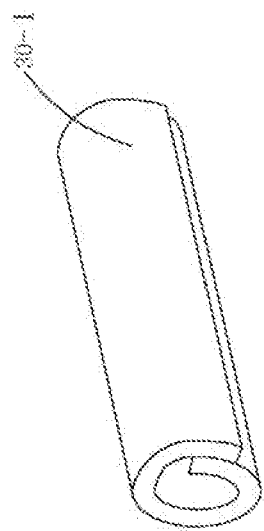
FIG. 8-I is a schematic diagram of a rolled state of the flexible battery pack shown in FIG. 7-I.
Figures 1, 9:
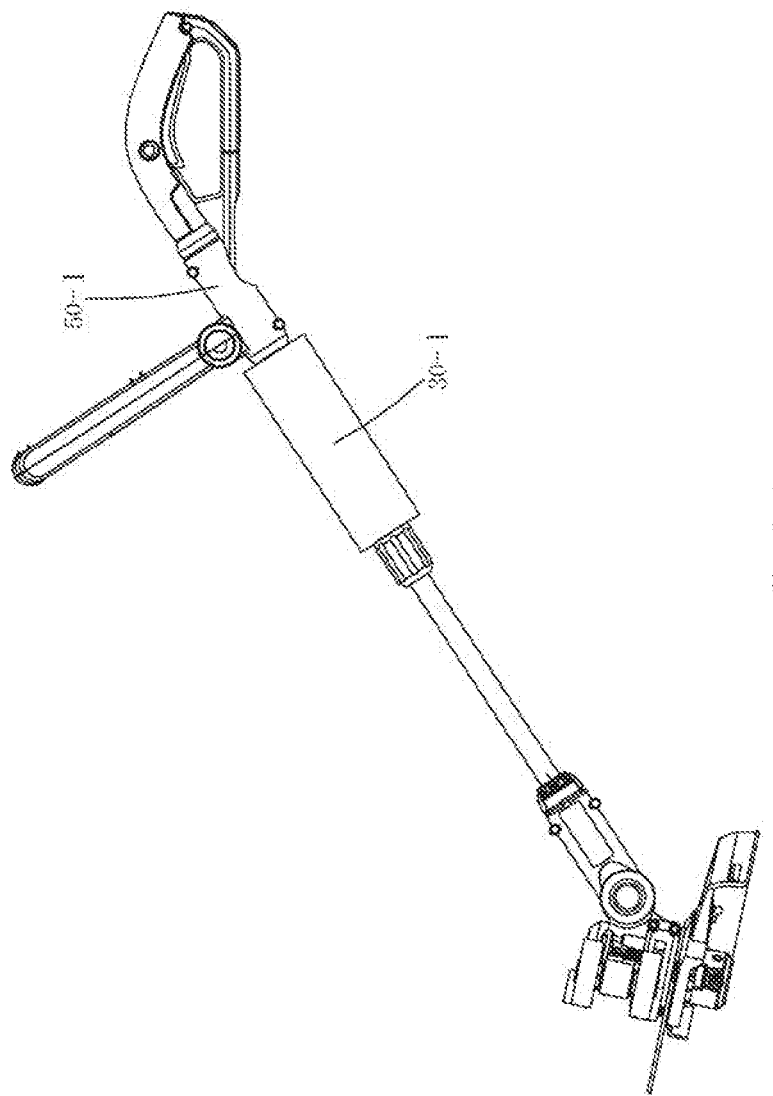
FIG. 9-I is a schematic diagram of the flexible battery pack shown in FIG. 8-I being mounted on a power tool.

In another example of the present invention, a housing of the battery pack 30-I is made of a flexible material. The shape of the battery pack 30-I may change within a particular range. For example, the battery pack 30-I may have an unfolded state shown in FIG. 7-I and a rolled state shown in FIG. 8-I. In the unfolded state, the battery pack 30-I is relatively thin and is used to be suitable for being mounted in the battery pack receiving apparatus 100-I, so that the center of gravity is near the front. In the rolled state, as shown in FIG. 9-I, the battery pack 30-I may be sleeved over a rod of the power tool 50-I or another elongated portion suitable for rolled mounting.

Because the overall rated output voltage of the battery pack receiving apparatus 100-I is relatively large, a possible heat generation problem is relatively severe during working. Therefore, in an implementation of the present invention, as shown in FIG. 10-I, a vent hole 15-I is provided on the battery pack receiving apparatus 100-I, facilitating timely elimination of the heat dissipated from the battery pack 30-I. In one example, the vent hole 15-I is arranged on a lateral surface of the battery pack receiving apparatus 100-I.

Because a user probably wears the battery pack receiving apparatus 100-I to work in a severe outdoor working condition, the battery pack receiving apparatus 100-I is consequently susceptible to rain or exposed to a high humidity environment. Therefore, in an implementation of the present invention, as shown in FIG. 10-I, the main body 1-I of the battery pack receiving apparatus 100-I includes a bag body 13-I and a cover 11-I. The battery pack receiving recesses 5-I is disposed in the bag body 13-I. The cover 11-I operatively closes and opens the bag body 13-I. The cover 11-I includes a waterproof layer. In one example, as shown in FIG. 10-I, the edge of the cover 11-I covers but does not seal the vent hole 15-I for both waterproofing and heat dissipation.

During working and transportation, the battery pack receiving apparatus 100-I may be susceptible to relatively intense vibration, and intense vibration leads to risks such as burning and explosion of a battery pack. Therefore, as shown in FIG. 11-I, in an implementation of the present invention, a shock absorber structure is disposed between the battery pack receiving recesses 5-I, for example, a safety airbag 17-I or soft rubber. In this example, the battery pack 30-I matching the battery pack receiving recesses is preferably a battery pack having a relatively low voltage, for example, a battery pack having a voltage less than 60 V or even less than 40 V or 30 V. Because a relatively low voltage has a relatively low risk of burning or explosion or relatively minor damage, the standard for the shock absorber structure may also be relatively low, so that the costs of production and transportation can be reduced.

The second group examples are described with reference to FIG. 1-II to FIG. 37-II.

As shown in FIG. 1-II, a working system in this example is formed of an electrical energy transmission apparatus 1-II, an energy storage component 3-II, and an electrical device 5-II. The electrical energy transmission apparatus 1-II and the energy storage component 3-II form an electrical energy supply apparatus. The electrical energy transmission apparatus 1-II is electrically connected between the energy storage component 3-II and the electrical device 5-II, and transfers electrical energy stored in the energy storage component 3-II to the electrical device for the electrical device to work. The energy storage component 3-II is a DC power supply, and specifically includes one or more battery packs. The electrical device 5-II is a DC device 21-II and/or an AC device 23-II, for example, a DC appliance, a DC power tool, an AC appliance or an AC power tool.

The electrical energy transmission apparatus 1-II includes an input component 11-II, an adapter component 15-II, and an output component 13-II. The input component 11-II is connected to the energy storage component 3-II to receive an electrical energy input. The output component 13-II is connected to the electrical device to output electrical energy to the electrical device. The adapter component 15-II is connected between the input component 11-II and the output component 13-II, converts electrical energy received by the input component 11-II into electrical energy suitable for use by the electrical device, and transmits the electrical energy to the output component 13-II.

Continuing to refer to FIG. 1-II, the output component 13-II includes a DC device interface 17-II and an AC device interface 19-II. A DC output interface 17 is connected to the DC device 21-II to output electrical energy to the DC device 21-II. An AC output interface 19 is connected to the AC device 23-II to output electrical energy to the AC device 23-II.

Referring to FIG. 2-II, the energy storage component includes a primary energy storage module 71-II, the primary energy storage module 71-II includes several secondary energy storage modules 73-II, and the secondary energy storage modules 73-II includes several tertiary energy storage modules 75-II.

The primary energy storage module 71-II is a battery pack 27-II. The battery pack 27-II can work independently to supply power to a matching electrical device 5-II. The battery pack 27-II has an independent housing, a control circuit, and an electrical energy output terminal. The electrical energy output terminal is located on the housing of the battery pack 27-II. The electrical energy output terminal of the battery pack 27-II includes a positive electrode and a negative electrode, and in some examples, further includes several signal electrodes. The secondary energy storage modules 73-II have a same specification and consistent rated voltages. The secondary energy storage module 73 has an independent electrical energy output terminal, but is fixedly mounted inside a battery pack housing and cannot be detached from the battery pack 27-II for separate use. The electrical energy output terminal of the secondary energy storage module 73-II is also located on the housing of the battery pack 27-II. The electrical energy output terminal of the secondary energy storage module 73-II includes a positive electrode and a negative electrode, and in some examples, further includes several signal electrodes. In an example, the secondary energy storage module 73-II also has an independent control circuit. The tertiary energy storage module 75-II is a cell itself and does not have an independent housing and an independent control circuit.

In this example, the energy storage component 3-II includes multiple primary energy storage modules 71-II. However, in an optional alternative solution, the energy storage component 3-II only includes one primary energy storage module 71-II.

In this example, at least one primary energy storage module 71-II includes multiple secondary energy storage modules 73-II. However, in an optional alternative solution, each primary energy storage module 71-II only includes one secondary energy storage module 73-II.

In this example, the secondary energy storage module 73-II includes multiple tertiary energy storage modules 75-II.

Multiple specific configuration solutions of energy storage components are described below. In an example, at least one primary energy storage module 71-II includes multiple secondary energy storage modules 73-II. For example, as shown in FIG. 3-II and FIG. 4-II, the rated voltage of the secondary energy storage module 73-II is 20 V, and the secondary energy storage module 73-II is formed of 5 tertiary energy storage modules 75-II whose rated voltage is 4 V connected in series. The energy storage component 3-II includes 6 secondary energy storage modules 73-II in total. Every three secondary energy storage modules 73-II form one battery pack 27-II. That is, the energy storage component 3-II includes two battery packs 27-II whose rated voltages are 60 V. In this example, the rated voltage of the secondary energy storage module 73-II is a divisor of an AC standard 120-V voltage in US regions. In this way, a sum of rated voltages of several secondary energy storage modules 73-II is just equal to the AC standard voltage in US regions. For example, the sum of rated voltages of the 6 secondary energy storage modules 73-II in this example is 120 V. In such a concept, the rated voltage of the secondary energy storage module 73-II may alternatively be 10 V, 40 V or 60 V. Similarly, the rated voltage of the secondary energy storage module 73-II may alternatively be a divisor of an AC standard voltage in another district, for example, a divisor of an AC standard voltage 220 V in China, a divisor of an AC standard voltage 230 V in the UK, a divisor of an AC standard voltage 110 V in some other districts. Details are not described.

Figures 1, 5:
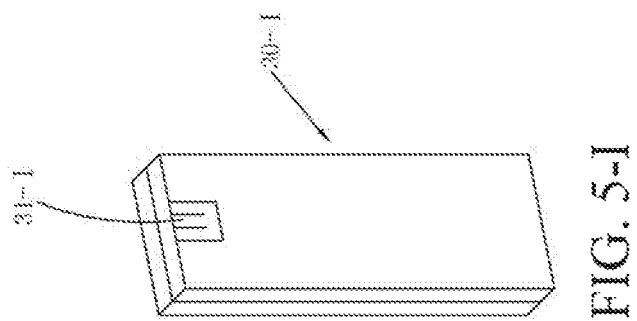
FIG. 5-I is a schematic diagram of a folded state of the foldable battery pack shown in FIG. 4-I.

In another example, at least one primary energy storage module 71-II only includes one secondary energy storage module 73-II. For example, the energy storage component 3-II also includes 6 secondary energy storage modules 73-II whose rated voltage is 20 V. As shown in FIG. 5-II and FIG. 6-II, a difference lies in that every secondary energy storage module 73-II forms one battery pack 27-II. That is, the energy storage component includes 6 battery packs whose rated voltages are 20 V. In another example, at least two primary energy storage modules 71-II have different quantities of secondary energy storage modules 73-II. For example, the energy storage component 3-II also includes 6 secondary energy storage modules 73-II whose rated voltages are 20 V. In FIG. 7-II, a difference lies in that three secondary energy storage modules 73-II together form one battery pack 27-II, and additionally the three secondary energy storage modules 73-II separately form one battery pack 27-II. That is, the energy storage component 3-II includes one battery pack 27-II whose rated voltage is 60 V, and further includes three battery packs 27-II whose rated voltages are 20 V. In another example, as shown in FIG. 8-II, the energy storage component 3-II also includes 6 secondary energy storage modules 73-II whose rated voltage is 20 V. A difference lies in that every two secondary energy storage modules 73-II together form one battery pack 27-II. That is, the energy storage component 3-II includes three battery packs 27-II whose rated voltage is 40 V.

The foregoing configuration solutions are only examples. A person skilled in the art can understand that the foregoing configuration solutions do not constitute any limitation on the present invention, and another configuration solution is also feasible. For example, the sum of rated voltages of multiple secondary energy storage modules 73-II in the foregoing solution is 120 V. However, in another optional solution, the sum may be 160 V, 200 V, 240 V, or the like. Details are not described.

A standard secondary energy storage modules 73-II is provided and a series/parallel relationship between the secondary energy storage modules 73-II is configured in the electrical energy transmission apparatus 1-II to implement multiple voltage outputs. In this example, a DC-DC voltage converter does not need to be disposed, so that the costs are reduced and the energy utilization efficiency is improved.

The following describes a manner of connection between the energy storage component and the input component.

As shown in FIG. 9-II, the input component 11-II includes a battery pack interface 28-II connected to the battery pack 27-II. The quantity of battery pack interfaces 28-II and a connection structure and a port arrangement of a single battery pack interface 28-II match the quantity of battery packs 27-II of the energy storage module 3 and a connection structure and a port arrangement of a single battery pack 27-II. In this example, there are two battery pack interfaces 28-II used to receive two 60V battery packs 27-II.

As discussed above, the housing of the battery pack 27-II has an electrical energy output terminal of the entire battery pack, and further has electrical energy output terminals of the secondary energy storage modules 73-II. However, the battery pack interface 28-II only has input terminals matching the electrical energy output terminals of the secondary energy storage modules 73-II, but does not have an input terminal matching the electrical energy output terminal of the battery pack 27-II. That is, from the perspective of a circuit, the input component directly connects the secondary energy storage modules to the electrical energy transmission apparatus, but does not have the level of a battery pack. In another optional example, the battery pack interface further includes an input terminal connected to an electrical energy output terminal of a battery pack itself.

In the design, the battery pack interface 28-II of the input component 11-II can be connected to all the battery packs 27-II of the energy storage component 3-II. However, during use, the battery pack interface 28-II of the input component 11-II is not necessarily always connected to all the battery pack 27-II.

The energy storage component 3-II including two 60V battery packs 27-II is used as an example. The battery pack interface 28-II correspondingly includes two 60V battery pack interfaces. However, according to actual use, one or two 60V battery packs 27-II may be connected to the input component 11-II.

The energy storage component 3-II including 6 20V battery packs 27-II is used as an example. The battery pack interface 28-II correspondingly includes 6 20V battery pack interfaces. However, according to actual use case, the input component 11-II may be connected to 1 battery pack 27-II to 6 battery packs 27-II.

The energy storage component 3-II including 1 60V battery pack and 3 20V battery packs is used as an example. The battery pack interface 28-II correspondingly includes 1 60V the battery pack interface and 3 20V battery pack interfaces. However, according to actual use case, the input component 11-II may be connected to 1 60V battery pack 27-II, or may be connected to 3 20V battery packs 27-II, or may be connected to another quantity of battery packs 27-II and another type of battery packs 27-II.

The energy storage component 3-II including 3 40V battery packs 27-II is used as an example. The battery pack interface 28-II correspondingly includes 3 40V battery pack interfaces. However, according to actual use, the input component may be connected to 1 40V battery pack 27-II to 3 40V battery packs 27-II.

The following describes the adapter component 15-II.

The adapter component 15-II is located between the input component 11-II and the output component 13-II of the electrical energy transmission apparatus 1-II, and converts electrical energy received by the input component 11-II into a suitable form and provides the electrical energy in the suitable form to the output component 13-II. For example, by using series and parallel configuration, the connected secondary energy storage modules 73-II output different voltages to the output component 13-II in different scenarios. In this example, the adapter component 15-II enables the 6 20V secondary energy storage modules 73-II by using series and parallel configuration to output voltages such as 20 V, 40 V, 60 V, 80 V, 100 V, and 120 V.

FIG. 10-1-II is used as an example. A first series-parallel circuit 31-II includes an input terminal 35-II and an output terminal 36-II. There are 6 pairs of input terminals, which are separately connected to positive and negative electrodes of 6 20V secondary energy storage modules 73-II A pair of output terminals is connected to the output component to supply electric energy to the output component. The 6 pairs of input terminals are connected to each other in parallel and are then connected to the output terminals, so that the output terminals outputs 20V DC electrical energy to the output component.

FIG. 10-2-II is used as an example. Similarly, positive and negative electrodes of 6 20V secondary energy storage modules 73-II are all connected to a second series-parallel circuit 32-II. Every two pairs of input terminals are connected in series to form one group. Three groups of input terminals are connected to each other in parallel and are then connected to the output terminal, so that the output terminal outputs 40V DC electrical energy to the output component.

FIG. 10-34I is used as an example. Similarly, positive and negative electrodes of 6 20V secondary energy storage modules 73-II are all connected to a third series-parallel circuit 33-II. Every three pairs of input terminals are connected in series to form one group.

Two groups of input terminals are connected to each other in parallel and are then connected to the output terminal, so that the output terminal outputs 60V DC electrical energy to the output component.

FIG. 10-4-II is used as an example. Similarly, positive and negative electrodes of 6 20V secondary energy storage modules 73-II are all connected to a fourth series-parallel circuit 34-II. The 6 pairs of input terminals are connected to each other in series and are then connected to the output terminal, so that the output terminal outputs 120V DC electrical energy to the output component.

An adapter component 3 further includes a control module. The control module selectively connects one of the series-parallel circuits to the output component according to a voltage that the output component needs to output, so as to output a suitable voltage externally. In one example, the adapter component may select a series-parallel circuit by directly using a structural cooperation instead of an electronic control form. For example, four series-parallel circuits are arranged in the adapter component in a manner of being isolated from each other. When a specific adapter or another terminal is inserted in a DC device connection terminal, one specific series-parallel circuit is connected to the circuit.

In this example, the adapter component 3 further includes an inverter, configured to convert a DC power provided by a battery pack into an AC power and provide the AC power to the output component.

The following describes the output component 13-II in this example.

Figures 1, 11:
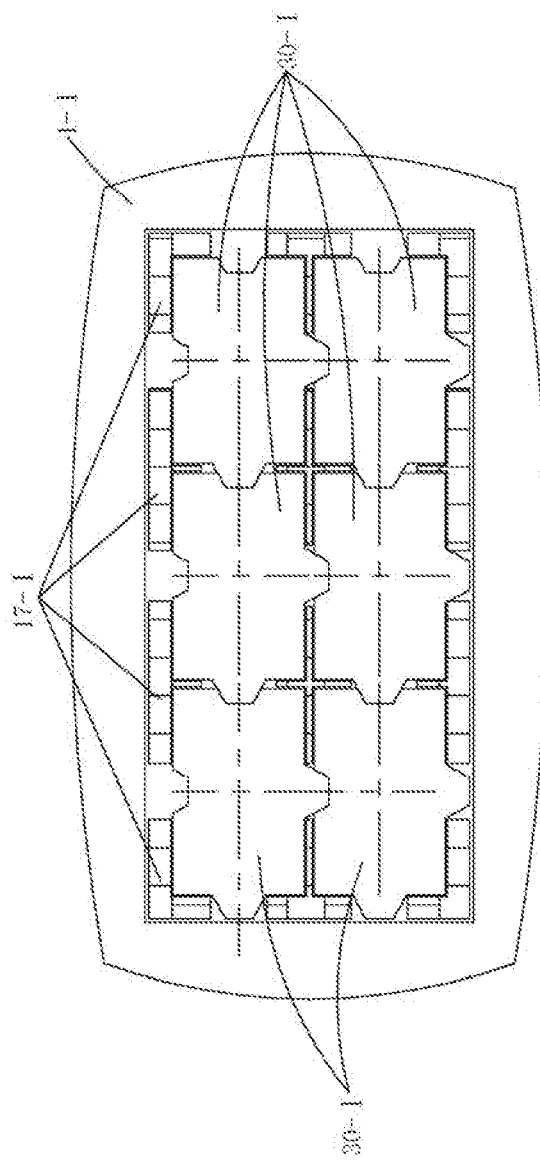
FIG. 11-I is a schematic diagram of a battery pack receiving apparatus according to an implementation of the present invention.

As shown in FIG. 11-II, the output component 13-II includes a DC device interface 41 and an AC device interface 51.

The DC device interface 41 is used to connect a DC device and supply power to the DC device. The AC device interface 51 is connected to the AC device and supply power to the AC device. In this example, the DC device interface includes 4 DC device connection terminals 43-II, separately outputting DC powers whose rated voltages are 120 V, 60 V, 40 V, and 20 V. As discussed above, the DC voltages are obtained by the multiple standard secondary energy storage modules 73-II by using suitable series and parallel configurations, and are then output to the DC device connection terminals 43-II. After a specific DC device connection terminal 43-II is connected to the DC device 21-II, the adapter component 15-II controls a corresponding series-parallel circuit to be connected to each secondary energy storage module 73-II of the input component 11-II, and the series-parallel circuit forms a needed specific voltage, and provides the specific voltage to the specific DC device connection terminal 43-II in the output component 13-II. For example, when a 60V DC device connection terminal 43-II is connected to the DC device 21-II, the adapter component 15-II is triggered to connect a third series-parallel circuit 33 to the secondary energy storage module 73-II, so as to obtain a 60V voltage and output the 60V voltage to the 60V DC device connection terminal 43-II. In this way, the electrical energy supply apparatus does not need a DC-DC transformer circuit to perform boosting or voltage reduction, so as to reduce energy loss during voltage conversion.

As shown in FIG. 19-II, the DC device connection terminal 43-II is connected to the DC device 21-II by using an adapter 61-II A case in which the DC device is a power tool 100-II is used as an example. The DC device connection terminal 43-II can be connected to different power tools 100-II by using different adapters. For example, a 20V DC device connection terminal is connected to a power tool 100-II by using one adapter 61-II, where the power tool 100-II is an electric drill. The adapter 61-II has an input terminal 63-II and an output terminal 65-II. The input terminal 63-II matches the 20V DC device connection terminal, and an electrical energy interface of the output terminal matches a battery pack interface of the electric drill. That is, the electrical energy interface is the same as an electrical energy interface of an original battery pack on the electric drill. Similarly, 40V, 60V, and 120V DC device connection terminals are separately equipped with corresponding adapters 61-II, so as to output energy to 40V, 60V, and 120V power tools 100-II. The power tools 100-II may be chainsaws, lawn mowers, or the like.

The AC device interface 51 includes an AC device connection terminal. The AC device connection terminal has a standard AC socket form. However, according to different use districts, the AC device connection terminal may be a European Standard socket, an American Standard socket, a Chinese Standard socket or a socket of another standard. The AC device connection terminal can output DC electrical energy. Specifically, in this example, the AC device connection terminal includes a first port 53-II and a second port 55-II. The first port 53-II outputs a DC power to the AC device. The second port 55-II outputs an AC power to the AC device 23-II.

In this example, the first port 53-II can externally output DC electrical energy whose rated voltage is 120 V. As discussed above, the rated voltage is obtained by using a series-parallel connection of multiple secondary energy storage modules 73-II. Because the rated voltage value of each secondary energy storage module 73-II is a divisor of an AC standard a 120V voltage, a 120V voltage may be obtained by connecting multiple secondary energy storage modules 73-II in series. In this way, the rated voltage of the DC electrical energy is basically equivalent to an AC standard voltage in a specific district, so as to obtain the capability of driving an AC device 23-II in the district.

The second port 55-II can externally output AC electrical energy whose rated voltage is 120 V. An inverter 81-II performs AC-DC conversion to obtain the rated voltage. Specifically, an adapter part 15 first obtains a 120V DC power by using the series-parallel circuit, then converts the 120V DC power by using the inverter 81-II into a 120V AC power, and outputs the 120V AC power to the second port 55-II. To control the volume and power consumption of an inverter, the maximum power of the inverter in this example is 300 W. According to a specific orientation and application scenario of a product, the maximum power of the inverter may change within a relatively large range, for example, 100 W, 200 W, 500 W, 1 KW or even 2 KW.

Even if rated voltage values match each other, the conduction of a DC power to the AC device 23-II still has a particular risk. The reason of this is mainly that some electric elements inside some AC devices 23-II cannot work normally at a DC power. A burnout may occur or an AC device may not work. For example, if the AC device 23-II includes an inductive motor or another inductive element, when a DC power is conducted, the inductive motor may burn out. If the AC device 23-II includes a speed adjustment apparatus or a speed stabilization apparatus, when a DC power is conducted, the AC device 23-II may not work. Moreover, because the AC power output by the AC device connection terminal is restricted by the maximum power of the inverter 81-II, even if when an AC power is output, the AC device connection terminal is not suitable for supplying power to some high-power AC devices. To resolve one or more of these problems, as shown in FIG. 12-II and FIG. 13-II, the electrical energy transmission apparatus 1-II further includes an output selection module 80-II. The output selection module 80-II selects a working energy output manner of the AC device connection terminal according to a characteristic of the AC device 23-II connected to the AC device connection terminal. For example, the output selection module 80-II detects whether the AC device 23-II on the AC device connection terminal is suitable for being driven by a DC power to work. For example, if yes, the AC device connection terminal outputs a DC power. Otherwise, the AC device connection terminal does not to output a DC power. For another example, the output selection module 80-II detects whether the AC device on the AC device connection terminal is a device whose power is less than a specific value. If yes, the AC device connection terminal outputs a low-power AC power. Otherwise, the AC device connection terminal does not output an AC power. Refer to the following description for details.

After the AC device connection terminal detects that an AC device 23-II is connected on the AC device connection terminal, before outputting working energy, the AC device connection terminal first outputs test energy used to test a characteristic of the AC device 23-II. The characteristic represents a working parameter of the AC device under the test energy. Then the output selection module 80-II selects a working energy output mode according to the working parameter. For example, the output selection module 80-II selects to output DC electrical energy, to output AC electrical energy or not to output working energy. The magnitude of the test energy is controlled to be less than the working energy, so as to prevent the AC device from being damaged. In this example, the test energy is restricted by using a preset manner, for example, an output power and/or an output time of the test energy is restricted.

After the working parameter of the AC device is obtained by using the test energy, the output selection module determines whether the working parameter meets a preset condition, so as to correspondingly select a working energy output mode. For example, if the working parameter meets a turn-off condition, the output selection module selects not to output working energy. If the working parameter meets a DC output condition, the output selection module selects to output DC working energy. If the working parameter meets an AC output condition, the output selection module selects to output AC working energy.

A circuit principle used by the output selection module 80-II to implement switching between the output of DC electrical energy and the output of AC electrical energy is described below with reference to FIG. 12-II and FIG. 13-II.

As shown in FIG. 12-II, the output selection module 80-II includes the battery pack 27-II and the inverter 81-II, further includes one a bypass controller 85-II. The bypass controller 85-II can selectively control whether to connect the inverter 81-II to an electrical energy transmission path. In the state in FIG. 12-II, the bypass controller 85-II close two switches 87-II at two ends of the inverter 81-II in FIG. 12-II to control the inverter 81-II to be connected to the electrical energy transmission path. The inverter converts the DC electrical energy output by the battery pack into AC electrical energy, and transfers the AC electrical energy to the AC device connection terminal in the output component 13-II. The AC device connection terminal transfers the AC electrical energy to the AC device. In this example, the voltage provided at the battery pack is 120 V, and an AC voltage output after conversion by the inverter is also 120 V. It should be noted that the battery pack shown here is only exemplary. In practice, multiple battery packs may be connected in series to form a 120V voltage.

In FIG. 13-II, the bypass controller 85-II enables the circuit transmission path to bypass the inverter. The switches 27 at two ends of the inverter are opened, and the switch 87-II between the battery pack and the AC device connection terminal is closed, so as to directly provide electrical energy at the battery pack 27-II to the AC device 23-II.

In this example, the test energy includes DC test energy and AC test energy. Correspondingly, the working parameter also includes a DC working parameter and an AC working parameter. The following describes in detail how to select a working energy output manner according to the DC working parameter, the AC working parameter, and a preset determining condition.

FIG. 14-II is a working flowchart of the system when a first port of the output DC working energy is connected to the AC device.

As shown in FIG. 14-II, first, the first port outputs AC test energy. The AC test energy is provided by the inverter. That is, the AC test energy is a 120V AC power. A rated power of the AC test energy means the rated power of the inverter is small, for example, less than 300 W. A relatively small inverter can reduce the volume and costs of the system.

Then, a test current I1 under the AC test energy is detected. Because the operation is still unstable at the initial stage after the AC device is powered on, the current fluctuates relatively widely. In this example, the current value of the test current I1 is detected after a preset time after the AC device is powered on, where the preset time is specifically 3 seconds. In addition, because the detection of the value of a DC power is simpler and more reliable than the detection of the value of an AC power, the test current I1 is a DC power before inversion.

In the step of applying the AC test energy to the AC device, the system restricts the test energy by using a manner of restricting the output power of the AC test energy, and moreover, also restricts the test energy by using a manner of restricting the output duration of the AC test energy. For example, after the value of the test current I1 is measured, the system stops outputting the AC test energy, that is, restricts the output duration to 3 seconds.

After the test current I1 is measured, the first port stops outputting the AC test energy, and switches to output DC test energy to the AC device. The DC test energy is a 120V DC power.

Then, a test current I2 under the DC test energy is detected. In addition, because the operation is still unstable at the initial stage when the AC device is powered on, in this example, the current value of the test current I2 is detected after a preset time after the AC device is powered on. However, at the same time, because a risk exists when a DC power is conducted to the AC device, during the test, the power-on time of the DC power also cannot be excessively long. In this example, the DC power is further turned off within a preset power-on time. Specifically, in this example, the test current I2 is detected after the AC device is powered on for 0.5 second, and the output of the DC power is cut off instantly after the detection is completed. Similarly, because the detection of the value of a DC power is simpler and more reliable than the detection of the value of an AC power, the test current I2 is a DC power before inversion, and a sampling position of the test current I2 is the same as a sampling position of the test current I1.

In the step of applying the DC test energy to the AC device, the system restricts the test energy by using a manner of restricting the output duration of the DC test energy. That is, after the value of the test current I2 is measured, the system stops outputting the DC test energy.

After the value of the test current I1 and the value of the test current I2 are obtained, the output selection module 80-II compares the values of the test current I1 with the test current I2. If the relationship between the values of the test current I1 and the test current I2 meets a DC output condition, the first port outputs DC working energy. If the relationship does not meet the DC output condition or meets a turn-off condition, the first port does not output working energy.

This procedure mainly detects whether a risk of a burnout exists when a DC power is connected to the AC device 23-II. As discussed above, the risk of a burnout mainly involves an inductive load such as an inductive motor in the AC device 23-II. The inductive load works normally at an AC power. However, at a DC power, after the current becomes stable, there is basically no resistance. As a result, the AC device 23-II is short circuited or the resistance is much less than that during normally working, and further the current becomes excessively large to cause a burnout. Based on this characteristic of an inductive load, this procedure mainly determines whether the test current I2 under DC test energy is much greater than the test current I1 under AC test energy. If I2 is much greater than I1, it indicates that the impedance that exists when an AC power is connected to the AC device 23-II is much greater than the impedance that exists when a DC power is connected. That is, it indicates that it is a large-probability event that an inductive load exists in the AC device. In this case, the output selection module 80-II selects not to output working energy. If a value difference between I2 and I1 is within a proper range, for example, I2 and I1 are basically equivalent, or a proportional relationship or difference between I2 and I1 is within a preset range, or even I2 is less than I1, it indicates that it is a large probability event that no inductive load exists in the AC device. In this case, the output selection module 80-II selects to output DC working energy.

Based on the foregoing determining principle, the DC output condition in this example is I2<10*I1, and correspondingly, the turn-off condition is I2>10*I1. In another example, the DC output condition is I2<5*I1, and correspondingly, the turn-off condition is I2>5*I1. In another example, the DC output condition is I2<I1+10 A, and correspondingly, the turn-off condition is I2>I1+10 A. Specific determining conditions are different according to different application scenarios, and are no longer enumerated herein.

FIG. 15-II is a working flowchart of the system when the AC device 23-II is connected to the second port 55-II. The second port 55-II outputs DC working energy.

As shown in FIG. 15-II, first, the second port 55-II outputs AC test energy. The AC test energy is provided by the inverter 81-II. That is, the AC test energy is a 120V AC power. A rated power of the AC test energy is the rated power of the inverter 81-II, and is, for example, less than 300 W.

Then, a test current I1 under the AC test energy is detected. Because the operation is still unstable at the initial stage when the AC device 23-II is powered on, the current fluctuates relatively widely. In this example, the current value of the test current I1 is detected after a preset time after the AC device 23-II is powered on, where the preset time is specifically 3 seconds. Similarly, the test current I1 is a DC power before inversion.

In the step of applying the AC test energy to the AC device 23-II, the system restricts the test energy by using a manner of restricting the output power of the AC test energy, and moreover, also restricts the test energy by using a manner of restricting the output duration of the AC test energy. For example, after the value of the test current I1 is measured, if it is determined not to output AC working energy, the system stops outputting the AC test energy, that is, restricts the output duration to 3 seconds.

After the test current I1 is measured, the output selection module 80-II compares the test current I1 with a preset current value. If a value relationship between the test current I1 and the preset current value meets the AC output condition, the second port outputs AC working energy. If the value relationship does not meet the AC output condition, or meets the turn-off condition, the second port does not output AC working energy.

In this example, the AC output condition is that the test current I1 is less than the preset current value, for example, is less than the preset current value 2.5 A. The turn-off condition is that the test current I2 is greater than the preset current value, for example, is greater than the preset current value 2.5 A.

After the AC working energy is output, the system still continues detecting the output power of the second port 55-II. If the output power is less than a preset value, the second port 55-II keeps outputting AC working energy. If the output power is greater than the preset value, the second port 55-II is turned off and stops outputting AC working energy.

This procedure mainly detects whether the load of the connected AC appliance 23 is within the bearing range of the electrical energy supply apparatus. More specifically, it is detected whether the power of the connected AC device is below a rated power of a DC-AC inverter 81-II. For example, if the rated power of the inverter is 300 W and the AC output voltage is 120 V, the test current I1 should be less than 2.5 A. If it is measured during detection that the test current is greater than 2.5 A, the output selection module determines that the load of the AC device is excessively large and exceeds the bearing range of the inverter 81-II, the output selection module selects not to output AC working energy. Similarly, when it is measured during working that the working current greater is than 2.5 A, the output selection module also selects to be turned off, and stops the output of AC working energy.

In this example, the output power of the DC working energy of the first port is greater than the output power of the AC working energy of the second port. For example, the output power of the first port may be above 2 KW or even reach 5 KW. However, the output power of the second port is only between 200 W and 500 W.

The configurations of the AC device interface 19-II in this example are to optimize the comprehensive performance of the electrical energy transmission efficiency, costs, volume, and adaptive surface of the system. This electrical energy supply apparatus uses a battery pack as a DC power supply to achieve exemplary portability, so that a user can carry the electrical energy supply apparatus to various occasions in which no electrical energy is supplied and use the electrical energy supply apparatus as a power supply. The occasions are, for example, picnics or outdoor work.

However, many electrical devices, for example, various chargers, microwave ovens or AC power tools, are AC devices. Usually, a DC source electrical energy supply apparatus cannot supply power to these AC devices. The reason of this is mainly that if the electrical energy supply apparatus is to provide an AC power output, an inverter needs to be equipped to perform AC-DC conversion. The AC-DC conversion has two major disadvantages: 1. The electrical energy consumption is large in and conversion process, and is usually above 25%. In consideration of that a DC source such as a battery pack has a limited storage capability, this degree of consumption greatly reduces a working time, affecting the usability of the product. 2. An inverter has high costs, a large volume, and a heavy weight, and the costs, volume, and weight of an inverter increase as the rated output power of the inverter increases. As a result, the electrical energy supply apparatus is expensive and bulky, which suppresses clients' desire to purchase and use the electrical energy supply apparatus. If a DC power is directly supplied to the AC device, the potential dangers described above may exist.

To resolve the foregoing problem, the AC device interface in this example provides a DC voltage output that is basically equivalent to an AC voltage, that is, an AC voltage output with low power consumption. In this way, an AC device such as a microwave oven and an AC tool with relatively high power consumption is powered by using DC electrical energy. Therefore, the efficiency loss is low, and the working time is long. Moreover, an output selection circuit is used to avoid supply of power to an AC device that is not suitable for being driven by a DC, thereby ensuring safety. Moreover, low-power AC appliances such as various chargers and lamps are powered by using AC electrical energy. Although there is still a loss in conversion efficiency, because power consumption is low, the total energy loss is small. Moreover, because an inverter has low power consumption, the costs and volume of the electrical energy supply apparatus are not significantly increased. In conclusion, the AC device interface in this example meets the power supply requirements of most of the AC devices, the costs and volume are not significantly increased, and the total energy loss is small.

FIG. 16-II is a schematic diagram of an output component according to another example of the present invention. Similarly, the output component includes a DC device interface 41-II and an AC device interface 51-II. Different from the foregoing example, the DC device interface 41-II and the AC device interface 51-II in this example both include only one output terminal. The DC device connection terminal 43-II of the DC device interface 41-II can output multiple voltages. The AC device connection terminal 53-II of the AC device interface 51-II can output DC electrical energy and AC electrical energy.

The DC device connection terminal 41-II selects different output voltages according to connected devices. As shown in FIG. 11-II, in this example, the DC device connection terminal supplies power to a DC device by using the adapter 61-II. The DC device connection terminal recognizes different adapters to select different output voltages. Specifically, the shape of the DC device connection terminal 43-II is basically one jack. The adapter has an input terminal 63-II and an output terminal 65-II. The input terminal 63-II is a plug matching the jack. The output terminal 65-II matches a power supply input terminal of the DC device. For example, the DC device is a power tool 100-II equipped with a detachable battery pack, and the output terminal of the adapter is consistent with an interface part of a battery pack of the power tool, so that the output terminal of the adapter can be connected to the power tool 100-II to supply power to the power tool 100-II.

As shown in FIG. 17-II, multiple terminals are arranged in the jack-shaped DC device connection terminal 43-II, and further include, in addition to positive and negative power supply terminals 45-II, multiple recognition terminals 47-II. Multiple terminals are also arranged on an input terminal of the adapter shown in FIG. 18-II, and further include, in addition to positive and negative power supply terminals 67-II, one feature terminal 69-II. Matching guide structures are disposed on a jack and a plug, so that the plug can be inserted in the jack at only a specific angle, and when the plug is inserted, positive and negative terminals of the plug and the jack are joined to each other, and the feature terminal 69-II is connected to a specific recognition terminal 47-II. In this way, the DC device interface 17-II of the output component 13-II can determine, by using a feature terminal 69-II connected to the recognition terminal 47-II, a model of the connected adapter 61-II, and correspondingly output a specific voltage.

In this example, four adapters 61-II are provided. After input terminals 63-II of the four adapters 61-II are connected to the DC device connection terminals 43-II, the DC device connection terminals 43-II are separately triggered to provide 20V, 40V, 60V, and 120V DC working energy. Output terminals 65-II of the four adapters 61-II are separately suitable for being connected to 20V, 40V, 60V, and 120V power tools 100-II.

Similar to the previous example, as shown in FIG. 20-II, for the AC device connection terminal, specifically, a first port 53-II is also a standard AC jack, and a plug of an AC device may be inserted in the standard AC jack. A difference lies in that the output selection module determines a type of the AC device by using test energy, and selects to output DC working energy, to output AC working energy or not to output working energy.

FIG. 21-II is a working flowchart of the system when the AC device connection terminal in this example is connected to the AC device 23-II.

As shown in FIG. 21-II, first, the AC device connection terminal outputs AC test energy. The AC test energy is provided by the inverter. That is, the AC test energy is a 120V AC power. A rated power of the AC test energy, that is, a rated power of the inverter, is less than a specific value, for example, less than 300 W.

Then, a test current I1 under the AC test energy is detected. Because the operation is still unstable at the initial stage when the AC device is powered on, in this example, the current value of the test current I1 is detected after a preset time after the AC device is powered on, where the preset time is specifically 3 seconds. Similar to the previous example, the test current I1 is a DC power before inversion.

In the step of applying the AC test energy to the AC device, the system restricts the test energy by using a manner of restricting the output power of the AC test energy, and moreover, also restricts the test energy by using a manner of restricting the output duration of the AC test energy. For example, after the value of the test current I1 is measured, if it is determined not to output AC working energy, the system stops outputting the AC test energy, that is, restricts the output duration to 3 seconds.

After the test current I1 is measured, the output selection module 80-II compares the test current I1 with the preset current value. If a value relationship between the test current I1 and the preset current value meets an AC output condition, the AC device connection terminal outputs AC working energy. In this example, the AC output condition is that the test current I1 is less than the preset current value, for example, is less than the preset current value 2.5 A.

After outputting the AC working energy, the system still continues detecting the output power of the AC device connection terminal. If the output power is less than the preset value, the AC device connection terminal keeps outputting AC working energy. If the output power is greater than the preset value, the AC device connection terminal is turned off and stops outputting AC working energy.

The step mainly detects whether the load of the connected AC device 23-II is within the bearing range of the electrical energy supply apparatus. If the output selection module 80-II determines that the load of the AC device is excessively large and exceeds the bearing range of the inverter 81-II, the output selection module 80-II selects not to output AC working energy. Similarly, if it is measured during the output of working energy that the test current is greater than 2.5 A, the output selection module also selects to be turned off and stops outputting AC working energy.

When the output selection module 80-II compares the test current I1 with the preset current value, if a value relationship between the test current I1 and the preset current value does not meet the AC output condition, the output selection module 80-II continues detecting whether the AC device 23-II is suitable for being connected to DC working energy. Specifically, the AC device connection terminal stops outputting the AC test energy, and switches to output DC test energy to the AC device 23-II. The DC test energy is a 120V DC power.

Then, the test current I2 under the DC test energy is detected. Similarly, because the operation is still unstable at the initial stage when the AC device 23-II is powered on, in this example, the current value of the test current I2 is detected after a preset time after the AC device 23-II is powered on. However, moreover, because a risk exists when a DC power is connected to the AC device, during the test, the power-on time of the DC power also cannot be excessively long. In this example, the DC power is further turned off within a preset power-on time. Moreover, in this example, the test current I2 is detected after the AC device 23-II is powered on for 0.5 second, and the output of the DC power is cut off instantly after the detection is completed. Moreover, because the detection of the value of a DC power is simpler and more reliable than the detection of the value of an AC power, the test current I2 is a DC power before inversion, and a sampling position of the test current I2 is the same as a sampling position of the test current I1.

In the step of applying the DC test energy to the AC device 23-II, the system restricts the test energy by using a manner of restricting the output duration of the DC test energy. That is, after the value of the test current I2 is measured, the system stops outputting the DC test energy.

After the value of the test current I1 and the value of the test current I2 are obtained, the output selection module 80-II compares the test current I1 with the test current I2. If a value relationship between the test current I1 and the test current I2 meets the DC output condition, the connection terminal of the AC device 23-II outputs DC working energy.

If the relationship does not meet the DC output condition or meets the turn-off condition, the connection terminal does not output working energy.

Same as the previous example, the DC output condition in this example is I2<10*I1, and correspondingly, the turn-off condition is I2>10*I1.

In this example, the DC device interface 17-II only has one DC device connection terminal 43-II, and multiple voltages are output by using one port. A user does not need to select an interface and only needs to connect the DC device 21-II to the DC device connection terminal 43-II to enable the DC device connection terminal 43-II to output a corresponding voltage, so that the operation is relatively simple and direct. The AC device 23-II also has only one AC device connection terminal. A user only needs to connect the AC device 23-II to the AC device connection terminal to enable the AC device connection terminal to automatically detect a characteristic of the AC device, and correspondingly outputs DC working energy or AC working energy or does not output working energy. The operation is simple and direct.

The following describes another example of the present invention with reference to FIG. 22-II.

As shown in FIG. 22-II, an electrical energy transmission apparatus 1-II includes an input interface 101-II, a control circuit 102-II, and an AC device interface 19-II. Similar to the foregoing example, the input interface 101-II is connected to one or more battery packs 27-II, to receive a DC electrical energy input of the battery pack 27-II. The AC device interface 19-II is connected to an AC device, and transfers electrical energy received from the foregoing battery pack 27-II to the AC device.

The control circuit 102-II is located between the input interface 101-II and the AC device interface 19-II, and is configured to control an electrical energy output manner of the AC device.

The control circuit 102-II includes a controller 110-II, a conversion circuit 103-II, a detection unit 105-II, a power-off unit 107-II, a DC driving unit 112, an AC driving unit 114-II, and an output selection unit 116-II. The control circuit 102-II further includes another specific element needed to implement various functions. Details are not described.

The conversion circuit 103-II is connected to the input interface 101-II, gathers electrical energy of the battery pack 27-II, and transfers the electrical energy to the control circuit. Specifically, the DC energy storage module formed of two 60V battery packs is used as an example. The two 60V battery packs include 6 20V secondary energy storage modules 73-II in total. The input interface 101-II correspondingly includes 6 groups of input terminals. Each group of input terminals includes a pair of positive and negative electrodes. The conversion circuit 103-II is connected to the 6 groups of input terminals, gathers electrical energy of the 6 groups of input terminals, and outputs the electrical energy into the control circuit 102-II by using a pair of a positive terminal and a negative terminal. In this example, the conversion circuit 103-II is a series circuit obtained by connecting the 6 groups of input terminals in series, to output 120V DC electrical energy.

The electrical energy output by the conversion circuit 103-II has two output paths. For one path, the electrical energy is output to the AC device interface through the DC driving unit and the output selection unit. The DC driving unit does not change an AC-DC form of electrical energy, and only regulates external output of DC electrical energy. For the other path, the electrical energy is output to the AC device interface through the AC driving unit and the output selection unit. The AC driving unit converts DC electrical energy into AC electrical energy for output. The AC driving unit may be a DC-AC inverter.

The output selection unit 116-II alternatively connects the DC driving unit 112 and the AC driving unit 114-II to the AC device interface 19-II, so that the AC device interface 19-II does not simultaneously output DC electrical energy and AC electrical energy. The detection unit 105-II detects a running parameter of the control circuit. The running parameter is, for example, a detection current or voltage.

The power-off unit 107-II is configured to turn off electrical energy output of the control circuit to the AC device interface 19-II.

The controller 110-II connects the various components and units, and is configured to control the functions of the control circuit 110. As shown in FIG. 23-II, the controller 110-II includes a test control unit 1101-II, a detection control unit 1102-II, a safety determining unit 1103-II, and an output control unit 1104-II. The test control unit 1101-II controls the output selection unit 116-II to enable the control circuit 110 to output test energy to the AC device interface 19-II. The detection control unit 1102-II receives a test running parameter measured by the detection unit 105-II under the test energy. The safety determining unit 1103-II determines, according to the test running parameter, whether the AC device connected to the AC device interface 19-II is suitable for being driven by DC electrical energy or AC electrical energy to work. An output control unit 116 receives a determining result of the safety determining unit 1103-II, and controls the output selection unit 116-II to correspondingly connect one of the DC driving unit 112 and the AC driving unit 114-II to the AC device interface 19-II, or controls the control circuit 110 to turn off electrical energy output to the AC device interface 19-II.

In one example, when the safety determining unit determines that the AC device connected to the AC device interface is suitable for being driven by DC electrical energy, the output control unit controls the output selection unit to connect the DC driving unit to the AC device interface. When the safety determining unit determines that the AC device connected to the AC device interface is suitable for being driven by AC electrical energy, the output control unit controls the output selection unit to connect the AC driving unit to the AC device interface. When the safety determining unit determines that the AC device connected to the AC device interface is neither suitable for being driven by an AC circuit nor suitable for being driven by DC electrical energy, the output control unit controls the control circuit to turn off electrical energy output to the AC device interface.

Similar to the foregoing example, the test energy includes DC test energy and AC test energy. Output duration and/or output powers of the DC test energy and the AC test energy are restricted by preset parameters. Correspondingly, the running parameter includes a DC running parameter under DC test energy and an AC running parameter under AC test energy. The safety determining unit determines, according to a relative relationship between the DC running parameter and the AC running parameter, whether the AC device is suitable for being driven by DC electrical energy or AC electrical energy to work. A specific relative relationship between the DC running parameter and the AC running parameter is similar to that in the foregoing example, and is not repeatedly described.

The AC device interface 19-II in this example may only have one AC device connection terminal. The AC device connection terminal is a single port, and may output both DC electrical energy and AC electrical energy. The AC device interface may also have two AC device connection terminals. One AC device connection terminal can output DC electrical energy, another the AC device connection terminal can output AC electrical energy, and in one example, one AC device connection terminal can output only DC electrical energy. The other AC device connection terminal can output only AC electrical energy. The AC device connection terminal is a standard AC socket.

In this example, a start switch 261-II of the electrical energy transmission apparatus is disposed in an output port, that is, the AC device connection terminal, of the AC device interface. The start switch 261-II controls the electrical energy transmission apparatus to be turned on or off. When a power supply connector of the AC device is connected to the output port, the start switch 261-II is triggered to be turned on. When the power supply connector is detached from the output port, the start switch 261-II is triggered to be turned off. Specifically, the start switch 261-II is a micro switch. In another example, the start switch 261-II may alternatively be disposed in an output port at another position, for example, an output port of a DC device interface.

In this example, when an electrical device connected to the AC device interface has not been working for a long time, the controller instructs the electrical energy transmission apparatus to be turned off to save electrical energy of a battery pack. Specifically, the detection unit 105-II detects a load condition of a connected electrical device. The power-off unit 107-II can be selectively turned off to stop electrical energy output of the electrical energy transmission apparatus to the electrical device. When the load condition meets a preset condition, the controller instructs the power-off unit to be turned off. The preset condition is that the load is less than a preset value and reaches preset duration. Specifically, the detection unit detects a current in a control point circuit to detect the load condition of the electrical device. In another example, when an electrical device connected to another type of output port (for example, the output port of the DC device interface) has not been working for a long time, the controller also instructs the electrical energy transmission apparatus to be turned off to save electrical energy of a battery pack. Specific manners and logic are similar, and are no longer elaborated.

In a similar example, the controller of the control circuit also includes a test control unit, a detection control unit, a safety determining unit, and an output control unit. A difference lies in that the safety determining unit determines, according to the test running parameter, whether the AC device connected to the AC device interface is suitable for being driven by AC electrical energy to work. The output control unit receives a determining result of the safety determining unit, controls the output selection unit to correspondingly connect the AC driving unit to the AC device interface, or controls the control circuit to turn off electrical energy output to the AC device interface.

In a similar example, the control circuit also includes a controller 110-II, a conversion circuit 103-II, a detection unit 105-II, a power-off unit 107-II, a DC driving unit 112-II, an AC driving unit 114-II, and an output selection unit 116-II. A difference of this example lies in that the AC driving unit 114-II does not include a DC-AC inverter, but instead, includes a bridge circuit. The bridge circuit converts DC electrical energy input by the conversion circuit 103-II into an alternating square wave current, and transmits the alternating square wave current to the AC device interface 19-II. A maximum output power of the AC driving unit 114-II is greater than 500 W, or furthermore, is greater than 1000 W, 1500 W or 2000 W. The frequency of the alternating square wave current is between 50 Hz and 200 Hz.

The inverter can provide a sinusoidal AC, but has high costs, a large volume, and high energy consumption in conversion. The bridge circuit can provide only a square wave AC, but has the advantages of low costs, a small volume and low energy consumption, and is also applicable to most AC appliances.

In a similar example, the AC driving unit 114-II of the control circuit also does not include a DC-AC inverter, but instead, includes a bridge circuit. The bridge circuit converts DC electrical energy input by the conversion circuit 103-II into an alternating square wave current, and transmits the alternating square wave current to the AC device interface 19-II. A difference of this example lies in that the control circuit no longer provides a DC electrical energy output, and correspondingly, does not include the DC driving unit and the output selection unit.

In a similar example, the AC driving unit 114-II of the control circuit also does not include a DC-AC inverter, but instead, includes a bridge circuit. The bridge circuit converts DC electrical energy input by the conversion circuit 103-II into an alternating square wave current, and transmits the DC electrical energy to the AC device interface 19-II. Moreover, the electrical energy transmission apparatus further includes the DC device interface and a related circuit, and form an electrical energy transmission system with an adapter. The specific content of this example is similar to a related structure in another example, and are no longer repeatedly described.

The following describes a working system of the present invention with reference to FIG. 24-II.

As shown in FIG. 24-II, the working system includes an energy storage component, an electrical energy transmission apparatus 1-II, the adapter 61-II, and a DC tool 130-II. The energy storage component is specifically a battery pack 27-II. The electrical energy transmission apparatus 1-II is connected to the battery pack 27-II, has an input interface 101-II to connect the battery pack 27-II and receive an electrical energy input of the battery pack 27-II, and further has a DC device interface 17-II to connect a DC device and supply power to the DC device. The adapter 61-II is connected between the DC device interface 17-II of the electrical energy transmission apparatus 1-II and a DC device 130-II, and transmits electrical energy of the electrical energy transmission apparatus 1-II to the DC device.

The electrical energy transmission apparatus 1-II and the adapter 61-II form an electrical energy transmission system.

The energy storage component includes two 60V battery packs 27-II. Each 60V battery pack includes 3 20V secondary energy storage modules 73-II. Each secondary energy storage module 72 has a group of power supply terminals. Each group of terminals includes a pair of positive and negative electrodes. Moreover, each battery pack further has at least one group of signal terminals. In this example, each battery pack has one group of temperature terminals, for example, T+ and T− shown in the figure. In this way, 8 terminals in 4 groups are arranged on an output interface of each battery pack. Two battery packs have 16 terminals in 8 groups.

Corresponding multiple groups of terminals are arranged on the input interface 101-II of the electrical energy transmission apparatus 1-II, that is, 16 terminals in 8 groups are arranged to be joined one by one to terminals of two battery packs 27-II. Multiple groups of terminals are also correspondingly arranged on the DC device interface 17-II of the electrical energy transmission apparatus 1-II. Specifically, 16 terminals in 8 groups are arranged to be connected one by one to multiple groups of terminals on the input interface 101-II. In this way, the electrical energy transmission apparatus 1-II directly leads out terminals of the secondary energy storage module 72-II to a DC device interface 101. The adapter 61-II has an input interface, a series-parallel circuit, and an output interface. The input interface of the adapter 61-II may be detachably connected to the DC device interface 101-II, and terminals on the input interface correspond one by one to terminals on the DC device interface 101. The series-parallel circuit 30-II is connected to multiple groups of terminals of the input interface, and input electrical energy is converted into a preset voltage by configuring a series/parallel relationship between the multiple groups of terminals, and the preset voltage is transferred to the output interface of the adapter 61-II. The output interface of the adapter 61-II matches a corresponding DC device, and can be joined to the corresponding DC device, so as to supply electric energy to the DC device.

In a variant form of this example, the electrical energy transmission apparatus has 4 60V the battery pack interfaces, and correspondingly, 16 groups of terminals are arranged on the input interface to be joined one by one to terminals of the two battery packs 27-II. However, a difference lies in that, terminals of the input interface do not correspond one by one to the DC device interface, but instead, every two groups of power supply terminals are connected in parallel to form a group of power supply terminals. In this way, when two battery packs or 4 battery packs are inserted at 4 60V battery pack receiving recesses, the electrical energy transmission apparatus may work normally, and the layout of terminals does not need to be changed for the adapter in the two scenarios.

In this example, there are multiple adapters 61-II. The adapters 61-II are interchangeably connected to the DC device interface, and at least two output voltages are not the same as each other. It may be understood that different output voltages are implemented by using different series-parallel circuits. For example, a series-parallel circuit of an adapter connects every two input terminals, other than a signal terminal, of the 6 groups of input terminals in parallel, and then connects the input terminals to the output terminals of the adapter in series, so as to externally provide a 60V output voltage. A series-parallel circuit of an adapter connects every three input terminals, other than a signal terminal, of the 6 groups of input terminals in parallel, and then connects the input terminals to the output terminals of the adapter in series, so as to externally provide a 40V output voltage. A series-parallel circuit of an adapter connects the 6 groups of input terminals other than a signal terminal to each other in parallel, and then connects the input terminals to the output terminals of the adapter in series, so as to externally provide a 20V output voltage. A series-parallel circuit of an adapter connects the 6 groups of input terminals other than a signal terminal to each other in series and then connects the input terminals to the output terminal of the adapter, so as to externally provide a 120V output voltage.

The adapter 61-II further includes a battery pack protection circuit 121-II, and specifically, includes at least one of a battery pack overcurrent protection circuit, an undervoltage protection circuit, and an overtemperature protection circuit. When the battery pack protection circuit is disposed in the adapter 61-II instead of being disposed in the electrical energy transmission apparatus 1-II, there are some specific advantages. For example, although same energy storage components, that is, two battery packs, are connected to each adapter, because the series/parallel relationships and eventual output voltages are different, the needed protection currents, undervoltage voltage values, and the like are different. However, these output parameters are fixed in each adapter. Therefore, when the battery packs are configured in an adapter, a battery pack can be protected in a more specified manner.

The adapter 61-II further includes a wake-up button. As discussed in the foregoing example, the electrical energy transmission apparatus has a power-off function. When the load connected to the interface is low, the electrical energy output is cut off to save electrical energy of a battery pack. The use of the wake-up button is that after the electrical energy transmission apparatus is powered off, when a user needs to use a tool again, the user presses the button to restart the tool.

A status indicator is further disposed on the adapter 61-II, and is configured to indicate to a user whether the electrical energy transmission apparatus is in a working state or is in a powered-off state.

In this example, the working system includes a series of exception indication apparatuses, for example, a power indication apparatus, an overcurrent indication apparatus or an overtemperature indication apparatus. The exception indication apparatuses may be arranged on an output interface of the adapter. In this way, the exception indication apparatuses are closed to a user and are easily noticeable.

In this example, the DC device 130 is a DC power tool.

In some scenarios, the DC power tool is a high voltage handheld power tool, for example, a power tool that needs a voltage greater than 50 V, greater than 60 V or even greater than 100 V. Specifically, a 120V handheld power tool is discussed here. In the scenario, because a battery pack is excessively heavy in a high voltage case, if the battery pack is mounted on the power tool, a user needs to expend more effort, resulting in poor use experience and a falling risk. Therefore, in the scenario, the handheld power tool does not have a battery pack support apparatus, but have only one electrical energy input interface. Correspondingly, the adapter 61-II includes an input interface, an output interface, and a connecting electric wire located between the input interface and the output interface. The output interface and the connecting electric wire form a cable electrical energy output part.

That is, the battery pack 27-II is supported in the working system by using the battery pack support apparatus. The electrical energy transmission apparatus is disposed separately from the DC tool. The electrical energy transmission apparatus outputs electrical energy to the DC tool by using the cable electrical energy output part. The battery pack support apparatus is only arranged on the electrical energy transmission apparatus. The electrical energy input interface on the DC tool only includes a port for connecting the cable electrical energy output part.

In some scenarios, the DC power tool is a high-voltage push power tool. Most of the weight of the push power tool is supported on the ground, and has a push handle and a main body, so that a user pushes the push handle with hands to drive the main body to move and work on the ground. A typical example is a push lawn mower.

Because the weight of the push power tool does not need to be carried by a user, a high voltage and relatively heavy battery pack may also be mounted on the power tool. In this way, the power tool in the working system has 2 groups of input interfaces. One group of input interfaces are used to receive the weight and electrical energy of a battery pack, and the other group of input interfaces are used to receive the electrical energy of the electrical energy transmission apparatus. In this example, a battery pack of the power tool the input interface includes two battery pack interfaces that separately receive one 60V battery pack and bear the weight of the 60V battery pack. The electrical energy interface of the electrical energy transmission apparatus is a cable electrical energy output part interface, and is used to connect the cable electrical energy output part.

The cable electrical energy output part is located on the push handle, and more specifically, is located at an upper portion of the push handle. In this way, the reason of such an arrangement is that in this example, the electrical energy transmission apparatus may be a wearable device, for example, a back pack. The push handle is a component that is closest to the body of a user on the push power tool. A cable electrical energy output part that facilitates plugging and unplugging by a user is arranged at the position, and a cable is prevented from being excessively long, dropping on the ground or even tripping a user.

In this scenario, the push power tool can only be powered by one of the battery pack and the cable electrical energy output part, or can be powered by both the battery pack and the cable electrical energy output part. In this scenario, the battery pack interface and the cable electrical energy output part interface of the push power tool are connected in parallel.

The following describes another example of the present invention.

Similar to the foregoing example, an electrical energy transmission apparatus includes an input interface, a control circuit, and an output interface. The output interface includes multiple connection terminals for connecting an external device. An interlock mechanism is disposed between multiple connection terminals. The interlock mechanism enables only one of the multiple connection terminals to convey electrical energy to an external electrical device at a same moment. Specifically, the output interface includes a DC device interface and an AC device interface. The DC device interface and the AC device interface separately include at least one connection terminal.

In an example, the interlock mechanism is a mechanical interlock mechanism. The mechanical interlock mechanism includes locking pieces disposed on the connection terminals and linkage pieces between the locking pieces. The locking piece moves between a locking position and an unlocking position. At the locking position, the locking piece forbids the connection terminals from being electrically connected to a power supply terminal of the electrical device. At the unlocking position, the locking piece allows the connection terminals to be electrically connected to the power supply terminal of the electrical device. When any connection terminal is electrically connected to the power supply terminal, the locking piece of the connection terminal is fixed at the unlocking position, and the locking piece drives the linkage piece to enable all other locking pieces to be fixed at the locking position.

Specifically, the connection terminal is a jack, there are two jacks. The mechanical interlock mechanism is one locking rod. The locking rod is located between the two jacks. Two ends of the locking rod movably extend into the two jacks separately to form two locking pieces. A part between the two ends forms the linkage piece.

In another example, the interlock mechanism is an electronic interlock mechanism.

The following describe another example of the present invention.

The working system in this example further includes a charger in addition to an energy storage component, an electrical energy transmission apparatus, and an electrical device.

In this example, the energy storage component includes two 60V battery packs. Each battery pack includes 3 20V secondary energy storage modules. The charger has two battery pack interfaces, and can charge two battery packs simultaneously.

The charger includes a protection circuit, specifically, has an overcharging protection circuit and an overtemperature protection circuit. The overcharging protection circuit provides separate protection for each secondary energy storage module. The overtemperature protection circuit provides separate protection for each battery pack.

In this example, the charger is integrated in the electrical energy transmission apparatus.

In this example, two battery packs can only be charged simultaneously, but cannot be charged separately. In this way, it may be avoided that double packs have inconsistent voltages and charge each other during working.

In this example, the electrical energy transmission apparatus may be a wearable device, for example, a back pack, a shoulder belt or a waist belt. However, optionally, the electrical energy transmission apparatus may alternatively be a portable case having a handle, or may further have wheels, a push handle or the like.

In an optional example, the electrical energy transmission apparatus may alternatively be one base. A high-power inverter, for example, an inverter whose voltage is greater than 1000 W, is provided in the base, so as to provide high-power AC electrical energy.

In an optional example, the working system further includes one storage box. The storage box has multiple compartments separately for placing the electrical energy transmission apparatus, multiple adapters, and a battery pack. In some examples, a small electrical device, for example, a DC power tool, can further be placed. It is convenient for a user to organize and carry the working system.

Figures 11, 25:
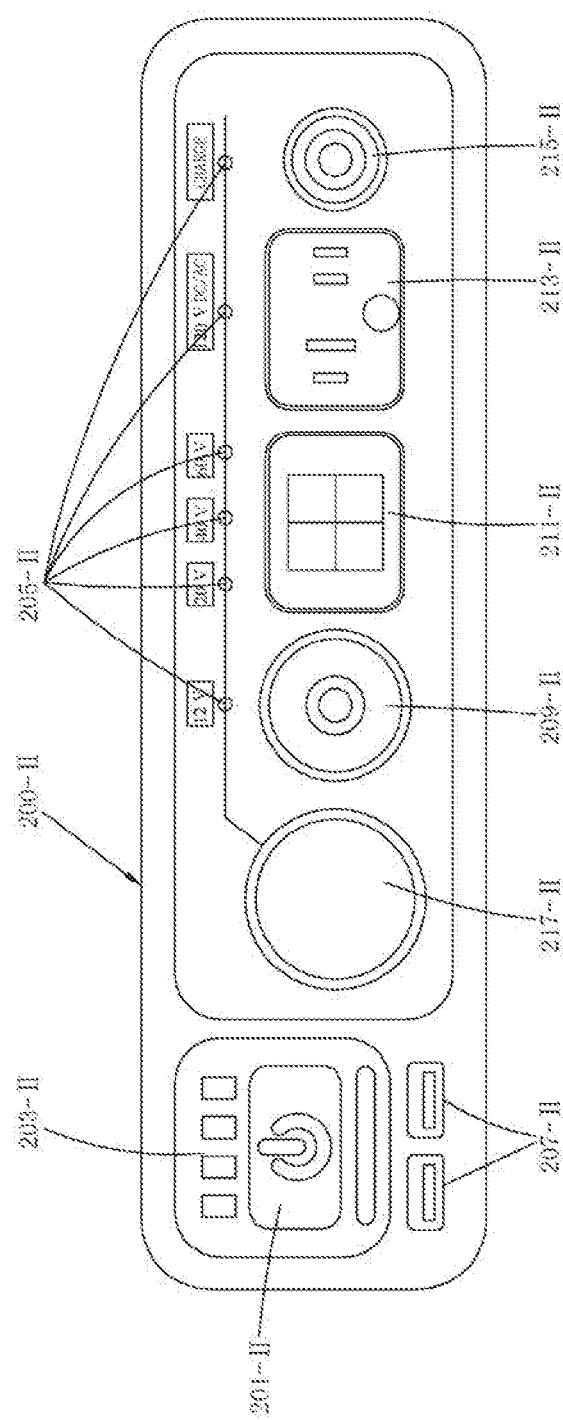
FIG. 25-II is a schematic diagram of an operation panel according to an example of the present invention.

The following describes another example of the present invention with reference to FIGS. 25-II to 29-II. This example is basically similar to the first example. Major differences lie in the structures of adapter circuits and different selection manners for series and parallel configurations.

In this example, multiple micro switches are arranged between the standard battery units. When the on-off combination of the multiple micro switches change, a series/parallel relationship between the standard battery units changes accordingly, further resulting in that combinations of the standard battery units output different voltages, for example, 20 V, 40 V, 60 V, and 120 V as discussed above. A mode selection operation piece 217-II, for example, a knob or a button, is disposed on the operation panel 200-II. The mode selection operation piece 217-II triggers the micro switches by using mechanical manners to select different voltage outputs.

As shown in FIG. 25-II, the operation panel 200-II is disposed on an energy storage system, which is also referred to as a power supply system. A switch, the mode selection operation piece 217-II, several electrical energy output interfaces, a circuit input interface (that is, a charging interface 215-II), and several indicator lamps are arranged on the operation panel 200-II. The indicator lamp includes a mode indicator lamp 203-II, a mode indicator lamp 205-II, and an alarm lamp. The mode indicator lamp 203-II displays remaining power by using a quantity of bars. The mode indicator lamp 205-II includes one group of lamps located at different positions. The lamps at different positions correspond to different working states. Some lamps indicate an electrical energy output type of the energy storage system, for example, a 12V DC output, a 20V DC output, a 40V DC output, a 60V DC output, a 120V output, or the like. Some lamps indicate that the energy storage system is in a charging mode. In this example, the mode indicator lamps 205-II are correspondingly located near different output interfaces. For example, a 20V DC output indicator lamp is located near a 20V output interface, a charging indicator lamp is located near the charging interface 215-II, and the like. In this way, when a lamp near an interface is on, it represents that the interface is usable, which is intuitive and readily comprehensible. In this example, a 12V DC output interface is a standard car power supply output interface. 20 V, 40 V, and 60 V share one low-voltage DC output interface 211-II. A 120V AC and a 120V DC share one high voltage output interface 213-II. The low voltage DC output interface 211-II and the high voltage output interface 213-II are compatible with different plugs. When different plugs are inserted, electrical energy of different types is output.

Several 5V USB output interfaces 207-II are further disposed on the operation panel 200-II.

Referring to FIG. 26-II, 6 standard battery units having a same rated voltage are connected to the series-parallel connection selection circuit of the energy storage system. One two-normally-open two-normally-closed micro switch is connected between every two standard battery units, and there are 5 micro switches in total, that is, K1 to K5 in FIG. 26-II. Each micro switch has a first subswitch and a second subswitch. The first subswitch and the second subswitch are synchronously closed (ON state) and opened (OFF state). When each first subswitch is opened, two positive electrodes of standard battery units at two ends of the first subswitch are connected. When each first subswitch is closed, the connection between the two positive electrodes is turned off. When each second subswitch is turned off, two negative electrodes of standard battery units at two ends of the second subswitch are connected. When each second switch is closed, a negative electrode of a standard battery unit on the left side of the second switch and a positive electrode of a standard battery unit on the right side of the second switch are connected. That is, when the micro switch is closed (ON state), two adjacent standard battery units are connected in series. When the micro switch is opened (OFF state), two adjacent standard battery units are connected in parallel. By using on-off combinations of the 5 micro switches, different series-parallel circuits can be configured, and the battery pack outputs different voltages. In this example, the voltages are specifically 20 V, 40 V, 60 V, and 120 V.

Continuing to refer to FIG. 26-II, the series-parallel connection selection circuit further has 4 positive electrode output terminals and relays separately connected to the 4 positive electrode output terminals. The 4 positive electrode output terminals separately output the 4 output voltages. The relays connected to positive electrode output terminals correspond to modes of the energy storage system. That is, when the energy storage system is in a 20V DC output mode, a relay corresponding to a 20V positive electrode output terminal is turned on, and the rest 3 relays are turned off; and the like. An on/off state of a relay is controlled by a controller in the energy storage system. In some examples, the controller detects an output voltage of a battery pack to correspondingly control the status of a relay. In some examples, the controller detects the status/position of the mode selection operation piece 217-II or the status/position of a micro switch to correspondingly control the status of the relay.

With reference to the following Table 1, FIG. 26-II to 29-II are respectively circuit forms when the series-parallel connection selection circuit outputs 20 V, 40 V, 60 V, and 120 V.

| Output voltage | Switch status | | | | | Relay status | | | |
| --- | --- | --- | --- | --- | --- | --- | --- | --- | --- |
| | K1 | K2 | K3 | K4 | K5 | JQ1 | JQ2 | JQ3 | JQ4 |
| 20 V | OFF | OFF | OFF | OFF | OFF | ON | OFF | OFF | OFF |
| 40 V | OFF | OFF | ON | OFF | OFF | OFF | ON | OFF | OFF |
| 60 V | OFF | ON | OFF | ON | OFF | OFF | OFF | ON | OFF |
| 120 V | ON | OFF | OFF | OFF | ON | OFF | OFF | OFF | ON |

As shown in FIG. 26-II, the series-parallel connection selection circuit configures series/parallel relationships among 6 standard battery units, to enable the battery pack to output a 20V voltage. Specifically, the 5 micro switches k1 to K5 are all in an OFF state. The 6 standard battery units are connected to each other in parallel. Moreover, a relay JQ1 is turned on, and the rest relays are turned off. The energy storage system outputs a 20V voltage from a 20V port. As discussed above, the 20V, 40V, and 60V output interfaces are integrated into 1 output interface. After an input terminal of an external adapter is inserted, the input terminal is connected to a negative electrode and the 20V positive electrode output terminal, and receives 20V DC electrical energy.

As shown in FIG. 27-II, the series-parallel connection selection circuit configures series/parallel relationships among the 6 standard battery units, so that the battery pack outputs a 40V voltage. Specifically, K1, K2, K4, and K5 of the 5 micro switches are in an OFF state, and K3 is in an ON state. In this way, the first 3 standard battery units of the 6 standard battery units are connected to each other in parallel into one group, and the last three standard battery units are connected to each other in parallel into one group. The two groups are then connected to each other in series, so as to output a 40V voltage. Moreover, the relay JQ2 is turned on, and the rest relays are turned off. The energy storage system outputs a 40V voltage from a 40V port. As discussed above, the 20V, 40V, 60V output interfaces are integrated into one output interface. After an input terminal of an external adapter is inserted, the input terminal is connected to a negative electrode and a 40V positive electrode output terminal, and receives 40V DC electrical energy.

As shown in FIG. 28-II, the series-parallel connection selection circuit configures series/parallel relationships among the 6 standard battery units, so that the battery pack outputs a 60 V voltage. Specifically, K1, K3, and K5 of the 5 micro switches are in an OFF state, and K2 and K4 are in an ON state. In this way, every two of the 6 standard battery units are connected to each other in parallel into one group, and there are 3 groups in total. Then the three groups are connected to each other in series, so as to output a 60V voltage. Moreover, the relay JQ3 is turned on, and the rest other relays are turned off. The energy storage system outputs a 60V voltage from a 60V port. As discussed above, the 20V output interface, the 40V output interface, and the 60V output interface are integrated into is one output interface. After an input terminal of an external adapter is inserted, the input terminal is connected to a negative electrode and a 60V positive electrode output terminal, and receives 60V DC electrical energy.

As shown in FIG. 29-II, the series-parallel connection selection circuit configures series/parallel relationships among the 6 standard battery units, so that the battery pack outputs a 60V voltage. Specifically, K1 to K5 of the 5 micro switches are all in an ON state. The 6 standard battery units are connected to each other in series, so as to output a 120V voltage. Moreover, the relay JQ4 is turned on, and the rest relays are turned off. The energy storage system outputs a 120V voltage from a 120V port. As discussed above, the 120V DC output interface and the AC output interface are integrated into one output interface. After an external specific plug is inserted, the energy storage system is triggered to select different modes, and supplies power to a DC device or an AC device.

The following describes another example of the present invention with reference to FIG. 30-II to FIG. 34-II.

This example is similar to the previous example. A difference lies in that a relay is used to replace a micro switch. The output interface detects a type of a connected plug to automatically output different values or different types of voltages, instead of selecting a working mode of an energy storage device by a using knob.

As shown in FIG. 30-II, in this example, the 5 two-normally-open-two-normally-closed micro switches located between the 6 standard battery units in the previous example are replaced with 5 two-normally-open-two-normally-closed relays JQ1 to JQ5. One driving circuit 270-II is configured on each relay. However, a circuit structure of a series-parallel circuit is not changed, and only components are replaced. After the micro switches are replaced with relays, configured switching of the series-parallel circuit no longer needs to be performed in a mechanical manner, and instead, may be implemented by using an electrical control manner. A relationship between an output voltage of a battery pack and on-off of a relay is the same as that in the previous example, and is no longer elaborated here.

In this example, the energy storage system detects a type of a connected electrical device to automatically control on-off of the relays, to implement that a battery pack outputs a voltage value corresponding to the type of the electrical device. Continuing to refer to FIG. 30-II, the electrical device is a DC tool. The DC tool is connected to the energy storage system by using an adapter. The adapter includes a tool end 231-II to which a DC tool is connected, an electrical energy input terminal 233-II connected to an output interface of the energy storage system, and a transmission cable 235-II connecting the tool end 231-II and the electrical energy input terminal 233-II.

As shown in FIGS. 31-II to 34-II, adapters having different output voltages have different electrical energy input terminals 233-II. FIGS. 31-II to 34-II are schematic diagrams of electrical energy output of 20V, 40V, 60V, and 120V adapter terminals. It may be seen from the figures that all adapters have a positive terminal 241-II, a negative terminal, a trigger piece 245-II, and a switch pole 247-II. On the electrical energy input terminals 233-II, the position of the negative terminal is the same as the position of the switch pole 247-II. The positive terminal 241-II and the trigger piece 245-II have different positions.

A DC output interface of the energy storage system is compatible with the electrical energy output terminals. As shown in FIG. 30-II, a negative terminal, a 20V positive terminal 253-II, a 40V positive terminal 255-II, a 60V output terminal, a 120V output terminal, a 20V sensing component, a 40V sensing component, a 60V sensing component, a 120V sensing component, and a start switch 261-II are disposed on the DC output interface. The positions of the positive electrode terminals and sensing components correspond to the positions of the positive terminals 241-II and the trigger pieces 245-II on the electrical energy input terminals 233-II. Therefore, when an electrical energy input terminal 233-II of a 20V adapter is connected to the DC output interface, the 20V positive terminal 253-II is joined to the 20V positive electrode port. The trigger piece 245-II triggers the 20 V sensing component; and the like. Details are no longer elaborated. At a same moment, the DC output interface only can be connected to one electrical energy input terminal 233-II. In this example, the trigger piece 245-II is magnetic steel, and the sensing component is a Hall sensor. Specifically, the magnetic steel on the electrical energy input terminal 233-II approaches the Hall sensor at a corresponding position, to enable the Hall sensor to generate a signal. After receiving the signal, the MCU sends an instruction to control the relays to be in a suitable on/off state, so as to enable the battery pack to output a voltage matching the adapter.

A start switch 261-II on the DC output interface is linked to a power-up switch correlation of the overall energy storage system. Therefore, when the start switch 261-II is turned on, the energy storage system is turned on and powered up. When the start switch 261-II is turned off, the energy storage system is not powered up, and basically does not consume electrically. The start switch 261-II corresponds to the position of the switch pole 247-II on the electrical energy input terminal 233-II. When the electrical energy input terminal 233-II is inserted in the DC output interface, the switch pole 247-II is held against the start switch 261-II to enable the start switch 261-II to be turned on. When the electrical energy input terminal 233-II is unplugged from the DC output interface, the start switch 261-II is reset and turned off, and the energy storage system is turned off.

After the start switch 261-II is turned on, by default, one standard battery unit is first enabled to supply power to a control circuit such as a controller. The control circuit determines the type of a connected adapter by using a received signal of a sensing component, and correspondingly controls on-off states of the relays, to enable the battery pack to output a target voltage. After on/off states of the relays are switched, the entire battery pack supplies power to the control circuit.

A safety switch is further arranged between an overall output terminal and a DC output interface of a battery pack. The on/off of the safety switch is controlled by the control circuit. When detecting that the output voltage of the battery pack is consistent with a target voltage corresponding to the type of the adapter, the control circuit instructs the safety switch to be turned on. If not, the control circuit controls the safety switch to be turned off. Such a design may avoid that the output voltage of the battery pack is inconsistent with the target voltage needed by the adapter because one or more of the relays in the series-parallel circuit accidentally fail, and eventually prevent a DC electrical device from being accidentally damaged or even burning out. In this example, the safety switch is a MOS transistor. The reliability of a MOS transistor switch is higher than that of a relay switch, so that the risk of an output voltage error is reduced.

For safety still, in this example, when the relays configured by the series-parallel circuit are in a normally-open state, the series-parallel circuit enables the battery pack to output a 20V voltage. The benefit of this is that a relay fails usually for the reason that the relay cannot not close rather than the reason that the relay cannot be turned off. Therefore, in a circuit configuration in this example, even if a relay fails, a voltage can only be excessively low, for example, is in a 20V state, and cannot cause severe damage to the electrical device.

In this example, when the energy storage system is charged, the battery pack is configured to a completely parallel state also by using the series-parallel circuit. That is, the rated voltage of the battery pack is 20 V. In this way, during charging, the standard battery units are connected to each other in parallel, and automatic charging balance can be implemented during charging. Even if the standard battery units have inconsistent actual voltages, a consistent voltage can be automatically obtained during charging. The manner may be that a specific standard battery unit used when the system is powered up is used to perform compensatory charging.

The following describes another example of the present invention with reference to FIG. 35-II. This example is approximately the same as the previous example. A difference between the examples lies in that two single switch relays are used to replace one dual normally-open/dual normally-closed relay in the previous example. However, the structure of the series-parallel circuit is not changed. As shown in FIG. 35-II, in this example, the series-parallel circuit includes 10 relays JQ1 to JQ10. Each relay is correspondingly equipped with one driving circuit 270-II. Similar to the previous example, a DC output interface of the energy storage system detects a type of a connected electrical device, and correspondingly determines a target voltage that needs to be output to control on/off states of the relays, so as to obtain the target voltage and output the target voltage to the electrical device.

An advantage of replacing one dual normally-open/dual normally-closed relay with the two single switch relays lies in that, the technology of a single switch relay is mature and has a relatively large maximum current, which facilitates large-scale purchase and production.

The following describes another example of the present invention with reference to FIG. 36-II. This example is approximately the same as the example corresponding to FIG. 35-II. Two single switch relays are also used to replace one dual normally-open/dual normally-closed relay. There are in total 10 relays JQ1 to JQ10. A difference between the examples lies in that, in this example, a light coupling element 271-II is arranged between two paired single switch relays. A double-relay group formed of JQ1 and JQ2 is used as an example. The light coupling element 271-II is disposed between JQ1 and JQ2. The light emitting electrode of the light coupling element 271-II is disposed between a conduction electrode of the relay JQ1 and a negative electrode of a first standard battery unit. A light receiving electrode of the light coupling element 271-II is disposed in a driving circuit 270-II of the relay JQ2. When a relay first needs to be switched from a turned-off state to a turned-on state, a controller sends a turn-on instruction to a driving circuit 270-II of JQ1. A driver drives JQ1 to switch from a turned-off state to a turned-on state. After JQ1 is turned on, the light emitting electrode is triggered to be turned on and emit light, the light receiving electrode detects a light ray and is then turned on, so as to trigger the driving circuit 270-II of the relay JQ2 to working to enable the relay JQ2 to switch from a turned off state to a turned-on state. Other pairs of relays have a same configuration, and a light coupling element 271-II is disposed in all the other pairs of relays, so that a second relay is turned on only when a paired first relay is turned on first. In this way, the light coupling element 271-II is disposed to ensure that a second relay is not separately turned on when a first relay fail, and as a result, a battery is short circuited.

The following describes another example of the present invention. The energy storage system in this example also includes multiple standard battery units. The standard battery units have an equal voltage, and one battery pack includes multiple standard battery units. However, when a voltage needed by an electrical device connected to the energy storage system is equal to a voltage of a standard battery unit, the energy storage system directly uses one of the multiple standard battery units to supply power to the electrical device, but does not enable another standard battery unit. After the use of the electrical device is completed, the energy storage system directly uses other multiple standard battery units to charge a used standard battery unit. The energy storage system does not need to be connected to an external power supply for charging. The charging circuit may be disposed in a battery pack, or may alternatively be disposed in a body of the energy storage system. Similar to the foregoing example, the energy storage system may detect the type of a connected electrical device to control on/off states of the relay to configure a series-parallel circuit, so as to implement that only one standard battery unit is powered by the electrical device. A knob or the like may also be configured to control a micro switch to implement the same function. Specific circuit connection forms are no longer elaborated.

The following describe another example of the present invention.

The energy storage system in this example is similar to the example in FIG. 21-II. A detection procedure is provided to determine the type of a connected AC electrical device, and a DC power or an AC power is selectively output. Moreover, in this example, the AC driving circuit 270-II includes a boost circuit. The boost circuit performs boost processing on a battery pack voltage, for example, boosts a 120V voltage to a 125V or 130V voltage. In this example, the boost circuit raises an output voltage of a battery pack by only a small amplitude. For example, the amplitude of rise is within 20%. A specific form of the boost circuit is known to a person skilled in the art, and is not elaborated. In this example, the inverter may be a conventional DC-AC inverter, and converts a DC power into a sinusoidal AC power, or may be a simplified H-bridge circuit, and converts a DC power into a square-wave AC power.

The following describe another example of the present invention. The energy storage system in this example is similar to the previous example. A detection procedure is provided to determine the type of a connected AC electrical device, and a DC power or an AC power is selectively output. In this example, the AC driving circuit 270-II includes a boost circuit. A difference lies in that, in this example, the output DC power is an interruptive DC power.

Similar to the example in FIG. 21-II, in this example, during supply of power to an AC appliance, a detection unit of the AC driving circuit 270-II detects the load or power of the electrical device. When the power of the AC appliance is less than a first preset threshold, for example, 200 W, the AC driving circuit 270-II supplies power to an AC appliance by using a DC-AC inverter. The DC-AC inverter converts a DC power input into a sinusoidal AC power and output the sinusoidal AC power. In addition, the boost circuit is started when an AC power is output, to enable that an eventual output AC power voltage is greater than an output DC power voltage of a battery pack. The boost circuit is optionally located at a front end or rear end of the DC-AC inverter. When the boost circuit is located at the front end of the DC-AC inverter, the boost circuit is a DC boost circuit, and boosts a DC power voltage of a battery pack and transfers the boosted DC power voltage to the DC-AC inverter. When the boost circuit is located at the rear end of the DC-AC inverter, the boost circuit is an AC boost circuit, and boosts an AC power voltage output by the DC-AC inverter and transfers the boosted AC power voltage to the output interface. In this example, the detection of a load is implemented through detection of a current value. A specific detection manner is the same as above, and is no longer elaborated.

When the power of the AC appliance is greater than a first preset threshold and less than a second preset threshold, for example, is greater than 200 W and less than 2000 W, the AC driving circuit 270-II provides an interruptive DC power to the AC appliance. That is, a current direction is unchanged, but a DC power is periodically interrupted within a preset time. The form is shown in FIG. 37-II. The DC power may prevent an arcing phenomenon from occurring on some switch devices because of continuous accumulation of current.

When the power of the AC appliance is greater than the second preset threshold, the AC driving circuit 270-II is interrupted.

Before a continuous DC power, the energy storage system determines whether the AC the electrical device is suitable for at a DC power. In addition to the determining algorithm in the example in FIG. 21-II, in this example, it is further detected whether a control power supply of an AC appliance has a transformer for voltage reduction. Usually, a detection circuit is disposed in an electric appliance with a control function, and detects one or more parameter values. The electric appliance is started only when the parameter value meets a preset condition. For example, a refrigerator has a temperature detection circuit. When the temperature is greater than a threshold, a compressor is started to perform refrigeration, instead of directly starting a compressor after the refrigerator is powered on. For these electric appliances, the processing logic in this example is as follows:

In a first case, if the electrical device is in a working state, a main power consumption device is directly started. In this case, the DC-AC inverter first supplies power to a device, and a current value I1 is detected after a particular time. The output power of the DC-AC inverter is usually insufficient to support the electrical device to work. The value I1 is relatively large, representing that the load is greater than 200 W. As a response, then, the output of the energy storage device is switched to a DC power, and a current value I2 is detected after a particular time. In this case, the value I2 is less than the I1 value. After a DC power is connected, the primary of the transformer used as a power supply is controlled to short circuit, and the primary of the transformer has relatively large internal resistance. Therefore, the actual value I2 is relatively small. In conclusion, if I1 is much greater than I2, or the output power of the energy storage system exceeds the DC-AC the rated power of the inverter during output of the AC, during a DC output, the power significantly reduces or become even less than the DC-AC the rated power of the inverter. This represents that the electrical device includes a transformer for controlling a power supply, and the energy storage device stops an electrical energy output.

In another case, if the electrical device is in a standby state, when the electrical device is started, the DC-AC inverter can support standby of the electrical device, the I1 value is relatively small, and the energy storage system continues outputting an AC power. After a particular time, it is detected that the parameter value reaches the preset condition, the electrical device switches to a working state, the main power consumption device is started, and subsequent processing is the same as that in the first case.

The following describes another example of the present invention.

In this example, the energy storage system can supply power to an AC power network. Typically, during outage, an indoor emergency power is supplied to a home. Specifically, the energy storage system has one adapter joined to an AC power network. The adapter includes an input terminal, a transmission cable 235-II, and an output terminal. The input terminal matches an AC output interface of the energy storage system. The output terminal matches a socket of the AC power network. When the AC output interface of the energy storage system is also a standard AC socket, the input terminal and the output terminal of the adapter are both male AC plugs.

In this way, during outage, the adapter is used to connect the energy storage system to a receptacle in a power grid. AC electrical energy output by the energy storage system passes through the adapter and is transferred from the receptacle of the power grid to other receptacles in an indoor power grid. The other receptacles are live and can be normally used, so as to maintain normal indoor power supply.

In an example of the present invention, the energy storage system includes the battery pack and a base. A projector is integrated on the base. The battery pack is one or more battery packs whose total voltages are 120 V (that is, 6 20V standard battery units are built in one battery pack), or is 2 or more battery packs whose total voltages are 60 V (that is, 3 20V standard battery units are built in one battery pack).

In an example of the present invention, the energy storage system includes the battery pack and a base. A radio is integrated on the base. The battery pack is one or more battery packs whose total voltages are 120 V (that is, 6 20V standard battery units are built in one battery pack), or 2 or more battery packs whose total voltages are 60 V (that is, 3 20V standard battery units are built in one battery pack).

In an example of the present invention, the energy storage system includes a battery pack and a back pack. The multiple standard battery units are built in the battery pack. The back pack only includes a configured series-parallel circuit and an output interface for outputting a DC voltage. Typically, the battery pack is one or more battery packs whose total voltages are 120 V (that is, 6 20V standard battery units are built in one battery pack), or 2 or more battery packs whose total voltages are 60 V (that is, 3 20V standard battery units are built in one battery pack). A series-parallel circuit of back pack configures multiple standard battery units to form a 120V output voltage, so as to supply power to a 120V DC tool or a tool that is compatible with an AC-DC input. The DC tool and the tool include, but are not limited to, various handheld or push power tools, gardening tools, and desktop tools.

In an example of the present invention, the energy storage system includes a battery pack and a back pack. The multiple standard battery units are built in the battery pack. The back pack only includes a series-parallel circuit and a DC output interface. The series-parallel circuit optionally has various series-parallel connection forms to enable the battery pack in the standard battery unit form to optionally output various DC voltages. The implementation forms of the series-parallel circuit are already described in detail in the foregoing examples, and are no longer repeated.

Typically, the battery pack is one or more battery packs whose total voltages are 120 V (that is, 6 20V standard battery units are built in one battery pack), or 2 or more battery packs whose total voltages are 60 V (that is, 3 20V standard battery units are built in one battery pack). The series-parallel circuit of the back pack configures multiple standard battery units to form 20V, 40V, and 120V output voltages, so as to supply power to various tools having 20V, 40V, and 120V input interfaces. The tool type is the same as that in the previous example.

In an example of the present invention, the energy storage system includes a battery pack and a base. The multiple standard battery units are built in the battery pack. The base includes one of the AC driving circuits 270-II in the foregoing examples. Therefore, the output interface on the base includes an AC output interface, and can output 120V AC electrical energy. The AC electrical energy may be one or more of a sinusoidal AC power or a square wave or trapezoidal wave AC power. In some variant examples, the AC output interface can output 120V or higher-voltage DC electrical energy. In some variant examples, the base further includes the DC output interface, and outputs 12V electrical energy, USB 5V electrical energy, 20V, 40V, 60V or 120V electrical energy, or the like. The implementation manners are similar to those in the foregoing examples.

Finally, the third group examples are described with reference to FIG. 1-III to FIG. 20-III.

FIG. 1-III is a general diagram of modules of a first example of the third group examples. As shown in FIG. 1-III, this example provides a power supply system 100-III. The power supply system 100-III can externally output DC electrical energy and AC electrical energy, and can be carried along by a user.

The power supply system 100-III includes an energy storage component 3-III formed of several battery packs 5-III, a power supply platform 1-III, and several adapters 30-III. The battery pack 5-III includes a housing, a standard battery unit 51-III located in the housing, and a battery pack output interface located on the housing. There is one or more battery packs 5-III.

The power supply platform 1-III includes a body 13-III, a battery pack support apparatus 15-III located on the body 13-III, a battery pack connection interface 17-III located on the battery pack support apparatus 15-III, a control circuit 20-III located in the body 13-III, and an electrical energy output interface connected to the control circuit 20-III. The electrical energy output interface includes a DC output interface 9-III and an AC output interface 11-III. The adapter 30-III includes an input terminal 31-III, a transmission cable 35-III, and an output terminal 37-III. The input terminal 31-III is suitable for being connected to the DC output interface 9-III. The output terminal 37-III is suitable for being connected to a DC electrical device 200-III. The transmission cable 35-III is connected between the input terminal 31-III and the output terminal 37-III. There is one or more adapters 30-III. When there are multiple adapters 30-III, output terminals 37-III of at least two adapters 30-III are different from each other, so that the output terminals 37-III are suitable for being connected to different DC electrical devices 200-III.

The AC output interface 11-III is a standard AC socket. An AC plug may be directly inserted to provide AC electrical energy to an AC electrical device 300-III. In this example, the standard AC socket uses the American Standard. However, in another optional example, the standard AC socket may also use the standard in another district.

A distance between the DC output interface 9-III and the AC output interface 11-III is less than 15 cm.

The energy storage component 3-III and the battery pack 5-III in this example are described below with reference to FIG. 2-III and FIG. 3-III.

As shown in FIG. 2-III, the several battery packs 5-III form the energy storage component 3-III of the power supply system 100-III. The internal frame of the energy storage component 3-III is described below in detail. The energy storage component 3-III includes a primary energy storage module. The primary energy storage module includes several secondary energy storage modules, and the secondary energy storage module includes several tertiary energy storage modules.

The primary energy storage module is a battery pack 5-III. The battery pack 5-III has an independent housing, a control circuit located in the housing, and a battery pack output interface located on the housing. The battery pack output interface has an output terminal. The output terminal includes a pair of positive and negative terminals, and further includes several signal terminals.

The secondary energy storage module is the standard battery unit 51-III disposed in the housing of the battery pack 5-III. The standard battery units 51-III are the same as each other, have a same specification and consistent rated voltages, and are electrically isolated from each other. The secondary energy storage module cannot be used separately from the battery pack 5-III, but has a pair of independent positive and negative electrode output terminals. The positive and negative electrode output terminals are led out on the battery pack output interface, that is, are led out and arranged on the housing. In an example, the secondary energy storage module also has an independent control circuit.

The tertiary energy storage module is a single battery, and cannot be further divided into a smaller subunit having positive and negative electrodes.

In this example, the energy storage component 3-III includes multiple primary energy storage modules. The primary energy storage modules include multiple secondary energy storage modules. The secondary energy storage module includes multiple tertiary energy storage modules.

Specifically, in this example, the energy storage component includes two primary energy storage modules, that is, includes two battery packs 5-III. As shown in FIG. 3-III. The specific structure of a battery pack is described below in detail by using one of the battery packs 5-III as an example.

The battery pack 5-III includes one housing and multiple standard battery units 51-III located in the housing. The standard battery units 51-III are the same as each other, are electrically isolated from each other, and all have independent positive and negative electrodes 19-III. The battery pack 5-III includes 6 standard battery units 51-III. Each standard battery unit 51-III includes 5 single batteries. The single batteries are connected to each other in series. The single battery is a lithium battery whose rated voltage is 4 V. That is, a rated voltage of each standard battery unit 51-III is 20 V. A sum of rated voltages of the standard battery units 51-III in the battery pack 5-III is 120 V, and is basically equivalent an AC standard voltage in the US.

The positive and negative electrodes 19-III of the standard battery unit 51-III are all directly led out to the battery pack output interface on the housing of the battery pack 5-III. That is, the battery pack output interface includes multiple pairs of positive and negative electrodes. In this example, there are specifically 6 pairs of positive and negative electrodes.

The battery pack output interface further includes a signal electrode 21-III. The signal electrode 21-III includes a temperature electrode. The temperature electrode is connected to a temperature measurement structure inside the battery pack 5-III, and battery pack temperature information detected by the temperature measurement structure is sent externally. The temperature electrode includes a pair of electrodes, that is, one electrode T and one grounded electrode GND. The signal electrode includes a voltage electrode BH. The voltage electrode BH is connected to a voltage detection unit 231-III inside the battery pack 5-III, and externally sends battery pack voltage information detected by the voltage detection unit 231-III. Specifically, the voltage detection unit includes 6 voltage detection elements. The 6 voltage detection elements correspond one by one to 6 standard battery units 51-III, so as to detect the voltage of the standard battery units 51-III. The voltage detection unit 231-III further includes a detection circuit. The detection circuit collects detection data of 6 voltage detection elements. When detection data of any voltage detection element has an exception, the voltage electrode BH is used to externally send a signal about a battery pack voltage exception. The signal electrode further includes a type recognition electrode BS. One identification element that indicates a type of a battery pack is connected to the type recognition electrode BS, and is specifically a recognition resistor having a specific resistance value. The power supply platform 1-III detects the type of identification element connected to the type recognition electrode BS to determine the type of the battery pack 5-III. The power supply platform 1-III may also determine, by using the type recognition electrode, whether a battery pack is connected to a specific battery pack connection interface 17-III.

In conclusion, the battery pack output interface includes multiple pairs of positive and negative electrodes 19-III and several signal electrodes 21-III. There are 6 pairs of positive and negative electrodes 19-III. Every pair of positive and negative electrodes 19-III is connected to one corresponding standard battery unit 51-III. The signal electrode 21-III includes a temperature electrode T and a GND, a voltage electrode BH, and a type recognition electrode BS.

To improve heat dissipation capability, in this example, the battery pack 5-III has an elongated shape. The length of the battery pack 5-III is much greater than the width and thickness of the battery pack 5-III. For example, the length is greater than the width and the thickness by 3 times. In this way, the area of the battery pack 5-III can be increased, thereby improving heat dissipation efficiency.

To improve heat dissipation capability, in this example, a heat dissipation mechanism, for example, a phase-change heat dissipation material, or a fan is disposed inside the battery pack 5-III.

In this example, there are two primary energy storage modules. However, in an optional alternative solution, the energy storage component 3-III only includes one primary energy storage module.

In this example, the at least one primary energy storage module includes multiple secondary energy storage modules. However, in an optional alternative solution, each primary energy storage module only includes one secondary energy storage module.

In this example, the secondary energy storage module includes multiple tertiary energy storage modules.

In this example, a rated voltage of the secondary energy storage module, that is, a standard battery unit is a divisor of the AC standard a 120V voltage in US regions. In this way, a sum of rated voltages of several secondary energy storage modules can be just equal to the AC standard voltage in US regions. For example, a sum of rated voltages of 6 secondary energy storage modules in this example is 120 V. In this concept, a rated voltage of the secondary energy storage module may alternatively be 10 V, 40 V or 60 V. Similarly, the rated voltage of the secondary energy storage module may alternatively be a divisor of an AC standard voltage of another district, for example, a divisor of the AC standard voltage 220 V in China, a divisor of the AC standard voltage 230 V in the UK, or a divisor of an AC standard voltage 110 V in some other districts. Details are not described.

By providing a standard secondary energy storage module, and a series/parallel relationship of secondary energy storage modules is configured in a power supply system to implement multiple voltage outputs. In this example, when a power is supplied externally, a DC-DC voltage converter does not need to be used, so that the costs are reduced, and the energy utilization efficiency is improved.

The following describes the power supply platform in this example with reference to FIG. 4-III.

The power supply system 100-III in this example may be used as a power supply for a DC or AC power tool such as an electric saw and a lawn mower, and the power supply system 100-III and the power tool together form a working system. For this reason, the power supply platform 1-III is designed to be a wearable device having a wearable component, for example, a back belt or a waist belt. In this way, a user can carry the power supply platform 1-III along, and at the same time both hands are free to move to operate the power tool. Specifically, the power supply platform 1-III in this example is a back pack, and the wearable component includes a back belt.

The power supply platform 1-III includes a body 13-III, a battery pack support apparatus 15-III located on the body 13-III, a wearable device located on the body 13-III, a battery pack connection interface 17-III, a control circuit 20-III, an electrical energy output interface, and several peripheral devices.

A battery pack is detachably mounted on the battery pack support apparatus 15-III. The battery pack support apparatus 15-III in this example has two battery pack support recesses for separately mounting one battery pack 5-III in the foregoing.

To enable the center of gravity of a back pack to be near human body and improve the comfort for a user, when the battery pack 5-III is mounted on the battery pack support apparatus 15-III, the axis in the length direction of the battery pack 5-III is basically parallel to the back of the user. That is, the axis in the length direction of the battery pack 5-III is basically parallel to the back plate of the back pack. More specifically, two battery packs are tiled instead of being stacked on the back plate.

The battery pack connection interface 17-III is located on the battery pack support apparatus 15-III, and is used to be connected to the battery pack output interface of the battery pack 5-III. Therefore, the quantity of the battery pack connection interfaces 17-III is the same as the quantity of battery pack support recesses. That is, one battery pack connection interface 17-III is disposed on each battery pack support recess. The electrode on the battery pack connection interface 17-III matches the electrode of the battery pack output interface, and also includes multiple pairs of positive and negative electrodes and several signal electrodes. Specifically, in this example, the battery pack connection interface has 6 pairs of positive and negative electrodes, a pair of temperature measurement electrodes, one voltage measurement electrode, and one type recognition electrode.

The battery pack connection interface 17-III is connected to a circuit system 20 of the power supply platform 1-III.

The control circuit 20-III includes an interface circuit 25-III, a body circuit 23-III, and an AC driving circuit 27-III.

The body circuit 23-III includes a battery pack detection circuit. The AC driving circuit 27-III includes a battery pack protection circuit. The battery pack detection circuit detects battery pack information and sends the battery pack information to the battery pack protection circuit. The battery pack protection circuit sends a corresponding control instruction according to the battery pack information. The battery pack detection circuit includes at least one of a temperature detection component, a current detection component, and a voltage detection component. A preset condition is built in the battery pack protection circuit. When received temperature information and/or current information and/or voltage information does not meet the preset condition, the battery pack protection circuit sends a control instruction used to make the battery pack stop working, or sends a control instruction used to make the power supply system to externally send an alarm signal.

As discussed above, because the power supply platform 1-III is a back pack, to prevent external impact from damaging the circuit structure, in this example, the control circuit 20-III is at least partially covered by a rigid protection shell. Because the control circuit 20-III is a split type, the body circuit 23-III (including the battery pack detection circuit) and the AC driving circuit 27-III (including the battery pack protection circuit) are located at different positions. There are correspondingly two protection shells, for separately protecting a body circuit and an AC driving circuit.

The interface circuit 25-III is connected to the electrodes on the battery pack connection interface 17-III, and the electrodes are configured in a preset manner and adapted to another part.

In this example, the interface circuit 25-III selectively connects multiple pairs of positive and negative electrodes on the battery pack connection interface 17-III to one of a DC output interface 9-III and an AC driving circuit 11. Specifically, the interface circuit 25-III configures the multiple pairs of positive and negative electrodes in a preset series/parallel relationship, and then connects the multiple pairs of positive and negative electrodes to one of the DC output interface 9-III and the AC driving circuit 11. When the multiple pairs of positive and negative electrodes are connected to the DC output interface 9-III and the AC driving circuit 11, the series/parallel relationships may be the same or may be different, and are the same in this example.

More specifically, the interface circuit 25-III connects every two pairs of positive and negative electrodes to each other in parallel and then connects the positive and negative electrodes to a pair of positive and negative electrode leads, to form 6 pairs of positive and negative electrode leads for output to preset positions of the control circuit 20-III. Two pairs of positive and negative electrodes that are connected to each other in parallel are separately located at different battery pack connection interfaces 17-III. That is, the interface circuit 25-III connects the pairs of positive and negative electrodes on one battery pack connection interface 17-III and a corresponding pair of positive and negative electrodes on another battery pack connection interface one by one in parallel, to form the 6 pairs of positive and negative electrode leads.

After the multiple pairs of positive and negative electrode leads are adapted to another part, eventually series and parallel configuration is performed by using a preset series-parallel circuit, so as to reach a preset rated voltage. The series-parallel circuit may be located in the adapter 30-III, the AC driving circuit 27-III or another component.

The interface circuit 25-III connects the signal electrode to the body circuit 23-III, so that the body circuit 23-III receives related information of the battery pack 5-III. The body circuit 23-III determines, by using information sent by a type recognition electrode, whether a battery pack 5-III is connected on the battery pack connection interface 17-III and the type of a connected battery pack; determines the temperature of the connected battery pack by using information sent by a temperature electrode T; and determines voltage information of the connected battery pack by using information sent by the voltage electrode BH, specifically, whether a voltage exception such as an undervoltage or an overvoltage occurs on the standard battery unit 51-III.

The body circuit 23-III includes a microprocessor and a peripheral circuit thereof. The body circuit 23-III controls, according to the received information, a peripheral device in the control circuit to operate, or sends related information to another part. The peripheral device includes a heat dissipation apparatus, which is a fan in this example; and further includes an interaction interface, which includes a power display lamp and an alarm device in this example. To clearly send an indication to a user, in this example, the interaction interface is located at a position such as a back belt that is easily seen by a user.

The body circuit 23-III controls, according to the temperature information, the fan to operate. For example, the body circuit 23-III correspondingly adjusts the rotating speed of the fan according to the temperature. For another example, when the temperature is greater than a preset value, the body circuit 23-III enables an alarm device to raise an alarm.

The body circuit 23-III determines a battery power according to the voltage information, and correspondingly controls the power display lamp to indicate the battery power. The body circuit 23-III further enables the alarm device to raise an alarm when the battery voltage is excessively low or excessively high. The body circuit 23-III further includes a communications module, at least including one signal receiver and one signal transmitter. The communications module communicates with another circuit part, for example, communicates with the AC driving circuit 27-III, and communicates with a DC driving circuit in the adapter 30-III described below. The body circuit 23-III transfers the battery pack information to another circuit part by using the communications module, and receives returned related information or instruction.

The body circuit 23-III further includes a power supply part. The power supply part provides, in suitable forms, electrical energy to corresponding components, including input positive and negative electrodes, voltage converters, and related circuits. In this example, the input positive and negative electrodes are selectively connected to one of the DC output interface 9-III and the AC driving circuit 27-III, and are connected to a DC power supply through DC output interface 9-III or the AC driving circuit 27-III. The voltage converter includes a DC/DC converter, converting a received 12V DC power supply into a 5V DC power supply and providing the 5V DC power supply to the microprocessor. The power supply part further provides the received 12V power supply to the fan.

The following describes the DC output interface 9-III and the adapter 30-III connected to the DC output interface 9-III.

Figures 1, 6:
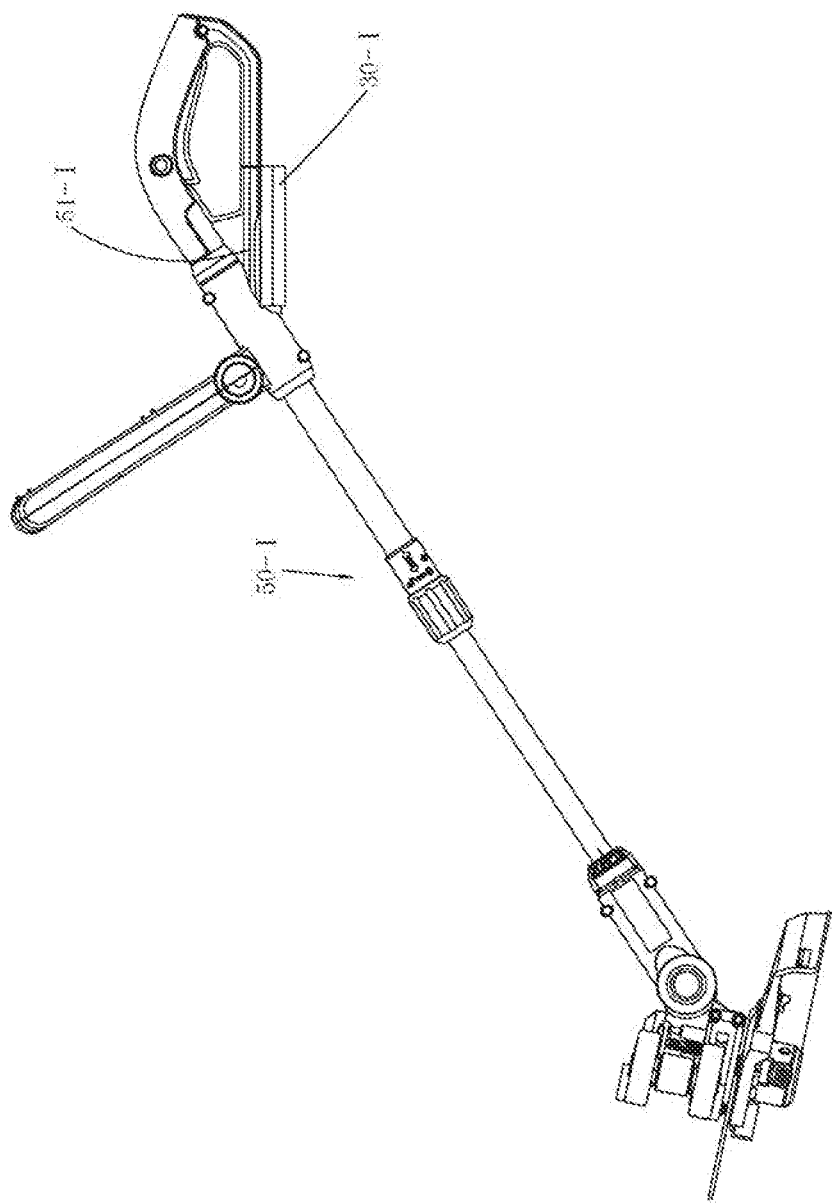
FIG. 6-I is a schematic diagram of the foldable battery pack shown in FIG. 5-I being mounted on a power tool.
Figures 1, 7:
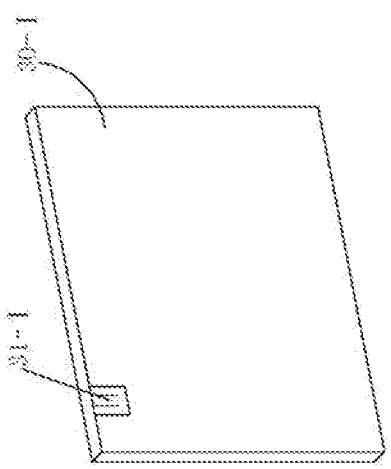
FIG. 7-I is a schematic diagram of an unfolded state of a flexible battery pack according to an implementation of the present invention.

As shown in FIG. 6-III, the DC output interface includes multiple pairs of output positive and negative electrodes 19a-III and several signal electrodes 21a-III, and further includes a pair of input positive and negative electrodes 191a-III.

The output positive and negative electrodes 19a-III are connected to the interface circuit 25-III. Every pair of positive and negative electrode leads is connected to a pair of output positive and negative electrodes 19a-III. In this way, the positive and negative electrodes 19-III on the standard battery unit 51-III of the battery pack 5-III are directly led out to the DC output interface 9-III by using the interface circuit 25-III. In this example, the DC output interface 9-III includes 6 pairs of positive and negative electrodes 19a-III. The rated output voltages of every pair of positive and negative electrodes 19a-III are both 20 V. The signal electrodes 21a-III are connected to the communications module of the body circuit 23-III, and specifically includes one signal output electrode and one signal input electrode. The input positive and negative electrodes 191a-III are connected to input positive and negative electrodes of the power supply part of the body circuit 23-III, and are used to receive electrical energy input from adapter 30-III, to supply power to the body circuit 23-III and peripheral devices of the power supply platform 1-III.

As shown in FIG. 7-III, the adapter 30-III includes an input terminal 31-III, an output terminal 37-III, and a transmission cable 35-III located between the input terminal 31-III and the output terminal 37-III. An input interface 33-III is disposed on the input terminal 31-III. An output interface 39-III is disposed on the output terminal 37-III. The DC driving circuit of the adapter 30-III includes a series-parallel circuit and a discharging protection circuit.

As shown in FIG. 8-III, an electrode arrangement of the input interface 33-III matches that of the DC output interface 9-III, and includes: multiple pairs of input positive and negative electrodes 19-IIIb, matching one by one to the output positive and negative electrodes 19a-III of the DC output interface; several signal electrodes 2 matching one by one to the signal electrodes 21a-III of the DC output interface 9-III; and a pair of output positive and negative electrodes 191b-III, matching one by one to the input positive and negative electrodes 191a-III of the DC output interface 9-III. Specifically, the signal electrode 21b-III includes a signal output electrode, matching a signal input electrode of the DC output interface 9-III; and a signal input electrode, matching a signal output electrode of the DC output interface 9-III.

In this example, the input terminal of the adapter 30-III is basically cylindrical. Correspondingly, a circuit board in the input terminal 31-III is also circular. A circumferential surface of the circuit board matches the cross-sectional shape of the input terminal. The series-parallel circuit is disposed on the circuit board.

This example includes multiple adapters 30-III. Different series-parallel circuits are different in the adapters 30-III. Specifically, the adapter in this example includes a first adapter 301-III, a second adapter 302-III, a third adapter 303-III, and a fourth adapter 304-III.

As shown in FIG. 9-III to FIG. 12-III, a series-parallel circuit is arranged in the input terminal of each adapter 30-III. The series-parallel circuit configures a series/parallel relationship between the pairs of input positive and negative electrodes to obtain preset voltage outputs on the output positive and negative electrodes of the output terminal of the adapter 30-III. The series-parallel circuits of the adapters have different configurations, so that preset voltage outputs of the output positive and negative electrodes are different.

As shown in FIG. 9-III, a series-parallel circuit 43a-III of the first adapter 301-III connects all the pairs of input positive and negative electrodes in parallel, which is equivalent to connecting all the standard battery units 51-III in parallel, so as to obtain a 20V voltage output. As shown in FIG. 10-III, a series-parallel circuit 43b-III of the second adapter 302-III connects every two pairs of input positive and negative electrodes in series, and connects 3 groups of 40 V units obtained through series connection to each other in parallel, so as to obtain a 40V voltage output. As shown in FIG. 11-III, a series-parallel circuit 43c-III of the third adapter 303-III connects every 3 pairs of input positive and negative electrodes in series, and connects 2 groups of 60V units obtained through series connection to each other in parallel, so as to obtain a 60V voltage output. As shown in FIG. 12-III, a series-parallel circuit 43d-III of the fourth adapter 304-III connects all the 6 pairs of input positive and negative electrodes in series, which is equivalent to connecting every two of all the standard battery units 51-III in parallel to form groups and connecting the groups in series, so as to obtain a 120V voltage output.

In this example, series and parallel configurations of circuits from the interface circuit 25-III to the DC output interface 9-III are all fixed. However, there are various types of adapters 30-III, and series-parallel circuits built in the adapters 30-III are different from each other. That is, in this example, the adapters 30-III having different series-parallel circuits are connected to implement voltage conversion, while series-parallel circuits having multiple electronic switches are not arranged. The electronic switches are turned on or off to change a series-parallel connection manner of the circuit. An advantage in this example lies in that: there is no electronic switch, and the costs are lower. The difficulty in circuit design and the difficulty in logic control are also lower. The system is more stable. Moreover, because there are a great variety of DC electrical devices, adapters originally need to be provided for the DC electrical devices. The costs are quite slightly affected when some series-parallel circuits are added to the adapters 30-III.

In this example, a DC-DC transformer is not used to convert a voltage into a working voltage needed by a DC electrical device 200-III, but instead, multiple standard battery units 51-III are built in the battery pack 5-III, and series and parallel configurations between the standard battery unit 51-III are then used to implement voltage conversion. The manner in this example has various advantages. First, the costs of a series circuit are much lower than those of a transformer. Second, various voltages can be conveniently obtained by using different series-parallel circuits, and a complex multi-voltage transformation structure does not need to be disposed. Third, for different tools, a user may purchase different adapters 30-III and does not have to pay for voltage outputs that the user does not need.

In this example, 20 V is chosen as a rated voltage of the standard battery unit 51-III, and 6 groups of positive and negative electrode output leads are selectively connected to the DC output interface 9-III and the AC driving circuit 27-III. Such parameter settings have an advantage of wide application range of output voltages. For an AC scenario, 6 groups of 20V units are connected to each other in series to obtain a 120V DC voltage. The voltage is basically equal to the AC standard voltage in the US, so that a transformer circuit is saved in the AC driving circuit, thereby greatly reducing the costs. For DC scenarios, by using suitable series and parallel configurations, the 6 groups of 20V units may obtain 20V, 40V, 60V, and 120V voltage outputs. These voltage outputs basically cover common input voltages for power tools, and a transformer circuit can also be omitted. Therefore, this example may adapt to various power tools and multiple manufacturers in a simple and at low costs. Moreover, as a transformer circuit is omitted, the loss in a conversion process of electrical energy can further be reduced, so that the battery pack has a longer working time.

It is easily seen that if the power supply system needs to be applied to districts having an AC standard voltage between 220 V and 240 V, only the quantity of positive and negative electrode leads of the 20V unit in the AC driving circuit needs to be increased to 11 pairs or 12 pairs.

The input terminal 31-III of the adapter is connected to the transmission cable 35-III. The transmission cable 35-III includes input positive and negative electrode leads, output positive and negative electrode leads, and signal leads, which are respectively connected to the output positive and negative electrodes of the series-parallel circuit, the output positive and negative electrodes of the input terminal, and the signal electrodes. The various leads are input to output terminals of the adapter 30-III.

The output terminal 37-III includes a discharging protection circuit 41-III. The discharging protection circuit 41-III includes a control unit, a current detection unit, a voltage detection unit, a voltage conversion unit, a start switch, and the like. The control unit includes a microprocessor.

The discharging protection circuit includes at least one of a battery pack overcurrent protection circuit, an undervoltage protection circuit, and an overtemperature protection circuit. As the battery pack protection circuit is disposed in the adapter 30-III instead of the power supply platform 1-III, there are some specific advantages. For example, each adapter 30-III is connected to a same energy storage component 3-III, and there are also two battery packs 5-III. However, because the series/parallel relationships and eventual output voltages are different, the needed protection currents, undervoltage voltage values, and the like are different. However, these output parameters are fixed in each adapter 30-III. Therefore, when the battery pack protection circuit is configured in the adapter 30-III, a battery pack can be protected in a more specified manner.

The current detection unit and the voltage detection unit respectively detect a working voltage and a working current of a battery pack, and send detection results to a control unit. After the control unit receives and processes the detection results, processing is performed according to a preset algorithm. For example, the signal electrode sends a corresponding signal to the power supply platform. After receiving the signal, the main control unit in the power supply platform makes a preset response, for example, raises an alarm, or displays a power. Alternatively, the control unit turns off the power supply system when the voltage is excessively low or the current excessively is large.

The voltage conversion unit converts a voltage of input positive and negative electrodes into a preset voltage value, provides the preset voltage value to the control circuit of the adapter 30-III as a power supply, and transfers the preset voltage value into the power supply platform through output positive and negative electrodes, so as to provide the preset voltage value to the control circuit of the adapter as a power supply.

In this example, the voltage conversion unit includes two voltage conversion elements. A first voltage conversion element converts a voltage of the input positive and negative electrodes into a 12V voltage, and provides the 12V voltage to the output positive and negative electrodes. A second voltage conversion unit further reduces the 12V voltage obtained through the conversion to a 5V voltage, and provides the 5V voltage to the control unit as a power supply.

The start switch is located in the discharging protection circuit 41-III, and is a switch for the adapter 30-III and the entire power supply system 100-III. When the start switch is closed, the discharging protection circuit 41-III and the power supply system 100-III are started, and start working to supply power externally. When the start switch is opened, the discharging protection circuit 41-III and the power supply system 100-III are turned off, and no longer supply power externally.

The output terminal 37-III further includes an output interface 39-III. Positive and negative output electrodes are provided on the output interface 39-III. The output interface is connected to the DC electrical device 200-III to supply power to the DC electrical device 200-III.

In this example, the output terminal 37-III of the adapter 30-III is connected to a power tool that uses a battery pack, to replace an original battery pack. Because an interface of the output terminal 37-III matches an interface of the power tool that uses the battery pack, the output terminal 37-III can be connected to the power tool to supply power. In this example, physical insertion and locking structures of the output terminal of the adapter and arrangement positions of the positive and negative electrodes of the adapter are all the same as those of the original battery pack. However, it should be noted that, for an interface matching the power tool, it is not necessarily that the interface of the output terminal of the adapter is completely consistent with an interface of an original battery pack, as long as the output terminal of the adapter can be connected to the battery pack interface of the power tool.

In this example, a trigger mechanism is arranged on the output terminal 37-III of the adapter 30-III. The trigger mechanism is connected to the start switch. When a power tool is connected to the output interface 39-III of the adapter 30-III, the trigger mechanism is triggered. The trigger mechanism enable the start switch to be turned on, and the discharging protection circuit 41-III of the adapter 30-III is turned on, so that the power supply system supplies power to the power tool. When the power tool is detached from the output interface 39-III of the adapter 30-III, the trigger mechanism is triggered again, so that the start switch is turned off, and the discharging protection circuit 41-III of the adapter 30-III is turned off, so as to turn off the power supply system 100-III.

Specifically, the trigger switch is a micro switch, and is arranged at a preset position on the interface of the output terminal 37-III. When the output terminal is mounted, the preset position is touched and triggered by a corresponding component of the battery pack interface of the power tool, to enable the start switch linked to the trigger switch to be turned on. When the power tool is detached, the corresponding component leaves the micro switch, and the micro switch is released, so that the start switch linked to the micro switch is turned off.

The power supply system 100-III is powered by the battery pack 5-III, and the energy is restricted. If the adapter 30-III and the control circuit 20-III on the power supply platform 1-III stays in a standby state and consumes power, the energy of the battery pack 5-III slowly becomes exhausted. In this case, first, energy sources are wasted, and second, a user may have no electricity to use when the user needs to use some, which affects the work of the user. However, if a component such as a start button is configured on the power supply system 100-III, for example, the adapter 30-III or the power supply platform 1-III according to a conventional concept, every time when a user works, the user needs to turn on a switch of the power supply system 100-III and a switch of the power tool, and further needs to turn off the switches every time the user finishes working. Therefore, operations are complex. The user may occasionally forget to turn off a switch, and the power of the battery pack 5-III may still get exhausted. In this example, the trigger mechanism and the start switch are disposed in a linked manner, so that at the same time when the power supply system brings a desirable energy saving effect, operation convenience is provided to the user. Therefore, it is ensured that without adding an operation step, the power supply system is turned on when a power tool is connected to the adapter, and the power supply system is turned off when a power tool is detached from the adapter.

In some cases, after finishing using a power tool, a user may not unplug the adapter 30-III from the power tool. For example, the user may intend to continue to use the tool after a period of time, or simply forgets to unplug the adapter. In this case, the circuit of the power supply system 100-III is still turned on, and the power slowly gets exhausted.

To avoid this case, the circuit of the output terminal 37-III of the adapter 30-III further includes a load detection unit, configured to detect a load condition of the power supply system 100-III. If the load condition meets a preset condition, the discharging protection circuit 41-III turns off the power supply system 100-III. The preset condition may be that the load is less than a preset value, or that the load is less than a preset value for a preset time. The load detection unit may be an independent component, or the current detection unit and the voltage detection unit may be additionally used to implement load detection.

As discussed above, the discharging protection circuit 41-III is automatically turned off in some cases. For example, when the system stays in a low power consumption state for a long time, or when the battery pack 5-III has an overcurrent. In this case, a user needs to unplug and plug the output terminal 37-III of the adapter 30-III again to restart the power supply system 100-III, which is relatively complex. For this reason, in this example, a restart switch for a user to perform a manual operation is disposed on the adapter 30-III. When the user presses the restart switch, the start switch in the adapter 30-III is triggered to be closed to enable the power supply system 100-III to restart. The restart switch may be disposed to be linked with the micro switch. The power supply system 100-III is restarted by triggering the micro switch. The restart switch may alternatively be disposed to be directly linked with the start switch. When the restart switch and the micro switch are linked, the restart switch is disposed on the output terminal at a position near an output interface, making it convenient to trigger the micro switch.

The following describes an overall working manner of the power supply system 100-III when a DC electrical device 200-III is connected.

An example in which one battery pack is mounted on the power supply platform 1-III and the first adapter 301-III is connected is used to perform description. The first adapter 301-III has a 20V rated output voltage.

When the adapter 30-III is not connected to a power tool, the circuit of the power supply platform 1-III is turned off, there is no power and no energy is consumed. A battery pack 5-III is connected on one battery pack interface 17 of the power supply platform 1-III, and another interface is left unoccupied. The series-parallel circuits in the interface circuit 25-III and the adapter 30-III configure the multiple standard battery units 51-III of the battery pack 5-III to be connected to each other in parallel, and form a 20V rated output voltage at the output terminal of the adapter 30-III. Moreover, the signal electrodes of the battery pack 5-III are connected to the body circuit 23-III of the power supply platform 1-III. The body circuit 23-III of the power supply platform 1-III communicates with the DC driving circuit of the adapter 30-III.

When the output terminal 37-III of the adapter 30-III is connected to a power tool, the micro switch is triggered and enables the start switch in the adapter 30-III to close, and the power supply system 100-III is started. The voltage conversion unit of the discharging protection circuit converts a voltage provided by the series-parallel circuit into a working voltage of the control circuit or another electronic component, and supplies power to the control circuit of the power supply platform 1-III and another electronic component by using the voltage output terminal.

After the power tool is started, the power supply system 100-III supplies power to the power tool, and the body circuit 23-III in the power supply platform 1-III collects related information such as temperature information and voltage information of the battery pack 5-III and transfers the related information to a discharging protection circuit 10-III in the adapter 30-III. The body circuit 23-III controls, in a preset case and according to a received signal, a peripheral device to perform an action, for example, to start a fan when the temperature of a battery is greater than a preset value, to raise an alarm when the temperature is greater than another preset value, or to display a power for another example. The discharging protection circuit 41-III of the adapter 30-III sends, according to the information received from the body circuit 23-III and according to the preset condition, a control instruction to regulate the power supply system 100-III. For example, when the temperature of a battery is excessively high, the discharging protection circuit 41-III opens the start switch to stop the power supply system 100-III. When the power is low, the discharging protection circuit 41-III opens the start switch to stop the power supply system 100-III. Moreover, the voltage detection unit and the current detection unit of the discharging protection circuit 100-III detect a working parameter of the power supply system 100-III, and correspondingly send a signal to the body circuit 23-III in a preset case. For example, when an undervoltage or an overcurrent occurs, the body circuit 23-III correspondingly controls the alarm device to raise an alarm. In other preset cases, the discharging protection circuit 41-III regulates itself, for example, is powers off and stops the power supply system 100-III when an undervoltage or an overcurrent or a low load occurs.

After the power tool is turned off, if adapter 30-III is removed, the micro switch is triggered to enable the start switch of the adapter 30-III to be opened, and the power supply system 100-III is turned off. If the adapter 30-III is not removed, the discharging protection circuit 41-III of the adapter 30-III detects a load condition according to the load detection unit, and turns off power when the load condition meets the preset condition, so as to avoid power consumption during standby. If a user needs to restart the power supply system 100-III, the user presses the restart switch, then the start switch closes, and the power supply system 100-III is restarted.

When two battery packs 5-III are both mounted on an input interface 17 of a battery pack, the interface circuit 25-III connects corresponding positive and negative electrodes of two battery packs 5-III one by one in parallel and lead out the positive and negative electrodes to the DC output interface 9-III of the power supply platform 1-III. The series-parallel circuit of the adapter 30-III performs series and parallel configuration in a same manner. A working manner of the power supply system 100-III is also basically consistent during mounting of one battery pack 5-III. However, a part of control logic is changed. For example, a current upper limit value in an overcurrent protection condition increases. The reason is that when double packs work, it means that the quantity of standard battery units connected in parallel in the circuit increases by one time. When a current upper limit of each standard battery unit stays unchanged, a working current upper limit of the power supply system 100-III may be increased by one time. Therefore, an upper limit value for current protection may be suitably increased.

The following describes the AC driving circuit in this example with reference to FIG. 13-III.

The power supply system 100-III in this example uses the battery pack 5-III as a DC power supply to have desirable portability, so that a user can carry the power supply system 100-III to various occasions in which no electrical energy is supplied and use the power supply system 100-III as a power supply. The occasions are, for example, picnics or outdoor work.

However, many electrical devices, for example, various chargers, microwave ovens or AC power tools, are AC electrical devices 300-III. Usually, a DC source electrical energy supply apparatus cannot supply power to these AC electrical devices 300-III. The reason of this is mainly that if the power supply system 100-III is to provide an AC power output, an inverter needs to be equipped to perform DC-AC conversion. The DC-AC conversion has two major disadvantages: 1. The electrical energy consumption is large in and conversion process, and is usually above 25%. In consideration of that a DC source such as a battery pack 5-III has a limited storage capability, this degree of consumption greatly reduces a working time, affecting the usability of the product. 2. An inverter has high costs, a large volume, and a heavy weight, and the costs, volume, and weight of an inverter increase as the rated output power of the inverter increases. As a result, the electrical energy supply apparatus is expensive and bulky, which suppresses clients' desire to purchase and use the electrical energy supply apparatus. If a DC power is directly supplied to the AC electrical device, the potential dangers described above may exist. To resolve the foregoing problems, the following solution is used in this example.

The AC driving circuit 27-III includes a series-parallel circuit 43e-III, a DC-AC inversion unit, a detection unit, and a main control unit.

The series-parallel circuit 43e-III is connected to multiple pairs of positive and negative electrode leads of the interface circuit 25-III, connects the multiple pairs of positive and negative electrode leads to each other in series to form a preset rated voltage, and transmits the preset rated voltage to the DC-AC inversion unit. The DC-AC inversion unit only converts an input DC voltage into an AC voltage but does not involve transformation. The DC-AC inversion unit provides the AC voltage obtained through conversion to the AC output interface.

A maximum output power of a DC-AC inverter is 2500 W or 3000 W. The power can cover mot home appliances or power tools, and at the same time can ensure that a battery pack works for sufficiently long duration and does not get exhausted soon.

In this example, the series-parallel circuit connects the connected 6 pairs of positive and negative electrode leads to each other in series to form a 120V rated output voltage. In this case, an additional transformer piece is not needed, thereby reducing the costs and energy consumption.

In this example, the DC-AC inversion unit does not convert a DC power into a sinusoidal AC power, but instead, converts the DC power into a square wave or trapezoidal wave AC power. The DC-AC inversion unit is an H-bridge inverter, including an H-bridge driver and an H-bridge circuit. The H-bridge driver controls the H-bridge circuit to convert a DC power into a square-wave AC power with a constant voltage. Because of an actual circuit condition, a waveform of the square-wave AC power may be not standard, and instead the DC power is converted into a trapezoidal wave AC power. The main control unit controls working of the DC-AC inversion unit.

In this example, a zero point having a predetermined duration exists between a positive voltage and a negative voltage of an AC power output by the H-bridge inverter.

The DC-AC inversion unit in this example has a simple structure, does not include rectification and transformation. Only an H-bridge is used to perform direction switching on a DC power to form an output square-wave AC power, and a square wave is not converted into a sine wave, so that the costs for DC-AC conversion are significantly reduced. The price of a conventional inverter is up to thousands of RMB Yuan, but in this example, the DC-AC inversion unit only costs hundreds of Yuan.

Similar to the case of a DC driving circuit, a detection unit of an AC driving circuit includes a current detection unit and a voltage detection unit, which respectively detect a working voltage and a working current of the battery pack 5-III, and send detection results to the main control unit. The main control unit receives and processes the detection results, and performs processing according to a preset algorithm. A signal processing logic of the main control unit and an information interaction manner of the main control circuit are similar to those of the discharging protection circuit of the DC driving circuit, and are no longer repeatedly described.

The voltage conversion unit further includes a voltage conversion unit that supplies power to a PCB board and the like inside the power supply system. The voltage conversion unit converts a voltage connected from the AC driving circuit into a voltage with a preset voltage value, and provides the voltage to the AC driving circuit and the like for use as a power supply. Moreover, the voltage is further converted and then transferred to the main control circuit through the output positive and negative electrodes. A power supply structure for receiving a power supply in the main control circuit is as discussed above, and is no longer repeated.

In this example, the internal voltage conversion unit includes two voltage conversion elements. A first voltage conversion element converts a voltage at input positive and negative electrodes into a 12V voltage, and provides the 12V voltage to the main control circuit. A second voltage conversion unit further reduces the 12V voltage obtained through the conversion to a 5V voltage, and provides the 5V voltage to the AC driving circuit for use as a power supply.

A start switch is disposed inside the AC driving circuit 27-III. The start switch is a switch of an AC driving circuit. When the start switch is closed, the AC driving circuit is started, and the power supply system 100-III starts working, and supplies power externally. When the start switch is opened, the AC driving circuit is turned off, and the power supply system is turned off accordingly.

In this example, a trigger mechanism is arranged on the AC output interface 11-III. The trigger mechanism is connected to the start switch of the AC driving circuit 27-III. When an AC plug of the AC electrical device 300-III is inserted into the AC output interface 11-III, the trigger mechanism is triggered. The trigger mechanism enables the start switch to be turned on. The AC driving circuit 27-III is turned on. The power supply system 100-III is powered up, so as to supply power to the AC electrical device 300-III. When the AC plug is unplugged, the trigger mechanism is triggered again, so that the start switch is turned off, and further the power supply system 100-III is turned off.

Specifically, the trigger switch is a micro switch, and is arranged at a preset position on the AC output interface 11-III. When the AC plug is inserted, the preset position is touched and triggered by the AC plug, to enable the start switch linked to the trigger switch to be turned on. When the AC plug is detached, the AC plug leaves the micro switch, and the micro switch is released, so that the start switch linked to the micro switch is turned off.

The power supply system 100-III is powered by the battery pack 5-III, and the energy is restricted. If the circuits of the power supply platform 100-III stay in a standby state and consumes power, the energy of the battery slowly becomes exhausted. In this case, first, energy sources are wasted, and second, a user may have no electricity to use when the user needs to use some, which affects the work of the user. However, if a component such as a start button is configured on the power supply system 100-III, for example, the adapter or the power supply platform according to a conventional concept, every time when a user works, the user needs to turn on a switch of the power supply system 100-III and a switch of the power tool, and further needs to turn off the switches every time the user finishes working. Therefore, operations are complex. The user may occasionally forget to turn off a switch, and the power of the battery pack may still get exhausted. In this example, the trigger mechanism and the start switch are disposed in a linked manner, so that at the same time when the power supply system brings a desirable energy saving effect, operation convenience is provided to the user. Therefore, it is ensured that without adding an operation step, the power supply system is turned on when an AC electrical device is connected, and the power supply system is turned off when the AC electrical device is detached.

In some cases, after finishing using a power tool, a user may not unplug the AC plug from the AC electrical device interface 11. For example, the user may intend to continue to use the AC electrical device 300-III after a period of time, or simply forgets to unplug the AC plug. In this case, the circuit of the power supply system 100-III is still turned on, and the power slowly gets exhausted.

To avoid this case, the AC driving circuit 27-III further includes a load detection unit, configured to detect a load condition of the power supply system 100-III. If the load condition meets a preset condition, the main control unit turns off the power supply system 100-III. The preset condition may be that the load is less than a preset value, or that the load is less than a preset value for a preset time. The load detection unit may be an independent component, or the current detection unit and the voltage detection unit may be additionally used to implement load detection.

In this example, a maximum rated output power of the AC driving circuit 27-III is greater than 2000 watts, for example, is 2500 watts. This power is sufficient for driving most consumer electric appliances and AC power tools, for example, a refrigerator, a television, a microwave oven, a reciprocating saw, an electric drill, and a lawn mower.

In this example, the AC output interface 11-III includes an American Standard AC jack. In a standard case, the output voltage is 120 V. Therefore, this example can be used as a movable power supply platform in US regions.

In this example, an interlock structure is disposed between the AC output interface 11-III and a DC output interface 9-III, so as to ensure that within a same time, only one of the AC output interface 11-III and the DC output interface 9-III outputs electrical energy.

The interlock structure is specifically a linkage mechanism between the DC output interface 9-III and the series-parallel circuit 43e-III of the AC driving circuit 27-III. The linkage mechanism includes a trigger portion located on the DC output interface 9-III and a linkage portion located between the series-parallel circuit and the interface circuit 25-III. When an adapter 30-III is connected to the DC output interface 9-III, the trigger portion is triggered to enable the linkage portion to perform an action to interrupt an electric connection between the series-parallel circuit and the interface circuit 25-III. When no adapter 30-III is connected to the DC output interface 9-III, the linkage portion maintains the electrical connection between the series-parallel circuit and the interface circuit.

In this example, a rated output voltage of the AC output interface 11-III is N times as large as a rated output voltage of a DC output part (including the DC output interface 9-III and the adapter 30-III), where N is a positive integer less than 10. Specifically, the rated output voltage of the AC output interface 11-III is 120 V, and the output voltage of the DC output part is 20 V, 40 V, 60 V or 120 V.

In this example, the power supply system further includes a charger 70-III. The structure and working manner of the charger 70-III are described below with reference to FIG. 14-III.

As shown in FIG. 14-III, the charger includes an output terminal 71-III, a main body 73, and an AC plug 75-III. An electrical energy output interface is disposed on the output terminal, and the electrical energy output interface is connected to the DC output interface 9-III. That is, the DC output interface 9-III is also used as a charging input interface. Similar to the input interface of the adapter 30-III, multiple pairs of positive and negative electrodes are also arranged on the electrical energy output interface of the charger 70-III, and a signal electrode is further arranged. Specifically, 6 pairs of positive and negative electrodes and a pair of signal transceiver electrodes are arranged on the electrical energy output interface.

A series-parallel circuit is also disposed in the output terminal of the charger. The series-parallel circuit 43f-III is connected to the 6 pairs of positive and negative electrodes on the charger, and connects the positive and negative electrodes to each other in series and then connects the positive and negative electrodes to a body 73-III of the charger 70-III. At the same time, the output terminal 71-III further connects the signal electrode to the body 73-III of the charger.

A charging circuit and a charging protection circuit are disposed in the body 73-III of the charger 70-III. The charging circuit is connect to the series-parallel circuit 43f-III, and charges the battery pack 5-III. That is, a charger 30 charges a 120V battery pack that is formed of multiple standard battery units 51-III by using series and parallel configurations. Moreover, the charging protection circuit receives, by using the signal electrode, battery pack information transferred by the body circuit 23-III of the power supply platform, to perform charging protection. For example, when the battery voltage is greater than the preset value, the charging protection circuit determines that the battery pack needs to be charged, so as to perform charging. When the battery voltage is less than the preset value, the charging protection circuit determines that the battery pack is fully charged, and stops charging. When the temperature of the battery pack is excessively high, the charging protection circuit stops charging. Other response logic is similar to the discharging protection circuit. Details are not described.

It should be noted that, in this example, because the DC output interface 9-III is also used as a charging interface, the power supply platform 1-III prevents the output of DC electrical energy and charging from occurring at the same time. Further, because an interlock structure is disposed between the DC output interface 9-III and the AC driving circuit 27-III, when a device is connected to the DC output interface 9-III, the AC driving circuit 27-III does not work. The power supply platform 1-III also prevents the output of an AC and charging from occurring at the same time. In this way, the power supply platform 1-III implements interlocking between charging and discharging.

To improve heat dissipation capability, in this example, as discussed above, during output of an AC and during charging, the standard battery unit 51-III of the battery pack 5-III is configured by using the series-parallel circuit as a 120V energy storage component to perform working. A relatively high voltage is formed by using series connection, and a working current I of the battery pack 5-III is relatively small, so that based on Joule's Law, $Q=I^2Rt$, heat dissipation is relatively small.

The following describes a second example of the third group examples.

The structure and the invention in this example are basically the same as those in the first example of the third group examples. A difference between this example and the first example lies in that: The power supply platform 1-III further has, in addition to a carrying mode, a base mode. In the carrying mode, the power supply platform 1-III is worn on a user by using a wearable component is used. In the base mode, the power supply platform 1-III is placed on a working surface by using a base disposed on the body 13-III.

In this example, the wearable component of the power supply platform 1-III is detachably mounted on the body 13-III. When the wearable component is mounted on the body 13-III, the body 13-III is suitable for being carried by a user. When the wearable component is removed from the body 13-III, the base of the body 13-III is exposed without coverage and interference, so that the power supply platform 1-III is suitable for being placed on a desk, on the ground or at another position.

In this example, the power supply platform 1-III is a back pack. A back plate of the back pack is basically parallel to a longitudinal direction of the battery pack 5-III. The plane defined by the base is also basically parallel to the longitudinal direction of the battery pack 5-III. In this way, during carrying, the center of gravity of the battery pack 5-III is near human body, so that the battery pack 5-III is relatively labor saving. When the power supply platform 1-III is horizontally placed, the center of gravity of the battery pack 5-III is relatively low, and the power supply platform 1-III is relatively stable.

In this example, when the power supply platform 1-III is worn on a user by using the wearable component, the lengthwise axis of the battery pack 5-III basically extends vertically relative to the ground. When the power supply platform 1-III is placed on a support surface by using the base of the body 13-III, the lengthwise axis of the battery pack 5-III is basically parallel or perpendicular to the support surface.

In this example, the base and the wearable component are located on a same lateral surface of the body 13-III. However, in another optional example, the base and the wearable component are located on different sides of the body 13-III.

In another example, the wearable component may also be fixed on the body 13-III, as long as the wearable component has a portion that does not prevent the base from being placed on a working surface.

The following describes a third example of the third group examples.

The structure and the invention in this example are basically the same as the first example of the third group examples. A difference between this example and the first example lies in that: The output terminal of the adapter 30-III is detachably connected to the input terminal 31-III. That is, the output terminal of the adapter 30-III may be replaced.

As discussed above, a series-parallel circuit is built in the input terminal 31-III of adapter 30-III to determine an output voltage of the adapter 30-III. The interface of the output terminal of the adapter 30-III matches a power tool of a specific brand/model. In the industry, many power tools of different brands have a same input voltage but inconsistent interfaces. By providing a replaceable adapter at an output terminal, a user may purchase multiple output terminals 37-III to enable the power supply platform 1-III to supply power to various power tools, but does not need to purchase multiple adapters 30-III, so that use costs are reduced for users.

If the output terminal 37-III is detachable, terminals included in an interface between the input terminal 31-III and the output terminal 37-III include: output positive and negative terminals, input positive and negative terminals, and a signal terminal. The types and quantities of terminals are consistent with the types and quantities of the groups of leads in the transmission cable.

The following describes a fourth example of the third group examples.

The structure and the invention in this example are basically the same as the first example of the third group examples. A difference between this example and the first example lies in that: an output terminal of an adapter 30-III is not a battery pack-like structure used to connect a power tool that originally uses a battery pack 5-III, but instead is a cable output terminal structure.

In some scenarios, the DC power tool is a high voltage handheld power tool, for example, a power tool that needs a voltage greater than 50 V, greater than 60 V or even greater than 100 V. Specifically, a 120V handheld power tool is discussed here. In the scenario, because a battery pack 5-III is excessively heavy in a high voltage case, if the battery pack 5-III is mounted on the power tool, a user needs to expend more effort, resulting in poor use experience and a falling risk. Therefore, in the scenario, the handheld power tool does not have a battery pack support apparatus, but have only one electrical energy input interface. Correspondingly, the adapter includes an output terminal to form a cable electrical energy output part.

That is, the battery pack 5-III is supported in the power supply system 100-III by using the battery pack support apparatus 15-III. The power supply platform 1-III and the DC power tool are detachably disposed. The power supply platform 1-III outputs electrical energy to a DC tool by using a cable electrical energy output part. The battery pack support apparatus 15-III is only arranged on the power supply platform 1-III. The electrical energy input interface on the DC tool only includes a port for connecting the cable electrical energy output part.

For this type of cable output terminals, terminals on the output interface 39-III of the output terminal 37-III include: output positive and negative terminals, input positive and negative terminals, and a signal terminal. The types and quantities of terminals are consistent with the types and quantities of the groups of leads in the transmission cable. The discharging protection circuit is built in a power tool, and the control logic and arrangement of the discharging protection circuit are consistent as those in the adapter 30-III, and are not elaborated.

The following describe a fifth example of the third group examples.

This example may be considered as a combination of the third example and the fourth example of the third group examples.

The power supply system 100-III has an adapter 30-III the same as that in the fourth example. The adapter 30-III has a cable output terminal. Moreover, the power supply system 100-III has an extension output terminal detachably connected to the cable output terminal. The extension output terminal adapts to a specific power tool. By replacing different extension output terminals, the power supply system may supply power to different power tools.

The adapter 30-III in this example may supply power to a high voltage handheld power tool, or may alternatively supply power to a common power tool using the battery pack 5-III. When supplying power to a high voltage handheld power tool, the cable output terminal of the adapter 30-III is directly connected to the power tool. When supplying power to a specific common power tool that uses a battery pack, the output terminal of the adapter is connected to a suitable battery pack output terminal.

The following describes a sixth example of the third group example.

The power supply system 100-III in this example is basically the same as that in the fourth example of the third group examples. A difference between this example and the fourth example lies in that a working system in this example includes a high-voltage push power tool.

In some scenarios, the DC power tool is a high-voltage push power tool. Most of the weight of the push power tool is supported on the ground, and has a push handle and a main body, so that a user pushes the push handle with hands to drive the main body to move and work on the ground. A typical example is a push lawn mower.

Because the weight of the push power tool does not need to be carried by a user, a high voltage and relatively heavy battery pack may also be mounted on the power tool. In this way, the power tool in the working system has 2 groups of input interfaces. One group of input interfaces are used to receive the weight and electrical energy of a battery pack, and the other group of input interfaces are used to receive the electrical energy of the power supply platform 1-III. In this example, a battery pack of the power tool the input interface includes two battery pack interfaces that separately receive one 60V battery pack and bear the weight of the 60V battery pack. The electrical energy interface of the electrical energy transmission apparatus is a cable electrical energy output part interface, and is used to connect the cable electrical energy output part.

The cable electrical energy output part is located on the push handle, and more specifically, is located at an upper portion of the push handle. In this way, the reason of such an arrangement is that in this example, the power supply platform 1-III may be a wearable device, for example, a back pack. The push handle is a component that is closest to the body of a user on the push power tool. A cable electrical energy output part that facilitates plugging and unplugging by a user is arranged at the position, and a cable is prevented from being excessively long, dropping on the ground or even tripping a user.

In this scenario, the push power tool can only be powered by one of the battery pack and the cable electrical energy output part, or can be powered by both the battery pack and the cable electrical energy output part. In this scenario, the battery pack interface and the cable electrical energy output part interface of the push power tool are connected in parallel.

The following describes a seventh example of the third group examples.

The structure and the present invention in this example are basically the same as those in the first example of the third group examples. A difference between this example and the first example lies in that: the forms of the energy storage components 3-III is different, and correspondingly, battery pack input interfaces and interface circuits on the power supply platforms are also different.

Specifically, the energy storage component includes 4 battery packs. Each battery pack 5-III includes 3 20V standard battery units 51-III. That is, the configuration and quantity of the standard battery units 51-III included in the energy storage component 3-III are the same as those in the first example. However, there are 4 battery packs. Correspondingly, the power supply platform includes 4 battery pack input interfaces. Each battery pack output interface includes 3 pairs of positive and negative electrodes and several signal electrodes. The interface circuit also connects in parallel two standard battery units that belong to different battery packs, to form 6 pairs of positive and negative electrode leads for output to another component of the power supply platform 1-III.

In this example, to ensure that a 120V DC power or AC power can be normally output, only 2 battery packs or 4 battery packs can be mounted on the power supply platform 1-III. In other cases, the power supply platform 1-III does not work.

To avoid incorrect mounting, the battery pack interfaces are grouped into multiple groups. Each group includes multiple battery pack interfaces. The positive and negative electrodes in each group of battery pack interfaces are electrically isolated from each other, and the corresponding positive and negative electrodes between different groups are connected to each other in parallel. Specifically, the battery pack interfaces are grouped into 2 groups. Each group includes 2 battery pack interfaces. The battery pack can be connected to the power supply platform in the form of being mounted to only one group of battery pack interfaces or to all battery pack interfaces.

The power supply platform further includes a battery pack mounting instruction apparatus. The battery pack mounting instruction apparatus instructs a user to mount battery packs in the battery pack support apparatus in a manner in which each group of battery pack interfaces is filled with battery packs or is empty.

The seventh example of the third group examples describes another form of energy storage component, but many other forms are also feasible.

For example, in an example, at least one primary energy storage module only includes one secondary energy storage module. The energy storage component 3-III includes 6 secondary energy storage modules whose rated voltage is 20 V, However, every one secondary energy storage module forms one battery pack, that is, the energy storage component includes 6 battery packs whose rated voltages are 20 V.

In another example, at least two primary energy storage modules have different quantities of secondary energy storage modules. For example, the energy storage component 3-III also includes 6 secondary energy storage modules whose rated voltage is 20 V. However, three of the secondary energy storage modules together form one battery pack, and the rest three secondary energy storage modules separately form one battery pack. That is, the energy storage component 3-III includes one battery pack whose rated voltage is 60 V, and further includes three battery packs whose rated voltages are 20 V.

In another example, the energy storage component 3-III also includes 6 secondary energy storage modules whose rated voltage is 20 V. A difference lies in that every two secondary energy storage modules together form one battery pack. That is, the energy storage component 3-III includes three battery packs whose rated voltages are 40 V.

The foregoing configuration solutions are only examples. A person skilled in the art can understand that the configuration solutions do not constitute any limitation on the present invention. Other configuration solutions are also feasible. For example, a sum of rated voltages of multiple secondary energy storage modules in the foregoing solution is 120 V or 240 V, but may be 160 V, 200 V or the like in another optional solution. Details are not described.

The following describe an eighth example of the third group examples.

The structure and the present invention in this example are basically the same as those in the first example of the third group examples. A difference between this example and the first example lies in that the series-parallel circuit that is originally located in the adapter 30-III is arranged in the power supply platform 1-III instead. A DC output interface 9-III is connected to different adapters 30-III to be connected to different series-parallel circuits, so as to obtain different voltage outputs. The configuration of the series-parallel circuit is the same as above, and the series-parallel circuit can output 20V, 40V, 60V, and 120V output voltages, and are no longer elaborated.

In this example, the body circuit 23-III includes a voltage selection module. The voltage selection module selectively connects one of the series-parallel circuits to the DC output interface according to the type of an adaptor, so as to externally output suitable voltages. In an optional example, the adapter 30-III may select a series-parallel circuit by directly using a structural cooperation instead of an electronic control form. For example, the four series-parallel circuits are arranged in the power supply platform 1-III in a manner of being isolated from each other. When a specific adapter 30-III or another terminal is inserted, one specific series-parallel circuit is connected to the circuit.

The following describes a ninth example of the third group examples.

The structure and the present invention in this example are basically the same as those in the first example of the third group examples. A difference between this example and the first example lies in an interlock structure between an AC output interface 11-III and a DC output interface 9-III.

In this example, the interlock mechanism is a mechanical interlock mechanism. The mechanical interlock mechanism includes locking pieces disposed on the AC output interface and the DC output interface and linkage pieces between the locking pieces. The locking piece moves between a locking position and an unlocking position. At the locking position, the locking piece forbids an output interface at which the locking piece is located from being connected to another device. At the unlocking position, the locking piece allows an output interface at which the locking piece is located to be connected to another device. When any output interface is connected to another device, the locking piece of the output interface is fixed at the unlocking position, and at the same time the locking piece drives the linkage piece to enable other locking pieces to be fixed at the locking position.

Specifically, the mechanical interlock mechanism is one locking rod. The locking rod is located between two output interfaces. Two ends of the locking rod movably extend into two jacks separately to form two locking pieces. A part between the two ends forms the linkage piece.

The following describes a tenth example of the third group examples.

The structure and the present invention in this example are basically the same as those in the first example of the third group examples. A difference between this example and the first example lies in an interlock structure between the AC output interface and the DC output interface.

In this example, the power supply system includes one AC start connector. The AC driving circuit can be started only when the AC start connector is inserted to the DC output interface. In this way, the AC driving circuit is turned on. When the AC output interface supplies power externally, the DC output interface is occupied and cannot externally output energy, so as to implement interlocking between an AC output and a DC output.

Furthermore, a series-parallel circuit in the AC driving circuit may transfer an arrangement to the AC start connector. That is, multiple pairs of positive and negative electrodes are arranged on an input interface of the AC start connector, and are connected to the series-parallel circuit built in the AC start connector. The series-parallel circuit connects the multiple pairs of positive and negative electrodes in series, and then connects the positive and negative electrodes to the AC driving circuit in the body. In such a setting, when the AC start connector is not connected to the DC output interface, the AC driving circuit is isolated from the battery pack and cannot start.

In one example, the working system further includes one storage box. The storage box has multiple compartments separately for placing an electrical energy transmission apparatus, multiple adapters, and a battery pack. In some examples, a small electrical device, for example, a DC power tool, can further be placed. It is convenient for a user to organize and carry the working system.

The following describes an eleventh example of the third group examples with reference to FIG. 15-III to FIG. 20-III.

In this example, the structure and the present invention of the power supply system are basically the same as the first example of the third group examples. The following mainly describes differences between this example and the first example.

As shown in FIG. 15-III, the body 13-III of the power supply platform also includes two battery pack connection interfaces, a body circuit 23-III, and an AC driving circuit 27-III. A DC output interface 9-III is connected to the body circuit 23-III. By using a cooperation with the adapter 30-III, the power supply system 100-III externally outputs DC electrical energy with various voltages, including 20 V, 40 V, and 60 V. The AC output interface 11-III is connected to the AC driving circuit 27-III, to output 120V AC electrical energy. Differences between this example and the first example include: One separate 120V DC output interface 9a-III is further included, where the DC output interface 9a-III and the AC driving circuit 27-III share a series-parallel circuit. The discharging protection circuit for a DC output by the power supply system 100-III is located in the body 13-III, and more specifically, is integrated into to the body circuit 23-III, where the adapter 30-III no longer includes the discharging protection circuit but has only the series-parallel circuit and a power supply wire. A charging interface 12-III and the DC output interface 9-III are disposed independent from each other.

In an alternative example, the 120V DC output interface 9a-III and the AC output interface 11-III are integrated into one interface. When being connected to an adapter, the interface outputs 120V DC electrical energy, and when being connected to an AC plug, the interface outputs 120V AC electrical energy.

As shown in FIG. 16-III, the DC output interface 9-III is connected to the first adapter 301a-III. The first adapter 301a-III is a 20V adapter. Multiple pairs of input positive and negative electrodes are arranged on an input interface of the input terminal 31-III of the adapter, and one output positive electrode and one reference negative electrode are further included. Correspondingly, multiple pairs of output positive and negative electrodes, one input positive electrode, and one reference negative electrode are arranged on the DC output interface 9-III.

The series-parallel circuit 44a-III in the output terminal 37-III of the adapter connects all the multiple pairs of input positive and negative electrodes in parallel, to output a 20V rated voltage. In one aspect, the series-parallel circuit 44a-III outputs the 20V rated voltage to the output terminal of the adapter. In another aspect, the series-parallel circuit 44a-III outputs the 20V rated voltage outputs the 20V rated voltage to an output positive electrode of an input terminal of an adapter. The output positive electrode and the reference negative electrode are respectively connected to the input positive electrode and the reference negative electrode on the DC output interface 9-III, the rated voltage is returned and applied to the body circuit 23-III, so as to supply power to the body circuit and another device.

The output terminal 37-III of the adapter has a pair of positive and negative electrodes, so as to supply electric energy to the DC electrical device 200-III. The input terminal 31-III and the output terminal 37-III of the adapter are connected by using a transmission cable 35-III. The transmission cable 35-III only includes positive and negative electrode leads for transmitting electrical energy.

Specifically, in this example, after positive electrodes of the pairs of input positive and negative electrodes of the input terminal 31-III are connected to each other in parallel, the positive electrodes of the pairs of input positive and negative electrodes are connected to the positive electrodes of the output terminal 37-III by using positive electrode leads in the transmission cable 35-III. After negative electrodes of the pairs of input positive and negative electrodes of the input terminal 31-III are connected to each other in parallel, the negative electrodes of the pairs of input positive and negative electrodes are not directly connected to the negative electrodes of the output terminal 37-III, but instead are connected to the reference negative electrodes of the DC output interface 9-III by using power supply leads in the body. After the reference negative electrodes of the DC output interface 9-III are joined to reference negative electrodes on the input terminals 31-III of the adapter, the negative electrodes of the pairs of input positive and negative electrodes are then connected to the negative electrodes of the output terminal 37-III of the adapter by using the power supply leads.

The output terminal 37-III of the adapter has a battery pack form, and is suitable for being connected to a power tool of a specific type. The output terminal of the adapter further has one temperature electrode plate. However, the temperature electrode plate is not connected to a battery pack and always outputs a normal temperature signal. An actual signal detected by a temperature electrode plate is transmitted into the body circuit 23-III.

The body circuit 23-III includes a discharging protection function. As discussed above, for different DC output voltages, specific parameters such as undervoltage thresholds or overcurrent thresholds for discharging protection are different. For this reason, when adapters of different output voltages are connected to the DC output interface, the body circuit correspondingly selects different discharging protection programs. Specifically, the body circuit 23-III includes a voltage detection unit, configured to detect an output voltage of the power supply system. The body circuit selects a corresponding discharging protection program according to the output voltage. For example, when it is detected that the voltage is between 16 V and 25 V, the body circuit 23-III determines that a 20V first adapter 301a-III is connected to the DC output interface 9-III, correspondingly uses a discharging protection program in a 20V DC output scenario, and chooses a specific undervoltage threshold and overcurrent threshold. When it is detected that the voltage is between 32 V and 46 V, the body circuit 23-III determines that a 40V second adapter 302a-III is connected to the DC output interface 9-III, correspondingly uses a discharging protection program in a 40V DC output scenario, and chooses a specific undervoltage threshold and overcurrent threshold. When it is detected that the voltage is between 50 V and 66 V, the body circuit determines that a 60V third adapter 303a-III is connected to the DC output interface, correspondingly uses a discharging protection program in a 60V DC output scenario, and chooses a specific undervoltage threshold and overcurrent threshold.

At different output voltages, the power supply system 100-III requires different device parameters and reliability in a discharging protection circuit. In the first example, the discharging protection circuit is located in the adapter 30-III. Each output voltage has an independent discharging protection circuit, and component model selection for the discharging protection circuit is also consistent with the requirement of the output voltage. When the output voltage is higher, the requirement for a component is higher. In this example, because of the sharing of 20V, 40V, and 60V discharging protection circuits, the same components require to be used. Therefore, during component model selection, in consideration of using a high requirement preferentially, a configuration of the 60V output voltage is chosen.

By integrating discharging protection circuits for 20V, 40V, and 60V outputs in the body circuit, the costs of an adapter are significantly reduced, and at the same time circuit arrangement is further simplified. Signal lines no longer need to be arranged in the transmission cable, and only positive and negative electrode power supply wires are needed.

A battery pack connection interface of a main body 13 a part connecting the interface circuit to the battery pack connection interface are the same as those in the first example, and are no longer elaborated.

In the body circuit 23-III, the part of the discharging protection circuit also includes a voltage detection apparatus and a discharging current detection apparatus, which are no longer elaborated. However, a difference lies in that, because the discharging protection circuit is integrated in the body circuit 23-III, signal interaction between the body circuit 23-III and the adapter 30-III is no longer needed. Corresponding signal electrode plates and signals and communication apparatuses all need to be omitted. After receiving a voltage signal and a current signal, the main control unit of the body circuit 23-III directly controls working of the discharging protection circuit and a peripheral device. For example, when the voltage is excessively low, raise an alarm or turn off the power supply system 100-III. When the current is excessively large, raise an alarm or turn off the power supply system 100-III. Correspondingly adjust the rotating speed of a fan according to a temperature. When the temperature is excessively high, raise an alarm or turn off the power supply system 100-III. Display a battery power.

The body circuit 23-III further has a master switch, which may perform large current trip protection.

The body circuit 23-III includes a voltage reduction apparatus, which converts a DC voltage returned from an adapter into a preset value to supply energy to another electrical device such as a fan and a display apparatus in the body circuit 23-III and the body. Specifically, the voltage reduction apparatus converts a DC voltage into a 12V voltage and a 5V voltage, and separately supply the 12V voltage and the 5V voltage to different devices. The details are similar to those in the first example, and are no longer elaborated. In addition, when the main body is connected to different adapters, the main body receives different voltages. Therefore, the voltage reduction apparatus adjusts a voltage reduction manner according to an input voltage, so as to ensure that a voltage is reduced to a preset voltage.

Similar to the first example, the start switch of the body circuit 23-III is linked to a trigger apparatus in the DC output interface 9-III. In this way, when the DC output interface 9-III is connected to the adapter 30-III, the trigger apparatus is triggered by the input terminal 31-III of the adapter to enable the start switch to be turn on. Moreover, the body circuit 23-III is automatically powered off when the load is excessively low. The body 13-III further has a reset switch. After the body circuit 23-III is automatically powered off, a user manually restarts the power supply system 100-III. The reset switch is linked to the start switch or the trigger apparatus in the DC output interface. The trigger apparatus in the DC output interface 9-III is also a micro switch.

In this example, the body 13-III has a power display switch. When the power display switch is pressed, a remaining power is displayed on a display panel of the body 13-III. A manner of detecting the remaining power is not specifically described.

In this example, the DC output interface 9-III is interlocked with an AC output interface and the 120V DC output interface 9a-III. That is, when the adapter 30-III is connected to the DC output interface 9-III, the AC output interface 11-III and the 120V DC output interface 9a-III cannot output electrical energy.

As shown in FIG. 17-III, the second adapter 302a-III that has a 40V output is connected to the body of the power supply platform. A series-parallel circuit 44b-III in the input terminal 31-III of the second adapter 302a-III connects in series every two output positive and negative electrode plates of the DC output interface 9-III into one group, and then connects the groups in parallel to output a 40V rated voltage. After the 40V adapter is connected, the body circuit is triggered to be started, and detects an output voltage to determine the type of the connected adapter. After it is confirmed through detection that the adapter is a 40V adapter, the body circuit selects a corresponding discharging protection program.

When the second adapter 302a-III is connected, another configuration of the power supply system is the same as that when the first adapter 301a-III connected, and is no longer elaborated.

As shown in FIG. 18-III, the third adapter 303a-III that has a 60V output is connected to the body 13-III of the power supply platform 1-III. A series-parallel circuit 44c-III in the input terminal of the third adapter 303a-III connects in series every three of output positive and negative electrode plates of the DC output interface 9-III into one group, and then connects the groups in parallel to output a 60V rated voltage. After the 60V adapter is connected, the body circuit 23-III is triggered to be started, and detects an output voltage to determine the type of the connected adapter. After it is confirmed through detection that the adapter is the third adapter 303a-III, the body circuit 23-III selects a corresponding discharging protection program.

When the third adapter 303a-III is connected, another configuration of the power supply system is the same as that when the first adapter 301a-III is connected, and is no longer elaborated.

As shown in FIG. 19-III, a 120V DC output interface and a 120V AC output interface share a part of the circuit. More specifically, because the output voltages are the same, the 120V DC output interface and the 120V AC output interface share the series-parallel circuit and the discharging protection circuit of the AC driving circuit 27-III.

When a device is connected to the 120V DC output interface 9a-III or the AC output interface 11-III, a series-parallel circuit 43d-III of the AC driving circuit 27-III is connected to the interface circuit 25-III, and the DC output interface 9-III and the charging interface 12-III are locked, so that the DC output interface 9-III and the charging interface 12-III cannot externally output electrical energy. The series-parallel circuit 43d-III connects 6 pairs of positive and negative electrodes of the interface circuit 25-III to each other in series, and separately provides the obtained 120 V DC voltage to the 120V DC output interface 9a-III and a DC AC conversion apparatus, that is, an H-bridge driver and an H-bridge circuit. Moreover, the series-parallel circuit further provides the voltage to the voltage reduction apparatus, reduces the voltage to a 12V voltage and a 5V voltage, and supplies power to the peripheral device and the main control unit. In addition, similar to the first example, a load detection apparatus is built in the AC driving circuit 27-III. When the load is low, the AC driving circuit 27-III is automatically powered off, so as to prevent from automatically discharging when the power supply platform 1-III is not outputting energy externally. A start switch is further built in the AC driving circuit 27-III. When a fourth adapter 304a-III is connected to the 120-aV DC output interface 9a-III, the start switch starts the AC driving circuit.

The main control unit of the AC driving circuit 27-III and the main control unit of the body circuit 23-III have a terminal connection relationship. The two main control units separately have a pair of positive and negative terminals and a pair of signal transceiver terminal, which are connected to each other in pairs. The two main control units perform communication by using signal transceiver terminals to transfer various signals and control instructions, for example, a discharging voltage value, a discharging current value, a temperature value, a power-off instruction, and a fan running instruction. The positive and negative terminals are used to provide 5V electrical energy of AC driving circuit to the main control unit of the body circuit.

It should be noted that, in a scenario of a 120V DC output or a 120V AC output, the discharging protection circuit of the power supply system 100-III is mainly controlled by the AC driving circuit 27-III. However, the discharging protection circuit and the body circuit 23-III may cooperate with each other. Specifically, the AC driving circuit 27-III includes a voltage detection apparatus and a current detection apparatus for the entire power supply system 100-III. The body circuit 23-III collects battery pack temperature information and single-battery voltage information from the battery pack 5-III by using the interface circuit 25-III, and transfers the battery pack temperature information and the single-battery voltage information to the AC driving circuit 27-III. The AC driving circuit 27-III integrates information detected by the AC driving circuit 27-III and the received information, and at a preset condition, starts a discharging protection action, for example, raises an alarm or turn off the power supply system 100-III. The body circuit 23-III also bears a part of control functions, for example, controls the fan to operate according to a temperature.

The AC driving circuit 27-III further returns the 12V voltage to the body circuit 23-III, to drive device such as a fan to work.

An input terminal 31-III of a 120V fourth adapter 304a-III does not include a series-parallel circuit, and therefore is disposed to be smaller than input terminals of the 20V, 40V, and 60V adapters. The input terminal of the fourth adapter 304a-III may be disposed to be similar with a common AC plug, and can be inserted in an AC jack, so that in some examples, the 120V DC output interface and the 120V AC output interface are integrated.

The output terminal of the fourth adapter 304a-III is basically the same as the architecture of another adapter, and does not include a discharging protection circuit. However, the output terminal has a structure similar to that in the first example, is a cable connector, and adapts to specific 120 V tools.

The following describes the part of an AC output in this example.

When an AC plug is inserted in the AC output interface 11-III, the AC driving circuit 27-III is triggered to be started. An H-bridge driver drives an H-bridge to output square-wave or trapezoidal-wave AC electrical energy. However, the voltage does not change. An operation manner of the H-bridge driver is similar to that in the first example, and is no longer elaborated.

The following describes the charging part in this example.

As shown in FIG. 20-III, similar to the first example, a charger 70-III has a body 73-III, an output terminal 71-III, and an AC plug 75-III. A series-parallel circuit 43e-III is disposed in the output terminal, so as to connect the standard battery units to a charging circuit by using a preset combination. A difference between this example and the first example lies in that, the series-parallel circuit 43e-III uses two of output positive and negative electrodes of the DC output interface 9-III as one group. The output positive and negative electrodes in the groups are connected in series, and the groups are connected in parallel, to form a battery pack having a 40V rated voltage. The charger 70-III charges the battery pack. In an optional alternative solution, the series-parallel circuit 43e-III of the charger 70-III may also configure the standard battery unit as a 60V battery pack to perform charging. A relatively high charging voltage may reduce heat dissipation. The reason is discussed above.

In addition, the output terminal 71-III of the charger is connected to the charging interface 12-III on the body. The arrangement of interface electrode plates of the output terminal 71-III is different from that in the first example. The charging interface includes 6 pairs of input positive and negative electrodes, which are separately connected to 6 pairs of power supply leads of the interface circuit; and further includes an additional input positive electrode and an additional reference negative electrode. The input positive electrode and the reference negative electrode are also connected to a pair of power supply leads. The output terminals of the charger include 6 pairs of output positive and negative electrodes, and are connected to the 6 pairs of input positive and negative electrodes; and further include an additional output positive electrode and an additional reference negative electrode, which are connected to an input positive electrode and a reference negative electrode of the charging interface 12-III. The 6 pairs of input positive and negative electrodes are connected to the series-parallel circuit 43e-III, and a positive electrode at an end of the series-parallel circuit 43e-III is connected to the body 73-III of the charger 70-III, and is connected to a positive electrode of a mains electricity voltage. The additional output positive electrode and reference negative electrode are connected to the body 73-III of the charger. The output positive electrode is connected to one voltage adjustment circuit of body 73-III. The voltage adjustment circuit adjusts the mains electricity voltage to a 12V voltage and provides the 12V voltage to the body circuit 23-III, so as to supply power to other electrical devices in the body circuit 23-III and the body 13-III. Through the foregoing description, it may be known that a transmission cable 72-III of the charger 70-III includes three power supply wires, that is, one mains electricity voltage positive electrode lead, one 12V voltage positive electrode lead, and one negative electrode lead.

In this example, the reference negative electrode of the charging interface 12-III and the reference negative electrode of the DC output interface 9-III have different positions, so that when the reference negative electrode of the charging interface 12-III is connected to the reference negative electrode of the charger 70-III, a charging current detection apparatus and a charging circuit control apparatus are connected to the circuit, while the discharging current detection apparatus and the discharging circuit control apparatus are not connected to the circuit. When the reference negative electrode of the DC output interface 9-III is connected to the reference negative electrode of the adapter 30-III, the case is opposite, the discharging current detection apparatus and the discharging circuit control apparatus are connected to the circuit, while the charging current detection apparatus and the charging circuit control apparatus are not connected to the access circuit.

Another part in this example is basically similar to the first example of the third group examples, and is no longer elaborated.

In the foregoing power supply system, an AC device interface of power supply system may output a DC power and an AC power. The DC power and the AC power may be alternatively output, or may be simultaneously output. Alternative output may be manually selected by an operator, or is automatic selected. An automatic selection manner is discussed above. In the manual selection manner, the AC device interface may include two same interfaces. A first interface outputs a DC power, and a second interface outputs an AC power. When a user connects an AC device to the first interface, a DC power is output to the AC device interface. When the user connects an AC device to the second interface, an AC power is output to the AC device interface. In the manual selection manner, alternatively, a user connects an AC device to the AC device interface, and then triggers a selection apparatus disposed on the power supply system. The selection apparatus generates a corresponding signal according to an operation of the user. The power supply system controls, according to the signal generated by the selection apparatus, to output a DC power or an AC power to the AC device interface. When an AC driving unit outputs an AC power, to prevent a directly output AC power with a rated power from causing excessively heavy load on the device, in one example, the AC driving unit gradually increases, in a soft start manner, a power of an AC power applied to the AC device interface.

Figures 11, 37:
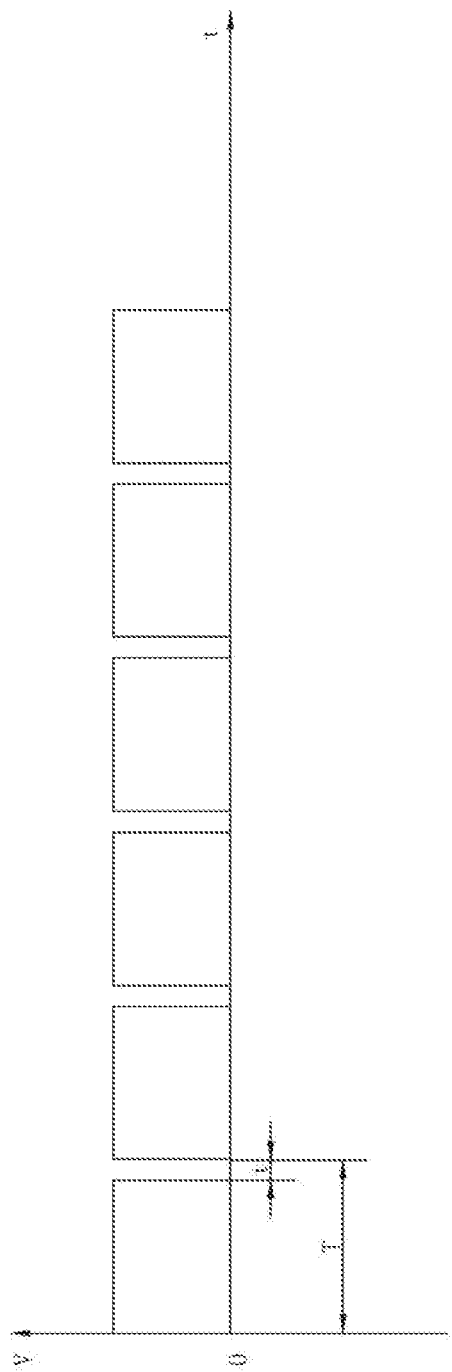
FIG. 37-II is an output waveform diagram of a DC power according to another example of the present invention.

In an interruptive DC power shown in FIG. 37-II, the duration of each interruption is t, and the duration of each DC power is T' (T'=T−t). In a DC output, the reason of setting an interruption is that by means of interruption for preset duration, it is ensured that when a main switch of the AC device is opened, the supply of electrical energy to the AC device by the DC power can be successfully cut off, so as to avoid a case that the supply cannot be cut off after the main switch receives an open instruction. The main switch here is a switch as follows: The switch is disposed on the AC device, and is connected in series to a load apparatus of the AC device. When the switch is closed, electrical energy flows from the AC device interface via the main switch to the load apparatus, to enable the load apparatus to obtain the electrical energy and start working. When the switch is open, electrical energy transmission between the AC device interface and the load apparatus is interrupted, to enable the load apparatus to stop working. The load apparatus of the AC device is described by using examples. For example, a load apparatus of a refrigerator is a compressor, a load apparatus of a home electric fan is a motor, and a load apparatus of an AC power tool is a motor. The open instruction may be that the operator manually releases the main switch, or may alternatively be an open instruction sent by a control component.

The main reason that the main switch cannot open after receiving an open instruction is that when a flowing current or voltage is relatively large, ionization of air may occur between contact points, that is, an arc appears between the contact points. As a result, electricity can still be transmitted between two separate contact points through the arc. This is equivalent to that the contact points are not separated, and the main switch cannot be turned off. However, in this case, if the output of the current is interrupted, the electricity in the air disappears, and the arc disappears. Therefore, electricity cannot be transmitted between two separate contact points, so that the main switch is opened.

The duration t of interruption is determined according to factors such as the operation frequency of opening the main switch, the material of the contact point of the main switch, the distance between the contact points, the elastic force between the contact points, and the magnitude of the flowing current or voltage. Based on the consideration of the foregoing factors, duration t of the interruption is greater than 3 ms. More specifically, the duration t of interruption is 4 ms to 6 ms. The duration t of interruption cannot be excessively long, or otherwise easily causes the fluctuation of the load and the fluctuation of a power supply of a control circuit.

The duration t' of a DC power is determined according to factors such as a time difference between a time point of opening the main switch and a time point at which the interruption of a DC power occurs, the operation frequency of opening the main switch, the material of the contact point of the main switch, the distance between the contact points, the elastic force between the contact points, and the magnitude of the flowing current or voltage. In consideration of the foregoing factors, in one example, the duration t' of a DC power is greater than 20 ms. More specifically, the duration t' of a DC power is 20 ms to 200 ms. The duration t' of a DC power cannot be excessively long, or otherwise easily causes arcing. The duration t' of a DC power cannot be excessively short, otherwise cannot provide a rated power to the AC device.

The interruption of the interruptive DC power may occur periodically, or may alternatively occur only when a preset condition is met. In a case, the preset condition is that the main switch of the AC device receives an open instruction. Specifically, at the same time when receiving an open instruction, the main switch of the AC device may send the open instruction to the power supply system by sending a corresponding signal in a mechanical or electronic manner. When detecting the signal, the power supply system controls the DC power at the AC device interface to be interrupted. After the interruption lasts for the preset duration, the power supply system is controlled to continue to output the DC power. When it is detected that the main switch is open a next time, the output of the DC power is interrupted again, and after the interruption lasts for the preset duration, the power supply system is controlled to continue to output the DC power. This process is repeated. If the DC power is interrupted when the preset condition is met, the duration of the interruption is t'. In one example, the duration t' of interruption is the same as the duration t of interruption. The duration t of interruption is the duration of each interruption when the interruptive DC power is periodically interrupted.

In another case, the preset condition is that the main switch receives an open instruction, and a working parameter of the main switch meets an interruption condition. The working parameter of the main switch may be a current, a voltage or the like that flows through the main switch. When the working parameter of the main switch meets the interruption condition, it indicates that although the main switch receives an open instruction, an arc occurs between contact points of the main switch. In this case, there is still a current flowing through the main switch, and a voltage drop occurs between the contact points of the switch. In this case, the interruption condition is that within the preset duration after the main switch receives an open instruction, the current flowing through the main switch is greater than or equal to a preset value. In this case, the interruption condition may further be that within the preset duration after the main switch receives an open instruction, a voltage difference generated between the two contact points by the current flowing through the main switch is less than or equal to the preset value.

In still another case, the preset condition is that a working parameter of the main switch meets an interruption condition. When the working parameter of the main switch meets the interruption condition, it indicates that the main switch receives an open instruction, but an arc occurs between contact points of the main switch. Because the arc itself has a resistance, when the arc occurs, the working parameter of the main switch is changed. For example, the current flowing through the main switch is reduced. Based on this, the interruption condition may be: the current flowing through the main switch is less than the preset value; or a change rate of the current is negative and an absolute value is greater than or equal to the preset value; or after the main switch is turned off for preset duration, the current flowing through the main switch is greater than zero; or starting from a time point when the main switch is turned off, within preset duration, a difference of the current flowing through the main switch is greater than or equal to the preset value. For another example, the voltage between the contact points of the main switch increases, but is less than an output voltage of the AC device interface. Based on this, the interruption condition may be: a voltage across the contact points of the main switch is less than the preset value; or a change rate of the voltage is positive and an absolute value is less than or equal to the preset value; or within preset duration after the main switch is turned off, the voltage across the contact points of the main switch is less than an output voltage of the AC device interface; or starting from a time point when the main switch is turned off, within preset duration, a difference of the voltage across the contact points of the main switch is less than or equal to the preset value. When detecting that the working parameter of the main switch meets the interruption condition, the power supply system controls the AC device interface to be interrupted, and after the interruption lasts for preset duration, the power supply system is controlled to continue to output a DC power. When it is detected that the working parameter of the main switch meets the interruption condition a next time, the output of the DC power is interrupted again, and after the interruption lasts for preset duration, the power supply system is controlled to continue to output the DC power. This process is repeated. When the working parameter of the main switch meets the interruption condition, if the DC power is interrupted, the duration of the interruption is t'. In one example, the duration t' of interruption is the same as the duration t of interruption. The duration t of interruption is the duration of each interruption when the interruptive DC power is periodically interrupted.

In addition, the interruptive DC power that is interrupted only when the interruption condition is met and the interruptive DC power that is periodically interrupted may be switched. Specifically, when an AC device of a type A is connected to the AC device interface, the power supply system supplies power to the AC device, and the working parameter of the main switch of the AC device keeps being monitored. When the working parameter of the main switch does not meet the interruption condition, the output of the DC power continues. When it is detected that the working parameter of the main switch meets the interruption condition, the output of the DC power is interrupted, and the interruption is kept for the preset duration t. Then, if the power supply system detects that the AC device of the type A continues acquiring electricity from the power supply system and is not removed from the power supply system, the power supply system supply power to the AC device of the type A by using a periodically interruptive DC power. For a manner of detecting that the AC device of the type A continues acquiring electricity from the power supply system, it may be detected whether a plug of the AC device has a plugging and unplugging operation, or it may be detected a current output occurs again in the AC device interface connected to the AC device within a preset time. It should be noted that, the interruptive DC that is interrupted only when the interruption condition is met includes an interruptive DC power for which the DC output is turned off when the working parameter of the main switch meets the interruption condition, and further includes an interruptive DC power for which DC output is turned off only when the main switch receives an open instruction and the working parameter of the main switch meets the interruption condition.

In addition, the interruptive DC power that is interrupted only when an interruption condition is met and the interruptive DC power that is interrupted when the main switch receives an open instruction may be switched. Specifically, when an AC device of a type A is connected to the AC device interface, the power supply system supplies power to the AC device, and the working parameter of the main switch of the AC device keeps being monitored. When the working parameter of the main switch does not meet the interruption condition, the output of the DC power continues. When it is detected that the working parameter of the main switch meets the interruption condition, the output of the DC power is interrupted, and the interruption is kept for the preset duration t. Then, if the power supply system provides a DC power to the AC device of the type A, when the power supply system detects that the main switch of the AC device of the type A receives an open instruction, the output of the DC power is interrupted, and the interruption is kept for the preset duration t, and then the DC power continues to be provided. It should be noted that, the interruptive DC that is interrupted only when the interruption condition is met includes the interruptive DC power for which the DC output is turned off when the working parameter of the main switch meets the interruption condition, and further includes the interruptive DC power for which the DC output is turned off only when the main switch receives an open instruction and the working parameter of the main switch meets the interruption condition.

The following describes the fourth group examples with reference to FIG. 1-IV.

As shown in FIG. 1-IV, the working system in this example is formed of an electrical energy transmission apparatus 1-IV, an energy storage component 3-IV and an electrical device 5-IV. The electrical energy transmission apparatus 1-IV and the energy storage component 3-IV form an electrical energy supply apparatus (also referred to as a power supply system). The electrical energy transmission apparatus 1-IV is electrically connected between the energy storage component 3-IV and the electrical device 5-IV, and electrical energy stored in the energy storage component 3-IV is transferred to the electrical device for the electrical device to work. The energy storage component 3-IV is a DC power supply, and specifically includes one or more battery packs. The electrical device 5-IV may be an AC electrical device, a USB electrical device, a DC electrical device or the like.

The electrical energy transmission apparatus 1-IV includes an input component 11-IV, an adapter component 15-IV, and an output component 13-IV. The input component 11-IV is connected to the energy storage component 3-IV to receive an electrical energy input. The output component 13-IV is connected to the electrical device to output electrical energy to the electrical device. The adapter component 15-IV is connected between the input component 11-IV and the output component 13-IV, converts electrical energy received by the input component 11-IV into electrical energy suitable for use by the electrical device, and transmits the electrical energy to the output component 13-IV. The functions and structures of the output component 13-IV and the adapter component 15-IV are the same as those in the foregoing example. The output component 13-IV includes various output interfaces in the foregoing examples. The adapter component 15-IV may selectively include various circuits, for example, a control circuit.

The energy storage component 3-IV may include several primary energy storage modules. The primary energy storage module includes several secondary energy storage modules. The secondary energy storage module includes several tertiary energy storage modules. Specific forms of the energy storage modules are the same as those in the foregoing examples, and are no longer elaborated here. The energy storage component 3-IV may further include only one primary energy storage module. The primary energy storage module is formed of multiple cells that are connected to each other in series and/or in parallel. A voltage of the primary energy storage module is any one of 80 V, 100 V, 120 V, 200V, 220 V, 240 V, 260 V or 280 V.

The output component 13-IV includes an AC device interface 19-IV. The AC device interface 19-IV may output a DC power and an AC power. An effective voltage value of an AC power output by the AC device interface 19-IV is 120 VAC or 240 VAC. The output component 13-IV further includes a USB interface 17-IV. The output component 13-IV may further selectively include a DC device interface. There is one or more DC device interfaces. The multiple DC device interfaces have a same output voltage or different output voltages. The output voltage of the DC device interface is one or more of 20 V, 40 V, 60 V, 80 V, 100 V or 120 V.

The electrical energy transmission apparatus 1-IV further includes a charging interface 21-IV. The electrical energy transmission apparatus 1-IV introduces an external power supply by using the charging interface 21-IV to the electrical energy transmission apparatus 1-IV, to charge the energy storage component 3-IV. Certainly, the energy storage component 3-IV may also be detached from the electrical energy transmission apparatus 1-IV, and is charged by using another charging device. The charging interface 21-IV may be a solar energy charging interface, for example, a 12V, 24V or 48V solar energy charging interface, or may alternatively be a vehicle-mounted cigarette lighter receptacle interface, for example, a 12V vehicle-mounted cigarette lighter receptacle interface or a 24V vehicle-mounted cigarette lighter receptacle interface. In this case, the adapter component 15-IV further includes a charging management module for adjusting an input voltage of the charging interface 21-IV, making the charging interface 21-IV suitable for charging the energy storage component 3-IV. Moreover, a charging management module further manages a charging process of the energy storage component 3-IV. For example, the charging management module manages a current for charging or manages when to stop charging.

The electrical energy transmission apparatus 1-IV further includes an audio processing circuit 22-IV. The audio processing circuit 22-IV may receive an external audio signal and play the audio signal. The external audio signal may be at least one of a radio signal and an MP3 signal. The audio processing circuit 22-IV may acquire an audio signal from outside in a wireless manner or acquire a signal from outside in a wired manner. An MP3 signal is used as an example. When the MP3 signal is acquired from outside by using a wireless manner, the audio processing circuit 22-IV further includes a wireless transmission module. The wireless transmission module may be a Bluetooth module, a WiFi module or the like. When an MP3 signal is acquired from outside in a wired manner, the audio processing circuit 22-IV further includes a USB interface circuit, and an MP3 signal is acquired from outside by using a USB interface. When the audio processing circuit 22-IV receives a radio signal, the audio processing circuit 22-IV further includes an antenna. A radio signal that exists in the environment is received by using the antenna. The audio processing circuit 22-IV is electrically connected to the adapter component 15-IV, so as to acquire electrical energy of the energy storage component 3-IV.

The audio processing circuit 22-IV may be integrally designed with the electrical energy transmission apparatus 1-IV, or may be designed to be a detachable module, so as to be detachably mounted on the electrical energy transmission apparatus 1-IV. When the audio processing circuit 22-IV is a detachable module, interfaces that may cooperate with each other are separately disposed on the electrical energy transmission apparatus 1-IV and the audio processing circuit 22-IV, to enable the audio processing circuit 22-IV to acquire electrical energy from the electrical energy transmission apparatus 1-IV and/or perform signal transmission.

The electrical energy transmission apparatus 1-IV may further include a projector circuit 24-IV. The projector circuit 24-IV includes a wireless transmission module, and acquires a video signal from outside by using the wireless transmission module. The projector circuit 24-IV is electrically connected to the adapter component 15-IV, so as to acquire electrical energy of the energy storage component 3-IV. The projector circuit 24-IV and the audio processing circuit 22-IV cooperate to synchronously transfer an audio signal and a video signal that are obtained from outside to a user, so as to achieve a home cinema effect. The projector circuit 24-IV further includes a remote control signal receiving port for receiving a control signal of a remote control.

The projector circuit 24-IV may be integrated on the electrical energy transmission apparatus 1-IV, or may be detachable from the electrical energy transmission apparatus 1-IV. When the projector circuit 24-IV is a detachable module, interfaces that may cooperate with each other are separately disposed on the electrical energy transmission apparatus 1-IV and the projector circuit 24-IV, enabling the projector circuit 24-IV to acquire electrical energy from the electrical energy transmission apparatus 1-IV and/or perform signal transmission.

The audio processing circuit 22-IV and the projector circuit 24-IV may also not include a wireless transmission module. In this case, the electrical energy transmission apparatus 1-IV further includes a signal transmission interface. An external audio signal and an external video signal are transferred respectively to the audio processing circuit 22-IV and the projector circuit 24-IV by using the signal transmission interface. The signal transmission interface connected to the audio processing circuit 22-IV may be a USB interface. The signal transmission interface connected to the projector circuit 24-IV may be at least one of a USB interface, an HDMI interface, and a VGA-PC interface.

The audio processing circuit 22-IV and the projector circuit 24-IV may also not include a wireless transmission module. In this case, the wireless transmission module is disposed on the electrical energy transmission apparatus 1-IV. An external audio signal and an external video signal are transferred respectively to the audio processing circuit 22-IV and the projector circuit 24-IV by using the wireless transmission module disposed on the electrical energy transmission apparatus 1-IV.

The following describes the fifth group examples with reference to FIG. 1-V to FIG. 10-V.

Referring to FIG. 1-V to FIG. 5-V, the example discloses a battery pack 30-V that outputs multiple voltages. The battery pack 30-V includes at least two battery units 2-V. Each battery unit 2-V leads out a positive terminal 6' and a negative terminal 6. The battery pack 30-V further includes a voltage conversion apparatus 8-V. The voltage conversion apparatus 8-V includes an input terminal 10-V and an output terminal 12-V that are electrically connected to the at least two battery units 2-V, where the output terminal 12-V is configured to output a voltage. The input terminal 10-V includes at least two groups of electrode contacts (not shown) corresponding to the quantity of the battery units 2-V. Each group of electrode contacts includes a positive electrode contact electrically connected to the positive terminal 6'-V and a negative electrode contact electrically connected to the negative terminal 6-V. The voltage conversion apparatus 8-V combines the at least two battery units 2-V in series and/or in parallel to enable the output terminal 12-V to output different voltage values.

In this example of the present invention, by using a principle that in a parallel connection, a voltage does not change while an output current increases and in a series connection, a voltage increase while an output current does not change, connecting lines between electrode contacts in the voltage conversion apparatus 8-V and between the electrode contacts and the output terminal 12-V are changed, so as to connect a particular quantity of battery units 2-V in different manners, that is, in series and/or in parallel, to enable the battery pack 30-V to output different voltage values.

For example, the input terminal 10-V of the voltage conversion apparatus 8-V includes a groups of electrodes. Each group of electrodes corresponds to one group of electrode contacts (that is, one positive electrode and one negative electrode). That is, there are a groups of electrode contacts, where b groups of electrode contacts are connected in parallel, and a/b groups of electrode contacts are connected in series, where b is a positive divisor of a. A quantity of battery units 2-V corresponding to the a groups of electrodes is a. In one example, a is an even number. The purpose is mainly to improve the utilization of the battery units 2-V. The service life of the battery unit 2-V is approximately 500 times of charging and discharging. If the quantity of battery units 2-V is an odd number but even-numbered battery units 2-V are used in series connection and/or parallel connection, one battery unit 2-V is idle, which consequently affects the overall service life of the battery pack 30-V. Certainly, if there are odd-numbered battery units 2-V, it is also feasible that the value is a composite number such as 9, 15 or 21.

An example in which a is equal to 6 is used for specific description below. Specific structures of the battery unit 2-V and the voltage conversion apparatus 8-V that exist when the quantity of the battery units 2-V in the battery pack 30-V is 6 are specifically described. A manner in which connecting lines between 6 groups of electrode contacts on the voltage conversion apparatus 8-V and between the 6 groups of electrode contacts and the output terminal 12 are changed to change series and/or in parallel connection manners of the 6 battery units to further output several different voltage values is also specifically described.

For a battery pack 30-V that includes 6 battery units 2-V in a preferred example of the present invention, FIG. 1-V is a left view, and FIG. 2-V is a front view and a diagram of internal connecting wires. First, referring to FIG. 2-V, the battery pack 30-V has a housing 4-V. The housing 4-V is divided into 6 compartments in a row. Each compartment receives one battery unit 2-V. For convenient description, an arrangement direction of the battery units 2-V in FIG. 2-V is defined to be the vertical direction, and the 6 battery units 2-V are sequentially arranged into a "-" form from left to right. Certainly, the layout of the 6 battery units 2-V in the housing 4-V may be in another arrangement manner, for example, two rows and three columns or three columns two rows. Correspondingly, the compartments in the housing 4-V may also have another variant.

It should be noted that, each battery unit 2-V may be a single battery with a minimum energy unit, or may be formed of multiple batteries with a minimum energy unit that are connected to each other in series, that is, a "battery pack" concept in the general sense. Moreover, each battery unit 2-V itself may have a housing that completely wraps a battery in the battery unit 2-V, for example, a housing of a battery pack. Each battery unit 2-V may alternatively have no housing but instead have only a simple stack and combination of batteries in the battery unit 2-V. A single battery may be a nickel-cadmium/nickel-hydrogen battery whose nominal voltage is 1.2 volts, or may alternatively be a lithium battery whose nominal voltage is 3.6 volts. The energy density of a lithium battery is approximately three times as large as that of a nickel-cadmium battery, and a lithium battery is smaller and lighter than a nickel-cadmium battery. In addition, a lithium battery has desirable discharging efficiency, and can discharge even in an environment with a relatively low temperature and can obtain a stable voltage within a relatively wide temperature range. Therefore, in this implementation, a single battery is a lithium ion battery. The battery unit 2-V is a lithium ion battery unit. Certainly, in another implementation, a nickel-hydrogen or nickel-cadmium battery may also be chosen.

Each battery unit 2-V includes a same quantity of batteries. Therefore, each battery unit 2-V has a same output voltage. In this example, a voltage value of each battery unit 2-V is 20 volts (each battery unit 2-V is formed of 6 lithium batteries connected in series, and an actual maximum discharging voltage is 21.6 volts). Certainly, the voltage value of each battery unit 2-V may alternatively be 12 volts (each battery unit 2-V is formed of 4 lithium batteries connected in series, and an actual maximum discharging voltage is 14.4 volts), or may further be 3.6 volts or any other multiple of 3.6 volts. In addition, when a nickel-hydrogen battery or a nickel-cadmium battery is used, a voltage value of each battery unit 2-V is 1.2 volts or any multiple of 1.2 volts.

Referring to FIG. 1-V and FIG. 2-V, a pair of electrode terminals are led out from each battery unit 2-V, that is, one positive terminal 6'-V is led out upwardly from a positive electrode of each battery unit 2-V, and one negative terminal 6-V is led out upwardly from a negative electrode of each battery unit 2-V. That is, in total 6 positive terminals 6'-V and 6 negative terminals 6-V are led out above the housing 4-V of the battery pack 30-V.

Certainly, the "upwardly" is discussed according to the arrangement positions of the battery units 2-V in the figures. As the relative positions of the battery units 2-V are changed, the positions of the electrode terminal may be changed correspondingly. An electrode terminal may be led out from the housing 4-V of the battery pack 30-V in the form of a plug. Certainly, the electrode terminal may be a jack or a port in another form.

FIG. 4-V and FIG. 5-V are respectively a schematic diagram of the voltage conversion apparatus 8-V according to the present invention and a schematic diagram of the assembly of the voltage conversion apparatus 8-V and the housing 4-V of the battery pack 30-V. The voltage conversion apparatus 8-V includes an input terminal 10-V and an output terminal 12-V. The input terminal 10-V has 6 groups of electrode contacts corresponding to the 6 groups of electrode terminals. Each group of electrode contacts includes a positive electrode contact electrically connected to the positive terminal and a negative electrode contact electrically connected to the negative terminal. An arrangement manner of electrode contacts on the voltage conversion apparatus 8-V is the same as an arrangement manner of electrode terminals on the housing 4-V. To prevent incorrect connection between positive electrodes and negative terminals of electrode contacts, positive and negative electrodes marks (not shown) are disposed at corresponding positions of the housing 4-V and the voltage conversion apparatus 8-V.

In this example, the voltage conversion apparatus 8-V is disposed as a cover plate of the housing of the battery pack 30-V. An electrode contact is disposed on a surface, facing the housing 4-V, of the cover plate, and a port of the output terminal 12-V is disposed on the other surface of the cover plate. The cover plate may be pivotally connected to the housing 4-V of the battery pack 30-V by using a pivoting shaft, or may be movably connected to the housing 4-V in another manner, or may be disposed separately from the housing 4-V and cover the housing 4-V when necessary. In this way, when the cover plate covers the housing 4-V, electrode contacts below the cover plate are electrically connected to electrode terminals on an upper portion of the housing 4-V in a manner of one-to-one correspondence.

Certainly, the present invention is not limited to a vertical connection form. For example, when electrode terminals are located on a lateral surface of the housing 4-V of the battery pack 30-V, the voltage conversion apparatus 8-V and the housing 4-V are correspondingly electrically connected on a lateral surface. For a connection manner between an electrode contact and an electrode terminal, a plugging manner may be used. For example, in this example, an electrode terminal is disposed to be a plug that protrudes from the plane of the housing 4-V, and an electrode contact is disposed to be a concave jack. When the electrode terminal needs to be connected to the electrode contact, the input terminal 10-V of the voltage conversion apparatus 8-V is aligned with the housing 4-V to enable the plug to be inserted in the jack. Therefore, the electrode contact may be electrically connected to the electrode terminal.

Certainly, the positions of the plug and the jack may be interchanged. Alternatively, a person skilled in the art may easily conceive of other manners of electrically connecting an electrode contact to an electrode terminal. The other manners are no longer enumerated here.

In addition, the voltage conversion apparatus 8-V is also not limited to the form of a cover plate. A person skilled in the art may very easily conceive of other variant forms, which are also no longer described in detail here.

In this example, the voltage conversion apparatus 8-V changes connecting lines between the groups of electrode contacts in the voltage conversion apparatus 8-V and between the electrode contacts and the output terminal, to connect the groups of electrode contacts in different manners, that is, in series and/or in parallel, so as to connect the battery units 2-V in series and/or in parallel by connecting electrode contacts and electrode terminals, thereby eventually enabling the battery pack 30-V to output different voltage values. Four connecting manners of the voltage conversion apparatus 8-V that enable the 6 battery units to output 4 different voltage values are enumerated below.

FIG. 6-V shows a first implementation of internal connecting wires of the voltage conversion apparatus 8-V in the present invention. In this implementation, b=6. That is, 6 groups of electrode contacts are connected in parallel, and 1 group of electrode contacts are connected in series. That is, positive electrodes (16', 18', 20', 22', 24', 26') of each group of electrode contacts are connected to positive electrodes 12'-V of the output terminal. Negative electrodes (16, 18, 20, 22, 24, 26) of each group of electrode contacts are connected to negative electrodes 12-V of the output terminal. In this way, the battery pack 30-V that is formed of 6 20 Volt battery units 2-V and the voltage conversion apparatus 8-V outputs a 20 Volt voltage. The output terminal 12-V of the battery pack 30-V may be electrically connected to a common cordless power tool whose rated voltage is 20 volts, where the power tool is, for example, a sanding machine, an oscillator or a gun drill.

FIG. 7-V shows a second implementation of internal connecting wires of the voltage conversion apparatus 8-V according to the present invention. In this implementation, b=3. That is, 3 groups of electrode contacts are connected in parallel, and 2 groups of electrode contacts are connected in series. For ease of description, electrode contacts in FIG. 7-V are sequentially named a first group of electrode contacts to a sixth group of electrode contacts from left to right. Positive electrodes 16'-V of a first group of electrode contacts are connected to negative electrodes 18-V of a second group of electrode contacts. Negative electrodes 16-V of the first group of electrode contacts are connected to negative electrodes 12-V of the output terminal. Positive electrodes 18'-V of the second group of electrode contacts are connected to positive electrodes 12'-V of the output terminal. Positive electrodes 20'-V of a third group of electrode contacts are connected to negative electrodes 22-V of a fourth group of electrode contacts. Negative electrodes 20V of the third group of electrode contacts are connected to the negative electrodes 12-V of the output terminal. Positive electrodes 22'-V of the fourth group of electrode contacts are connected to the positive electrodes 12-V' of the output terminal. Positive electrodes 24'-V of a fifth group of electrode contacts are connected to negative electrodes 26-V of the sixth group of electrode contacts. Negative electrodes 24-V of the fifth group of electrode contacts are connected to the negative electrodes 12-V of the output terminal. Positive electrodes 26'-V of the sixth group of electrode contacts are connected to the positive electrodes 12-V' of the output terminal. In this way, the battery pack 30-V that is formed of the 6 20 Volt battery units 2-V and the voltage conversion apparatus 8-V disposed in this manner may output a 40 Volt voltage value. The output terminal 12-V of the battery pack 30-V may be electrically connected to a cordless power tool whose rated voltage is 40 volts, where the battery pack 30-V is, for example, a chainsaw or pruning shears.

FIG. 8-V shows a third example of internal connecting wires of the voltage conversion apparatus 8-V according to the present invention. In this implementation, b=2. That is, 2 groups of electrode contacts are connected in parallel, and 3 groups of electrode contacts are connected in series. For ease of description, electrode contacts in FIG. 8-V are also sequentially named a first group of electrode contacts to a sixth group of electrode contacts from left to right. Positive electrodes 16'-V of a first group of electrode contacts are connected to negative electrodes 18-V of a second group of electrode contacts. Positive electrodes 18'-V of the second group of electrode contacts are connected to negative electrodes 20V of a third group of electrode contacts. Negative electrodes 16-V of the first group of electrode contacts are connected to negative electrodes 12-V of the output terminal. Positive electrodes 20'-V of the third group of electrode contacts are connected to positive electrodes 12'-V of the output terminal. Positive electrodes 22'-V of a fourth group of electrode contacts are connected to negative electrodes 24-V of a fifth group of electrode contacts. Positive electrodes 24'-V of the fifth group of electrode contacts are connected to negative electrodes 26-V of the sixth group of electrode contacts. Negative electrodes 22-V of the fourth group of electrode contacts are connected to the negative electrodes 12-V of the output terminal. Positive electrodes 26'-V of the sixth group of electrode contacts are connected to the positive electrodes 12'-V of the output terminal. In this way, the battery pack 30-V that is formed of the 6 20 Volt battery units 2-V and the voltage conversion apparatus 8-V disposed in this manner may output a 60 Volt voltage value. The output terminal 12-V of the battery pack 30-V may be electrically connected to a power tool such as a lawn mower.

FIG. 9-V shows a fourth implementation of internal connecting wires of the voltage conversion apparatus 8-V according to the present invention. In this implementation, b=1. That is, 1 group of electrode contacts are connected in parallel, and 6 groups of electrode contacts connected in series. For ease of description, also electrode contacts in FIG. 9-V are sequentially named a first group of electrode contacts to a sixth group of electrode contacts 26-V from left to right. Negative electrodes 16-V of a first group of electrode contacts are connected to negative electrodes 12-V of the output terminal. Positive electrodes 16'-V of the first group of electrode contacts are connected to negative electrodes 18-V of a second group of electrode contacts. Positive electrodes 18'-V of the second group of electrode contacts are connected to negative electrodes 20V of a third group of electrode contacts. Positive electrodes 20'-V of the third group of electrode contacts are connected to negative electrodes 22-V of a fourth group of electrode contacts. Positive electrodes 22'-V of the fourth group of electrode contacts are connected to negative electrodes 24-V of a fifth group of electrode contacts. Positive electrodes 24'-V of the fifth group of electrode contacts are connected to negative electrodes 26-V of the sixth group of electrode contacts. Positive electrodes 26'-V of the sixth group of electrode contacts are connected to positive electrodes 12'-V of the output terminal. In this way, the battery pack 30-V that is formed of the 6 20 Volt battery units 2-V and the voltage conversion apparatus 8-V disposed in this manner may output a 120 Volt voltage value. The battery pack 30-V may supply power to a working platform for series power tools.

In conclusion, the battery pack 30-V provided in the present invention may change internal connecting wires between electrode contacts in the voltage conversion apparatus 8-V, and connect a same quantity of battery units 2-V in different manners of series and/or in parallel connection to output different voltage values. A specific representation in this example is that one cover plate may implement different voltage outputs. Certainly, in other implementations, different voltage conversion apparatuses 8-V may be replaced to implement different voltage outputs. For example, the voltage conversion apparatus 8-V is manufactured in the form of an adapter sheet. Electrode contacts on each adapter sheet have specific connection manners, so that a battery pack may output specific voltage values. When different voltages need to be output, only different adapter sheets need to be replaced. For example, to output a 20 Volt voltage value, adapter sheets connecting electrode contacts in Implementation 1 are used, and the adapter sheets are electrically connected to electrode terminals on the housing 4-V. To output a 40 Volt voltage value, adapter sheets connecting electrode contacts in Implementation 2 are used.

As can be seen from the foregoing four implementations, when the quantity of the battery units 2-V in the battery pack 30-V is 6, 4 different output voltages may be obtained by using the voltage conversion apparatus 8-V to establish series and/or in parallel connection. Assuming that the output voltage value is x when there is one battery unit 2-V, an output voltage value of the battery pack 30-V in Implementation 1 is x, an output voltage value of the battery pack 30-V in Implementation 2 is 2x, an output voltage value of the battery pack 30-V in Implementation 3 is 3x, and an output voltage value of the battery pack 30-V in Implementation 4 is 6x. For example, an output voltage of a single battery unit 2-V is 20 volts, a 20 Volt voltage, a 40 Volt voltage, a 60 Volt voltage, and a 120 Volt voltage are obtained by using the voltage conversion apparatus 8-V to establish series and/or in parallel connection. If an output voltage of a single battery unit 2-V is 12 volts, a 12-volt voltage, a 24-volt voltage, a 36-volt voltage, and a 72-volt voltage may be obtained by using the foregoing series and/or in parallel connection. Certainly, as discussed above, an output voltage of a single battery unit 2-V may alternatively be any another multiple of 1.2 volts or 3.6 volts. In this case, 4 corresponding voltage values may be obtained by connecting the voltage conversion apparatus 8-V in different implementations, so that a user may select a battery unit 2-V with a corresponding output voltage value according to a need.

Certainly, not only voltage values of single battery units 2-V that form the battery pack 30-V are variable, and the quantity of the battery units 2-V that are used to form the battery pack 30-V are also variable. In this example, the quantity of the battery units 2-V is 6, and correspondingly, electrode contacts of the voltage conversion apparatus 8-V have 4 series and/or in parallel connection manners (the quantities of parallel connection groups are separately 1, 2, 3, and 6), and 4 different voltage values 6x, 3x, 2x, and x may be output. Certainly, the quantity of the battery units 2-V may alternatively be 8, and electrode contacts of the corresponding voltage conversion apparatus 8-V also have 4 series connection and/or parallel connection manners. The quantity of parallel connection groups are separately 1, 2, 4, and 8, so that 4 different voltage value 8x, 4x, 2x, and x may be output. That is, the quantity b of groups of electrode contacts that may be connected in parallel is a positive divisor of the quantity a of battery units 2-V, and the quantity c of voltage values that may be output is the quantity of positive divisors of a. When the quantity of the battery units 2-V that form the battery pack 30-V is 2, by means of different connecting lines of electrode contacts in the voltage conversion apparatus 8-V, 2 different voltage values may be output. When the quantity of the battery units 2-V that form the battery pack 30-V is 12, 6 different voltage values may be output. The rest may be deduced by analogy.

Referring to FIG. 10-V, the present invention also further discloses a power tool system including such battery pack 30-V. The power tool system includes a power tool, and further includes the foregoing battery pack 30-V that outputs multiple voltages. In this example, the power tool is an oscillator 28-V, and includes multiple battery units (not shown) and the battery pack 30-V of the voltage conversion apparatus (not shown). As shown in FIG. 10-V, the battery pack 30-V is detachably and electrically connected to the oscillator 28-V. A method for connecting the battery pack 30-V to the oscillator 28-V is a slide connection method. That is, a slide groove (not shown) formed on the oscillator 28-V matches a slide rail (not shown) formed on the battery pack 30-V, so the oscillator 28-V is connected to the battery pack 30-V in a slide manner. Certainly, an insertion connection method may alternatively be used. That is, a hollow receiving portion is formed at the oscillator 28-V, and an insertion part formed by the output terminal of the battery pack 30-V is inserted in the receiving portion.

The following describes the sixth group examples with reference to FIG. 1-VI to FIG. 4-VI.

Referring to FIG. 1-VI to FIG. 4-VI, a battery pack bracket structure 100-VI in an example of the present utility model includes a bracket body 110-VI and a control apparatus. A battery pack holder is disposed on the bracket body 110-VI. A battery pack 200-VI is clamped by using the battery pack holder, making it convenient to fix the battery pack 200-VI, so as to reduce phenomena of wire damage and short circuits. A positive electrode lead wire P1 and a negative electrode lead wire P2 are disposed on the battery pack holder. The positive electrode lead wire P1 and the negative electrode lead wire P2 of the battery pack holder are electrically connected to the control apparatus separately. Electrical energy in the battery pack 200-VI is output by using the positive electrode lead wire P1 and the negative electrode lead wire P2 of the battery pack holder, and the control apparatus controls the working of a battery pack 200-VI in a battery pack clamping portion 111-VI. The battery pack holder includes at least two battery pack clamping portions 111-VI. The battery pack 200-VI is mounted in the battery pack clamping portion 111-VI. The control apparatus is mounted in the bracket body 110-VI. The control apparatus is electrically connected to the battery pack 200-VI in the battery pack clamping portion 111-VI by using the battery pack holder. The control apparatus controls the battery pack 200-VI to output a voltage.

The battery pack clamping portion 111-VI may be a structure such as a clamp piece, an insertion slot or a placing slot in which a battery pack 200-VI can be mounted. One battery pack 200-VI may be mounted in each battery pack clamping portion 111-VI, or more than two battery packs 200-VI may be mounted. Therefore, there should be at least two battery packs 200-VI. The battery pack 200-VI is mounted in the battery pack clamping portion 111-VI. The control apparatus controls the at least two battery packs 200-VI to be connected in series or in parallel, so as to meet use requirements of different operators to supply power to different electric appliances 300-VI. The battery pack bracket structure 100-VI is a multifunctional bracket. During the use of the battery pack bracket structure 100-VI, at least two battery pack clamping portions 111-VI connected in series of the battery pack holder are used to implement series connection or parallel connection of the battery packs 200-VI, and the control apparatus is configured to control the battery pack 200-VI to output a voltage.

The at least two battery pack clamping portions 111-VI may be connected in series, or may alternatively be connected in parallel. Moreover, after being connected in series or in parallel, the battery packs 200-VI can drive a larger load. In this way, the battery packs 200-VI connected in series or in parallel may be applied to an electric appliance 300-VI that needs to be driven by using an increased large voltage, so as to bear a relatively large load and improve working efficiency. The control apparatus controls series connection of the battery packs 200-VI to output a voltage, which is convenient, fast, and time saving, thereby improving working efficiency of an operator.

Furthermore, an output part 112-VI configured to output electrical energy of the battery pack 200-VI is further disposed on the bracket body 110-VI. An end of the output part 112-VI is electrically connected to the positive electrode lead wire P1 and the negative electrode lead wire P2. The other end of the output part 112-VI is connected to the electric appliance 300-VI, enabling the control apparatus and the electric appliance 300-VI to establish an electrical connection. Furthermore, there are at least two output parts 112-VI. The output part 112-VI may include a two-phase jack connector and/or a three-phase jack connector, to connect electric appliances 300-VI of different types, so as to meet use requirements of the electric appliances 300-VI of different types. The control apparatus of the battery pack bracket structure 100-VI controls an electrical energy output of the battery pack 200-VI. A connection plug of the electric appliance 300-VI is connected to the output part 112-VI of the bracket body 110-VI, and then the output part 112-VI is used to implement electrical energy output, so as to provide power to the electric appliance 300-VI. The present utility model provides more than one output part 112-VI, so that electric energy can be supplied to different electric appliances.

Furthermore, a conversion control piece 120-VI is further disposed on the bracket body 110-VI. The conversion control piece 120-VI is electrically connected to the control apparatus. The conversion control piece 120-VI is applicable to adjustment of an output voltage of the output part 112-VI, so as to enable the conversion control piece 120-VI to adjust a voltage output by a battery pack 200-VI in the battery pack holder. The conversion control piece 120-VI is used to facilitate the adjustment of the output voltage of the output part 112-VI, so as to adapt to different electric appliances 300-VI. Furthermore, the conversion control piece 120-VI has at least two voltage shifts. The conversion control piece 120-VI adjusts the output voltage of the output part 112-VI by using at least two voltage shifts, and a difference exists between voltages of the at least two voltage shifts. In this way, a difference exists between output voltages of any two voltage shifts, so as to meet use requirements of different users for different electric appliances 300-VI. Moreover, the range of a voltage/current output by the battery packs 200-VI in the at least two battery pack clamping portions 111-VI connected in series or in parallel is wide, so as to facilitate selection by a user.

The conversion control piece 120-VI may be disposed to be a switching knob for manual operation. The switching knob is used to selectively adjust the output voltage of the output part 112-VI, to enable a voltage output to be in different voltage shifts. In this way, it can be ensured that the voltage output of the battery pack 200-VI is in a controlled state. An operator selects an output voltage of the output part 112-VI according to an actual requirement. Certainly, the conversion control piece 120-VI may alternatively be disposed to be a shift switch. The shift switch is operated to enable the output voltage of the output part 112-VI to be in different voltage shifts, making an output voltage of a battery pack 200-VI in the battery pack holder adjustable. In this example, the conversion control piece 120-VI is a switching knob. The conversion control piece 120-VI is applicable to the adjustment of the voltage shift of the output voltage of the output part 112-VI and control of output voltages of the battery packs 200-VI in at least two battery pack clamping portions 111-VI connected in series or in parallel. In the present utility model, the conversion control piece 120-VI has five voltage shifts. Voltages at the five voltage shifts are different from each other. In this way, a difference exists between output voltages at any two voltage shifts, so as to meet use requirements of different users for different electric appliances 300-VI, and facilitate selection by a user. The conversion control piece 120-VI is rotated to any voltage shift, and the control apparatus receives a signal of voltage shift selected by the conversion control piece 120-VI, and controls the battery packs 200-VI in the at least two battery pack clamping portions 111-VI connected in series to output a voltage corresponding to the voltage shift. In this way, the output voltage of the output part 112-VI can be adjusted.

Currently, an operator usually uses a battery pack to supply power to an electrical device. When the power consumption of the electrical device is relatively high, the operator connects battery packs in series by using a simple wired connection manner, to ensure normal operation of the electrical device. However, to meet use requirements of different electric appliances, a connecting wire often needs to be switched to adjust an output voltage. As a result, a connecting wire gets damaged, and a short circuit occurs in a severe case. Moreover, the operator repeatedly switches connecting wires, causing a complex process, affected efficiency, and inconvenient use by the operator. For the battery pack bracket structure 100-VI in this example, the battery pack 200-VI is mounted in the battery pack clamping portion 111-VI of the bracket body 110-VI, the battery pack clamping portion 111-VI is electrically connected to the control apparatus, and the positive electrode lead wire P1 and the negative electrode lead wire P2 on the battery pack holder implement the output of electrical energy of the battery pack 200-VI. The bracket body 110-VI and the control apparatus are used to replace the simple connecting wire, so as to reduce phenomena of wire damage and short circuits, so that the quality is improved. The conversion control piece 120-VI is then used to implement rapid switching of output voltages of the battery pack bracket structure 100-VI, making it convenient to adjust the output voltage of the output part 112-VI, so that operations are convenient and fast, efficiency of the operator is improved, use safety of the battery pack 200-VI is ensured, and use by the operator is facilitated.

Referring to FIG. 2-VI and FIG. 3-VI, as an implementation, the control apparatus includes an MCU. The MCU is electrically connected to the positive electrode lead wire P1 and the negative electrode lead wire P2. The MCU is applicable to control of an output voltage of a battery pack 200-VI in the battery pack holder. The battery pack 200-VI is mounted in the battery pack clamping portion 111-VI. The at least two battery pack clamping portions 111-VI are connected in series or connected in parallel. A positive electrode lead wire P1 and a negative electrode lead wire P2 are separately disposed at two ends of the battery pack holder, that is, a front end and a rear end of the at least two battery pack clamping portions 111-VI that are connected in series or connected in parallel. The positive electrode lead wire P1 is connected in series to the MCU and is electrically connected to the output part 112-VI. The negative electrode lead wire P2 is connected in series to the MCU and is electrically connected to the output part 112-VI. The MCU controls the battery packs 200-VI in the at least two battery pack clamping portions 111-VI to externally output a voltage.

Further, the control apparatus further includes a shift detection module. The shift detection module is electrically connected to the MCU and the conversion control piece 120-VI separately. The shift detection module is applicable to detection of a voltage shift adjusted by the conversion control piece 120-VI. When being rotated to any voltage shift, the conversion control piece 120-VI can adjust the output voltage of the output part 112-VI. The shift detection module feeds back the detected voltage shift to the MCU. The MCU controls an output voltage of a battery pack 200-VI in the battery pack holder, to further achieve an objective of adjusting the output voltage of the output part 112-VI. An operator rotates the conversion control piece 120-VI to one of the voltage shifts according to an actual use requirement, that is, a voltage shift that the battery pack bracket structure 100-VI needs to output. The shift detection module detects the voltage shift obtained after the adjustment by the conversion control piece 120-VI, and feeds back an output signal of the voltage shift to the MCU. The MCU adjusts an output voltage of a battery pack 200-VI in the battery pack holder, so as to adjust the output voltage of the output part 112-VI.

In one example, the control apparatus further includes a voltage detection module. The voltage detection module is electrically connected to the positive electrode lead wire P1 and the MCU separately. The voltage detection module is applicable to detection of a voltage of a battery pack 200-VI in the battery pack holder. When the voltage of the battery pack 200-VI in the battery pack holder reaches a preset voltage value, the MCU controls the battery pack 200-VI in the battery pack holder to stop outputting the voltage. The preset voltage value is determined according to a working condition during actual use. The voltage detection module is electrically connected to the positive electrode lead wire P1 and the MCU separately. The voltage detection module can detect an output voltage of a battery pack 200-VI in the battery pack holder in real time. To prevent overdischarge of electrical energy in a battery pack 200-VI, when a voltage of a battery pack 200-VI in the battery pack holder is excessively low, that is, when a sum of voltages of the battery packs 200-VI in the battery pack holder is greater than the preset voltage value, the MCU controls the battery packs 200-VI in the battery pack holder to stop outputting the voltage externally. The battery pack 200-VI is usually cyclically used. When the electrical energy in the battery pack 200-VI is excessively low or exhausted, the battery pack 200-VI requires to be charged. After charging of the battery pack 200-VI is completed, the battery pack 200-VI is mounted in the battery pack clamping portion 111-VI of the bracket body 110-VI to perform discharging, so as to ensure normal working of the electric appliance 300-VI.

However, overdischarge of electrical energy in the battery pack 200-VI affects the service life of the battery pack 200-VI and affects the use performance of the battery pack 200-VI. Therefore, it needs to be ensured that the voltage in the battery pack 200-VI is not excessively low. The MCU can control the battery pack 200-VI to output the voltage only when a voltage of a battery pack 200-VI in the battery pack holder is within a particular range.

In one example, the control apparatus further includes a current detection module and a sampling resistor R. The current detection module is electrically connected to the negative electrode lead wire P2 and the MCU separately. The sampling resistor R is electrically connected to the negative electrode lead wire P2 and the current detection module separately. The sampling resistor R and the current detection module are applicable to detection of an output current of a battery pack 200-VI in the battery pack holder. When the output current is greater than a preset current value, the MCU controls a battery pack 200-VI in the battery pack holder to stop outputting a voltage. The preset current value is determined according to a working condition during actual use. When the current output of a battery pack 200-VI in the battery pack holder is excessively high, the battery pack 200-VI is damaged. The current detection module detects an output current of a battery pack 200-VI in the battery pack holder, so that when the output current is greater than the preset current value, the MCU controls the battery pack 200-VI in the battery pack holder to stop outputting the voltage. An end of the current detection module is connected in series to the MCU. The other end of the current detection module is connected in series to the sampling resistor R and is electrically connected to the negative electrode lead wire P2 of the battery pack holder. The sampling resistor R can have a shunting effect, so as to prevent the battery pack 200-VI from being damaged. When a battery pack 200-VI in the battery pack holder outputs a voltage, the current detection module detects an output current of the battery pack 200-VI. When the output current is greater than the preset current value, the current detection module feeds back a signal representing that the output current is excessively high to the MCU. The MCU controls the battery pack 200-VI in the battery pack holder to stop outputting the voltage. When the output current is less than the preset current value, the current detection module feeds back a signal representing that the output current does not exceed the preset current value to the MCU. The MCU controls the battery pack 200-VI in the battery pack holder to outputting the voltage.

In one example, the control apparatus further includes a temperature detection module. The temperature detection module is electrically connected to the battery pack holder and the MCU separately. A temperature detection wire P3 is disposed on the battery pack holder 111. The battery pack clamping portion 111-VI is electrically connected to the temperature detection module by using the temperature detection wire P3, so as to detect the temperature of a battery pack 200-VI. The temperature detection module is applicable to detection of the temperature of a battery pack 200-VI in the battery pack holder. When the temperature of a battery pack 200-VI is greater than a preset temperature, the MCU controls the battery pack 200-VI in the battery pack holder to stop outputting the voltage. The battery pack 200-VI is usually cyclically used. When electrical energy in the battery pack 200-VI is excessively low or exhausted, the battery pack 200-VI needs to be charged. After charging of the battery pack 200-VI is completed, the battery pack 200-VI is mounted in the battery pack clamping portion 111-VI of the bracket body 110-VI to perform discharging, so as to ensure normal working of the electric appliance 300-VI. However, when the temperature of a battery pack 200-VI during working is excessively high and is greater than 45° C., the service life of the battery pack 200-VI is affected. When the temperature of a battery pack 200-VI in the battery pack holder is greater than a preset temperature (for example, greater than 45° C.), the temperature detection module performs detection and feeds back a signal representing that the temperature is excessively high to the MCU. The MCU controls the battery pack 200-VI in the battery pack holder to stop outputting the voltage. As long as the temperature one battery pack 200-VI in the battery pack holder is excessively high, the MCU controls the battery packs 200-VI in the battery pack holder to stop outputting the voltage. The MCU can control the battery packs 200-VI in the battery pack holder to output a voltage only when the temperature of all the battery packs 200-VI in the battery pack holder is less than the preset temperature.

As an implementation, referring to FIG. 2-VI, in an example of the disclosure, the control apparatus further includes a pulse width modulation module (PWM). The pulse width modulation module is electrically connected to a positive electrode lead wire P1, an output part, and an MCU separately. The pulse width modulation module is applicable to control of a pulse width duty ratio to adjust the output voltage of the output part 112-VI. The conversion control piece 120-VI adjusts a voltage shift. The shift detection module feeds back a detected voltage shift to the MCU. The MCU controls the pulse width modulation module to adjust the output voltage of the output part 112-VI, and then the output part 112-VI outputs the output voltage. When an operator uses the battery pack bracket structure 100-VI to supply power to the electric appliance 300-VI, the shift detection module detects a voltage shift obtained after adjustment by the conversion control piece 120-VI and feeds back a signal of the voltage shift to the MCU. The MCU feeds back a signal of an output voltage corresponding to the voltage shift to the pulse width modulation module. The MCU controls the pulse width modulation module to adjust a pulse width duty ratio, and adjusts the output voltage of the output part 112-VI, so as to control an output voltage of a battery pack 200-VI in the battery pack holder, to further achieve an objective of making the output voltage of the output part 112-VI adjustable, so that use requirements of different users for different electric appliances 300-VI can be met, and use by a user is facilitated.

The MCU controls the pulse width modulation module to adjust the output voltage of the output part 112-VI, that is, to adjust an output voltage of a battery pack 200-VI in the battery pack holder. An operator rotates the conversion control piece 120-VI according to an actual use requirement to one of the voltage shifts, that is, a voltage shift that the battery pack bracket structure 100-VI needs to output. The shift detection module detects a voltage shift obtained after adjustment by the conversion control piece 120-VI. The MCU feeds back an output signal of the voltage shift to the pulse width modulation module. The MCU controls the pulse width modulation module to adjust a pulse width duty ratio, so as to adjust an output voltage of a battery pack 200-VI in the battery pack holder.

Further, the at least two battery pack clamping portions 111-VI are connected in series. The pulse width modulation module can adjust the output voltage of the output part 112-VI that exists when the at least two battery pack clamping portions 111-VI are connected in series. The battery packs 200-VI in the at least two battery pack clamping portions 111-VI are connected in series. The pulse width modulation module adjusts an output voltage of the battery packs 200-VI connected in series, so as to adjust the output voltage of the output part 112-VI. The at least two battery pack clamping portions 111-VI have a series connection relationship in the circuit. The control apparatus can control the at least two battery pack clamping portions 111-VI to implement series connection. The control apparatus controls an electrical energy output of the battery packs 200-VI in the at least two battery pack clamping portions 111-VI. In this example, there are three battery pack clamping portions 111-VI. Correspondingly, there are three battery packs 200-VI. The three battery packs 200-VI are separately mounted in the battery pack clamping portions 111-VI, and the three the battery packs 200-VI are connected in series. The pulse width modulation module adjusts output voltages of the three battery packs 200-VI that are connected in series.

As an implementation, referring to FIG. 3-VI, in another example of the present invention, a relay controls the at least two battery pack clamping portions 111-VI to be connected in series or in parallel, so as to adjust output voltages of the at least two battery pack clamping portions 111-VI, thereby adjusting a voltage of the output part 112-VI. The control apparatus further includes at least two relays. Two ends of coils of at least two relays are electrically connected to the MCU and a circuit power supply separately. Contact points of the at least two relays are electrically connected to the at least two battery pack clamping portions 111-VI respectively. The conversion control piece 120-VI adjusts a voltage shift, and feeds back a signal of the voltage shift to the MCU. The MCU controls the relays to be opened or closed to enable the at least two battery pack clamping portions 111-VI to be connected in parallel or connected in series.

The quantity of battery pack clamping portions 111-VI corresponds to the quantity of relays. That is, the quantity of the battery pack clamping portions 111-VI is n, and the quantity of relays is (n−1)×3. When the conversion control piece 120-VI adjusts a needed voltage shift, the shift detection module detects a voltage shift and feeds back a signal of the voltage shift to the MCU. The MCU controls the (n−1)×3 relays to be separately opened or closed, to enable the n battery pack clamping portions 111-VI to be connected in series connect or in parallel, so as to implement a series output voltage or a parallel output voltage of the battery packs 200-VI in the n battery packs clamping portions 111-VI, so as to meet use requirements for different electric appliances 300-VI. When there are two battery pack clamping portions 111-VI, there are 3 relays. When there are 3 battery pack clamping portions 111-VI, there are 6 relays. When there are 4 battery pack clamping portions 111-VI, there are 9 relays. The rest may be deduced by analogy.

Specifically, in this example, there are 3 battery pack clamping portions 111-VI, which are separately a first battery pack clamping portion A1, a second battery pack clamping portion A2, and a third battery pack clamping portion A3. A positive electrode of the first battery pack clamping portion A1 is electrically connected to the positive electrode lead wire P1. A negative electrode of the third battery pack clamping portion A3 is electrically connected to the negative electrode lead wire P2. The positive electrode lead wire P1 and the negative electrode lead wire P2 use electrical energy of the battery packs 200-VI in the first battery pack clamping portion A1, the second battery pack clamping portion A2, and the third battery pack clamping portion A3 that are connected in parallel or in series to output an voltage by using the output part 112-VI.

There are six relays, that is, a first relay K1, a second relay K2, a third relay K3, a fourth relay K4, a fifth relay K5, and a sixth relay K6. Two ends of coils of each of the six relays are electrically connected to a circuit power supply and an MCU separately, a circuit power supply supplies electric energy to the relays, and the MCU controls the relays to be opened or closed. Two contact points of the first relay K1 are electrically connected to a negative electrode of the first battery pack clamping portion A1 and a positive electrode of the second battery pack clamping portion A2 separately. Two contact points of the second relay K2 are electrically connected to a negative electrode of the second battery pack clamping portion A2 and a positive electrode of the third battery pack clamping portion A3 separately. Two contact points of the third relay K3 are electrically connected to the positive electrode of the first battery pack clamping portion A1 and the positive electrode of the second battery pack clamping portion A2 separately. Two contact points of the fourth relay K4 are electrically connected to the positive electrode of the first battery pack clamping portion A1 and the positive electrode of the third battery pack clamping portion A3 separately. Two contact points of the fifth relay K5 are electrically connected to the negative electrode of the second battery pack clamping portion A2 and the negative electrode of the third battery pack clamping portion A3 separately. Two contact points of the sixth relay K6 are electrically connected to the negative electrode of the first battery pack clamping portion A1 and the negative electrode of the third battery pack clamping portion A3 separately.

The conversion control piece 120-V1 performs adjustment to a needed voltage shift. The shift detection module detects the needed voltage shift and feeds back a signal of the voltage shift to the MCU. The MCU controls the first relay K1 and the second relay K2 to close, and controls the third relay K3, the fourth relay K4, the fifth relay K5, and the sixth relay K6 to open, so as to implement series connection of the first battery pack clamping portion A1, the second battery pack clamping portion A2, and the third battery pack clamping portion A3. The conversion control piece 120-V1 performs adjustment to a needed voltage shift. The shift detection module detects the needed voltage shift, and feeds back a signal of the voltage shift to the MCU. The MCU controls the first relay K1 and the second relay K2 to open, and controls the third relay K3, the fourth relay K4, the fifth relay K5, and the sixth relay K6 to close, so as to implement parallel connection of the first battery pack clamping portion A1, the second battery pack clamping portion A2, and the third battery pack clamping portion A3.

The MCU detects, by using the shift detection module, a voltage shift obtained after adjustment by the conversion control piece 120-V1, and according to different shifts, the MCU controls the first relay K1, the second relay K2, the third relay K3, the fourth relay K4, the fifth relay K5, and the sixth relay K6 to open or close to implement series connection or parallel connection of the first battery pack clamping portion A1, the second battery pack clamping portion A2, and the third battery pack clamping portion A3, thereby implementing that the output part 112-V1 can output different voltages, and achieving an objective of making an output voltage adjustable. Certainly, the MCU may further control one or more relays to close or open, so as to implement that battery packs 200-VI in one battery pack clamping portion 111-VI output an voltage and battery packs 200-VI in two battery pack clamping portions 111-VI are connected in series or in parallel to output an voltage. For example, the MCU controls the sixth relay K6 to close, and controls the first relay K1, the second relay K2, the third relay K3, the fourth relay K4, and the fifth relay K5 to open. In this case, only the battery pack 200-VI in the first battery pack clamping portion A1 outputs a voltage. The MCU controls the third relay K3, the fifth relay K5, and the sixth relay K6 to close, and controls the first relay K1, the second relay K2, and the fourth relay K4 to open. In this case, the battery pack 200-VI in the first battery pack clamping portion A1 and the battery pack 200-VI in the second battery pack clamping portion A2 are connected in parallel to output a voltage. The rest may be deduced by analogy.

Further, the MCU by using the voltage detection module detects voltages of battery packs 200-VI in the first battery pack clamping portion A1, the second battery pack clamping portion A2, and the third battery pack clamping portion A3, to prevent an overdischarge of the voltages of the battery packs 200-VI in the first battery pack clamping portion A1, the second battery pack clamping portion A2, and the third battery pack clamping portion A3. When a sum of the voltages of the battery packs 200-VI in the first battery pack clamping portion A1, the second battery pack clamping portion A2, and the third battery pack clamping portion A3 is 0.05 to 0.15 of a sum of initial voltages of all the battery packs 200-VI, the MCU controls the first relay K1, the second relay K2, the third relay K3, the fourth relay K4, the fifth relay K5, and the sixth relay K6 to open, so as to stop external output.

Furthermore, the MCU detects the temperature of the battery packs 200-VI in the first battery pack clamping portion A1, the second battery pack clamping portion A2, and the third battery pack clamping portion A3 by using the temperature detection module, so as to prevent the temperature of the battery packs 200-VI from becoming excessively high. When the temperature of the battery packs 200-VI in the first battery pack clamping portion A1, the second battery pack clamping portion A2, and the third battery pack clamping portion A3 during working is excessively high and is greater than 45° C., the temperature detection module feeds back a signal representing that the temperature is excessively high to the MCU. The MCU controls the first relay K1, the second relay K2, the third relay K3, the fourth relay K4, the fifth relay K5, and the sixth relay K6 to open, to stop external output.

Furthermore, the MCU detects an output current of the battery packs 200-VI in the first battery pack clamping portion A1, the second battery pack clamping portion A2, and the third battery pack clamping portion A3 by using the current detection module, so as to prevent the output current from becoming excessively high and damaging the battery pack 200-VI. When the output current of the battery packs 200-VI in the first battery pack clamping portion A1, the second battery pack clamping portion A2, and the third battery pack clamping portion A3 is greater than a preset current value, the current detection module feeds back a signal representing that the output current is excessively high to the MCU. The MCU controls the first relay K1, the second relay K2, the third relay K3, the fourth relay K4, the fifth relay K5, and the sixth relay K6 to open, to stop external output.

As an implementation, referring to FIG. 4-VI, in still another example of this disclosure, the control apparatus includes a lever. The conversion control piece 120-VI is moved to control the lever. The lever is separately connected to at least the battery pack clamping portions 111-VI. The conversion control piece 120-VI performs adjustment to a voltage shift. The conversion control piece 120-VI moves the lever to enable the at least two battery pack clamping portions 111-VI to implement parallel connection or series connection. The at least two battery pack clamping portions 111-VI in this example adjusts the conversion control piece 120-VI to move the lever to implement series connection or parallel connection without needing to control the MCU and relays. Therefore, the structure is simple, and operation by an operator is facilitated.

The quantity of the battery pack clamping portions 111-VI is m. Each battery pack clamping portion 111-VI has two internal ports. Correspondingly, the quantity of internal ports of m battery pack clamping portions 111-VI is 2m. When the conversion control piece 120-VI performs adjustment to a needed voltage shift, the conversion control piece 120-VI moves the lever, to enable the lever to adjust the position of a connecting sheet at an internal port of a battery pack clamping portions 111-VI, so as to implement series connection or parallel connection. When the lever is moved to a first position, the internal ports of the positive electrodes of the m battery pack clamping portions 111-VI are connected, and the internal ports of the negative electrodes of the m battery pack clamping portions 111-VI are connected. In this case, the m battery pack clamping portions 111-VI are connected in parallel. When the lever is moved to a second position, the internal ports of the positive electrodes of the m battery pack clamping portions 111-VI are sequentially connected to the internal ports of negative electrodes. In this case, the m battery pack clamping portions 111-VI are connected in series.

Specifically, there are three battery pack clamping portions, that is, is a first battery pack clamping portion B1, a second battery pack clamping portion B2, and a third battery pack clamping portion B3. A negative electrode of the first battery pack clamping portion B1 is electrically connected to a first internal port a, and a positive electrode of the first battery pack clamping portion B1 is electrically connected to a second internal port b. A negative electrode of the second battery pack clamping portion B2 is electrically connected to a third internal port c, and a positive electrode of the second battery pack clamping portion B2 is electrically connected to a fourth internal port d. A negative electrode of the third battery pack clamping portion B3 is electrically connected to a fifth internal port e, and a positive electrode of the third battery pack clamping portion B3 is electrically connected to a sixth internal port f. The first internal port a is electrically connected to the negative electrode lead wire P2, and the sixth internal port f is electrically connected to the positive electrode lead wire P1. The positive electrode lead wire P1 and the negative electrode lead wire P2 use electrical energy of the battery packs 200-VI in the first battery pack clamping portion B1, the second battery pack clamping portion B2, and the third battery pack clamping portion B3 that are connected in parallel or in series to output an voltage by using the output part 112-VI.

The conversion control piece 120-VI performs adjustment to a needed voltage shift. The conversion control piece 120-VI moves the lever to a first position. As shown by a solid-line state in FIG. 4-VI, the first internal port a, the third internal port c, and the fifth internal port e are connected, and the second internal port b, the fourth internal port d, and the sixth internal port f are connected. In this case, the first battery pack clamping portion B1, the second battery pack clamping portion B2, and the third battery pack clamping portion B3 are connected in parallel. The conversion control piece moves the lever to a second position. As shown by a dotted line state in FIG. 4-VI, the second internal port b is connected to the third internal port c, the fourth internal port d is connected to the fifth internal port e, and the first battery pack clamping portion B1, the second battery pack clamping portion B2z and the third battery pack clamping portion B3 are connected in series, so as to achieve an objective of adjusting an output voltage. Connected repetitive ports, that is, an unoccupied port a and an unoccupied port f3 at the fifth internal port e are suspended and are not connected to each other.

Certainly, being at different positions, the lever may also control several internal ports to be connected, so as to implement that the battery packs 200-VI in one battery pack clamping portion 111-VI output voltages, or the battery packs 200-VI in two battery pack clamping portions 111-VI are connected in series or in parallel to output voltage. For example, the first internal port a is connected to the fifth internal port e, and the second internal port b is connected to the sixth internal port f. In this case, the first battery pack clamping portion B1 and the third battery pack clamping portion B3 are connected in parallel to output a voltage. The rest may be deduced by analogy.

In one example, the output part 112-VI includes a DC output terminal and an AC output terminal. The DC output terminal is electrically connected to the positive electrode lead wire P1 and the negative electrode lead wire P2 of the battery pack holder. The DC output terminal is used to output a DC voltage. The AC output terminal is used to an output AC voltage, so as to meet use requirements of different users for different electric appliances 300-VI. The control apparatus further includes a DC/AC conversion module. The positive electrode lead wire P1 and the negative electrode lead wire P2 of the battery pack holder are electrically connected to the DC/AC conversion module. The AC output terminal is electrically connected to the DC/AC conversion module. The positive electrode lead wire P1 and the negative electrode lead wire P2 of the battery pack holder are electrically connected to the DC/AC conversion module and the DC output terminal respectively. The DC/AC conversion module is further electrically connected to the AC output terminal. The DC output terminal and the AC output terminal are separately used to connect different types of electric appliances 300-VI.

In one example, an elastic piece is further disposed on the battery pack clamping portion 111-VI. The elastic piece is compressed or stretched to adjust the size of a receiving space of the battery pack clamping portion 111-VI. To adapt to battery packs 200-VI of various different shapes and specifications, the size of a receiving space in the battery pack clamping portion 111-VI may be adjusted. The elastic piece is used to adjust the receiving space of the battery pack clamping portion 111-VI, so as to adapt to battery packs 200-VI having different structural sizes. The structural sizes of the battery packs 200-VI are different, and generally, rated voltages and/or capacity of the battery packs 200-VI are also different. The battery packs 200-VI having different structural sizes are combined to meet use requirements of different electric appliances 300-VI. The receiving space in the battery pack clamping portion 111-VI may be disposed to be relatively wide in the horizontal direction, so as to adapt to the widths of most of battery packs 200-VI. The elastic piece is compressed or stretched to adjust the size of in a length direction (between positive and negative electrodes of the battery pack 200-VI) of receiving space of the battery pack clamping portion 111-VI, so that battery packs 200-VI having different structural sizes can be placed in the receiving space.

Further, a fastener element used to fix the battery pack 200-VI is further disposed on the battery pack clamping portion 111-VI. When an operator is working, the battery pack 200-VI is mounted in the battery pack clamping portion 111-VI. The position of the battery pack 200-VI may shift. The fastener element is used to fix the battery pack 200-VI, so as to prevent the position of the battery pack 200-VI from shifting. Moreover, it can be further ensured that connecting lines of the battery pack 200-VI and the battery pack clamping portion 111-VI have desirable contact. Specifically, the fastener element is a buckle structure. A hook of the buckle structure is disposed on the battery pack clamping portion 111-VI. A buckle slot is disposed at a corresponding position of the battery pack 200-VI. The hook and the buckle slot cooperate to ensure that the battery pack 200-VI is tightly fixed in the battery pack clamping portion 111-VI. the hook in the battery pack clamping portion 111-VI matches the buckle slot of the battery pack 200-VI to establish a mechanical connection, so that the battery pack 200-VI can be tightly fixed in the battery pack clamping portion 111-VI. Furthermore, there are two hooks on each battery pack clamping portion 111-VI. Correspondingly, there are also two buckle slots on the battery pack 200-VI. Two buckles and the two buckle slots cooperate to enable the battery pack 200-VI to be fixed in the battery pack clamping portion 111-VI more tightly. The position of the battery pack 200-VI does not shift. Moreover, the two buckles are disposed opposite each other on two sides of the battery pack clamping portion 111-VI, so as to facilitate mounting of the battery pack 200-VI.

In one example, a positioning post is disposed in the battery pack clamping portion 111-VI. A positioning hole matching the positioning post is provided on the battery pack 200-VI. The positioning post can have a guiding effect and a positioning effect. The guiding effect of the positioning post enables the battery pack 200-VI to be easily mounted in the battery pack clamping portion 111-VI, and the positioning effect of the positioning post enables the battery pack 200-VI to be mounted more stably. In this example, there are three battery pack clamping portions 111-VI. The three battery pack clamping portions 111-VI are disposed in a row on the battery pack holder of the bracket body 110-VI, and are electrically connected to the control apparatus by using the positive electrode lead wire P1 and the negative electrode lead wire P2 on the battery pack holder. The control apparatus controls the three battery packs 200-VI to be connected in series to output electrical energy.

The following describes the seventh group examples with reference to FIG. 1-VII to FIG. 6-VII. A power supply system of this group examples is the same as the power supply system in the foregoing example. A difference lies in that a series-parallel circuit is disposed.

As shown in FIG. 1-VII, one example provides a power supply system, including multiple standard battery units 1-VII, where there are 6 standard battery units, and a series-parallel circuit connecting the multiple standard battery units 1-VII. The standard battery units 1-VII are the same as each other, have a same specification and a consistent rated voltage of 20 volts, and are electrically isolated from each other. It may be understood that there may be any quantity of standard battery units. The voltage may be 20 V, 40 V, 60 V, 80 V, 100 V or the like. Each battery unit 1 has independent positive and negative electrodes. Every pair of positive and negative electrodes is connected to the series-parallel circuit. The series-parallel circuit configures different series/parallel relationships for the multiple standard battery units 1-VII. The power supply system forms different output voltages in the different series/parallel relationships. The series-parallel circuit includes a first connection apparatus 4-VII. The first connection apparatus 4-VII includes 1 first terminal group. The first terminal group includes first terminals connected to positive and negative electrodes of the multiple standard battery units. The first connection apparatus 4-VII is fixedly disposed relative to the power supply system. The series-parallel circuit includes a moving component 2-VII. The moving component 2-VII includes a main body 30-VII and N second connection apparatuses 3-VII supported by the main body. In one example, the main body 30-VII is a cylindrical body. The N second connection apparatuses 3-VII are evenly arranged along a circumferential direction of the cylindrical body. A second connection apparatus 3-VII includes a second terminal group. The quantity of second terminals included in the second terminal group is the same as the quantity of the first terminals. The second terminals in the second terminal group are evenly arranged along the vertical direction of the cylindrical body. The positions of the second terminals are opposite the positions of the first terminals. The second connection apparatus 3-VII further includes a voltage output terminal. The voltage output terminal outputs a series-parallel connection result of the second terminal group. A hollow cavity is provided in the main body 30-VII to receive a wire, so that the arrangement of the wire does not affect the external appearance of the system. The wire may be an electric wire, or may alternatively be a copper foil in a circuit board. When the wire is a copper foil in a circuit board, the circuit board is disposed in the hollow cavity of the main body 30-VII. The wire is connected to the second terminals. In different second connection apparatuses, the wire forms different series/parallel relationships for the second terminals, to enable the voltage output terminal to have different outputs, so that the power supply system outputs different voltages.

An angle at which the moving component rotates along the circumferential direction is changed, to enable different second connection apparatuses 3-VII and first connection apparatuses 4-VII to be connected, enable the multiple standard battery units 1-VII to form different series/parallel relationships, so as to enable the power supply system to output different voltages. More specifically, when the moving component 2-VII rotates by a first preset angle to reach the first position, enable the second connection apparatus whose reference numeral is 21-VII to be connected to the first connection apparatus, that is, the second terminal group in the second connection apparatus 3-VII whose reference numeral is 21-VII is correspondingly connected to the first terminal group in the first connection apparatus 4-VII. The second terminal group in the second connection apparatus 3-VII whose reference numeral is 21-VII has an $M^{th}$ series/parallel relationship, to enable the multiple standard battery units 1-VII to form the $M^{th}$ series/parallel relationship, that is, the 6 standard battery units 1-VII are connected in parallel. The voltage output terminal outputs a 20V voltage, and the power supply system outputs a 20V voltage. When the moving component 2-VII rotates by a second preset angle to reach a second preset position, to enable the second connection apparatus 3-VII whose reference numeral is 22-VII to be connected to the first connection apparatus 4-VII, that is, the second terminal group in the second connection apparatus 3-VII whose reference numeral is 22-VII is correspondingly connected to the first terminal group in the first connection apparatus 4-VII. The second terminal group in the second connection apparatus 3-VII whose reference numeral is 22-VII has an $(M+1)^{th}$ series/parallel relationship, that is, every two of the 6 standard battery units are connected in series to form three groups, and then the three group are connected to each other in parallel, to enable the multiple standard battery units 1-VII to form the $(M+1)^{th}$ series/parallel relationship. The voltage output terminal outputs a 40V voltage, and the power supply system outputs a 40V voltage. The moving component 2-VII rotates by a third preset angle to reach a third position, to enable the second connection apparatus whose reference numeral is 23-VII to be connected to the first connection apparatus. Every three of the 6 standard battery units are connected in series to form two groups, and then the two groups are connected in parallel. The voltage output terminal outputs a 60V voltage, and the power supply system outputs a 60V voltage. The moving component 2-VII rotates by a fourth preset angle to reach a fourth position, so that when the second connection apparatus whose reference numeral is 24-VII is connected to the first connection apparatus, the 6 standard battery units are connected to each other in series. The power supply system outputs a 120V voltage. As may be seen, the moving component 2-VII is rotated to different positions to implement the function that the power supply system may selectively outputs multiple or different voltages. Because the moving component 2-VII is disposed to be a rotating structure, the space needed for the series-parallel circuit can be greatly reduced, and rotation operation is more convenient. It should be noted here that it is only exemplary description that when the moving component is at a specific position, the power supply system outputs a 20V, 40V, 60V or 120V voltage. There may further be any other voltage, for example, a voltage value mentioned in other examples.

The rotating angle of the moving component 2-VII is 0 degree to 180 degrees, to enable the moving component 2-VII to rotate to any angle between 0 degree to 180 degrees, which helps an operator to adjust a series/parallel relationship of the standard battery units 1-VII according to an actual case, so as to achieving a technical effect of facilitating switching between different output voltages.

The voltage output terminal includes a positive electrode voltage output terminal and a negative electrode voltage output terminal. There are in total N second connection apparatuses, and therefore, the moving component 2-VII has N voltage output terminals. That is, N positive electrode voltage output terminals and N negative electrode voltage output terminals. The N negative electrode voltage output terminals are connected to each other in series, or the N negative electrode voltage output terminals are disposed to be one negative electrode voltage output terminal. In this way, the quantity of leads can be reduced, a wiring solution is simplified, and wiring costs are reduced.

In the example shown in FIG. 1-VII, the second terminal group in the second connection apparatus 3-VII is disposed to be a single column along the vertical direction of the moving component 2-VII. Correspondingly, the first terminal group of the first connection apparatus 4-VII is also disposed to be a single column in the vertical direction of the moving component 2-VII.

In another alternative example, the second terminal group in the second connection apparatus 3-VII may further be disposed in another manner. For example, in the example shown in FIG. 2-VII, the second terminal group in the second connection apparatus 3-VII is disposed to be double columns in the vertical direction of the moving component 2-VII. The double columns are disposed at a 180° included angle. Correspondingly, the first terminal group of the first connection apparatus 4-VII is also disposed to be double columns in the vertical direction of the moving component 2-VII.

In the foregoing example, the moving component 2-VII changes a position state in a rotational manner. In another example, the moving component 2-VII may further change a position state in a slide manner.

As shown in FIG. 4-VII and FIG. 5-VII, N second connection apparatuses are evenly disposed in an X direction, and the second terminals in the second terminal group are disposed in a Y direction. The X direction is a moving direction of the moving component 2-VII. The Y direction is a direction perpendicular to the X direction, and is also a vertically extending direction of the moving component 2-VII. The moving component 2-VII moves up and down in the X direction, so that the moving component 2-VII is in different positions states, to establish different series-parallel connections for the multiple standard battery units. For example, when the moving component 2-VII moves to a first position to enable second connection apparatus whose reference numeral is 11-VII to be connected to the first connection apparatus, the 6 standard battery units 1-VII are connected in parallel. The voltage output terminal outputs a 20V voltage, and the power supply system outputs a 20V voltage. When the moving component 2-VII moves to a second position to enable the second connection apparatus whose reference numeral is 12-VII to be connected to the first connection apparatus, every two of the 6 standard battery units are connected in series to form three groups, and then the three groups are connected to each other in parallel. The voltage output terminal outputs a 40V voltage, and the power supply system outputs a 40V voltage. When the moving component 2-VII moves to a third position to enable the second connection apparatus whose reference numeral is 13-VII to be connected to the first connection apparatus, every three of the 6 standard battery units are connected in series to form two groups, and then the two groups are connected in parallel. The voltage output terminal outputs a 60V voltage, and the power supply system outputs a 60V voltage. When the moving component 2-VII moves to a fourth position to enable the second connection apparatus whose reference numeral is 14-VII to be connected to the first connection apparatus, the 6 standard battery units are connected to each other in series. The power supply system outputs a 120V voltage. It should be noted here that it is only exemplary description that when the moving component is at a specific position, the power supply system outputs a 20V, 40V, 60V or 120V voltage. There may further be any other voltage, for example, a voltage value mentioned in other examples.

In the example shown in FIG. 4-VII, the second terminal group in every second connection apparatus 3-VII may be disposed to be double columns in a Y direction. Correspondingly, the first terminal group of the first connection apparatus 4-VII is also disposed to be double columns in the Y direction.

In another alternative example, the second terminal group in the second connection apparatus 3-VII may further be disposed is another manner. For example, in the example shown in FIG. 6-VII, the second terminal group in the second connection apparatus 3-VII may be disposed in a single column in the Y direction. Correspondingly, the first terminal group of the first connection apparatus 4-VII is also disposed to be double columns in the Y direction.

In one example, a detection unit is further disposed in the power supply system. The detection unit detects whether the moving component 2-VII reaches a preset position or whether the moving component 2-VII leaves a preset position. When the moving component 2-VII performs position switching, the state of the moving component 2-VII is that the moving component 2-VII leaves a position A and then reaches a position B. When detecting that the moving component 2-VII already leaves the position A, the detection unit controls the power supply system to interrupt external output of electrical energy. Then, when detecting that the moving component already reaches the position B, the detection unit controls the power supply system to continue outputting electrical energy externally. A benefit of this setting lies in that when the moving component 2-VII performs position switching, an arc that damages the terminal group or causes a short circuit is prevented from being generated between the second terminal group and the first terminal group. Various manners of detecting whether one component reaches a preset position or leaves a preset position are provided in the prior art, and are no longer enumerated here.

In this disclosure, in different examples, different element names are used for element having a same function or effect, for example, an electrical energy supply apparatus in some examples and a power supply system in some examples, or for another example, an electrical energy transmission apparatus in some examples and a power supply platform in some examples. A person skilled in the art may understand that when a specific element name appears at any position in this application document, the meaning of the element name at least covers elements having a same function or effect in all the examples of the present invention.

In this disclosure, a voltage value such as 20 V, 40 V, 60 V, 80 V or 120 V may be a nominal voltage or a full voltage. For a cell, the nominal voltage means a nominal voltage in a cell specification, for example, about 3.6 V. The full voltage means a charging cut-off voltage in a standard charge, for example, about 4.0 V. When a specific voltage value is mentioned in the present invention, the value means the value itself and a value within a ±15% range of the value. For example, 17 V to 23 V are all within the range of a voltage value of 20 V.

The transformer circuit in this disclosure may be any circuit that changes a value relationship between an input voltage and an output voltage, and is, for example, a transformer, a DC/DC circuit or a series-parallel circuit. The meaning of a recognition terminal in the present invention at least covers a recognition terminal and a sensing component in the examples.

It should be noted that when one element is considered to be "connected" to another element, the element may be directly connected to the another element or an intermediate element may exist between the elements. The terms "up", "down", "left", "right" and similar expressions used herein are only for the purpose of description.

Unless otherwise defined, all technical and scientific terms used herein have meanings the same as those generally understood by a person skilled in the art of this disclosure. The terms used herein in the specification of this disclosure are only for the purpose of describing specific example, but are not intended to limit the present invention. The term "and/or" used herein includes any combination or all combinations of one or more related listed items.

The present invention is not limited to the listed structures in specific examples. Different examples may be combined with each other. For example, an energy storage component in Example A is replaced by an energy storage component in Example B. An interface circuit in Example B is replaced by an interface circuit in Example C, and at the same time a control circuit in Example B is replaced by a control circuit in Example D. The combination of different examples is not limited to the combination of examples under the same group examples, and examples under different group examples may also be combined. Structures obtained based on the concept of the present invention and combination of various examples all fall within the protection scope of the present invention.

What is claimed is:

1. An electrical energy transmission apparatus, comprising:
   an input component, connected to a direct current (DC) energy storage component;
   an output component, comprising an alternating current (AC) device interface used to connect an AC device; and
   an adapter component, transferring electrical energy from the input component to the output component, wherein the adapter component comprises a DC driving unit and an AC driving unit, the DC driving unit converts energy of the DC energy storage component into a DC power, the AC driving unit converts energy of the DC energy storage component into an AC power, and at least one of the DC driving unit and the AC driving unit is connected to the AC device interface;
   wherein the DC driving unit and the AC driving unit are alternatively connected to a same AC device interface,
   wherein the adapter component further comprises a detection unit, a controller, and an output selection unit, the detection unit detects a working parameter related to a characteristic of the AC device, and the controller controls, according to a detection result of the detection unit, the output selection unit to alternatively output an AC power or a DC power, and
   wherein the detection unit detects a power of the AC device and when determining that the power of the AC device is less than or equal to a preset value, the controller controls the output selection unit to output an AC power to the AC device interface; and when determining that the power of the AC device is greater than a preset power value, the controller controls the output selection unit to output a DC power to the AC device interface.

2. The electrical energy transmission apparatus according to claim 1, wherein the DC driving unit outputs a continuous DC power to the AC device interface.

3. The electrical energy transmission apparatus according to claim 1, wherein the DC driving unit outputs an intermittently interruptive DC power to the AC device interface.

4. The electrical energy transmission apparatus according to claim 3, wherein the DC power is periodically interrupted.

5. The electrical energy transmission apparatus according to claim 4, wherein duration of the DC power is greater than or equal to 20 ms.

6. The electrical energy transmission apparatus according to claim 3, wherein when a preset condition is met, the DC power is interrupted, and the preset condition is that the electrical energy transmission apparatus detects that a main switch of the AC device connected to the electrical energy transmission apparatus receives a turn-off instruction.

7. The electrical energy transmission apparatus according to claim 3, wherein when a preset condition is met, the DC power is interrupted, and the preset condition is that the electrical energy transmission apparatus detects that a working parameter of a main switch of the AC device connected to the electrical energy transmission apparatus meets an interruption condition.

8. The electrical energy transmission apparatus according to claim 3, wherein duration of the interruption is greater than or equal to 3 ms.

9. The electrical energy transmission apparatus according to claim 1, wherein the AC driving unit boosts and inverts electrical energy of the input component into an AC power.

10. The electrical energy transmission apparatus according to claim 9, wherein a maximum output power of the AC driving unit is less than or equal to 300 W.

11. The electrical energy transmission apparatus according to claim 1, wherein a peak value of the AC power is less than or equal to a voltage value at an input terminal of the AC driving unit.

12. The electrical energy transmission apparatus according to claim 1, wherein the AC driving unit gradually increases, in a soft start manner, a power of an AC power applied to the AC device interface.

13. The electrical energy transmission apparatus according to claim 1, wherein when the controller determines that the power of the AC device is greater than the preset power value, the controller further determines whether the AC device is suitable to be powered by a DC power, and when a determining result is yes, controls the output selection unit to output a DC power to the AC device interface, or when a determining result is no, controls the output selection unit stop outputting electrical energy to the AC device interface.

14. The electrical energy transmission apparatus according to claim 13, wherein a specific manner in which the controller further determines whether the AC device is suitable to be powered by a DC power is that, the detection unit detects an AC working current value of the electrical energy transmission apparatus that exists when an AC power is output to the AC device interface and a DC working current value of the electrical energy transmission apparatus that exists when a DC power is output to the AC device interface, when the DC working current value and the AC working current value meet a preset relationship, a determining result of the controller is yes, and when the DC working current value and the AC working current value meet a turn-off condition, a determining result of the controller is no.

15. The electrical energy transmission apparatus according to claim 14, wherein the preset relationship is: the DC working current value is less than five times of the AC working current value.

16. The electrical energy transmission apparatus according to claim 14, wherein the turn-off condition is: the DC working current value is greater than five times of the AC working current value; or the DC working current value is greater than the AC working current value by more than 10 A.

17. The electrical energy transmission apparatus according to claim 14, wherein when the controller determines whether the AC device is suitable to be powered by a DC power, a power of an AC power or a DC power output to the AC device interface is restricted.

18. The electrical energy transmission apparatus according to claim 1, wherein in a process in which the output selection unit outputs an AC power to the AC device interface, if the detection unit detects that the power of the AC device is greater than the preset power value, the controller controls the output selection unit to output a DC power to the AC device interface.

19. The electrical energy transmission apparatus according to claim 1, wherein in a process in which the output selection unit outputs a DC power to the AC device interface, if the detection unit detects that the power of the AC device is less than or equal to the preset power value, the controller controls the output selection unit to output an AC power to the AC device interface.

20. A control method for an electrical energy transmission apparatus comprising:
    an input component, connected to a direct current (DC) energy storage component;
    an output component, comprising an alternating current (AC) device interface used to connect an AC device; and
    an adapter component, transferring electrical energy from the input component to the output component, wherein the adapter component comprises a DC driving unit and an AC driving unit, the DC driving unit converts energy of the DC energy storage component into a DC power, the AC driving unit converts energy of the DC energy storage component into an AC power, and at least one of the DC driving unit and the AC driving unit is connected to the AC device interface;
    wherein the DC driving unit and the AC driving unit are alternatively connected to a same AC device interface,
    wherein the adapter component further comprises a detection unit, a controller, and an output selection unit, the detection unit detects a working parameter related to a characteristic of the AC device, and the controller controls, according to a detection result of the detection unit, the output selection unit to alternatively output an AC power or a DC power, and
    wherein the detection unit detects a power of the AC device and when determining that the power of the AC device is less than or equal to a preset value, the controller controls the output selection unit to output an AC power to the AC device interface; and when determining that the power of the AC device is greater than a preset power value, the controller controls the output selection unit to output a DC power to the AC device interface, wherein the control method comprises the following steps:
connecting an alternating current (AC) device to an AC device interface of an electrical energy transmission apparatus;
detecting a power of the AC device;
when the power of the AC device is less than or equal to a preset power value, outputting an AC power to the AC device interface; and
when the power of the AC device is greater than the preset power value, outputting a direct current (DC) power to the AC device interface.

21. The control method according to claim 20, wherein before the outputting a DC power to the AC device interface, the control method further comprises the following steps:
determining whether the AC device is suitable to be powered by a DC power, and if a determining result is yes, outputting a DC power to the AC device interface, or if a determining result is no, stopping outputting electrical energy to the AC device interface.

22. The control method according to claim 21, wherein the step of determining whether the AC device is suitable to be powered by a DC power is:
outputting an AC power to the AC device interface;
detecting an AC working current of the electrical energy transmission apparatus;
outputting a DC power to the AC device interface;
detecting a DC working current of the electrical energy transmission apparatus; and
if a DC working current value and an AC working current value meet a preset relationship, a determining result is yes, and if the DC working current value and the AC working current value meet a turn-off condition, a determining result is no.

23. A power supply system, wherein the power supply system comprises a direct current (DC) energy storage component and an electrical energy transmission apparatus comprising:
an input component, connected to the DC energy storage component;
an output component, comprising an alternating current (AC) device interface used to connect an AC device; and
an adapter component, transferring electrical energy from the input component to the output component, wherein the adapter component comprises a DC driving unit and an AC driving unit, the DC driving unit converts energy of the DC energy storage component into a DC power, the AC driving unit converts energy of the DC energy storage component into an AC power, and at least one of the DC driving unit and the AC driving unit is connected to the AC device interface;
wherein the DC driving unit and the AC driving unit are alternatively connected to a same AC device interface,
wherein the adapter component further comprises a detection unit, a controller, and an output selection unit, the detection unit detects a working parameter related to a characteristic of the AC device, and the controller controls, according to a detection result of the detection unit, the output selection unit to alternatively output an AC power or a DC power, and
wherein the detection unit detects a power of the AC device and when determining that the power of the AC device is less than or equal to a preset value, the controller controls the output selection unit to output an AC power to the AC device interface; and when determining that the power of the AC device is greater than a preset power value, the controller controls the output selection unit to output a DC power to the AC device interface.

24. The power supply system according to claim 23, wherein the DC energy storage component comprises a primary energy storage module, a secondary energy storage module, and a tertiary energy storage module; the primary energy storage module is a battery pack detachably mounted on the electrical energy transmission apparatus; the secondary energy storage module is a standard battery unit located in the battery pack, and the standard battery unit has an output terminal that outputs a voltage; the DC energy storage component comprises multiple secondary energy storage modules; the secondary energy storage module comprises multiple tertiary energy storage modules; and the tertiary energy storage module is a cell located in the secondary energy storage module.

25. The power supply system according to claim 24, wherein an adapter component comprises a conversion circuit, an input terminal of the conversion circuit is connected to the input component, an output terminal of the conversion circuit is connected to the DC driving unit and the alternating current (AC) driving unit, and the conversion circuit connects the secondary energy storage module in series and/or in parallel.

26. The power supply system according to claim 25, wherein the conversion circuit comprises multiple different series-parallel circuits.

* * * * *